(12) United States Patent
Umetsu et al.

(10) Patent No.: US 10,825,616 B2
(45) Date of Patent: Nov. 3, 2020

(54) NONAQUEOUS LITHIUM STORAGE ELEMENT

(71) Applicant: Asahi Kasei Kabushiki Kaisha, Tokyo (JP)

(72) Inventors: Kazuteru Umetsu, Tokyo (JP); Nobuhiro Okada, Tokyo (JP); Takeshi Kamijo, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/502,499

(22) Filed: Jul. 3, 2019

(65) Prior Publication Data
US 2019/0333710 A1    Oct. 31, 2019

Related U.S. Application Data

(63) Continuation of application No. 16/069,930, filed as application No. PCT/JP2017/002020 on Jan. 20, 2017, now Pat. No. 10,395,848.

(30) Foreign Application Priority Data

Jan. 22, 2016  (JP) .................................. 2016-010895
Aug. 8, 2016  (JP) .................................. 2016-155480
(Continued)

(51) Int. Cl.
*H01G 11/84* (2013.01)
*H01G 11/24* (2013.01)
(Continued)

(52) U.S. Cl.
CPC ............. *H01G 11/84* (2013.01); *H01G 11/06* (2013.01); *H01G 11/24* (2013.01); *H01G 11/34* (2013.01);
(Continued)

(58) Field of Classification Search
CPC .. H01G 11/06; H01G 11/50; H01G 11/78–82; H01G 11/84–86;
(Continued)

(56) References Cited

U.S. PATENT DOCUMENTS 5,427,875 A   6/1995  Yamamoto et al.
5,702,843 A  12/1997  Mitate et al.
(Continued)

FOREIGN PATENT DOCUMENTS

EP   2219247 A1   8/2010
EP   2485303 A1   8/2012
(Continued)

OTHER PUBLICATIONS

Office Action issued in U.S. Appl. No. 16/070,425 dated Jan. 24, 2020.
(Continued)

*Primary Examiner* — Scott B Geyer
(74) *Attorney, Agent, or Firm* — Morgan, Lewis & Bockius LLP

(57) ABSTRACT

Method of preparing a nonaqueous lithium power storage element, by providing a nonaqueous lithium power storage element comprising a positive electrode precursor containing a lithium compound other than an active material, a negative electrode, a separator, a nonaqueous electrolytic solution containing lithium ions, and a casing; and applying a voltage of 4.2V or more to the nonaqueous lithium power storage element to decompose the lithium compound in the positive electrode precursor and pre-dope the negative electrode with the lithium ions, while releasing a gas generated from decomposition of the lithium compound either out of an opening of the casing or through a degassing valve or gas permeable film.

21 Claims, 2 Drawing Sheets

(30) Foreign Application Priority Data

| Aug. 8, 2016 | (JP) | 2016-155794 |
| Sep. 30, 2016 | (JP) | 2016-192448 |
| Sep. 30, 2016 | (JP) | 2016-192586 |

(51) Int. Cl.

| H01G 11/50 | (2013.01) |
| H01G 11/70 | (2013.01) |
| H01M 4/1393 | (2010.01) |
| H01M 10/0567 | (2010.01) |
| H01M 10/0585 | (2010.01) |
| H01G 11/34 | (2013.01) |
| H01M 10/052 | (2010.01) |
| H01G 11/78 | (2013.01) |
| H01G 11/06 | (2013.01) |
| H01M 4/36 | (2006.01) |
| H01M 10/0525 | (2010.01) |
| H01G 11/26 | (2013.01) |

(52) U.S. Cl.
CPC ............ *H01G 11/50* (2013.01); *H01G 11/70* (2013.01); *H01G 11/78* (2013.01); *H01M 4/1393* (2013.01); *H01M 4/364* (2013.01); *H01M 10/052* (2013.01); *H01M 10/0525* (2013.01); *H01M 10/0567* (2013.01); *H01M 10/0585* (2013.01); *H01G 11/26* (2013.01); *Y02E 60/13* (2013.01); *Y02T 10/70* (2013.01)

(58) Field of Classification Search
CPC ....... H01M 4/139–1399; H01M 4/382; H01M 4/405; H01M 10/0525
See application file for complete search history.

(56) References Cited

U.S. PATENT DOCUMENTS

| 5,928,812 | A | 7/1999 | Xue | |
| 6,294,292 | B1 | 9/2001 | Tsushima et al. | |
| 10,396,361 | B2 | 8/2019 | Kamijo et al. | |
| 10,403,447 | B2 | 9/2019 | Umetsu et al. | |
| 10,748,716 | B2 * | 8/2020 | Umetsu | H01M 10/0569 |
| 2004/0126659 | A1 | 7/2004 | Graetz et al. | |
| 2005/0130043 | A1 | 6/2005 | Gao et al. | |
| 2005/0233218 | A1 | 10/2005 | Ogawa et al. | |
| 2005/0271944 | A1 | 12/2005 | Suhara et al. | |
| 2006/0105242 | A1 | 5/2006 | Sato et al. | |
| 2006/0134517 | A1 | 6/2006 | Sawa et al. | |
| 2006/0209493 | A1 | 9/2006 | Fujino et al. | |
| 2007/0020385 | A1 | 1/2007 | Naoi et al. | |
| 2007/0281216 | A1 | 12/2007 | Petrat et al. | |
| 2008/0055819 | A1 | 3/2008 | Taguchi et al. | |
| 2008/0254368 | A1 | 10/2008 | Ooyama et al. | |
| 2010/0255377 | A1 | 10/2010 | Tsubata et al. | |
| 2011/0039160 | A1 | 2/2011 | Takahata et al. | |
| 2011/0159382 | A1 | 6/2011 | Matsui et al. | |
| 2012/0050950 | A1 | 3/2012 | Kim et al. | |
| 2012/0094177 | A1 | 4/2012 | Honoki et al. | |
| 2012/0212186 | A1 | 8/2012 | Fujii et al. | |
| 2013/0163147 | A1 * | 6/2013 | Uehara | H01G 11/50 361/502 |
| 2013/0208404 | A1 | 8/2013 | Yasuda et al. | |
| 2013/0208405 | A1 | 8/2013 | Okada et al. | |
| 2013/0224608 | A1 | 8/2013 | Sasaki et al. | |
| 2015/0162598 | A1 | 6/2015 | Kim et al. | |
| 2015/0243449 | A1 * | 8/2015 | Okada | H01G 11/28 361/502 |
| 2015/0255781 | A1 | 9/2015 | Hashimoto | |
| 2015/0311002 | A1 | 10/2015 | Okada et al. | |
| 2016/0284479 | A1 * | 9/2016 | Okuno | H01G 11/52 |
| 2016/0300667 | A1 | 10/2016 | Okada et al. | |
| 2017/0200943 | A1 | 7/2017 | Kawakami | |
| 2017/0207459 | A1 | 7/2017 | Okada et al. | |
| 2017/0214103 | A1 * | 7/2017 | Onnerud | H01G 11/66 |
| 2017/0244098 | A1 | 8/2017 | Duong et al. | |
| 2019/0020030 | A1 * | 1/2019 | Umetsu | H01G 11/78 |
| 2019/0027319 | A1 * | 1/2019 | Umetsu | H01G 11/24 |
| 2019/0027754 | A1 * | 1/2019 | Kamijo | H01G 11/06 |

FOREIGN PATENT DOCUMENTS

| JP | H04-328278 A | 11/1992 |
| JP | H05-343066 A | 12/1993 |
| JP | H08-107048 A | 4/1996 |
| JP | 2001-126718 A | 5/2001 |
| JP | 2001-167767 A | 6/2001 |
| JP | 2003-297424 A | 10/2003 |
| JP | 2004-095188 A | 3/2004 |
| JP | 2004-362859 A | 12/2004 |
| JP | 2007-035770 A | 2/2007 |
| JP | 2008-177263 A | 7/2008 |
| JP | 2008-181830 A | 8/2008 |
| JP | 2008-251434 A | 10/2008 |
| JP | 2010-205827 A | 9/2010 |
| JP | 2010-225291 A | 10/2010 |
| JP | 2011-249507 A | 12/2011 |
| JP | 2012-074467 A | 4/2012 |
| JP | 2012-174437 A | 9/2012 |
| JP | 2014-022334 A | 2/2014 |
| JP | 2014-143380 A | 8/2014 |
| JP | 2014-146448 A | 8/2014 |
| JP | 2014-199723 A | 10/2014 |
| JP | 2015-072867 A | 4/2015 |
| JP | 2015-092478 A | 5/2015 |
| JP | 2016-012620 A | 1/2016 |
| TW | 201535848 A | 9/2015 |
| WO | 2012/063545 A1 | 5/2012 |
| WO | 2012/070397 A1 | 5/2012 |
| WO | 2012/081348 A1 | 6/2012 |
| WO | 2014/088074 A1 | 6/2014 |
| WO | 2016/006632 A1 | 1/2016 |
| WO | 2016/010056 A1 | 1/2016 |

OTHER PUBLICATIONS

Barrett et al., "The Determination of Pore Volume and Area Distributions in Porous Substances: I. Computations from Nitrogen Isotherms," The Journal of the American Chemical Society, 73: 373-380 (1951).

Lippens et al., "Studies on Pore Systems in Catalysts: V. The t Method," Journal of Catalysts, 4: 319-323 (1965).

Mikhail et al., "Investigations of a Complete Pore Structure Analysis: I. Analysis of Micropores," Journal of Colloid and Interface Science, 26: 45-53 (1968).

International Search Report issued in corresponding International Patent Application No. PCT/JP2017/002020 dated Apr. 18, 2017.

Decision of Patent Grant issued in corresponding Japanese Patent Application No. 2017-509060 dated Nov. 22, 2017.

Partial Supplemental European Search Report issued in related European Patent Application No. 17741570.0 dated Jan. 11, 2019.

Supplemental European Search Report issued in corresponding European Patent Application No. 17741570.0 dated Apr. 11, 2019.

International Preliminary Report on Patentability and Written Opinion issued in corresponding International Patent Application No. PCT/JP2017/002020 dated Aug. 2, 2018.

Supplemental European Search Report issued in related European Patent Application No. 17741564.3 dated Nov. 23, 2018.

* cited by examiner

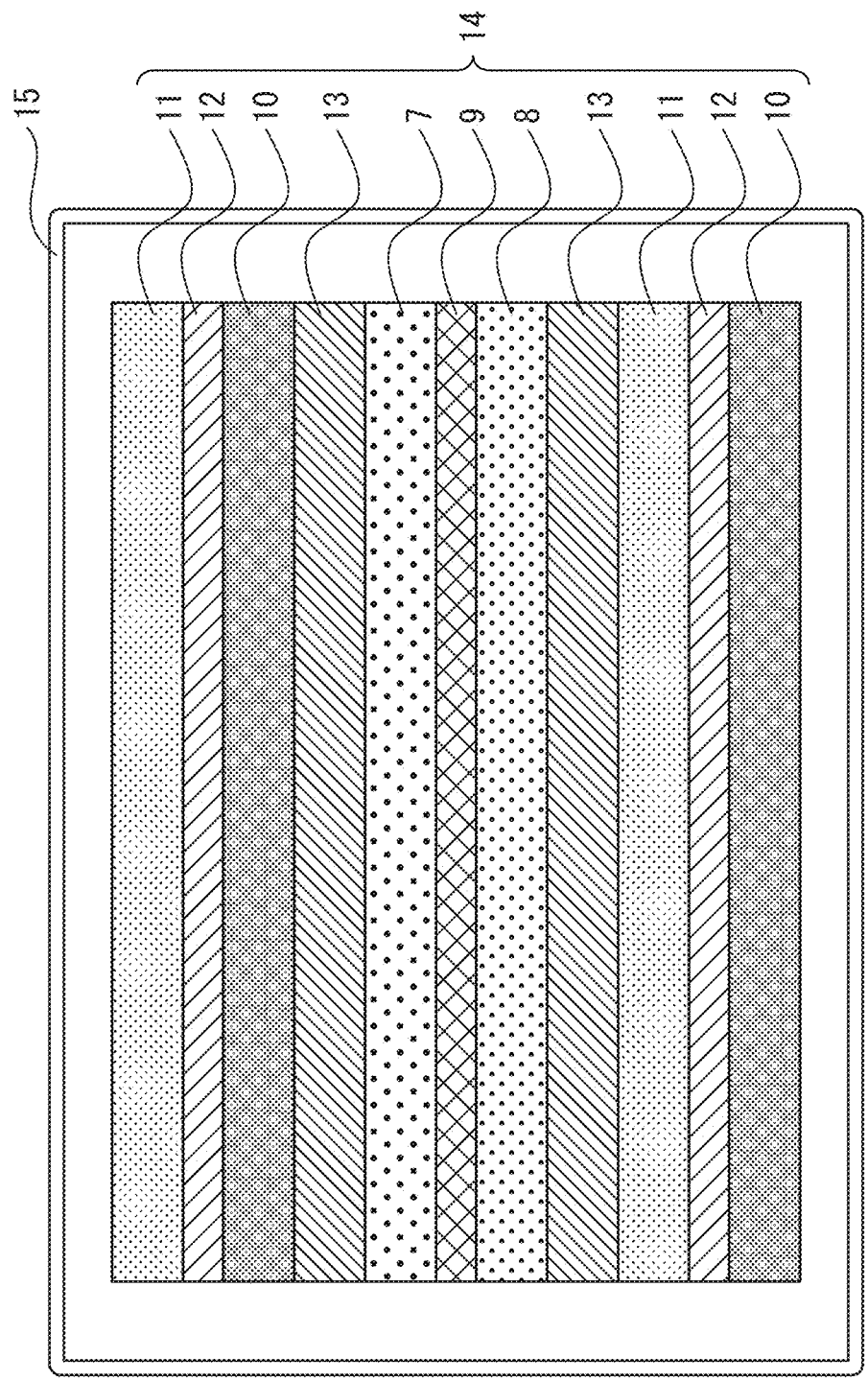

NONAQUEOUS LITHIUM STORAGE ELEMENT

RELATED APPLICATION DATA

This application is a continuation application of U.S. application Ser. No. 16/069,930, filed Jul. 13, 2018, which is a § 371 National Stage Application of PCT International Application No. PCT/JP2017/002020 filed Jan. 20, 2017 claiming priority of Japanese Application No. JP 2016-010895, filed Jan. 22, 2016; Japanese Application No. JP 2016-155480, filed Aug. 8, 2016; Japanese Application No. JP 2016-155794, filed Aug. 8, 2016; Japanese Application No. JP 2016-192448, filed Sep. 30, 2016; and Japanese Application No. JP 2016-192586, filed Sep. 30, 2016, the entire contents of each are incorporated herein by reference.

FIELD

The present invention relates to a nonaqueous lithium power storage element.

BACKGROUND

In recent years, with an aim toward effective utilization of energy for greater environmental conservation and reduced usage of resources, a great deal of attention is being directed to power smoothing systems for wind power generation or overnight charging electric power storage systems, household dispersive power storage systems based on solar power generation technology, and power storage systems for electric vehicles and the like.

The number one requirement for cells used in such power storage systems is high energy density. The development of lithium ion batteries is therefore advancing at a rapid pace, as an effective strategy for cells with high energy density that can meet this requirement.

The second requirement is a high output characteristic. A high power discharge characteristic is required for a power storage system during acceleration in, for example, a combination of a high efficiency engine and a power storage system (such as in a hybrid electric vehicle), or a combination of a fuel cell and a power storage system (such as in a fuel cell electric vehicle).

Electrical double layer capacitors and nickel-metal hydride batteries are currently under development as high output power storage devices.

Electrical double layer capacitors that employ activated carbon in the electrodes have output characteristics of about 0.5 to 1 kW/L. Such electrical double layer capacitors have high durability (cycle characteristics and high-temperature storage characteristics), and have been considered optimal devices in fields where the high output mentioned above is required. However, their energy densities are no more than about 1 to 5 Wh/L. A need therefore exists for even higher energy density.

On the other hand, nickel-metal hydride batteries employed in existing hybrid electric vehicles exhibit high output equivalent to electrical double layer capacitors, and have energy densities of about 160 Wh/L. Still, research is being actively pursued toward further increasing their energy density and output, and increasing their durability (especially stability at high temperatures).

Research is also advancing toward increased outputs for lithium ion batteries as well. For example, lithium ion batteries are being developed that yield high output exceeding 3 kW/L at 50% depth of discharge (a value representing the state of the percentage of discharge of the service capacity of a power storage element). However, the energy density is 100 Wh/L or less, and the design is such that high energy density, as the major feature of a lithium ion battery, is reduced. Also, the durability (especially cycle characteristic and high-temperature storage characteristic) is inferior to that of an electrical double layer capacitor. In order to provide practical durability, therefore, these are used with a depth of discharge in a narrower range than 0 to 100%. Because the usable capacity is even lower, research is actively being pursued toward further increasing durability.

There is a strong demand for implementation of power storage elements exhibiting high energy density, high output characteristics and durability, as mentioned above. Nevertheless, the existing power storage elements mentioned above have their advantages and disadvantages. New power storage elements are therefore desired that can meet these technical requirements. Promising candidates are power storage elements known as lithium ion capacitors, which are being actively developed in recent years.

A lithium ion capacitor is a type of power storage element using a nonaqueous electrolytic solution comprising a lithium salt (hereunder also referred to as "nonaqueous lithium power storage element"), wherein charge/discharge is accomplished by non-Faraday reaction by adsorption and desorption of anions similar to an electrical double layer capacitor at about 3 V or higher, at the positive electrode, and Faraday reaction by intercalation and release of lithium ions similar to a lithium ion battery, at the negative electrode.

To summarize the electrode materials commonly used in power storage elements, and their characteristics: when charge/discharge is carried out using a material such as activated carbon as an electrode, by adsorption and desorption of ions on the activated carbon surface (non-Faraday reaction), it is possible to obtain high output and high durability, but with lower energy density (for example, one-fold). On the other hand, when charge/discharge is carried out by Faraday reaction using an oxide or carbon material as the electrode, the energy density is higher (for example, 10-fold that of non-Faraday reaction using activated carbon), but then durability and output characteristic become issues.

Electrical double layer capacitors that combine these electrode materials employ activated carbon as the positive electrode and negative electrode (energy density: one-fold), and carry out charge/discharge by non-Faraday reaction at both the positive and negative electrodes, and are characterized by having high output and high durability, but also low energy density (positive electrode: one-fold×negative electrode: one-fold=1).

Lithium ion secondary batteries use a lithium transition metal oxide (energy density: 10-fold) for the positive electrode and a carbon material (energy density: 10-fold) for the negative electrode, carrying out charge/discharge by Faraday reaction at both the positive and negative electrodes, but while their energy density is high (positive electrode: 10-fold×negative electrode: 10-fold=100), they have issues in terms of output characteristic and durability. In addition, the depth of discharge must be restricted in order to satisfy the high durability required for hybrid electric vehicles, and with lithium ion secondary batteries only 10 to 50% of the energy can be utilized.

A lithium ion capacitor is a new type of asymmetric capacitor that employs activated carbon (energy density: 1×) for the positive electrode and a carbon material (energy density: 10-fold) for the negative electrode, and it is characterized by carrying out charge/discharge by non-Faraday reaction at the positive electrode and Faraday reaction at the negative electrode, and thus having the characteristics of both an electrical double layer capacitor and a lithium ion secondary battery. It also exhibits high output and high durability, while also having high energy density (positive electrode: one-fold×negative electrode: 10-fold=10) and requiring no restrictions on depth of discharge as with a lithium ion secondary battery.

In PTL 1 there is proposed a lithium ion secondary battery using a positive electrode containing lithium carbonate in the positive electrode, and having a current shielding mechanism that operates in response to increased internal pressure in the battery. In PTL 2 there is proposed a lithium ion secondary battery employing a lithium complex oxide such as lithium manganate as the positive electrode, and with reduced elution of manganese by including lithium carbonate in the positive electrode. In PTL 3 there is proposed a method of causing restoration of the capacitance of a deteriorated power storage element by oxidizing different lithium compounds as coated oxides at the positive electrode.

These methods, however, are associated with increased resistance due to inhibition of electron conduction between the active material particles by addition of lithium compounds, and reduced energy density, and therefore there has still been room for improvement in terms of high output and high energy density. Moreover, the change in potential of the positive electrode active material layer coated on the front and back sides of nonporous positive electrode power collector is not taken into consideration, and therefore there has still been room for improvement in terms of minimizing excessive decomposition of the lithium compound in the positive electrode active material layer.

PTL 4 proposes a power storage element employing activated carbon as the positive electrode active material, and as the negative electrode active material, a carbonaceous material obtained by intercalating lithium by a chemical process or electrochemical process in a carbon material capable of intercalating and withdrawing lithium in an ionized state. However, the uses mentioned for the lithium ion capacitor are power storage elements for railways, construction machinery and automobiles, and such uses require even greater improvement in the charge/discharge cycle characteristic under high load.

With charge/discharge of a nonaqueous lithium power storage element, the negative electrode active material layer undergoes repeated intercalation and release of lithium ions and expansion and shrinkage, and the stress causes the negative electrode active material layer to detach from the negative electrode power collector, lowering the high load charge/discharge cycle characteristic. Methods for minimizing such detachment of the negative electrode active material layer include methods of modifying the type and amount of binder.

However, since binders with high binding capacity have a low swelling property for nonaqueous electrolytic solutions, and the increase in binder causes obstruction of the lithium ion diffusion channels in the nonaqueous electrolytic solution, the internal resistance increases, resulting in increased overvoltage during high load charge/discharge cycling, and significant increase in the coating film or deposits due to reductive decomposition of the nonaqueous electrolytic solution at the negative electrode active material layer, and making it difficult to obtain a satisfactory high load charge/discharge cycle characteristic.

PTL 5 proposes a lithium ion capacitor having low deviation in thickness of the electrode layer on the front and back sides. With the electrode of PTL 5, however, no consideration is given to minimizing increase in resistance during high load charge/discharge cycling at the lithium compound-containing positive electrode, or minimizing gas generation due to decomposition of the lithium compound under high voltage.

CITATION LIST

Patent Literature

[PTL 1] Japanese Unexamined Patent Publication HEI No. 4-328278
[PTL 2] Japanese Unexamined Patent Publication No. 2001-167767
[PTL 3] Japanese Unexamined Patent Publication No. 2012-174437
[PTL 4] Japanese Unexamined Patent Publication 1996 (H8)-107048
[PTL 5] International Patent Publication No. WO2012/63545

Non-Patent Literature

[NPL 1] E. P. Barrett, L. G. Joyner and P. Halenda, J. Am. Chem. Soc., 73, 373(1951)
[NPL 2] B. C. Lippens, J. H. de Boer, J. Catalysis, 4319 (1965)
[NPL 3] R. S. Mikhail, S. Brunauer, E. E. Bodor, J. Colloid Interface ci., 26, 45(1968)

SUMMARY

Technical Problem

The present invention has been devised in light of the existing situation as described above.

The problem to be solved by the invention is therefore to provide a nonaqueous lithium power storage element employing a nonporous positive electrode power collector and a nonporous negative electrode power collector, having high output and high energy density without lowering electron conductivity of the positive electrode containing the lithium compound, an excellent high load charge/discharge cycle characteristic, adjusting the change in potential of a positive electrode active material layer coated onto both sides of the nonporous positive electrode power collector, and minimizing gas generated by excessive decomposition of the lithium compound remaining in the positive electrode under high-temperature, high-voltage conditions, wherein uneven distribution of ions in the electrolytic solution during high load charge/discharge cycling is mitigated to suppress increase in resistance, and decomposition of the lithium compound in the positive electrode under high voltage is suppressed to inhibit gas generation.

Solution to Problem

The present inventors have conducted much diligent experimentation with the aim of solving the problems described above. As a result, it has been found that by controlling the mean particle diameter $X_1$ of the lithium compound in the positive electrode and the mean particle diameter $Y_1$ of the positive electrode active material to ensure electron conductivity between the positive electrode active materials, it is possible to obtain high output and high energy density.

The present invention has been devised on the basis of this knowledge.

Specifically, the present invention is as follows.

[1] A nonaqueous lithium power storage element comprising a positive electrode containing a lithium compound other than an active material, a negative electrode, a separator and a nonaqueous electrolytic solution containing a lithium ion, wherein the expression 0.1 µm≤$X_1$≤10.0 µm is satisfied, where $X_1$ is the mean particle diameter of the lithium compound, the expressions 2.0 µm≤$Y_1$≤20.0 µm and $X_1$<$Y_1$ are satisfied, where $Y_1$ is the mean particle diameter of a positive electrode active material, and the amount of lithium compound in the positive electrode is 1 weight % to 50 weight %.

[2] The nonaqueous lithium power storage element according to [1], wherein the area overlap ratio $A_1$ of fluorine mapping with respect to oxygen mapping, binarized based on the average value of brightness, is 40% to 99%, in element mapping of the positive electrode surface by SEM-EDX.

[3] The nonaqueous lithium power storage element according to [1] or [2], wherein the area overlap ratio $A_2$ of fluorine mapping with respect to oxygen mapping, binarized based on the average value of brightness, is 10% to 60%, in element mapping of the BIB-processed positive electrode cross-section by SEM-EDX.

[4] The nonaqueous lithium power storage element according to any one of [1] to [3], wherein $X_1$ is 0.5 µm to 5.0 µm.

[5] The nonaqueous lithium power storage element according to any one of [1] to [4], wherein the amount of lithium compound in the positive electrode is 2 weight % to 20 weight %.

[6] The nonaqueous lithium power storage element according to any one of [1] to [5], wherein the negative electrode has a nonporous negative electrode power collector, and a negative electrode active material layer containing a negative electrode active material, formed on one or both sides of the negative electrode power collector, the negative electrode active material contains a carbon material capable of intercalating and releasing lithium ions, at least one positive electrode has a nonporous positive electrode power collector, and a positive electrode active material layer containing the positive electrode active material, formed on both sides of the positive electrode power collector, $C_{y1}/C_{x1}$ is 0.70 to 0.98, where the basis weight of the positive electrode active material layer on one side ($C_y$ side) of the positive electrode is $C_{y1}$ (g/m$^2$) and the basis weight of the positive electrode active material layer on the other side ($C_x$ side) is $C_{x1}$ (g/m$^2$), and $C_{y2}$ and $C_{x2}$ are 0.10 to 20.0 and $C_{y2}/C_{x2}$ is 0.10 to 1.0, where the amount of lithium compound per unit area of the $C_y$ side is $C_{y2}$ (g/m$^2$) and the amount of lithium compound per unit area on the $C_x$ side is $C_{x2}$ (g/m$^2$).

[7] The nonaqueous lithium power storage element according to any one of [1] to [6], wherein the positive electrode has a positive electrode power collector and a positive electrode active material layer containing a positive electrode active material, formed on one or both sides of the positive electrode power collector, the negative electrode has a negative electrode power collector without through-holes, and first and second negative electrode active material layers containing a negative electrode active material, formed on both sides of the negative electrode power collector, the first and second negative electrode active material layers each intercalate lithium ions, and the coefficient of variation CV of $q_1$ and $q_2$ is 0.001 to 0.500, where $q_1$ is the amount of lithium per unit weight of the first negative electrode active material layer that has intercalated the lithium ions, calculated by the peak area of −20 ppm to 60 ppm in the solid $^7$Li-NMR spectrum of the first negative electrode active material layer formed on the first side of the negative electrode power collector, and $q_2$ is the amount of lithium per unit weight of the second negative electrode active material layer that has intercalated the lithium ions, calculated by the peak area of −20 ppm to 60 ppm in the solid $^7$Li-NMR spectrum of the second negative electrode active material layer formed on the second side of the negative electrode power collector, which is the back side of the first side.

[8] The nonaqueous lithium power storage element according to [7], wherein 1.04≤b/a≤5.56 is satisfied, where, in the solid $^7$Li-NMR spectrum of the positive electrode active material layer, "a" is the peak area in the spectral range of −40 ppm to 40 ppm, obtained by measurement with a repeated latency of 10 seconds, and "b" is the peak area in the spectral range of −40 ppm to 40 ppm, obtained by measurement with a repeated latency of 3,000 seconds.

[9] The nonaqueous lithium power storage element according to [7] or [8], wherein the BET specific surface area per unit volume of the first or second negative electrode active material layer is 20 m$^2$/cc to 1,500 m$^2$/cc.

[10] The nonaqueous lithium power storage element according to [7] or [8], wherein the BET specific surface area per unit volume of the first or second negative electrode active material layer is 1 m$^2$/cc to 50 m$^2$/cc.

[11] The nonaqueous lithium power storage element according to any one of [1] to [10], wherein the positive electrode active material is activated carbon satisfying 0.3<$V_1$≤0.8 and 0.5≤$V_2$≤1.0, where $V_1$ (cc/g) is the mesopore volume due to pores with diameters of 20 Å to 500 Å as calculated by the BJH method, and $V_2$ (cc/g) is the micropore volume due to pores with diameters of smaller than 20 Å as calculated by the MP method, and has a specific surface area of 1,500 m$^2$/g to 3,000 m$^2$/g, as measured by the BET method.

[12] The nonaqueous lithium power storage element according to any one of [1] to [10], wherein the positive electrode active material is activated carbon satisfying 0.8<$V_1$≤2.5 and 0.8<$V_2$≤3.0, where $V_1$ (cc/g) is the mesopore volume due to pores with diameters of 20 Å to 500 Å as calculated by the BJH method, and $V_2$ (cc/g) is the micropore volume due to pores with diameters of smaller than 20 Å as calculated by the MP method, and has a specific surface area of 2,300 m$^2$/g to 4,000 m$^2$/g, as measured by the BET method.

[13]

A nonaqueous lithium power storage element having a positive electrode containing a lithium compound other than a positive electrode active material, a negative electrode, a separator, and a nonaqueous electrolytic solution containing a lithium ion, wherein the positive electrode has a positive electrode power collector and a positive electrode active material layer containing a positive electrode active material, formed on one or both sides of the positive electrode power collector, the negative electrode has a negative electrode power collector without through-holes, and first and second negative electrode active material layers containing a negative electrode active material, formed on both sides of the negative electrode power collector, the first and second negative electrode active material layers each intercalate lithium ions, and the coefficient of variation CV of $q_1$ and $q_2$ is 0.001 to 0.50, where $q_1$ is the amount of lithium per unit weight of the first negative electrode active material layer that has intercalated the lithium ions, calculated by the peak area of −20 ppm to 60 ppm in the solid $^7$Li-NMR spectrum of the first negative electrode active material layer formed on the first side of the negative electrode power collector, and $q_2$ is the amount of lithium per unit weight of the second negative electrode active material layer that has intercalated the lithium ions, calculated by the peak area of −20 ppm to 60 ppm in the solid $^7$Li-NMR spectrum of the second negative electrode active material layer formed on the second side of the negative electrode power collector, which is the back side of the first side, and Rb/Ra is 0.9 to 2.0, where Rb (Ω) is the internal resistance after 60,000 charge/discharge cycles and Ra (Ω) is the internal resistance before start of the charge/discharge cycles, the 60,000 charge/discharge cycles being carried out on the nonaqueous lithium power storage element at an environmental temperature of 25° C., a cell voltage of 2.2 V to 3.8 V and a rate of 300 C.

[14] The nonaqueous lithium power storage element according to any one of [1] to [12], wherein the active material is coated onto both sides of the nonporous positive electrode power collector of the positive electrode, a negative electrode active material capable of intercalating and releasing lithium ions is coated onto both sides of the nonporous negative electrode power collector of the negative electrode, $C_{x1}/C_{y1}$ is 1.02 to 1.35, where $C_{x1}$ (g/m$^2$) is the basis weight of the positive electrode active material layer on one side ($C_x$ side) of the positive electrode, and $C_{y1}$ (g/m$^2$) is the basis weight of the positive electrode active material layer on the other side ($C_y$ side), $A_{x1}/A_{y1}$ is 0.74 to 0.98, where $A_{y1}$ (g/m$^2$) is the basis weight of the negative electrode active material layer on one side ($A_y$ side) of the negative electrode that is facing the $C_y$ side, and $A_{x1}$ (g/m$^2$) is the basis weight of the negative electrode active material layer on the other side ($A_x$ side), and $C_{x2}$ and $C_{y2}$ are 0.10 to 20.0 and $C_{y2}/C_{x2}$ is 0.10 to 0.95, where $C_{x2}$ (g/m$^2$) is the basis weight of the lithium compound on the $C_x$ side, and $C_{y2}$ (g/m$^2$) is the basis weight of the lithium compound on the $C_y$ side.

[15] The nonaqueous lithium power storage element according to [14], wherein $(C_{x1}+C_{x2})A_{x1}/(C_{y1}+C_{y2})A_{y1}$ is 0.80 to 1.32.

[16] The nonaqueous lithium power storage element according to [14] or [15], wherein the $C_x$ side and $A_x$ side are facing each other.

[17] The nonaqueous lithium power storage element according to any one of [14] to [16], wherein the $C_y$ side contains one or more compounds represented by the following formulas (1) to (3):

[Chem. 1]

(1)

{where R$^1$ is an alkylene group of 1 to 4 carbon atoms or a halogenated alkylene group of 1 to 4 carbon atoms, and X$^1$ and X$^2$ each respectively and independently represent —(COO)$_n$ (where n is 0 or 1)},

[Chem. 2]

(2)

{where R$^1$ is an alkylene group of 1 to 4 carbon atoms or a halogenated alkylene group of 1 to 4 carbon atoms, R$^2$ is hydrogen, an alkyl group of 1 to 10 carbon atoms, a mono- or polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms, or an aryl group, and X$^1$ and X$^2$ each respectively and independently represent —(COO)$_n$ (where n is 0 or 1)}, and

[Chem. 3]

(3)

{where R$^1$ is an alkylene group of 1 to 4 carbon atoms or a halogenated alkylene group of 1 to 4 carbon atoms, R$^2$ and R$^3$ each respectively and independently represent hydrogen, an alkyl group of 1 to 10 carbon atoms, a polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms or an aryl group, and X$^1$ and X$^2$ each respectively and independently represent —(COO)$_n$ (where n is 0 or 1)}, and $C_{y3}$ is 1.60×10$^{-4}$ to 300×10$^{-4}$, where $C_{y3}$ (mol/g) is the content of the compound represented by formulas (1) to (3) per unit weight on the $C_y$ side.

[18] The nonaqueous lithium power storage element according to [17], wherein $C_{y3}/A_{y3}$ is 0.2 to 20, where $A_{y3}$ (mol/g) is the content of the compound represented by formulas (1) to (3) on the $A_y$ side.

[19] The nonaqueous lithium power storage element according to any one of [1] to [12] and

[14] to [18], wherein the lithium compound is lithium carbonate, lithium oxide or lithium hydroxide.

[20] The nonaqueous lithium power storage element according to any one of [14] to [19], wherein the lithium compound is lithium carbonate, and $S_x$ and $S_y$ are each 1 to 40 and $S_x/S_y$ is 1.00 to 2.00, where $S_x$% and $S_y$% are the area ratios in carbonate ion mapping for an image obtained by microscopic Raman spectroscopy of the $C_x$ side and $C_y$ side.

[21] The nonaqueous lithium power storage element according to any one of [14] to [20], wherein the positive electrode active material in the positive electrode active material layer having the $C_x$ side or $C_y$ side is activated carbon satisfying 0.3<$V_1$≤0.8 and 0.5≤$V_2$≤1.0, where $V_1$ (cc/g) is the mesopore volume due to pores with diameters of 20 Å to 500 Å as calculated by the BJH method, and $V_2$ (cc/g) is the micropore volume due to pores with diameters of smaller than 20 Å as calculated by the MP method, and has a specific surface area of 1,500 m$^2$/g to 3,000 m$^2$/g, as measured by the BET method.

[22] The nonaqueous lithium power storage element according to any one of [14] to [20], wherein the positive electrode active material in the positive electrode active material layer having the $C_x$ side or $C_y$ side is activated carbon in which the mesopore volume due to pores with diameters of 20 Å to 500 Å as calculated by the BJH method $V_1$ (cc/g) satisfies 0.8<$V_1$≤2.5, the micropore volume due to pores with diameters of smaller than 20 Å as calculated by the MP method $V_2$ (cc/g) satisfies 0.8<$V_2$≤3.0, and the specific surface area as measured by the BET method is 2,300 m$^2$/g to 4,000 m$^2$/g.

[23] The nonaqueous lithium power storage element according to any one of [1] to [12] and
[14] to [22], wherein the lithium ion doping amount with respect to the negative electrode active material is 530 mAh/g to 2,500 mAh/g per unit weight of the negative electrode active material.
[24] The nonaqueous lithium power storage element according to [23], wherein the BET specific surface area of the negative electrode active material is 100 m²/g to 1,500 m²/g.
[25] The nonaqueous lithium power storage element according to any one of [1] to [12] and
[14] to [22], wherein the lithium ion doping amount with respect to the negative electrode active material is 50 mAh/g to 700 mAh/g per unit weight of the negative electrode active material.
[26] The nonaqueous lithium power storage element according to [25], wherein the BET specific surface area of the negative electrode active material is 1 m²/g to 50 m²/g.
[27] The nonaqueous lithium power storage element according to any one of [1] to [22], [25] and [26], wherein the mean particle diameter of the negative electrode active material is 1 µm to 10 µm.
[28] A power storage module containing a nonaqueous lithium power storage element according to any one of [1] to [27].
[29] A power regenerating system containing a nonaqueous lithium power storage element according to any one of [1] to [27] or a power storage module according to [28].
[30] A power load-leveling system containing a nonaqueous lithium power storage element according to any one of [1] to [27] or a power storage module according to [28].
[31] An uninterruptible power source system containing a nonaqueous lithium power storage element according to any one of [1] to [27] or a power storage module according to [28].
[32] A non-contact power supply system containing a nonaqueous lithium power storage element according to any one of [1] to [27] or a power storage module according to [28].
[33] An energy harvesting system containing a nonaqueous lithium power storage element according to any one of [1] to [27] or a power storage module according to [28].
[34] A power storage system containing a nonaqueous lithium power storage element according to any one of [1] to [27] or a power storage module according to [28].

Advantageous Effects of Invention

According to the invention it is possible to provide a nonaqueous lithium power storage element employing a nonporous positive electrode power collector and a nonporous negative electrode power collector, having an excellent high load charge/discharge cycle characteristic, high output and high energy density, adjusting the change in potential of a positive electrode active material layer coated onto both sides of the nonporous positive electrode power collector, and minimizing gas generated by excessive decomposition of the lithium compound remaining in the positive electrode under high-temperature and high-voltage conditions, wherein uneven distribution of ions in the electrolytic solution during high load charge/discharge cycling is mitigated to suppress increase in resistance, and decomposition of the lithium compound in the positive electrode under high voltage is suppressed to inhibit gas generation.

BRIEF DESCRIPTION OF DRAWINGS

FIG. 3 is a diagram showing the facing states of the $C_x$ side and $C_y$ side of a positive electrode active material layer and the $A_x$ side and $A_y$ side of a negative electrode active material layer, in an electrode laminated body according to a fourth aspect of the invention.

DESCRIPTION OF EMBODIMENTS

Figure 1:
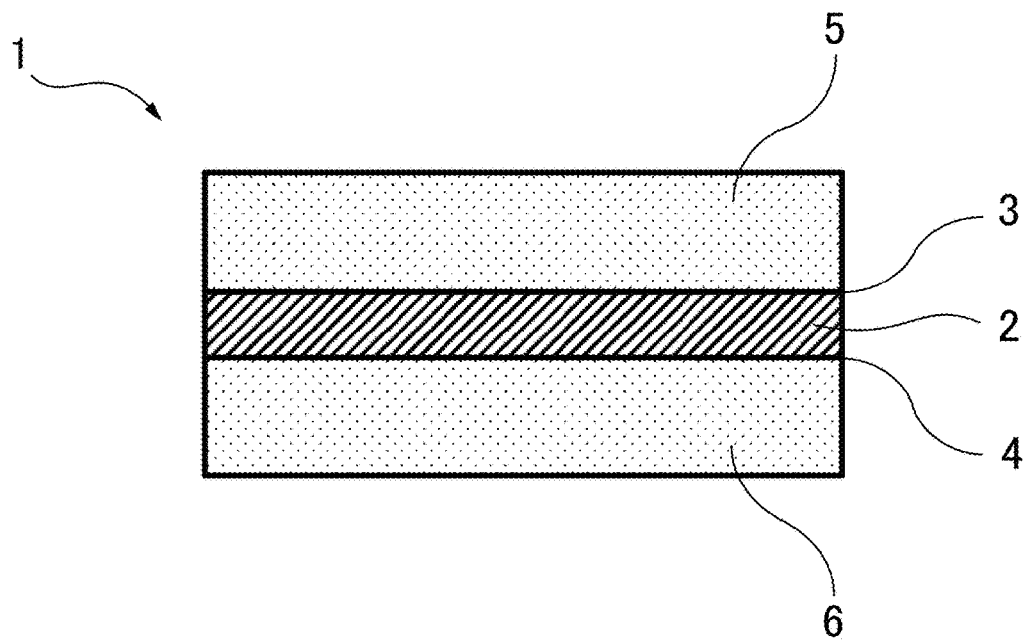
FIG. 1 is a schematic side view of a negative electrode according to a third aspect of the invention.

An embodiment of the invention (hereunder referred to as "this embodiment") will now be explained in detail as an example, with the understanding that the invention is not limited to this embodiment. The upper limits and lower limits for the numerical ranges for this embodiment may be combined as desired to constitute any desired numerical ranges.

A nonaqueous lithium power storage element generally comprises a positive electrode, a negative electrode, a separator, an electrolytic solution and a casing, as the major constituent elements. The electrolytic solution used is an organic solvent dissolving a lithium salt (hereunder referred to as "nonaqueous electrolytic solution").

The nonaqueous lithium power storage element of the invention comprises the following first to fourth aspects, and each of the aspects may be combined.
[First Aspect]

The first aspect of the nonaqueous lithium power storage element of the invention is a nonaqueous lithium power storage element containing a lithium compound other than the active material in the positive electrode, wherein the expression $0.1 \mu m \leq X_1 \leq 10.0 \mu m$ is satisfied, where $X_1$ is the mean particle diameter of the lithium compound, the expressions $2.0 \mu m \leq Y_1 \leq 20.0 \mu m$ and $X_1 < Y_1$ are satisfied, where $Y_1$ is the mean particle diameter of the positive electrode active material, and the amount of lithium compound in the positive electrode is 1 weight % to 50 weight %.
[Second Aspect]

The second aspect of the invention is a nonaqueous lithium power storage element wherein the negative electrode has a nonporous negative electrode power collector, and a negative electrode active material layer containing a negative electrode active material, formed on one or both sides of the negative electrode power collector, the negative electrode active material contains a carbon material capable of intercalating and releasing lithium ions, at least one positive electrode has a nonporous positive electrode power collector, and a positive electrode active material layer containing a positive electrode active material, formed on both sides of the positive electrode power collector, $C_{y1}/C_{x1}$ is 0.70 to 0.98, where the basis weight of the positive electrode active material layer on one side ($C_y$ side) of the positive electrode is $C_{y1}$ (g/m²) and the basis weight of the positive electrode active material layer on the other side ($C_x$ side) is $C_{x1}$ (g/m²), and $C_{y2}$ and $C_{x2}$ are 0.10 to 20.0 and $C_{y2}/C_{x2}$ is 0.10 to 1.0, where the amount of lithium compound per unit area of the $C_y$ side is $C_{y2}$ (g/m²) and the amount of lithium compound per unit area on the $C_x$ side is $C_{x2}$ (g/m²).

[Third Aspect]

A nonaqueous lithium power storage element wherein the positive electrode has a positive electrode power collector and a positive electrode active material layer containing a positive electrode active material, formed on one or both sides of the positive electrode power collector, the negative electrode has a negative electrode power collector without through-holes, and first and second negative electrode active material layers containing a negative electrode active material, formed on both sides of the negative electrode power collector, the first and second negative electrode active material layers each intercalate lithium ions, and the coefficient of variation CV of $q_1$ and $q_2$ is 0.001 to 0.500, where $q_1$ is the amount of lithium per unit weight of the first negative electrode active material layer that has intercalated the lithium ions, calculated by the peak area in a range of −20 ppm to 60 ppm in the solid $^7$Li-NMR spectrum of the first negative electrode active material layer formed on the first side of the negative electrode power collector, and $q_2$ is the amount of lithium per unit weight of the second negative electrode active material layer that has intercalated the lithium ions, calculated by the peak area in a range of −20 ppm to 60 ppm in the solid $^7$Li-NMR spectrum of the second negative electrode active material layer formed on the second side of the negative electrode power collector, which is the back side of the first side.

[Fourth Aspect]

The fourth aspect of the invention is a nonaqueous lithium power storage element wherein the active material is coated onto both sides of the nonporous positive electrode power collector of the positive electrode, a negative electrode active material capable of intercalating and releasing lithium ions is coated onto both sides of the nonporous negative electrode power collector of the negative electrode, $C_{x1}/C_{y1}$ is 1.02 to 1.35, where $C_{x1}$ (g/m$^2$) is the basis weight of the positive electrode active material layer on one side ($C_x$ side) of the positive electrode, and $C_{y1}$ (g/m$^2$) is the basis weight of the positive electrode active material layer on the other side ($C_y$ side), $A_{x1}/A_{y1}$ is 0.74 to 0.98, where $A_{y1}$ (g/m$^2$) is the basis weight of the negative electrode active material layer on one side ($A_y$ side) of the negative electrode that is facing the $C_y$ side, and $A_{x1}$ (g/m$^2$) is the basis weight of the negative electrode active material layer on the other side ($A_x$ side), and $C_{x2}$ and $C_{y2}$ are 0.10 to 20.0 and $C_{y2}/C_{x2}$ is 0.10 to 0.95, where $C_{x2}$ (g/m$^2$) is the basis weight of the lithium compound on the $C_x$ side, and $C_{y2}$ (g/m$^2$) is the basis weight of the lithium compound on the $C_y$ side.

Embodiments for each aspect will now be described in detail.

FIG. 3 shows the facing state between the side of the positive electrode active material layer and the side of the negative electrode active material layer of the nonaqueous lithium power storage element of the fourth embodiment of the invention. An electrode laminated body (14) comprising a positive electrode and negative electrode laminated via a separator (13) is housed in the casing (15) of the nonaqueous lithium power storage element according to an embodiment of the invention.

In the electrode laminated body (14), at least one positive electrode contains a nonporous positive electrode power collector (9), both sides of the nonporous positive electrode power collector (9) being coated with an active material, so as to have a positive electrode active material layer with a positive electrode active material layer $C_x$ side (7) and a positive electrode active material layer with a positive electrode active material layer $C_y$ side (8) disposed, respectively.

In the electrode laminated body (14), at least one negative electrode contains a nonporous negative electrode power collector (12), both sides of the nonporous negative electrode power collector (12) being coated with a negative electrode active material capable of intercalating and releasing lithium ions, so as to have a negative electrode active material layer with a negative electrode active material layer $A_x$ side (10) and a negative electrode active material layer with a negative electrode active material layer $A_y$ side (11) disposed, respectively.

As shown in FIG. 3, the positive electrode active material layer $C_x$ side (7) and negative electrode active material layer $A_x$ side (10) are facing each other across a separator (13), and/or the positive electrode active material layer $C_y$ side (8) and the negative electrode active material layer $A_y$ side (11) are facing each other across a separator (13).

While not shown in FIG. 3, a single-sided positive electrode having a positive electrode active material layer formed on only one side of a positive electrode power collector, or a double-sided positive electrode having positive electrode active material layers formed on both sides of a positive electrode power collector, may be disposed on the outermost sides of the electrode laminated body, or a single-sided negative electrode having a negative electrode active material layer formed on only one side of a negative electrode power collector or a double-sided negative electrode having negative electrode active material layers formed on both sides of a negative electrode power collector may be disposed on the outermost sides of the electrode laminated body.

<Positive Electrode>

The positive electrode of the invention has a positive electrode power collector, and a positive electrode active material layer situated on one or both sides thereof. At least one of the positive electrodes of the second and fourth aspects of the invention has a nonporous positive electrode power collector and a positive electrode active material layer containing a positive electrode active material, formed on both sides thereof.

Throughout the present specification, "nonporous positive electrode power collector" means a positive electrode power collector that, at least in the region where the positive electrode active material layer has been coated, lacks pores that would allow lithium ions to pass through the positive electrode power collector and result in uniformity of lithium ions on the front and back sides of the positive electrode. Therefore, it does not exclude positive electrode power collectors having very small or microlevel pores, or positive electrode power collectors having pores in regions of the positive electrode active material layer that are not coated, within a range in which the effect of the invention is exhibited.

The positive electrode of the invention preferably contains a lithium compound as the positive electrode precursor, prior to assembly of the power storage element. As explained below, according to the invention the negative electrode is preferably predoped with lithium ion during the step of assembling the power storage element, and the predoping method is preferably application of a voltage between the positive electrode precursor and negative electrode, after the power storage element has been assembled using the positive electrode precursor containing the lithium compound, the negative electrode, the separator, the casing and the nonaqueous electrolytic solution. The lithium compound is preferably contained in the positive electrode active material layer formed on the positive electrode power collector of the positive electrode precursor.

According to the invention, "positive electrode precursor" is defined as the state of the positive electrode before the lithium doping step, and "positive electrode" is defined as the state of the positive electrode after the lithium doping step.

[Positive Electrode Active Material Layer]

The positive electrode active material layer preferably comprises a positive electrode active material containing a carbon material, and if necessary it may also additionally contain optional components such as a conductive filler, binder and dispersion stabilizer, as necessary.

Moreover, a lithium compound is preferably contained in the positive electrode active material layer of the positive electrode precursor.

[Positive Electrode Active Material]

The positive electrode active material preferably contains a carbon material. The carbon material used is more preferably carbon nanotubes, a conductive polymer or a porous carbon material, and more preferably activated carbon. One or more different materials may also be used in admixture as the positive electrode active material, and it may even contain a material other than a carbon material (for example, a complex oxide of lithium and a transition metal).

Preferably, the content of the carbon material with respect to the total amount of the positive electrode active material is 50 weight % or greater, and more preferably 70 weight % or greater. The carbon material content may be 100 weight %, but from the viewpoint of obtaining a satisfactory effect by combined use with other materials, it is preferably, for example, no greater than 90 weight %, and may even be 80 weight % or lower.

When activated carbon is used as the positive electrode active material, there are no particular restrictions on the type of activated carbon or its starting material. However, preferably the pores of the activated carbon are optimally controlled to obtain both a high input/output characteristic and high energy density. Specifically, if $V_1$ (cc/g) is the mesopore volume due to pores with diameters of 20 Å to 500 Å as calculated by the BJH method, and $V_2$ (cc/g) is the micropore volume due to pores with diameters of smaller than 20 Å as calculated by the MP method, then:

(1) in order to obtain a high input/output characteristic, activated carbon satisfying $0.3<V_1\leq0.8$ and $0.5\leq V_2\leq1.0$ and exhibiting a specific surface area of 1,500 m$^2$/g to 3,000 m$^2$/g as measured by the BET method (hereunder also referred to as activated carbon 1) is preferred, and (2) in order to obtain high energy density, activated carbon satisfying $0.8<V_1\leq2.5$ and $0.8<V_2\leq3.0$ and exhibiting a specific surface area of 2,300 m$^2$/g to 4,000 m$^2$/g as measured by the BET method (hereunder also referred to as activated carbon 2), is preferred.

The (1) activated carbon 1 and (2) activated carbon 2 will each be explained in order.

(Activated Carbon 1)

The mesopore volume $V_1$ of activated carbon 1 is preferably a value larger than 0.3 cc/g, from the viewpoint of a greater input/output characteristic when the positive electrode material has been incorporated into a power storage element. On the other hand, $V_1$ is also preferably no greater than 0.8 cc/g from the viewpoint of minimizing reduction in the bulk density of the positive electrode. $V_1$ is more preferably 0.35 cc/g to 0.7 cc/g and even more preferably 0.4 cc/g to 0.6 cc/g.

The micropore volume $V_2$ of activated carbon 1 is preferably 0.5 cc/g or greater in order to increase the specific surface area of the activated carbon and increase capacitance. On the other hand, from the viewpoint of minimizing the bulk of the activated carbon, increasing the density as an electrode and increasing the capacitance per unit volume, $V_2$ is preferably no larger than 1.0 cc/g. $V_2$ is more preferably 0.6 cc/g to 1.0 cc/g and even more preferably 0.8 cc/g to 1.0 cc/g.

The ratio of the mesopore volume $V_1$ to the micropore volume $V_2$ ($V_1/V_2$) is preferably in the range of $0.3\leq V_1/V_2\leq0.9$. Namely, $V_1/V_2$ is preferably 0.3 or greater from the viewpoint of increasing the ratio of the mesopore volume to the micropore volume to a degree allowing reduction in the output characteristic to be minimized while maintaining high capacitance. On the other hand, $V_1/V_2$ is preferably no greater than 0.9 from the viewpoint of increasing the ratio of the micropore volume with respect to the mesopore volume, to a degree allowing a high output characteristic to be maintained while minimizing reduction in capacitance. The range of $V_1/V_2$ is more preferably $0.4\leq V_1/V_2\leq0.7$, and the range of $V_1/V_2$ is even more preferably $0.55\leq V_1/V_2\leq0.7$.

The mean pore size of the activated carbon 1 is preferably 17 Å or greater, more preferably 18 Å or greater and even more preferably 20 Å or greater, from the viewpoint of maximizing the output of the obtained power storage element. From the viewpoint of maximizing capacitance, the mean pore size of activated carbon 1 is preferably no greater than 25 Å.

The BET specific surface area of activated carbon 1 is preferably 1,500 m$^2$/g to 3,000 m$^2$/g, and more preferably 1,500 m$^2$/g to 2,500 m$^2$/g. If the BET specific surface area is 1,500 m$^2$/g or greater it will be easier to obtain satisfactory energy density, and if the BET specific surface area is 3,000 m$^2$/g or lower there will be no need to add large amounts of a binder to maintain the strength of the electrode, and therefore the performance per volume of the electrode will be higher.

The activated carbon 1 having such features can be obtained, for example, using the starting material and treatment method described below.

For this embodiment, the carbon source to be used as the starting material for activated carbon 1 is not particularly restricted. Examples include plant-based starting materials such as wood, wood dust, coconut shell, by-products of pulp production, bagasse and molasses; fossil-based starting materials such as peat, lignite, brown coal, bituminous coal, anthracite, petroleum distillation residue components, petroleum pitch, coke and coal tar; various synthetic resins such as phenol resin, vinyl chloride resin, vinyl acetate resin, melamine resin, urea resin, resorcinol resin, celluloid, epoxy resin, polyurethane resin, polyester resin and polyamide resin; synthetic rubbers such as polybutylene, polybutadiene and polychloroprene; as well as synthetic wood or synthetic pulp materials, and carbides of the foregoing. From the viewpoint of suitability for weight-production and of cost, the starting materials preferred among these are plant-based starting materials such as coconut shell and wood dust, and their carbides, with coconut shell carbides being particularly preferred.

The system used for carbonization and activation of these starting materials to obtain the activated carbon 1 may be a known system such as, for example, a fixed bed system, moving bed system, fluidized bed system, slurry system or rotary kiln system.

The carbonization method for these starting materials is a method in which an inert gas such as nitrogen, carbon dioxide, helium, argon, xenon, neon, carbon monoxide or exhaust gas, or a mixed gas composed mainly of such inert gases with other gases, is used for calcination at 400 to 700° C. (preferably 450 to 600° C.), over a period of about 30 minutes to 10 hours.

The activation method for a carbide obtained by the carbonization method is preferably a gas activation method in which an activating gas such as water vapor, carbon dioxide or oxygen is used for calcination. A method using water vapor or carbon dioxide as the activating gas is preferred.

In this activation method, preferably the activating gas is supplied at a rate of 0.5 to 3.0 kg/h (preferably 0.7 to 2.0 kg/h) while the carbide is raised to 800 to 1,000° C. over a period of 3 to 12 hours (preferably 5 to 11 hours and even more preferably 6 to 10 hours), for activation.

The carbide may be subjected to a primary activation before activation treatment of the carbide. In the primary activation, it is usually preferred to employ a method of calcination the carbon material at a temperature of below 900° C. using an activating gas such as water vapor, carbon dioxide or oxygen for gas activation.

By appropriate combinations for the calcination temperature and calcination time for the carbonization method, and the activating gas supply rate, temperature-elevating rate and maximum activation temperature in the activation method, it is possible to produce activated carbon 1 having the features described above, that may be used for this embodiment.

The mean particle diameter of the activated carbon 1 is preferably 2 to 20 µm.

If the mean particle diameter is 2 µm or greater, the capacitance per electrode volume will tend to be higher due to the higher density of the active material layer. A small mean particle diameter may lead to the disadvantage of low durability, but a mean particle diameter of at least 2 µm will help avoid this disadvantage. A mean particle diameter of no larger than 20 µm, on the other hand, will tend to be more suitable for high-speed charge/discharge. The mean particle diameter is more preferably 2 to 15 µm and even more preferably 3 to 10 µm.

(Activated Carbon 2)

The mesopore volume $V_1$ of activated carbon 2 is preferably a value larger than 0.8 cc/g, from the viewpoint of a greater output characteristic when the positive electrode material has been incorporated into a power storage element, but $V_1$ is also preferably no greater than 2.5 cc/g from the viewpoint of minimizing reduction in the capacitance of the power storage element. $V_1$ is more preferably 1.00 cc/g to 2.0 cc/g and even more preferably 1.2 cc/g to 1.8 cc/g.

The micropore volume $V_2$ of activated carbon 2 is preferably greater than 0.8 cc/g for a larger specific surface area of the activated carbon and to increase the capacitance, but $V_2$ is also preferably no greater than 3.0 cc/g to increase the density as an activated carbon electrode, and to increase the capacitance per unit volume. $V_2$ is more preferably larger than 1.0 cc/g and no larger than 2.5 cc/g, and even more preferably 1.5 cc/g to 2.5 cc/g.

Activated carbon 2 having the mesopore volume and micropore volume described above has a higher BET specific surface area than activated carbon used in conventional electrical double layer capacitors or lithium ion capacitors.

The specific value of the BET specific surface area of the activated carbon 2 is preferably 2,300 m$^2$/g to 4,000 m$^2$/g, and more preferably 3,200 m$^2$/g to 3,800 m$^2$/g. If the BET specific surface area is 2,300 m$^2$/g or greater it will be easier to obtain satisfactory energy density, and if the BET specific surface area is 4,000 m$^2$/g or lower there will be no need to add large amounts of a binder to maintain the strength of the electrode, and therefore the performance per volume of the electrode will be higher.

Activated carbon 2 having such features can be obtained, for example, using the starting material and treatment method described below.

The carbonaceous material used as the starting material for activated carbon 2 is not particularly restricted so long as it is a carbon source commonly used as a starting material for activated carbon, and examples include plant-based starting materials such as wood, wood dust and coconut shell; petroleum-based starting materials such as petroleum pitch and coke; and various synthetic resins such as phenol resins, furan resins, vinyl chloride resins, vinyl acetate resins, melamine resins, urea resins and resorcinol resins. Of these starting materials, phenol resins and furan resins are especially preferred, being suitable for fabrication of activated carbon with a high specific surface area.

The system used for carbonization of these starting materials, or the heating method during activation treatment, may be a known system such as, for example, a fixed bed system, moving bed system, fluidized bed system, slurry system or rotary kiln system. The atmosphere during heating is an inert gas such as nitrogen, carbon dioxide, helium or argon, or a mixed gas composed mainly of such inert gases in admixture with other gases. A common method employs a carbonization temperature of about 400 to 700° C. and a calcination time of about 0.5 to 10 hours.

The activation method for the carbide may be a gas activation method in which calcination is accomplished using an activating gas such as water vapor, carbon dioxide or oxygen, or an alkali metal activation method in which heat treatment is carried out after mixture with an alkali metal compound, but an alkali metal activation method is preferred for fabrication of activated carbon with a high specific surface area.

In this activation method, a carbide and an alkali metal compound such as KOH or NaOH are mixed so that the weight ratio is 1:≥1 (the amount of the alkali metal compound being equal to or greater than the amount of the carbide), after which heat treatment is carried out in a range of 600 to 900° C. for 0.5 to 5 hours under an inert gas atmosphere, and then the alkali metal compound is subjected to cleaning removal with an acid or water, and drying is performed.

In order to increase the micropore volume and not increase the mesopore volume, the amount of carbide may be increased during activation, and mixed with KOH. In order to increase both the micropore volume and mesopore volume, a large amount of KOH may be used. In order to increase mainly the mesopore volume, steam-activation is preferably carried out after alkaline activation treatment.

The mean particle diameter of the activated carbon 2 is preferably 2 µm to 20 µm. The mean particle diameter of the activated carbon 2 is more preferably 3 µm to 10 µm.

(Aspect Using Activated Carbon)

The activated carbons 1 and 2 may each be a single type of activated carbon, or a mixture of two or more different types of activated carbon, such that the mixture as a whole exhibits the characteristic values described above.

Either of activated carbon 1 or 2 may be selected for use, or both may be used in admixture.

The positive electrode active material may include materials other than activated carbons 1 and 2 (for example, activated carbon without the specified $V_1$ and/or $V_2$ values, or materials other than activated carbon (such as complex oxides of lithium and transition metals)). In the exemplary aspect, the content of the activated carbon 1, or the content of the activated carbon 2, or the total content of the activated carbons 1 and 2, are preferably greater than 50 weight %, more preferably 70 weight % or greater, even more preferably 90 weight % or greater and most preferably 100 weight %, of the total positive electrode active material.

The content ratio of the positive electrode active material in the positive electrode active material layer is preferably 35 weight % to 95 weight % based on the total weight of the positive electrode active material layer in the positive electrode precursor. The lower limit for the content ratio of the positive electrode active material is more preferably 45 weight % or greater and even more preferably 55 weight % or greater. On the other hand, the upper limit for the content ratio of the positive electrode active material is more preferably no greater than 90 weight % and even more preferably no greater than 85 weight %. A suitable charge/discharge characteristic is exhibited within this range of the content ratio.

(Lithium Compound)

Throughout the present specification, a lithium compound is a substance containing lithium, and it excludes active materials that contribute to Faraday reaction or non-Faraday reaction in the electrode during charge/discharge of the power storage element.

Suitable lithium compounds to be used for this embodiment include one or more selected from among lithium carbonate, lithium oxide, lithium hydroxide, lithium fluoride, lithium chloride, lithium bromide, lithium iodide, lithium nitride, lithium oxalate and lithium acetate. Preferred among these are lithium carbonate, lithium oxide and lithium hydroxide, with lithium carbonate being more preferred from the viewpoint of being handleable in air and having low hygroscopicity. Such lithium compounds can decompose upon application of a voltage, to function as a dopant source for lithium doping in the negative electrode, while also forming pores in the positive electrode active material layer, having excellent electrolytic solution retentivity, and forming a positive electrode with excellent ionic conductivity. In addition to the aforementioned lithium compounds, one or more alkali metal carbonates such as sodium carbonate, potassium carbonate, rubidium carbonate and cesium carbonate may also be used. When an electrolytic solution predissolving a lithium salt such as $LiPF_6$, described below, is used as the nonaqueous electrolytic solution, such an alkali metal carbonate may be used alone. The lithium compound in the positive electrode precursor may be of a single type, or two or more different lithium compounds may be included, or a lithium compound may be used in admixture with another alkali metal carbonate.

In addition, the positive electrode precursor of this embodiment may be any one that contains at least one lithium compound, and it may also contain, in addition to a lithium compound, one or more from among the following formulas:

oxides such as $M_2O$,
hydroxides such as MOH,
halides such as MF or MCl,
oxalates such as $M_2(CO_2)_2$, and
carboxylates such as RCOOM (where R is H, an alkyl group or an aryl group), where M is one or more selected from among Na, K, Rb and Cs.

The positive electrode precursor may also contain one or more alkaline earth metal carbonates selected from among $BeCO_3$, $MgCO_3$, $CaCO_3$, $SrCO_3$ and $BaCO_3$, and one or more alkaline earth metal oxides, alkaline earth metal hydroxides, alkaline earth metal halides, alkaline earth metal oxalates and alkaline earth metal carboxylates.

Various methods may be used for micronization of the lithium compound. For example, a pulverizer such as a ball mill, bead mill, ring mill, jet mill or rod mill may be used.

The amount of lithium compound in the positive electrode is preferably 1 weight % to 50 weight %. It is more preferably 2 weight % to 30 weight %. If the amount of lithium compound is 1 weight % or greater, a sufficient amount of lithium carbonate will be present to adsorb fluorine ions formed in the high load charge/discharge cycling, and therefore the high load charge/discharge cycle characteristic will be improved. If the amount of lithium compound is no greater than 50 weight %, it will be possible to increase the energy density of the nonaqueous lithium power storage element.

The content ratio of the lithium compound in the positive electrode active material layer is preferably 10 weight % to 60 weight % and more preferably 20 weight % to 50 weight %, based on the total weight of the positive electrode active material layer of the positive electrode precursor. A content ratio within this range will allow suitable function to be exhibited as a dopant source into the negative electrode, while also allowing a suitable degree of porosity to be imparted to the positive electrode, which together will allow a power storage element with excellent charge/discharge efficiency under high load to be provided, and it is therefore preferred.

[Mean Particle Diameter of Lithium Compound and Positive Electrode Active Material]

Preferably, the expression $0.1\ \mu m \leq X_1 \leq 10.0\ \mu m$ is satisfied where $X_1$ is the mean particle diameter of the lithium compound and the expressions $2.0\ \mu m \leq Y_1 \leq 20.0\ \mu m$ and $X_1 < Y_1$ are satisfied, where $Y_1$ is the mean particle diameter of the positive electrode active material. More preferably the range for $X_1$ is $0.5\ \mu m \leq X_1 \leq 5.0\ \mu m$, and $3.0\ \mu m \leq Y_1 \leq 10.0\ \mu m$. If $X_1$ is 0.1 μm or greater, it will be possible to have lithium carbonate remain in the positive electrode after predoping of lithium, and therefore the high load charge/discharge cycle characteristic will be increased by adsorption of fluorine ions produced by high load charge/discharge cycling. If $X_1$ is no greater than 10.0 μm, the reaction area with the fluorine ions generated by the high load charge/discharge cycling will increase, thus allowing the fluorine ions to be adsorbed more efficiently. If $Y_1$ is 2.0 μm or greater, it will be possible to ensure electron conductivity between the positive electrode active materials. If $Y_1$ is no greater than 20.0 μm, the reaction area with the electrolyte ion will increase, allowing a high output characteristic to be obtained. If $X_1 < Y_1$, then the lithium carbonate will fill in the gaps formed between the positive electrode active materials, thus allowing the electron conductivity between the positive electrode active materials to be ensured while increasing the energy density.

The method of measuring $X_1$ and $Y_1$ is not particularly restricted, and they may be calculated from an SEM image and SEM-EDX image of the positive electrode cross-section. The method of forming the positive electrode cross-section may employ BIB processing in which an Ar beam is irradiated from above the positive electrode, and a smooth cross-section is created along the edges of a masking shield set directly above the sample. When the positive electrode comprises lithium carbonate, the carbonate ion distribution can be determined by measurement with Raman imaging of the positive electrode cross-section.

The upper limit and lower limit for $V_1$ and the upper limit and lower limit for $V_2$ may also be optionally combined. Throughout the present specification, this also applies for combinations of the upper limit and lower limit of the other constituent features.

For the first aspect of the invention, the preferred combination of $X_1$, $Y_1$ and the amount of lithium compound in the positive electrode is:

0.1 μm≤$X_1$≤10.0 μm,
2.0 μm≤$Y_1$≤20.0 μm, and
a lithium compound amount of 1 weight % to 50 weight %.

Another preferred combination is:
0.2 μm≤$X_1$≤7.0 μm,
5.0 μm≤$Y_1$≤15.0 μm, and
a lithium compound amount of 1 weight % to 50 weight %.

Another preferred combination is:
0.3 μm≤$X_1$≤10.0 μm,
5.0 μm≤$Y_1$≤15.0 μm, and
a lithium compound amount of 2 weight % to 30 weight %.

Another preferred combination is:
0.3 μm≤$X_1$≤5.0 μm,
5.0 μm≤$Y_1$≤15.0 μm, and
a lithium compound amount of 2 weight % to 30 weight %.

Another preferred combination is:
0.3 μm≤$X_1$≤10.0 μm,
5.0 μm≤$Y_1$≤15.0 μm, and
a lithium compound amount of 2 weight % to 30 weight %.

[Method of Discriminating Lithium Compound and Positive Electrode Active Material]

The lithium compound and positive electrode active material can be discriminated by oxygen mapping with an SEM-EDX image of the positive electrode cross-section measured at an observational magnification of 1000-4000×. The method of measuring the SEM-EDX image is preferably with adjustment of the luminance and contrast so that no pixel reaches the maximum luminance value in the mapping image, and the average value of brightness is in the range of 40% to 60% of the maximum luminance value. In the obtained oxygen mapping, particles containing a bright portion equal to 50% or more of the area thereof when binarized based on the average value of brightness with respect to the resulting oxygen mapping are considered to constitute the lithium compound.

[Method of Calculating $X_1$ and $Y_1$]

$X_1$ and $Y_1$ can be determined by analysis of an image obtained from positive electrode cross-sectional SEM-EDX, measured in the same visual field as the positive electrode cross-sectional SEM mentioned above. The cross-sectional area S is determined for all of the particles X and Y observed in the cross-sectional SEM image, X being lithium compound particles discriminated in the SEM image of the positive electrode cross-section, and Y being the other particles which are particles of the positive electrode active material, and the particle diameter d is determined by calculation using the following formula. (π is the circular constant.)

[Math. 1]

$$d = 2 \times (S/\pi)^{1/2} \quad (1)$$

Each obtained particle diameter d is used to determine the volume-average particle diameters $X_0$ and $Y_0$, by the following formula.

[Math. 2]

$$X_0(Y_0) = \Sigma[4/3\pi \times (d/2)^3 \times d] / \Sigma[4/3\pi \times (d/2)^3] \quad (2)$$

Measurement is performed at five or more locations varying the visual field of the positive electrode cross-section, and the mean values of $X_0$ and $Y_0$ are recorded as the mean particle diameters $X_1$ and $Y_1$.

The lithium compound in the positive electrode gradually decomposes and gasifies as it is exposed to a high potential of about 4.0 V or greater, and the generated gas inhibits diffusion of ions in the electrolytic solution, thereby causing increased resistance. Consequently, preferably a coating film comprising the fluorine-containing compound is formed on the surface of the lithium compound, to inhibit reaction of the lithium compound.

The method of forming a coating film of the fluorine-containing compound is not particularly restricted, and may be a method in which a fluorine-containing compound that decomposes at a high potential is added to the electrolytic solution and a high voltage above the decomposition potential of the fluorine-containing compound is applied to the nonaqueous lithium power storage element, or a method in which it is subjected to a temperature above the decomposition temperature.

The coverage factor of the fluorinated compound covering the lithium compound surface (the area overlap ratio $A_1$ of fluorine mapping with respect to oxygen mapping in the SEM-EDX image of the positive electrode surface) is preferably 40% to 99%. If the coverage factor is 40% or greater it will be possible to suppress decomposition of the lithium compound. If the coverage factor is 99% or lower, it will be possible to maintain basicity near the positive electrode and the high load cycle characteristic will therefore be excellent.

As the method of measuring the coverage factor, it is determined by calculating the area overlap ratio of fluorine mapping with respect to oxygen mapping that has been binarized based on the average value of brightness, in element mapping obtained by SEM-EDX of the positive electrode surface.

The measuring conditions for SEM-EDX element mapping are not particularly restricted, and are preferably a pixel count in the range of 128×128 pixels to 512×512 pixels, and adjustment of the luminance and contrast so that no pixel reaches the maximum luminance value in the mapping image, and the average value of brightness falls within the range of 40% to 60% of the maximum luminance value.

In the element mapping obtained by SEM-EDX of the positive electrode cross-section, the area overlap ratio $A_2$ of fluorine mapping with respect to oxygen mapping, binarized based on the average value of brightness, is preferably 10% to 60%. If $A_2$ is 10% or higher it will be possible to suppress decomposition of the lithium compound. If $A_2$ is 60% or lower, there will be a non-fluorinated state up to the interior of the lithium compound, and it will therefore be possible to maintain basicity near the positive electrode, and the high load cycle characteristic will be excellent.

The negative electrode can be predoped with lithium ion by oxidative decomposition of the lithium compound in the positive electrode precursor and reduction at the negative electrode. Prolonged application of a high voltage, for example, may be continued in order to completely decompose the lithium compound in the positive electrode precursor. However, prolonged application of a high voltage can potentially lead to decomposition of the electrolytic solution and electrolyte and increased resistance. Therefore, in order to obtain a high output nonaqueous lithium power storage element, it is preferred to halt application of high-voltage before decomposition of the electrolytic solution and electrolyte occurs, to prevent decomposition of the lithium compound. When high-voltage application is halted, however, lithium compounds which remain in the positive electrode and are gradually decomposed when exposed to high-temperature, high-voltage conditions, are generating gas and thus leading to higher resistance. In this regard, the present inventors have found that if the positive electrode power collector is a nonporous positive electrode power collector, lithium ion cannot pass through the positive electrode power collector, and therefore by varying the basis weight of the positive electrode active material layer on the front and back sides of the positive electrode power collector it is possible to control the potential of the positive electrode. When the positive electrode power collector has pores that would allow lithium ions to pass through and become uniform on the front and back sides of the positive electrode, the aforementioned effect cannot be obtained. From this viewpoint, according to the second aspect of the invention, at least the region of the positive electrode power collector that is coated with the positive electrode active material layer is nonporous, and the remaining sections of the positive electrode power collector that are not coated with the positive electrode active material may either have or lack pores.

Preferably, $C_{y1}/C_{x1}$ is 0.70 to 0.98, where $C_{y1}$ (g/m$^2$) is the basis weight of the positive electrode active material layer on one side ($C_y$ side) of the positive electrode and $C_{x1}$ (g/m$^2$) is the basis weight of the positive electrode active material layer on the other side ($C_x$ side), and $C_{y2}$ and $C_{x2}$ are 0.10 to 20.0 and $C_{y2}/C_{x2}$ is 0.10 to 1.0, where $C_{y2}$ (g/m$^2$) is the amount of lithium compound per unit area on the $C_y$ side and $C_{x2}$ (g/m$^2$) is the amount of lithium compound per unit area on the $C_x$ side. Namely, the change in potential due to charge/discharge is large, and decomposition of lithium compound remaining in the positive electrode takes place preferentially, on the side with low basis weight ($C_y$ side), and when the amount of lithium compound on the $C_y$ side is less than on the side with high basis weight ($C_x$ side), then the decomposition rate of lithium compound on the $C_y$ side under high-temperature, high-voltage conditions can be suppressed.

If $C_{y1}/C_{x1}$ is 0.70 or greater, the region in which the negative electrode facing the $C_y$ side and $C_x$ side is utilized will be equal, and high energy density can be achieved. If $C_{y1}/C_{x1}$ is 0.98 or smaller, it will be possible to suppress decomposition of the remaining lithium compound by changing the variation range of the potential on the $C_y$ side and $C_x$ side.

$C_{y2}$ and $C_{x2}$ are preferably 0.10 to 20.0. If $C_{y2}$ and $C_{x2}$ are 0.10 or greater, the high load charge/discharge cycle characteristic will be excellent. If $C_{y2}$ and $C_{x2}$ are no greater than 20.0, it will be possible to increase the energy density.

$C_{y2}/C_{x2}$ is preferably 0.10 to 1.0. If $C_{y2}/C_{x2}$ is 0.10 or greater, decomposition of the electrolytic solution or electrolyte will be less likely to take place and a high output characteristic can be achieved. If $C_{y2}/C_{x2}$ is no greater than 1.0, it will be possible to suppress decomposition of lithium compound on the A side where potential variation is large.

In the solid $^7$Li-NMR spectrum of the positive electrode active material layer for the third aspect of the invention, preferably $1.04 \leq b/a \leq 5.56$ is satisfied, where "a" is the peak area in the spectral range of −40 ppm to 40 ppm, obtained by measurement with a repeated latency of 10 seconds, and "b" is the peak area in the spectral range of −40 ppm to 40 ppm, obtained by measurement with a repeated latency of 3,000 seconds. The value of b/a is more preferably $1.05 \leq b/a \leq 3.79$, even more preferably $1.09 \leq b/a \leq 3.32$, yet more preferably $1.14 \leq b/a \leq 2.86$ and most preferably $1.18 \leq b/a \leq 1.93$. The upper limit and lower limit may be combined as desired.

By adjusting b/a to be within the range of $1.04 \leq b/a \leq 5.56$ it will be possible to maintain a high input/output characteristic while increasing the high load charge/discharge cycle characteristic. While the principle is not completely understood, and it is not our intention to be limited by theory, the following is conjectured.

The peak area "a" is believed to be for peaks derived mainly from lithium ion intercalated in the positive electrode active material and the adhering lithium-containing coating film, and presumably it is a relative representation of the positive electrode active material. On the other hand, the peak area "b" is considered to be for peaks derived from lithium compounds that have separated from the positive electrode active material, integrated with the peak area "a". Namely, b/a is considered to represent the amount of lithium compound that has separated from the positive electrode active material. The lithium compound that has separated from the positive electrode active material can maintain a high input/output characteristic without inhibiting electron conduction or ion diffusion between the positive electrode active material. Furthermore, the lithium compound traps active products such as fluorine ions that are generated during high load charge/discharge cycling, thereby increasing the high load charge/discharge cycle characteristic due to the reason explained above. Throughout the present specification, "separated" means a state in which, when the positive electrode active material is an aggregate of activated carbon particles, for example, lithium compound particles are independently dispersed in its interior.

If b/a is 1.04 or greater, the amount of lithium compound with respect to the positive electrode active material will be sufficient, and therefore the lithium compound will trap active products such as fluorine ions that are generated during high load charge/discharge cycling, thereby increasing the high load charge/discharge cycle characteristic. On the other hand, if b/a is 5.56 or smaller, the lithium compound will be able to maintain a high input/output characteristic without inhibiting electron conduction or ion diffusion between the positive electrode active material.

Throughout the present specification, the area ratio b/a of the peak area "a" in the spectral range of −40 ppm to 40 ppm, with a repeated latency of 10 seconds, and the peak area "b" in the spectral range of −40 ppm to 40 ppm, with a repeated latency of 3,000 seconds, in the solid $^7$Li-NMR spectrum of the positive electrode active material layer, can be calculated by the following method.

The measuring apparatus used for solid $^7$Li-NMR may be a commercially available apparatus. Measurement is performed by the single pulse method in a room temperature environment, with a magic-angle spinning rotational speed of 14.5 kHz and an irradiation pulse width set to a 45$^0$ pulse. Measurement is performed with repeated latency of 10 seconds and 3,000 seconds, to obtain a solid $^7$Li-NMR spectrum. When obtaining the solid $^7$Li-NMR spectrum, the measuring conditions other than the repeated latency, such as the number of scans and receiver gain, are all identical. A 1 mol/L aqueous lithium chloride solution is used as the shift reference, and the shift position measured separately as an external standard is defined as 0 ppm. During measurement of the 1 mol/L aqueous lithium chloride solution, the single pulse method is used with an irradiation pulse width set to a 45° pulse, without rotation of the sample.

The peak areas "a" and "b" in a spectral range of −40 ppm to 40 ppm are read off from the solid $^7$Li-NMR spectrum of the positive electrode active material layer obtained by the method described above, and b/a is calculated.

(Other Components of Positive Electrode Active Material Layer)

If necessary, the positive electrode active material layer of the invention may also contain optional components such as a conductive filler, binder and dispersion stabilizer, in addition to the positive electrode active material and lithium compound.

The conductive filler may be a conductive carbonaceous material with higher conductivity than the positive electrode active material. Preferred examples of such conductive fillers include Ketchen black, acetylene black, vapor grown carbon fibers, graphite and carbon nanotubes, as well as mixtures thereof.

The amount of conductive filler mixed in the positive electrode active material layer is preferably 0 to 20 parts by weight and more preferably in the range of 1 to 15 parts by weight, with respect to 100 parts by weight of the positive electrode active material. The conductive filler is preferably mixed, from the viewpoint of high input. However, if the amount of mixture is greater than 20 parts by weight, the energy density per volume of the positive electrode active material layer will be lower due to the reduced content ratio of the positive electrode active material in the positive electrode active material layer, and therefore it is not desirable.

The binder is not particularly restricted, and for example, PVdF (polyvinylidene fluoride), PTFE (polytetrafluoroethylene), polyimide, latex, styrene-butadiene copolymer, fluorine rubber or an acrylic copolymer may be used. The amount of binder used is preferably 1 part by weight to 30 parts by weight, with respect to 100 parts by weight of the positive electrode active material. It is more preferably 3 parts by weight to 27 parts by weight and even more preferably 5 parts by weight to 25 parts by weight. If the amount of binder is 1 weight % or greater, adequate electrode strength will be exhibited. If the amount of binder is no greater than 30 parts by weight, on the other hand, a high input/output characteristic will be exhibited without inhibiting movement or diffusion of ions in and from the positive electrode active material.

The dispersion stabilizer is not particularly restricted, and for example, PVP (polyvinylpyrrolidone), PVA (polyvinyl alcohol) or cellulose derivatives may be used. The amount of binder used is preferably no greater than 10 parts by weight with respect to 100 parts by weight of the positive electrode active material. If the amount of dispersion stabilizer is no greater than 10 parts by weight, on the other hand, a high input/output characteristic will be exhibited without inhibiting movement or diffusion of ions in and from the positive electrode active material.

[Positive Electrode Power Collector]

The material composing the positive electrode power collector of the invention is not particularly restricted so long as it is a material that has high electron conductivity and does not undergo degradation by elution into the electrolytic solution or reaction with the electrolyte or ion, but a metal foil is preferred. The positive electrode power collector in the nonaqueous lithium power storage element of this embodiment is most preferably an aluminum foil.

The metal foil may be a common metal foil without ruggedness or through-holes, or it may be a metal foil having ruggedness formed by embossing, chemical etching, electrolytic deposition or blasting, or it may be a metal foil having through-holes, such as an expanded metal, punching metal or etching foil. The positive electrode power collector according to the second and fourth aspects of the invention may be a common metal foil having no ruggedness or through-holes, or it may be a metal foil having ruggedness formed by embossing, chemical etching, electrolytic deposition or blasting, or a metal foil having through-holes such as expanded metal, punching metal or etching foil, so long as it is used as a "nonporous positive electrode power collector" as defined above.

The thickness of the positive electrode power collector is not particularly restricted so long as it allows the shape and strength of the positive electrode to be maintained, but 1 to 100 μm, for example, is preferred.

[Production of Positive Electrode Precursor]

According to the invention, the positive electrode precursor that is to be the positive electrode of the nonaqueous lithium power storage element can be produced by a known production technique for electrodes for lithium ion batteries or electrical double layer capacitors. For example, the positive electrode active material and lithium compound, as well as the other optional components that are used as necessary, may be dispersed and dissolved in water or an organic solvent to prepare a slurry-like coating solution, and the coating solution coated onto one or both sides of a positive electrode power collector to form a coating film, which is dried to obtain a positive electrode precursor. The obtained positive electrode precursor may also be pressed to adjust the film thickness or bulk density of the positive electrode active material layer. An alternative method may also be used, in which the positive electrode active material and lithium compound, as well as the other optional components used as necessary, are mixed in a dry state without using a solvent, and the obtained mixture is subjected to press molding, after which a conductive adhesive is used for attachment to the positive electrode power collector.

The positive electrode precursor coating solution may also be prepared by dry blending all or a portion of each of the starting material powders containing the positive electrode active material, and then adding water or an organic solvent, and/or adding a liquid or slurry-like substance comprising a binder or dispersion stabilizer dissolved or dispersed in them. It may also be prepared by adding various starting powders containing the positive electrode active material, to a liquid or slurry-like substance comprising a binder or dispersion stabilizer dissolved or dispersed in water or an organic solvent. The method of dry blending may be, for example, premixing in which a ball mill or the like is used to premix the positive electrode active material and lithium compound, and a conductive filler if necessary, and the low-conductivity lithium compound is coated with the conductive material. This will help the lithium compound to decompose by the positive electrode precursor in the lithium doping step described below. When water is used as the solvent for the coating solution, the coating solution may be rendered alkaline by addition of the lithium compound, and therefore a pH modifier may be added as necessary.

Preparation of the coating solution of the positive electrode precursor is not particularly restricted, and a dispersing machine such as a homodisperser or multiscrew dispersing machine, planetary mixer, thin-film rotating-type high speed mixer or the like, may be suitably used. In order to obtain a coating solution in a satisfactorily dispersed state, it is preferred for the dispersion to be at a peripheral velocity of 1 m/s to 50 m/s. It is preferred if the peripheral velocity is 1 m/s or greater, because this will allow each material to satisfactorily dissolve or disperse. It is also preferred if the peripheral velocity is no greater than 50 m/s, because each material will not be broken down by heat or shear force during dispersion, and reaggregation will not take place.

The degree of dispersion of the coating solution is preferably to a granularity of 0.1 μm to 100 μm, as measured with a fineness gauge. The upper limit for the degree of dispersion is more preferably to a granularity of no greater than 80 μm, and more preferably to a granularity of no greater than 50 μm. It is not preferred if the granularity is 0.1 μm or smaller, because the size will be less than the particle diameter of each starting powder containing the positive electrode active material, meaning that the material will have been crushed during preparation of the coating solution. If the granularity is no greater than 100 μm, there will be no clogging during discharge of the coating solution or formation of streaks in the coating film, allowing more stable coating.

The viscosity (ηb) of the coating solution of the positive electrode precursor is preferably 1,000 mPa·s to 20,000 mPa·s. The viscosity (ηb) is preferably 1,500 mPa·s to 10,000 mPa·s and more preferably 1,700 mPa·s to 5,000 mPa·s. If the viscosity (ηb) is 1,000 mPa·s or higher, liquid dripping during formation of the coating film will be suppressed, and the coating film width and thickness can be satisfactorily controlled. If it is no higher than 20,000 mPa·s, there will be less pressure loss in the flow channel of the coating solution when a coating machine is used, allowing stable coating to be carried out, and allowing control to less than the prescribed coating film thickness.

The TI value (thixotropy index value) of the coating solution is preferably 1.1 or greater. The TI value is more preferably 1.2 or greater and even more preferably 1.5 or greater. If the TI value is 1.1 or greater, the coating film width and thickness can be satisfactorily controlled.

Formation of a coating film of the positive electrode precursor is not particularly restricted, and a coating machine such as a die coater, comma coater, knife coater or gravure coating machine may be suitably used. The coating film may be formed by monolayer coating or by multilayer coating. In the case of multilayer coating, the coating solution compositions may be adjusted so that the lithium compound content differs within each layer of the coating film. The coating speed is also preferably 0.1 m/min to 100 m/min. The coating speed is more preferably 0.5 m/min to 70 m/min and even more preferably 1 m/min to 50 m/min. If the coating speed is 0.1 m/min or greater, stable coating will be possible. If it is 100 m/min or lower, on the other hand, the coating precision can be adequately ensured.

Drying of the coating film of the positive electrode precursor is not particularly restricted, and a drying method such as hot air drying or infrared ray (IR) drying may be suitably employed. Drying of the coating film may be drying at a single temperature, or it may be drying while varying the temperature in different stages. Several drying methods may also be used in combination for drying. The drying temperature is preferably 25° C. to 200° C., more preferably 40° C. to 180° C. and even more preferably 50° C. to 160° C. If the drying temperature is 25° C. or higher, it will be possible to adequately volatilize off the solvent in the coating film. If it is no higher than 200° C., on the other hand, it will be possible to reduce cracking of the coating film by rapid volatilization of the solvent or maldistribution of the binder by migration, and oxidation of the positive electrode power collector or positive electrode active material layer.

Pressing of the positive electrode precursor is not particularly restricted, and a pressing machine such as a hydraulic press or vacuum pressing machine may be suitably used. The film thickness, bulk density and electrode strength of the positive electrode active material layer can be adjusted by the pressing pressure, the gap, and the surface temperature of the pressed portion, as described below. The pressing pressure is preferably 0.5 kN/cm to 20 kN/cm, more preferably 1 kN/cm to 10 kN/cm and even more preferably 2 kN/cm to 7 kN/cm. If the pressing pressure is 0.5 kN/cm or greater, it will be possible to adequately increase the electrode strength. If it is no greater than 20 kN/cm, on the other hand, distortion or wrinkles will not be produced in the positive electrode precursor, and adjustment can be made to the desired film thickness and bulk density for the positive electrode active material layer. Also, the gap between the press rolls may be set to a desired value depending on the film thickness of the dried positive electrode precursor, so that the desired film thickness and bulk density of the positive electrode active material layer is obtained. The pressing speed may also be set to the desired speed, so as to avoid distortion and wrinkles in the positive electrode precursor. The surface temperature of the pressed portion may be room temperature, or it may be heated instead, if necessary. In the case of heating, the lower limit for the surface temperature of the pressed portion is at least the melting point of the binder used minus preferably 60° C., more preferably 45° C. and even more preferably 30° C. In the case of heating, the upper limit for the surface temperature of the pressed portion is no higher than the melting point of the binder used plus preferably 50° C., more preferably 30° C. and even more preferably 20° C. For example, when PVdF (polyvinylidene fluoride: melting point=150° C.) is used as the binder, heating to 90° C. to 200° C. is preferred, and more preferably heating to 105° C. to 180° C. and even more preferably 120° C. to 170° C. When styrene-butadiene copolymer (melting point: 100° C.) is used as the binder, it is preferably heated to 40° C. to 150° C., or heated to more preferably 55° C. to 130° C. and even more preferably 70° C. to 120° C.

The melting point of the binder can be determined by the endothermic peak position in DSC (Differential Scanning Calorimetry). For example, using a "DSC7" differential scanning calorimeter by Perkin-Elmer, 10 mg of sample resin is set in the measuring cell and the temperature is increased from 30° C. to 250° C. at a temperature-elevating rate of 10° C./min, in a nitrogen gas atmosphere, the melting point being the endothermic peak temperature during the temperature elevation.

Pressing may also be carried out multiple times while varying the conditions including the pressing pressure, gap, speed, and pressed portion surface temperature.

The thickness of the positive electrode active material layer is preferably 20 μm to 200 m for each side of the positive electrode power collector. The thickness of the positive electrode active material layer per side is more preferably 25 μm to 100 μm, and even more preferably 30 μm to 80 μm, for each side. If the thickness is 20 μm or greater, sufficient charge/discharge capacity can be exhibited. If the thickness is 200 μm or smaller, on the other hand, the ion diffusion resistance in the electrode can be kept low. It will thus be possible to obtain an adequate output characteristic and to reduce the cell volume, thereby increasing the energy density. When the power collector has through-holes or ruggedness, the thickness of the positive electrode active material layer is the mean value of the thickness for each side at the sections of the power collector without through-holes or ruggedness.

The bulk density of the positive electrode active material layer at the positive electrode after the lithium doping step described below is preferably 0.40 g/cm$^3$ or greater and more preferably in the range of 0.50 g/cm$^3$ to 1.3 g/cm$^3$. If the bulk density of the positive electrode active material layer is 0.40 g/cm$^3$ or greater, it will be possible to exhibit high energy density and to reduce the size of the power storage element. If the bulk density is no higher than 1.3 g/cm$^3$, diffusion of the electrolytic solution in the pores in the positive electrode active material layer will be adequate, and a high output characteristic will be obtained.

The BET specific surface area, mesopore volume and micropore volume for this embodiment are the values determined by the following respective methods. A sample is vacuum dried at 200° C. for a day and a night, and the adsorption/desorption isotherm is measured using nitrogen as the adsorbate. Using the obtained isotherm on the adsorption side, the BET specific surface area is calculated by the multipoint BET method or single point BET method, the mean pore size is calculated by dividing the total pore volume per weight by the BET specific surface area, the mesopore volume is calculated by the BJH method, and the micropore volume is calculated by the MP method.

The BJH method is a method of calculation commonly used for analysis of mesopores, and it was advocated by Barrett, Joyner, Halenda et al. (NPL 1).

The MP method is a method in which the "t-plot method" (NPL 2) is utilized to determine micropore volume, micropore area and micropore distribution, and it is the method proposed by R. S. Mikhail, Brunauer and Bodor (NPL 3).

The mean particle diameter for this embodiment is the particle diameter at the point where, when the particle size distribution is measured using a particle size distribution analyzer, and a cumulative curve with 100% as the total volume is determined, the cumulative curve is at 50% (i. e., the 50% diameter (median diameter)). The mean particle diameter can be measured using a commercially available laser diffraction particle size distribution analyzer.

<Negative Electrode>

The negative electrode of the invention has a negative electrode power collector, and a negative electrode active material layer situated on one or both sides thereof.

[Negative Electrode Active Material Layer]

The negative electrode active material layer contains a negative electrode active material that can intercalate and release lithium ions. It may also contain optional components such as a conductive filler, binder and dispersion stabilizer, as necessary.

Throughout the present specification, "nonporous negative electrode power collector" means a negative electrode power collector that, at least in the region where the negative electrode active material layer has been coated, lacks pores that would allow lithium ions to pass through the negative electrode power collector and result in uniformity of lithium ions on the front and back sides of the negative electrode. Therefore, it does not exclude negative electrode power collectors having very small or microlevel pores, or negative electrode power collectors having pores in regions of the negative electrode active material layer that are not coated, within a range in which the effect of the invention is exhibited. According to this embodiment, at least the region of the negative electrode power collector that is coated with the negative electrode active material layer is nonporous, and the remaining sections of the negative electrode power collector that are not coated with the negative electrode active material may either have or lack pores.

According to the third aspect of the invention, the coefficient of variation CV of $q_1$ and $q_2$ is 0.001 to 0.500, where $q_1$ is the amount of lithium per unit weight of the first negative electrode active material layer that has intercalated the lithium ions, calculated by the peak area in the range of −20 ppm to 60 ppm in the solid $^7$Li-NMR spectrum of the first negative electrode active material layer formed on the first side of the negative electrode power collector, and $q_2$ is the amount of lithium per unit weight of the second negative electrode active material layer that has intercalated the lithium ions, calculated by the peak area in the range of −20 ppm to 60 ppm in the solid $^7$Li-NMR spectrum of the second negative electrode active material layer formed on the second side of the negative electrode power collector, which is the back side of the first side. The coefficient of variation CV is preferably 0.002 to 0.400, more preferably 0.004 to 0.300, even more preferably 0.008 to 0.250 and most preferably 0.010 to 0.200.

The nonaqueous lithium power storage element of the third aspect of the invention has a high load charge/discharge cycle characteristic, by using a positive electrode containing a lithium compound other than the positive electrode active material, and a negative electrode having a coefficient of variation CV adjusted to within the range of 0.001 to 0.500. While the principle is not completely understood, and it is not our intention to be limited by theory, the following is conjectured.

Since the size of expansion and shrinkage of the negative electrode active material layer that takes place with charge/discharge of the nonaqueous lithium power storage element is proportional to the amount of lithium in the negative electrode active material layer, when the amount of lithium $q_1$ in the first negative electrode active material layer on the first side of the negative electrode power collector is equal to the amount of lithium $q_2$ in the second negative electrode active material layer on the second side of the negative electrode power collector (i.e., when the coefficient of variation CV=0), it is not possible to mitigate the stress caused by expansion and shrinkage of the negative electrode active material layer, and distortion occurs in the negative electrode active material layer, resulting in detachment of the negative electrode active material layer from the negative electrode power collector. This reduces the high load charge/discharge cycle characteristic.

On the other hand, when the amount of lithium $q_1$ in the first negative electrode active material layer on the first side of the negative electrode power collector is different from the amount of lithium $q_2$ in the second negative electrode active material layer on the second side of the negative electrode power collector (i.e., when coefficient of variation CV≠0), the negative electrode itself becomes curved due to the difference in expansion and shrinkage between the first negative electrode active material layer on the first side and the second negative electrode active material layer on the second side, allowing the stress to be mitigated, and allowing detachment of the negative electrode active material layer from the negative electrode power collector to be suppressed. This can improve the high load charge/discharge cycle characteristic. However, with a negative electrode in which the coefficient of variation CV has been controlled to within the range specified above, active products such as fluorine ion (for example, HF) generated at the positive electrode during high load charge/discharge cycling react with the binder in the negative electrode active material layer, lowering the strength of the negative electrode active material layer and lowering the high load charge/discharge cycle characteristic. However, by adding a lithium compound other than the positive electrode active material to the positive electrode, the lithium compound traps such active products such as fluorine ions, allowing reduction in the binding force of the binder in the negative electrode active material layer to be suppressed, and allowing a satisfactory high load charge/discharge cycle characteristic to be exhibited.

If the coefficient of variation CV is 0.001 or greater, the stress due to expansion and shrinkage of the negative electrode active material layer that occurs with intercalation and release of lithium ions can be mitigated by curving of the negative electrode itself, and the negative electrode active material layer does not detach from the negative electrode power collector, such that a high load charge/discharge cycle characteristic can be exhibited. If the coefficient of variation CV is no greater than 0.500, on the other hand, detachment of the negative electrode active material layer from the negative electrode power collector that occurs due to excessive curving of the negative electrode itself can be suppressed, and therefore a high load charge/discharge cycle characteristic can be exhibited and curving of the nonaqueous lithium power storage element itself can be suppressed.

From the viewpoint of mitigating stress on the negative electrode itself due to the difference in expansion and shrinkage of the first negative electrode active material layer on the first side and the second negative electrode active material layer on the second side, it is preferred for the negative electrode active material layer formed on the surface of the negative electrode power collector and the negative electrode active material layer formed on the back side of the negative electrode power collector to be in a separated state.

FIG. 1 is a schematic side view of a negative electrode according to the third aspect of the invention. In the negative electrode (1) shown in FIG. 1, a first negative electrode active material layer (5) is formed on the first side (3) of the negative electrode power collector (2) and a second negative electrode active material layer (6) is formed on the second side (4) of the negative electrode power collector (2), which is the side opposite the first side, the first negative electrode active material layer (5) and second negative electrode active material layer (6) thus being in a separated state.

Throughout the present specification, the amounts of lithium $q_1$ and $q_2$ obtained by the solid $^7$Li-NMR spectrum of the negative electrode active material layer, and their coefficients of variation CV, can be calculated by the following method.

The measuring apparatus used for solid $^7$Li-NMR may be a commercially available apparatus. Measurement is performed by the single pulse method in a room temperature environment, with a magic-angle spinning rotational speed of 14.5 kHz and an irradiation pulse width set to a 45° pulse. The repeated latency during the measurement is set for adequate measurement. A 1 mol/L aqueous lithium chloride solution is used as the shift reference, and the shift position measured separately as an external standard is defined as 0 ppm. During measurement of the 1 mol/L aqueous lithium chloride solution, the single pulse method is used with an irradiation pulse width set to a 45° pulse, without rotation of the sample.

The solid $^7$Li-NMR spectrum of the negative electrode active material layer is obtained by the method described above, for both the first negative electrode active material layer formed on the first side of the negative electrode power collector and the second negative electrode active material layer formed on the second side of the negative electrode power collector. The obtained solid $^7$Li-NMR spectra for the negative electrode active material layers are used to determine the peak areas for components in the range of −20 ppm to 60 ppm. The peak areas are then divided by the peak area for a 1 mol/L aqueous lithium chloride solution, with the same sample height in the measuring rotor as during measurement of the negative electrode active material layer, and further divided by the weight of the negative electrode active material layer used for measurement, to calculate the lithium amounts $q_1$ and $q_2$. Throughout the present specification, the "weight of the negative electrode active material layer" is the weight of the negative electrode active material layer including lithium ion intercalated in the negative electrode active material layer and/or the coating film or accumulated deposit on the negative electrode active material layer.

The obtained $q_1$ and $q_2$ values are used to calculate the coefficient of variation CV by the order formula (3).

[Math. 3]

$$\text{Coefficient of variation } CV = \sqrt{\frac{\sum_{i=1}^{n}(q_i - m)^2}{n}} \Big/ m \quad (3)$$

{In the formula, m is the arithmetic mean of $q_1$ and $q_2$, and n is 2.}

[Negative Electrode Active Material Layer]

The negative electrode active material layer contains the negative electrode active material, but it may also contain optional components such as a conductive filler, binder and dispersion stabilizer, as necessary.

The negative electrode active material layer according to the third aspect of the invention contains the first and second negative electrode active material layers formed on the front side and back side of the negative electrode power collector, respectively, and the lithium amounts ($q_1$, $q_2$) in the first and second negative electrode active material layers are mutually different.

The first and second negative electrode active material layers can be formed using the negative electrode active materials, negative electrode power collectors and production method described below, so long as each of them intercalate lithium ions, and so long as the lithium amounts ($q_1$, $q_2$) are different.

[Negative Electrode Active Material]

The negative electrode active material used may be a substance capable of intercalating and releasing lithium ions. Examples include, specifically, carbon materials, titanates, silicon, silicon oxides, silicon alloys, silicon compounds, tin and tin compounds. Preferably, the content of the carbon material with respect to the total amount of the negative electrode active material is 50 weight % or greater, and more preferably 70 weight % or greater. The carbon material content may be 100 weight %, but from the viewpoint of obtaining a satisfactory effect by combined use with other materials, it is preferably, for example, no greater than 90 weight %, and may even be 80 weight % or lower.

The negative electrode active material is preferably doped with lithium ion. The lithium ion doped in the negative electrode active material, as described throughout the present specification, includes three major forms.

The first form is lithium ion that is intercalated in advance in the negative electrode active material, as a design value, before fabrication of the nonaqueous lithium power storage element.

The second form is lithium ion intercalated in the negative electrode active material during fabrication and shipping of the nonaqueous lithium power storage element.

The third form is lithium ion intercalated in the negative electrode active material after the nonaqueous lithium power storage element has been used as a device.

By doping the negative electrode active material with lithium ion it is possible to satisfactorily control the capacitance and operating voltage of the obtained nonaqueous lithium power storage element.

Examples of carbon materials include non-graphitizable carbon materials; easily graphitizable carbon materials; carbon black; carbon nanoparticles; activated carbon; artificial graphite; natural graphite; graphitized mesophase carbon microspheres; graphite whiskers; amorphous carbonaceous materials such as polyacene-based materials; carbonaceous materials obtained by heat treatment of carbon precursors such as petroleum-based pitch, coal-based pitch, mesocarbon microbeads, coke and synthetic resins (for example, phenol resins); thermal decomposition products of furfuryl alcohol resins or novolac resins; fullerenes; carbon nanohorns; and carbon materials that are composites of the foregoing.

From the viewpoint of lowering resistance of the negative electrode, pitch composite carbon materials are preferred that are obtained by heat treatment of one or more carbon materials with petroleum-based pitch or coal-based pitch in admixture. Before the heat treatment, the carbon material and the pitch may be mixed at a temperature higher than the melting point of the pitch. The heat treatment temperature may be a temperature such that the components generated by volatilization or thermal decomposition of the pitch used are converted to a carbonaceous material. The atmosphere for the heat treatment is preferably a non-oxidizing atmosphere.

Preferred examples for the pitch composite carbon material are pitch composite carbon materials 1a and 2a mentioned below. Either of these may be selected for use, or both may be used in combination.

Pitch composite carbon material 1a can be obtained by heat treating one or more carbon materials with a BET specific surface area of 100 $m^2/g$ to 3000 $m^2/g$ in admixture with petroleum-based pitch or coal-based pitch.

The carbon material is not particularly restricted, but activated carbon, carbon black, molded porous carbon, high specific surface area graphite or carbon nanoparticles may be suitably used.

—Composite Carbon Material 1a—

Composite carbon material 1a is a composite carbon material using at least one type of carbon material with a BET specific surface area of 50 $m^2/g$ to 3000 $m^2/g$ as the base material. The base material is not particularly restricted, but activated carbon, carbon black, molded porous carbon, high specific surface area graphite or carbon nanoparticles may be suitably used.

For the first, second and fourth aspects of the invention, the BET specific surface area of the composite carbon material 1a is preferably 100 $m^2/g$ to 1,500 $m^2/g$, more preferably 150 $m^2/g$ to 1,100 $m^2/g$ and even more preferably 180 $m^2/g$ to 550 $m^2/g$. If the BET specific surface area of the composite carbon material 1a is 100 $m^2/g$ or greater, suitable pores will be maintained and diffusion of lithium ions in the nonaqueous electrolytic solution will be satisfactory, and therefore a high input/output characteristic can be exhibited and reaction sites between lithium ions in the nonaqueous electrolytic solution can be adequately increased, thereby allowing a high input/output characteristic to be exhibited. If the BET specific surface area of the composite carbon material 1a is no greater than 1,500 $m^2/g$, the lithium ion charge/discharge efficiency will be increased and excessive reductive decomposition of the nonaqueous electrolytic solution can be suppressed, so that impairment of the high load charge/discharge cycle characteristic can be minimized.

According to the third aspect of the invention, the BET specific surface area per unit volume of the negative electrode active material layer, in a negative electrode active material layer using composite carbon material 1a as the negative electrode active material, is preferably 20 $m^2/cc$ to 1,500 $m^2/cc$. The BET specific surface area per unit volume of the negative electrode active material layer is more preferably 25 $m^2/cc$ to 1,000 $m^2/cc$, even more preferably 30 $m^2/cc$ to 500 $m^2/cc$ and most preferably 33 $m^2/cc$ to 400 $m^2/cc$. If the BET specific surface area per unit volume of the negative electrode active material layer is 20 $m^2/cc$ or greater, the reaction sites with lithium ions in the nonaqueous electrolytic solution can be adequately increased per unit volume of the negative electrode active material layer, and therefore the nonaqueous lithium power storage element using it can exhibit a high input/output characteristic. On the other hand, if the BET specific surface area per unit volume of the negative electrode active material layer is no greater than 1,500 $m^2/cc$, excessive reductive decomposition of the nonaqueous electrolytic solution in the negative electrode active material layer can be suppressed, and therefore a nonaqueous lithium power storage element employing it can exhibit a high load charge/discharge cycle characteristic.

The weight ratio of the carbonaceous material with respect to the base material in the composite carbon material 1a is preferably 10% to 200%. The weight ratio is preferably 12% to 180%, more preferably 15% to 160% and most preferably 18% to 150%. If the weight ratio of the carbonaceous material is 10% or greater, it will be possible to suitably fill the micropores of the base material with the carbonaceous material, and the lithium ion charge/discharge efficiency will be increased, therefore allowing satisfactory cycle durability to be exhibited. If the weight ratio of the carbonaceous material is no greater than 200%, it will be possible to suitably maintain the pores and the lithium ion diffusion will be satisfactory, and therefore a high input/output characteristic can be exhibited.

The lithium ion doping amount per unit weight of the composite carbon material 1a is preferably 530 mAh/g to 2,500 mAh/g. This is more preferably 620 mAh/g to 2,100 mAh/g, even more preferably 760 mAh/g to 1,700 mAh/g, and most preferably 840 mAh/g to 1,500 mAh/g.

Doping lithium ion lowers the potential of the negative electrode. Thus, when a negative electrode containing composite carbon material 1a doped with lithium ion is combined with a positive electrode, the voltage of the nonaqueous lithium power storage element is increased and the utilizable capacity of the positive electrode is increased. Therefore, the capacitance and energy density of the obtained nonaqueous lithium power storage element increases.

If the doping amount is 530 mAh/g or greater, lithium ion in the composite carbon material 1a will be satisfactorily doped even at irreversible sites where lithium ion cannot be desorbed after once being inserted, and it will also be possible to reduce the amount of composite carbon material 1a per amount of lithium. The film thickness of the negative electrode can therefore be reduced and high energy density can be obtained. As the doping amount increases, the negative electrode potential decreases and the input/output characteristic, energy density and durability increase.

If the doping amount is no greater than 2,500 mAh/g, on the other hand, there will be no risk of side-effects such as deposition of lithium metal.

Composite carbon material 1a using activated carbon as the base material will now be described as a preferred example of composite carbon material 1a.

The composite carbon material 1a preferably satisfies $0.010 \leq Vm1 \leq 0.300$ and $0.001 \leq Vm2 \leq 0.650$ where Vm1 (cc/g) is the mesopore volume due to pores with diameters of 20 Å to 500 Å, as calculated by the BJH method, and Vm2 (cc/g) is the micropore volume due to pores with diameters of smaller than 20 Å as calculated by the MP method.

The mesopore volume Vm1 more preferably satisfies $0.010 \leq Vm1 \leq 0.225$ and even more preferably $0.010 \leq Vm1 \leq 0.200$. The micropore volume Vm2 more preferably satisfies $0.001 \leq Vm2 \leq 0.200$, even more preferably $0.001 \leq Vm2 \leq 0.150$ and most preferably $0.001 \leq Vm2 \leq 0.100$.

If the mesopore volume Vm1 is no greater than 0.300 cc/g it will be possible to increase the BET specific surface area and increase the lithium ion doping amount, while also increasing the bulk density of the negative electrode. As a result, the negative electrode can be made into a thin-film. If the micropore volume Vm2 is no greater than 0.650 cc/g, it will be possible to maintain high charge/discharge efficiency for lithium ions. If the mesopore volume Vm1 and micropore volume Vm2 are at least the lower limits ($0.010 \leq Vm1$, $0.001 \leq Vm2$), a high input/output characteristic can be obtained.

The mean pore size of composite carbon material 1a is preferably 20 Å or larger, more preferably 25 Å or larger and even more preferably 30 Å or larger, from the viewpoint of obtaining a high input/output characteristic. On the other hand, the mean pore size is preferably no larger than 65 Å and more preferably no larger than 60 Å, from the viewpoint of obtaining high energy density.

The mean particle diameter of the composite carbon material 1a is preferably 1 μm to 10 μm. The lower limit is more preferably 2 μm and even more preferably 2.5 μm. The upper limit is more preferably no greater than 6 μm and even more preferably no greater than 4 μm. If the mean particle diameter is 1 μm to 10 μm, then satisfactory durability will be maintained.

For composite carbon material 1a, the atomic ratio of hydrogen/carbon atom (H/C) is preferably 0.05 to 0.35 and more preferably 0.05 to 0.15. If H/C is 0.35 or smaller, the structure of the carbonaceous material adhering to the activated carbon surface (typically a polycyclic aromatic conjugated structure) will satisfactorily develop and the capacitance (energy density) and charge/discharge efficiency will increase. If H/C is 0.05 or larger, on the other hand, there will be no excessive carbonization, and therefore satisfactory energy density will be obtained. The H/C ratio is measured with an elemental analyzer.

Composite carbon material 1a has an amorphous structure derived from the activated carbon of the base material, but it simultaneously also has a crystal structure derived mainly from the coated carbonaceous material. Based on wide-angle X-ray diffraction, in the composite carbon material A, preferably the plane spacing $d_{002}$ of the (002) plane is 3.60 Å to 4.00 Å and the crystallite size Lc in the c-axis direction obtained from the half width of the peak is 8.0 Å to 20.0 Å, and more preferably $d_{002}$ is 3.60 Å to 3.75 Å and the crystallite size Lc in the c-axis direction obtained from the half width of the peak is 11.0 Å to 16.0 Å.

The activated carbon used as the base material for composite carbon material 1a is not particularly restricted so long as the obtained composite carbon material 1a exhibits the desired properties. For example, it is possible to use a commercially available product obtained from a petroleum-based, coal-based, plant-based or polymer-based starting material. It is particularly preferred to use activated carbon powder having a mean particle diameter of 1 μm to 15 μm. The mean particle diameter is more preferably 2 μm to 10 μm.

In order to obtain composite carbon material 1a having the pore distribution range specified for this embodiment, the pore distribution of the activated carbon used as the base material is important.

In the activated carbon, if $V_1$ (cc/g) is the mesopore volume due to pores with diameters of 20 Å to 500 Å, as calculated by the BJH method, and $V_2$ (cc/g) is the micropore volume due to pores with diameters of smaller than 20 Å as calculated by the MP method, then preferably $0.050 \leq V_1 \leq 0.500$, $0.005 \leq V_2 \leq 1.000$ and $0.2 \leq V_1/V_2 \leq 20.0$.

For the mesopore volume $V_1$, more preferably $0.050 \leq V_1 \leq 0.350$ and even more preferably $0.100 \leq V_1 \leq 0.300$. For the micropore volume $V_2$, more preferably $0.005 \leq V_2 \leq 0.850$ and even more preferably $0.100 \leq V_2 \leq 0.800$. For the mesopore volume/micropore volume ratio, more preferably $0.22 \leq V_1/V_2 \leq 15.0$ and even more preferably $0.25 \leq V_1/V_2 \leq 10.0$. When the mesopore volume $V_1$ of the activated carbon is 0.500 or smaller and the micropore volume $V_2$ is 1.000 or smaller, coating a suitable amount of carbonaceous material will be sufficient for obtaining a pore structure for the composite carbon material 1a according to this embodiment, and it will therefore tend to be easier to control the pore structure. The structure is also easily obtained when the mesopore volume $V_1$ of the activated carbon is 0.050 or greater and the micropore volume $V_2$ is 0.005 or greater, when $V_1/V_2$ is 0.2 or greater, and when $V_1/V_2$ is no greater than 20.0.

A carbonaceous material precursor to be used as a starting material for composite carbon material 1a is a solid, liquid or solvent-soluble organic material that can be coated as a carbonaceous material onto activated carbon by heat treatment. The carbonaceous material precursor may be, for example, pitch, mesocarbon microbeads, coke or a synthetic resin (for example, a phenol resin). Among such carbonaceous material precursors, the use of inexpensive pitch is preferred in terms of production cost. Pitch is largely classified as petroleum-based pitch or coal-based pitch. Examples of petroleum-based pitch include crude oil distillation residue, fluid catalytic cracking residue (decant oil and the like), bottom oil from thermal crackers, and ethylene tar obtained during naphtha cracking.

When pitch is used, composite carbon material 1a can be obtained by heat treatment of the pitch in the co-presence of activated carbon, causing thermal reaction of the volatile components and thermal decomposition components of the pitch on the surface of the activated carbon to coat the carbonaceous material onto the activated carbon. In this case, coating of the volatile components or thermal decomposition components of the pitch inside the pores of the activated carbon proceeds at a temperature of about 200 to 500° C., and the coated components undergo reaction to form a carbonaceous material at 400° C. or higher. The peak temperature during heat treatment (maximum ultimate temperature) may be appropriately set depending on the properties of the composite carbon material 1a to be obtained, the thermal reaction pattern and the thermal reaction atmosphere, but it is preferably 400° C. or higher, more preferably 450° C. to 1,000° C. and even more preferably about 500 to 800° C. The time for which the peak temperature is maintained during heat treatment is preferably 30 minutes to 10 hours, more preferably 1 hour to 7 hours and even more preferably 2 hours to 5 hours. For example, with heat treatment at a peak temperature of about 500 to 800° C. over a period of 2 hours to 5 hours, the carbonaceous material adhering to the activated carbon surface is thought to be converted to polycyclic aromatic hydrocarbons.

Also, the softening point of the pitch used is preferably 30° C. to 250° C. and more preferably 60° C. to 130° C. Pitch with a softening point of 30° C. or higher will allow precise charging to be carried out without impairing the handleability. Pitch with a softening point of no higher than 250° C. comprises a relatively large number of low molecular compounds, and therefore using such pitch will allow coating even to the relatively fine pores in the activated carbon.

The specific method for producing composite carbon material 1a may be, for example, a method in which activated carbon is heat treated in an inert atmosphere containing a hydrocarbon gas volatilized from the carbonaceous material precursor, and coated with the carbonaceous material in a gas phase. It may instead be a method in which the activated carbon and carbonaceous material precursor are pre-mixed and then heat treated, or the carbonaceous material precursor dissolved in a solvent is coated onto the activated carbon and dried, and then heat treated.

The weight ratio of the carbonaceous material with respect to the activated carbon in the composite carbon material 1a is preferably 10% to 100%. The weight ratio is preferably 15% to 80%. If the weight ratio of the carbonaceous material is 10% or greater, it will be possible to suitably fill the micropores of the activated carbon with the carbonaceous material, and the charge/discharge efficiency of lithium ions will be increased, thus avoiding loss of cycle durability. If the weight ratio of the carbonaceous material is no greater than 100%, the pores in the composite carbon material 1a will be suitably conserved and a high specific surface area will be maintained. The lithium ion doping amount can therefore be increased, consequently allowing high output density and high durability to be maintained even if the negative electrode is a thin-film.

—Composite carbon material 2a—

Composite carbon material 2a is a composite carbon material using at least one type of carbon material with a BET specific surface area of 0.5 m$^2$/g to 80 m$^2$/g as the base material. The base material is not particularly restricted, and natural graphite, artificial graphite, low crystalline graphite, hard carbon, soft carbon, carbon black or the like may be suitably used.

The BET specific surface area of composite carbon material 2a is preferably 1 m$^2$/g to 50 m$^2$/g, more preferably 1.5 m$^2$/g to 40 m$^2$/g and even more preferably 2 m$^2$/g to 25 m$^2$/g. If the BET specific surface area is 1 m$^2$/g or greater, it will be possible to adequately ensure reaction sites with the lithium ions, and to thus exhibit a high input/output characteristic. If the BET specific surface area is no greater than 50 m$^2$/g, on the other hand, the lithium ion charge/discharge efficiency will be increased and decomposition reaction of the nonaqueous electrolytic solution during charge/discharge will be suppressed, thus allowing high cycle durability to be exhibited.

The BET specific surface area, mesopore volume and micropore volume of the negative electrode active material of this embodiment are the values determined by the following respective methods. A sample is vacuum dried at 200° C. for a day and a night, and the adsorption/desorption isotherm is measured using nitrogen as the adsorbate. Using the obtained isotherm at the adsorption side, the BET specific surface area is calculated by the multipoint BET method or single point BET method, the mesopore volume by the BJH method, and the micropore volume by the MP method.

The mean particle diameter of the composite carbon material 2a is preferably 1 μm to 10 μm. The mean particle diameter is more preferably 2 μm to 8 μm and even more preferably 3 μm to 6 μm. If the mean particle diameter is 1 μm or larger it will be possible to increase the lithium ion charge/discharge efficiency, and to thus exhibit high cycle durability. If it is no larger than 10 μm, the reaction area between composite carbon material 2a and the nonaqueous electrolytic solution will increase, allowing a high input/output characteristic to be exhibited.

The weight ratio of the carbonaceous material with respect to the base material in the composite carbon material 2a is preferably 1% to 30%. The weight ratio is more preferably 1.2% to 25% and even more preferably 1.5% to 20%. If the weight ratio of the carbonaceous material is 1% or greater, the number of reaction sites with lithium ion can be adequately increased by the carbonaceous material, and desolvation of the lithium ion will be facilitated, thus allowing a high input/output characteristic to be exhibited. If the weight ratio of the carbonaceous material is no greater than 20%, on the other hand, it will be possible to satisfactorily maintain solid diffusion of lithium ions between the carbonaceous material and base material, and therefore a high input/output characteristic can be exhibited. In addition, the lithium ion charge/discharge efficiency can be increased, and therefore high cycle durability can be exhibited.

The lithium ion doping amount per unit weight of the composite carbon material 2a is preferably 50 mAh/g to 700 mAh/g. This is more preferably 70 mAh/g to 650 mAh/g, even more preferably 90 mAh/g to 600 mAh/g, and most preferably 100 mAh/g to 550 mAh/g.

Doping lithium ion lowers the potential of the negative electrode. Thus, when a negative electrode containing composite carbon material 2a doped with lithium ion is combined with a positive electrode, the voltage of the nonaqueous lithium power storage element is increased and the utilizable capacity of the positive electrode is increased. Therefore, the capacitance and energy density of the obtained nonaqueous lithium power storage element increases.

If the doping amount is 50 mAh/g or greater, lithium ion will be satisfactorily doped even at irreversible sites where lithium ion in the composite carbon material 2a cannot be desorbed after once being inserted, and therefore high energy density can be obtained. As the doping amount increases, the negative electrode potential decreases and the input/output characteristic, energy density and durability increase.

If the doping amount is no greater than 700 mAh/g, on the other hand, there will be no risk of side-effects such as deposition of lithium metal.

Composite carbon material 2a using a graphite material as the base material will now be explained as a preferred example of composite carbon material 2a.

The mean particle diameter of the composite carbon material 2a is preferably 1 μm to 10 μm. The mean particle diameter is more preferably 2 μm to 8 μm and even more preferably 3 μm to 6 μm. If the mean particle diameter is 1 μm or larger it will be possible to increase the lithium ion charge/discharge efficiency, and to thus exhibit high cycle durability. If it is no larger than 10 μm, the reaction area between composite carbon material 2a and the nonaqueous electrolytic solution will increase, allowing a high input/output characteristic to be exhibited.

The graphite material to be used as the base material is not particularly restricted, so long as the obtained composite carbon material 2a exhibits the desired properties. Examples that may be used include artificial graphite, natural graphite, graphitized mesophase carbon microspheres and graphite whiskers. The mean particle diameter of the graphite material is preferably 1 μm to 10 μm and more preferably 2 μm to 8 μm.

A carbonaceous material precursor to be used as a starting material for composite carbon material 2a is a solid, liquid or solvent-soluble organic material that allows the carbonaceous material to be composited with a graphite material by heat treatment. The carbonaceous material precursor may be, for example, pitch, mesocarbon microbeads, coke or a synthetic resin (for example, a phenol resin). Among such carbonaceous material precursors, the use of inexpensive pitch is preferred in terms of production cost. Pitch is largely classified as petroleum-based pitch or coal-based pitch. Examples of petroleum-based pitch include crude oil distillation residue, fluid catalytic cracking residue (decant oil and the like), bottom oil from thermal crackers, and ethylene tar obtained during naphtha cracking.

The weight ratio of the carbonaceous material with respect to the graphite material in the composite carbon material 2a is preferably 1% to 10%. The weight ratio is more preferably 1.2% to 8%, even more preferably 1.5% to 6% and most preferably 2% to 5%. If the weight ratio of the carbonaceous material is 1% or greater, the number of reaction sites with lithium ion can be adequately increased by the carbonaceous material, and desolvation of the lithium ion will be facilitated, thus allowing a high input/output characteristic to be exhibited. If the weight ratio of the carbonaceous material is no greater than 20%, on the other hand, it will be possible to satisfactorily maintain solid diffusion of lithium ions between the carbonaceous material and graphite material, and therefore a high input/output characteristic can be exhibited. In addition, the lithium ion charge/discharge efficiency can be increased, and therefore high cycle durability can be exhibited.

(Other Components of Negative Electrode Active Material Layer)

The negative electrode active material layer of the invention may also contain optional components such as a conductive filler, binder and dispersion stabilizer, as necessary, in addition to the negative electrode active material.

The type of conductive filler is not particularly restricted, and examples include acetylene black, Ketchen black and vapor grown carbon fibers. The amount of conductive filler used is preferably 0 parts by weight to 30 parts by weight, with respect to 100 parts by weight of the negative electrode active material. It is more preferably 0 parts by weight to 20 parts by weight and even more preferably 0 parts by weight to 15 parts by weight.

The binder is not particularly restricted, and for example, PVdF (polyvinylidene fluoride), PTFE (polytetrafluoroethylene), polyimide, latex, styrene-butadiene copolymer, fluorine rubber or an acrylic copolymer may be used. The amount of binder used is preferably 1 part by weight to 30 parts by weight, with respect to 100 parts by weight of the negative electrode active material. It is more preferably 2 parts by weight to 27 parts by weight and even more preferably 3 parts by weight to 25 parts by weight. If the amount of binder is 1 weight % or greater, adequate electrode strength will be exhibited. If the amount of binder is no greater than 30 parts by weight, on the other hand, a high input/output characteristic will be exhibited without inhibiting movement of lithium ions into the negative electrode active material.

The dispersion stabilizer is not particularly restricted, and for example, PVP (polyvinylpyrrolidone), PVA (polyvinyl alcohol) or cellulose derivatives may be used. The amount of binder used is preferably 0 parts by weight to 10 parts by weight, with respect to 100 parts by weight of the negative electrode active material. If the amount of dispersion stabilizer is no greater than 10 parts by weight, a high input/output characteristic will be exhibited without inhibiting movement of lithium ions into the negative electrode active material.

[Negative Electrode Power Collector]

The material composing the negative electrode power collector of the invention is preferably a metal foil with high electron conductivity, and no degradation by elution into the electrolytic solution or reaction with the electrolyte or ion. There are no particular restrictions on such metal foils, and examples include aluminum foils, copper foils, nickel foils and stainless steel foils. The negative electrode power collector in the nonaqueous lithium power storage element of this embodiment is preferably a copper foil.

The metal foil may be a common metal foil without ruggedness or through-holes, or it may be a metal foil having ruggedness formed by embossing, chemical etching, electrolytic deposition or blasting, or it may be a metal foil having through-holes, such as an expanded metal, punching metal or etching foil. The negative electrode power collector according to the third and fourth aspects of the invention may be a common metal foil having no ruggedness or through-holes, or it may be a metal foil having ruggedness formed by embossing, chemical etching, electrolytic deposition or blasting, or a metal foil having through-holes such as expanded metal, punching metal or etching foil, so long as it is used as a "nonporous negative electrode power collector" as defined above.

The thickness of the negative electrode power collector is not particularly restricted so long as it allows the shape and strength of the negative electrode to be maintained, but 1 to 100 μm, for example, is preferred.

[Production of Negative Electrode]

The negative electrode comprises a negative electrode active material layer on one or both sides of a negative electrode power collector. According to a typical aspect, the negative electrode active material layer is anchored to the negative electrode power collector.

The negative electrode can be produced by a known electrode production technique for lithium ion batteries or electrical double layer capacitors. For example, different materials containing a negative electrode active material may be dispersed and dissolved in water or an organic solvent to prepare a slurry-like coating solution, and the coating solution coated onto one or both sides of a negative electrode power collector to form a coating film, which is dried to obtain a negative electrode. The obtained negative electrode may also be pressed to adjust the film thickness or bulk density of the negative electrode active material layer. As an alternative method, various materials containing negative electrode active materials may also be dry-mixed without using a solvent, and the obtained mixture press-molded and then attached to a negative electrode power collector using a conductive adhesive.

The coating solution may also be prepared by dry blending all or a portion of each of the starting material powders containing the negative electrode active material, and then adding water or an organic solvent, and/or adding a liquid or slurry-like substance comprising a binder or dispersion stabilizer dissolved or dispersed in them. It may also be prepared by adding various starting powders containing the negative electrode active material, to a liquid or slurry-like substance comprising a binder or dispersion stabilizer dissolved or dispersed in water or an organic solvent. Preparation of the coating solution is not particularly restricted, and a dispersing machine such as a homodisperser or multiscrew dispersing machine, planetary mixer, thin-film rotating-type high speed mixer or the like, may be suitably used. In order to obtain a coating solution in a satisfactorily dispersed state, it is preferred for the dispersion to be at a peripheral velocity of 1 m/s to 50 m/s. It is preferred if the peripheral velocity is 1 m/s or greater, because this will allow each material to satisfactorily dissolve or disperse. It is also preferred if the peripheral velocity is no greater than 50 m/s, because each material will not be broken down by heat or shear force during dispersion, and reaggregation will not take place.

The viscosity ($\eta b$) of the coating solution is preferably 1,000 mPa·s to 20,000 mPa·s. It is preferably 1,500 mPa·s to 10,000 mPa·s and more preferably 1,700 mPa·s to 5,000 mPa·s. If the viscosity ($\eta b$) is 1,000 mPa·s or higher, liquid dripping during formation of the coating film will be suppressed, and the coating film width and thickness can be satisfactorily controlled. If it is no higher than 20,000 mPa·s, there will be less pressure loss in the flow channel of the coating solution when a coating machine is used, allowing stable coating to be carried out, and allowing control to less than the prescribed coating film thickness.

Also, the TI value (thixotropy index value) of the coating solution is preferably 1.1 or greater, more preferably 1.2 or greater and even more preferably 1.5 or greater. If the TI value is 1.1 or greater, the coating film width and thickness can be satisfactorily controlled.

Formation of the coating film is not particularly restricted, and a coating machine such as a die coater, comma coater, knife coater or gravure coating machine may be suitably used. The coating film may be formed by monolayer coating or by multilayer coating. The coating speed is preferably 0.1 m/min to 100 m/min, more preferably 0.5 m/min to 70 m/min and even more preferably 1 m/min to 50 m/min. If the coating speed is 0.1 m/min or greater, stable coating will be possible. If it is 100 m/min or lower, on the other hand, the coating precision can be adequately ensured.

Drying of the coating film is not particularly restricted, and a drying method such as hot air drying or infrared ray (IR) drying may be suitably employed. Drying of the coating film may be drying at a single temperature, or it may be drying while varying the temperature in different stages. Several drying methods may also be used in combination for drying. The drying temperature is preferably between 25° C. and 200° C. It is more preferably between 40° C. and 180° C. and even more preferably between 50° C. and 160° C. If the drying temperature is 25° C. or higher, it will be possible to adequately volatilize off the solvent in the coating film. If it is no higher than 200° C., on the other hand, it will be possible to reduce cracking of the coating film by rapid volatilization of the solvent or uneven distribution of the binder by migration, and oxidation of the negative electrode power collector or negative electrode active material layer.

Pressing of the negative electrode is not particularly restricted, and a pressing machine such as a hydraulic press or vacuum pressing machine may be suitably used. The film thickness, bulk density and electrode strength of the negative electrode active material layer can be adjusted by the pressing pressure, the gap, and the surface temperature of the pressed portion, as described below. The pressing pressure is preferably 0.5 kN/cm to 20 kN/cm, more preferably 1 kN/cm to 10 kN/cm and even more preferably 2 kN/cm to 7 kN/cm. If the pressing pressure is 0.5 kN/cm or greater, it will be possible to adequately increase the electrode strength. If it is no greater than 20 kN/cm, on the other hand, distortion or wrinkles will not be produced in the negative electrode, and adjustment can be made to the desired film thickness and bulk density for the negative electrode active material layer. Also, the gap between the press rolls may be set to a desired value depending on the film thickness of the dried negative electrode, so that the desired film thickness and bulk density of the negative electrode active material layer is obtained. The pressing speed may also be set to the desired speed, so as to avoid distortion and wrinkles in the negative electrode. The surface temperature of the pressed portion may be room temperature, or it may be heated instead, if necessary. In the case of heating, the lower limit for the surface temperature of the pressed portion is at least the melting point of the binder used minus preferably 60° C., more preferably 45° C. and even more preferably 30° C. In the case of heating, the upper limit for the surface temperature of the pressed portion is no higher than the melting point of the binder used plus preferably 50° C., more preferably 30° C. and even more preferably 20° C. For example, when PVdF (polyvinylidene fluoride: melting point=150° C.) is used as the binder, heating to 90° C. to 200° C. is preferred, and more preferably heating to 105° C. to 180° C. and even more preferably 120° C. to 170° C. When styrene-butadiene copolymer (melting point: 100° C.) is used as the binder, it is preferably heated to 40° C. to 150° C., or heated to more preferably 55° C. to 130° C. and even more preferably 70° C. to 120° C.

The melting point of the binder can be determined by the endothermic peak position in DSC (Differential Scanning Calorimetry). For example, using a "DSC7" differential scanning calorimeter by Perkin-Elmer, 10 mg of sample resin is set in the measuring cell and the temperature is increased from 30° C. to 250° C. at a temperature-elevating rate of 10° C./min, in a nitrogen gas atmosphere, the melting point being the endothermic peak temperature during the temperature elevation.

Pressing may also be carried out multiple times while varying the conditions including the pressing pressure, gap, speed, and pressed portion surface temperature.

The thickness of the negative electrode active material layer is preferably 5 μm to 100 μm, for each side. The lower limit for the thickness of the negative electrode active material layer is more preferably 7 μm or greater and even more preferably 10 μm or greater. The upper limit for the thickness of the negative electrode active material layer is more preferably no greater than 80 μm and even more preferably no greater than 60 μm. If the thickness is 5 μm or greater, the coatability will be excellent without streaking during coating of the negative electrode active material layer. If the thickness is 100 μm or smaller, on the other hand, high energy density can be exhibited by reducing the cell volume. The thickness of the negative electrode active material layer, when the power collector has through-holes or ruggedness, is the mean value of the thickness for each side at the sections of the power collector without through-holes or ruggedness.

The bulk density of the negative electrode active material layer is preferably 0.30 g/cm³ to 1.8 g/cm³, more preferably 0.40 g/cm³ to 1.5 g/cm³ and even more preferably 0.45 g/cm³ to 1.3 g/cm³. If the bulk density is 0.30 g/cm³ or greater, sufficient strength can be obtained and sufficient conductivity can be exhibited between the negative electrode active materials. If it is 1.8 g/cm³ or lower, it is possible to ensure pores through which the ions can be sufficiently diffused in the negative electrode active material layer.

The BET specific surface area per unit volume of the negative electrode active material layer, in a negative electrode active material layer using composite carbon material 1a as the negative electrode active material, is preferably 20 m²/cc to 1,500 m²/cc. The BET specific surface area per unit volume of the negative electrode active material layer is more preferably 25 m²/cc to 1,000 m²/cc, even more preferably 30 m²/cc to 500 m²/cc and most preferably 33 m²/cc to 400 m²/cc. If the BET specific surface area per unit volume of the negative electrode active material layer is 20 m²/cc or greater, the reaction sites with lithium ions in the nonaqueous electrolytic solution can be adequately increased per unit volume of the negative electrode active material layer, and therefore the nonaqueous lithium power storage element using it can exhibit a high input/output characteristic. On the other hand, if the BET specific surface area per unit volume of the negative electrode active material layer is no greater than 1,500 m²/cc, excessive reductive decomposition of the nonaqueous electrolytic solution in the negative electrode active material layer can be suppressed, and therefore a nonaqueous lithium power storage element employing it can exhibit a high load charge/discharge cycle characteristic.

The BET specific surface area per unit volume of the negative electrode active material layer, in a negative electrode active material layer using composite carbon material 2a as the negative electrode active material, is preferably 1 m²/cc to 50 m²/cc. The BET specific surface area per unit volume of the negative electrode active material layer is more preferably 2 m²/cc to 40 m²/cc, even more preferably 3 m²/cc to 35 m²/cc and most preferably 4 m²/cc to 30 m²/cc. If the BET specific surface area per unit volume of the negative electrode active material layer is 1 m²/cc or greater, the reaction sites with lithium ions in the nonaqueous electrolytic solution can be adequately increased per unit volume of the negative electrode active material layer, and therefore the nonaqueous lithium power storage element using it can exhibit a high input/output characteristic. On the other hand, if the BET specific surface area per unit volume of the negative electrode active material layer is no greater than 50 m²/cc, excessive reductive decomposition of the nonaqueous electrolytic solution in the negative electrode active material layer can be suppressed, and therefore a nonaqueous lithium power storage element employing it can exhibit a high load charge/discharge cycle characteristic.

For the purpose of the present specification, the BET specific surface area per unit volume of the negative electrode active material layer can be calculated by the following method.

The sample used for measurement may be the negative electrode before it is incorporated into the nonaqueous lithium power storage element (hereunder also referred to as "negative electrode before use"), or it may be the negative electrode incorporated in the nonaqueous lithium power storage element (hereunder also referred to as "negative electrode after use").

When the negative electrode incorporated in the nonaqueous lithium power storage element is to be used as the measuring sample, the following method, for example, is preferably used as pretreatment of the measuring sample.

First, the nonaqueous lithium power storage element is disassembled under an inert atmosphere such as argon, and the negative electrode is removed. The removed negative electrode is immersed in a linear carbonate (such as methyl ethyl carbonate or dimethyl carbonate), the nonaqueous electrolytic solution and lithium salt are removed and air-drying is carried out. Next, the following method (1), (2) or (3) is preferably used.

(1) The obtained negative electrode is immersed in a mixed solvent comprising methanol and isopropanol to inactivate the lithium ion intercalated in the negative electrode active material, and air-drying is carried out. Next, using vacuum drying or the like, the linear carbonate and organic solvent in the obtained negative electrode are removed to obtain a measuring sample.

(2) Using the obtained negative electrode as the working electrode and metal lithium as the counter electrode and reference electrode, they are immersed in the nonaqueous electrolytic solution under an inert atmosphere such as argon, to fabricate an electrochemical cell. A charger-discharger is used for adjustment of the obtained electrochemical cell, so that the negative electrode potential (vs. Li/Li⁺) is in the range of 1.5 V to 3.5 V. Next, the negative electrode is removed from the electrochemical cell under an inert atmosphere such as argon and immersed in a linear carbonate to remove the nonaqueous electrolytic solution and lithium salt, and air-drying is carried out. Next, vacuum drying or the like is used to remove the linear carbonate in the obtained negative electrode, to obtain a measuring sample.

(3) The obtained negative electrode may be used directly as the measuring sample.

Figure 2:
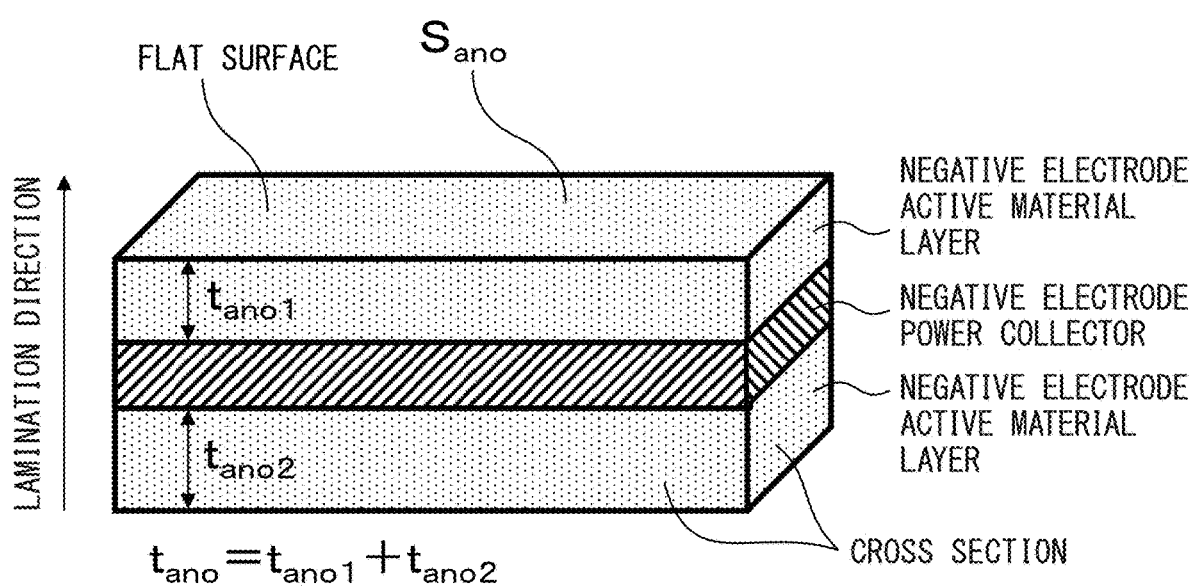
FIG. 2 is an illustration of the geometric area $S_{ano}$ of the flat section and the total film thickness $t_{ano}$ of a measuring sample, for determining the volume $V_{ano}=S_{ano} \times t_{ano}$ of a negative electrode active material layer according to the third aspect of the invention.

The volume $V_{ano}$ (cc) of the negative electrode active material layer of the measuring sample obtained as described above is measured, as shown in FIG. 2. The volume of the negative electrode active material layer can be calculated by $V_{ano}=S_{ano} \times t_{ano}$, where $S_{ano}$ is the geometric area of the flat section of the measuring sample, when the cross-section is on a horizontal plane with respect to the direction of lamination of the negative electrode power collector and negative electrode active material layer and the flat section is on a plane crossing perpendicular to the horizontal surface, and $t_{ano}$ is the total film thickness of the negative electrode active material layer.

Using the obtained measuring sample, the adsorption/desorption isotherm is measured with nitrogen or argon as the adsorbate. Using the obtained isotherm on the adsorption side, the BET specific surface area is calculated by the multipoint BET method or single point BET method, and divided by $V_{ano}$ to calculate the BET specific surface area per unit volume of the negative electrode active material layer.

The doping amount of lithium ion in the negative electrode active material (mAh/g) of the nonaqueous lithium power storage element, during shipping and after use, according to this embodiment, can be determined in the following manner, for example.

First, after washing the negative electrode active material layer of this embodiment with ethylmethyl carbonate or dimethyl carbonate and air-drying it, it is extracted with a mixed solvent comprising methanol and isopropanol, to obtain the extract and the extracted negative electrode active material layer. The extraction will typically be carried out in an Ar box at an environmental temperature of 23° C.

The lithium amounts in the extract obtained in this manner and the extracted negative electrode active material layer are each quantified using ICP-MS (Inductively Coupled Plasma-Mass Spectrometry), for example, and the total is calculated to determine the lithium ion doping amount in the negative electrode active material. The obtained value may be compared to the amount of negative electrode active material supplied for extraction, to calculate the lithium ion doping amount (mAh/g).

The primary particle diameter according to this embodiment can be obtained by a method in which the powder is photographed with an electron microscope in several visual fields, the particle diameters are calculated for 2,000 to 3,000 particles in the visual fields using a fully automatic image processing device, and the value of the arithmetic mean is recorded as the primary particle diameter.

The degree of dispersion for this embodiment is the value determined based on a dispersion evaluation test using a fineness gauge conforming to JIS K5600. Specifically, a sufficient amount of sample is allowed to flow into the tip of a fineness gauge having a groove with the prescribed depth corresponding to the particle size, through the deep part of the groove, and is allowed to slightly spill over from the groove. Next, with the long side of a scraper parallel to the widthwise direction of the gauge, and placed with the blade edge in contact with the deep tip of the groove of the fineness gauge, the scraper is held on the surface of the gauge, the surface of the gauge is pulled at an even speed perpendicular to the long side direction of the groove to a groove depth of 0 for a period of 1 to 2 seconds, observation is made with light irradiated at an angle of 20° to 300 within 3 seconds after the pulling has ended, and the depth at which particles appear in the groove of the fineness gauge is read off.

The viscosity ($\eta b$) and TI value for this embodiment are the values determined by the following respective methods. First, an E-type viscometer is used to determine the viscosity ($\eta a$) stabilized after measurement for 2 minutes or longer under conditions with a temperature of 25° C. and a shear rate of 2 s$^{-1}$. Next, the viscosity ($\eta b$) is determined as measured under the same conditions except for changing the shear rate to 20 s$^{-1}$. The viscosity values as obtained above are used to calculate the TI value as: TI value=$\eta a/\eta b$. When increasing the shear rate from 2 s$^{-1}$ to 20 s$^{-1}$, it may be increased in a single stage, or the shear rate may be increased in stages within the range specified above, while appropriately determining the viscosity at each shear rate.

<Separator>

The positive electrode precursor and negative electrode may be laminated or wound via a separator, to form an electrode laminated body or wound electrode comprising a positive electrode precursor, negative electrode and separator.

The separator used may be a polyethylene microporous film or polypropylene microporous film used in lithium ion secondary batteries, or a cellulose nonwoven sheet used in electrical double layer capacitors. A film composed of organic or inorganic microparticles may also be laminated on one or both sides of these separators. Organic or inorganic microparticles may also be included inside a separator.

The thickness of the separator is preferably 5 μm to 35 μm. The thickness is preferably 5 m or greater, as this will tend to reduce self-discharge due to internal microshorts. The thickness is also preferably no greater than 35 μm, as this will tend to result in a higher output characteristic of the power storage element.

The thickness of a film composed of organic or inorganic microparticles is preferably 1 m to 10 μm. The thickness is preferably 1 μm or greater, as this will tend to reduce self-discharge due to internal microshorts. The thickness is also preferably no greater than 10 μm, as this will tend to result in a higher output characteristic of the power storage element.

<Casing>

The casing used may be a metal can or laminate film.

The metal can is preferably made of aluminum.

The laminate film is preferably a laminated film of a metal foil and a resin film, an example of which is a three-layer structure comprising the structure: outer layer resin film/metal foil/inner layer resin film. The outer layer resin film serves to prevent damage to the metal foil by contact, and a resin such as nylon or polyester may be suitably used. The metal foil serves to prevent penetration of moisture and gas, and a foil such as copper, aluminum or stainless steel may be suitably used. The inner layer resin film serves to protect the metal foil from the electrolytic solution housed inside while also providing a melt seal during heat sealing of the casing, and a polyolefin or acid-modified polyolefin may be suitably used.

<Nonaqueous Electrolytic Solution>

The electrolytic solution for this embodiment is a nonaqueous electrolytic solution. Specifically, the electrolytic solution includes a nonaqueous solvent as described below. The nonaqueous electrolytic solution comprises a lithium salt dissolved at a concentration of 0.5 mol/L or greater based on the total amount of the nonaqueous electrolytic solution. Namely, the nonaqueous electrolytic solution contains lithium ion as an electrolyte.

The nonaqueous electrolytic solution of this embodiment may employ, as the lithium salt, $LiN(SO_2F)_2$, $LiN(SO_2CF_3)_2$, $LiN(SO_2C_2F_5)_2$, $LiN(SO_2CF_3)(SO_2C_2F_5)$, $LiN(SO_2CF_3)(SO_2C_2F_4H)$, $LiC(SO_2F)_3$, $LiC(SO_2CF_3)_3$, $LiC(SO_2C_2F_5)_3$, $LiCF_3SO_3$, $LiC_4F_9SO_3$, $LiPF_6$ or $LiBF_4$, either used alone or in mixtures of two more. It also preferably contains $LiPF_6$ and/or $LiN(SO_2F)_2$, since these will allow high conductivity to be exhibited.

It is sufficient if the nonaqueous electrolytic solution of this embodiment comprises at least one type of lithium salt, and it may comprise, in addition to the lithium salt, an alkali metal salt selected from among sodium salts, potassium salts, rubidium salts and cesium salts, or an alkaline earth metal salt selected from among beryllium salts, magnesium salts, calcium salts, strontium salts and barium salts.

When such an alkali metal salt is to be added to the nonaqueous electrolytic solution in addition to lithium, since sodium ion, potassium ion, rubidium ion or cesium ion, which has a smaller Stokes radius than lithium ion, has high ionic conductance, it can lower the resistance of the nonaqueous lithium power storage element. When such an alkaline earth metal salt is to be added to the nonaqueous electrolytic solution in addition to lithium, since beryllium ion, magnesium ion, calcium ion, strontium ion and barium ion are divalent cations, they can increase the capacitance of the nonaqueous lithium power storage element.

There are no particular restrictions on the method of adding an alkali metal salt other than a lithium salt and/or an alkaline earth metal salt to the nonaqueous electrolytic solution in addition to a lithium salt, but the method may be predissolving the lithium salt and an alkali metal salt other than a lithium salt and/or an alkaline earth metal salt in the nonaqueous electrolytic solution, or adding one or more from among the following formulas:

carbonates such as $M_2CO_3$,
oxides such as $M_2O$,
hydroxides such as MOH,
halides such as MF or MCl,
oxalates such as $M_2(CO_2)_2$, and
carboxylates such as RCOOM (where R is H, an alkyl group or an aryl group), and/or
where M is one or more selected from among Na, K, Rb and Cs,
and/or alkaline earth metal carbonates selected from among $BeCO_3$, $MgCO_3$, $CaCO_3$, $SrCO_3$ and $BaCO_3$, and alkaline earth metal oxides, alkaline earth metal hydroxides, alkaline earth metal halides, alkaline earth metal oxalates and alkaline earth metal carboxylates, to the positive electrode precursor, and decomposing them during the lithium doping step.

The lithium salt concentration in the nonaqueous electrolytic solution is preferably 0.5 mol/L or greater, and more preferably in the range of 0.5 to 2.0 mol/L. If the lithium salt concentration is 0.5 mol/L or greater, anions will be sufficiently present to allow sufficiently high power storage element capacitance. The lithium salt concentration is preferably 2.0 mol/L or lower, because this can prevent precipitation of the undissolved lithium salt in the nonaqueous electrolytic solution and prevent the viscosity of the electrolytic solution from becoming too high, and will avoid lowering of the conductivity or reduction in the output characteristic as well.

When an alkali metal salt other than a lithium salt and/or an alkaline earth metal salt is to be added to the nonaqueous electrolytic solution, the total value of their salt concentrations is preferably 0.5 mol/L or greater and more preferably in the range of 0.5 to 2.0 mol/L.

The nonaqueous electrolytic solution of this embodiment preferably comprises a cyclic carbonate and linear carbonate as nonaqueous solvents. If the nonaqueous electrolytic solution comprises a cyclic carbonate and a linear carbonate, this will be advantageous from the viewpoint of dissolving the lithium salt to the desired concentration and exhibiting high lithium ion conductivity. Examples of cyclic carbonates include alkylene carbonate compounds, representative of which are ethylene carbonate, propylene carbonate and butylene carbonate. An alkylene carbonate compound will typically be unsubstituted. Linear carbonates include dialkyl carbonate compounds, representative of which are dimethyl carbonate, diethyl carbonate, ethylmethyl carbonate, dipropyl carbonate and dibutyl carbonate. A dialkyl carbonate compound will typically be unsubstituted.

The total content of the cyclic carbonate and linear carbonate is preferably 50 weight % or greater and more preferably 65 weight % or greater, and preferably no greater than 95 weight % and more preferably no greater than 90 weight %, based on the total amount of the nonaqueous electrolytic solution. If the total content is 50 weight % or greater, it will be possible to dissolve the lithium salt to the desired concentration, and to exhibit high lithium ion conductivity. If the total concentration is no greater than 95 weight %, the electrolytic solution will be able to further contain the additives mentioned below.

The nonaqueous electrolytic solution of this embodiment may also further comprise additives. The additives are not particularly restricted, and for example, they include sultone compounds, cyclic phosphazenes, acyclic fluoroethers, fluorinated cyclic carbonates, cyclic carbonates, cyclic carboxylates, and cyclic acid anhydrides, which may be used alone or in mixtures of two or more.

According to this embodiment, from the viewpoint of minimal adverse effect on resistance, and from the viewpoint of suppressing decomposition of the nonaqueous electrolytic solution at high temperature to minimize gas generation, 1,3-propanesultone, 2,4-butanesultone, 1,4-butanesultone, 1,3-butanesultone and 2,4-pentanesultone are preferred as saturated cyclic sultone compounds, 1,3-propenesultone and 1,4-butenesultone are preferred as unsaturated cyclic sultone compounds, and methylenebis(benzenesulfonic acid), methylenebis(phenylmethanesulfonic acid), methylenebis(ethanesulfonic acid), methylenebis(2,4,6,trimethylbenzenesulfonic acid) and methylenebis(2-trifluoromethylbenzenesulfonic acid) may be mentioned as other sultone compounds, and preferably one or more of these are selected.

The total content of sultone compounds in the nonaqueous electrolytic solution of the nonaqueous lithium power storage element of this embodiment is preferably 0.1 weight % to 15 weight %, based on the total amount of the nonaqueous electrolytic solution. If the total content of sultone compounds in the nonaqueous electrolytic solution is 0.1 weight % or greater, it will be possible to suppress decomposition of the electrolytic solution at high temperature and to reduce gas generation. If the total content is no greater than 15 weight %, on the other hand, it will be possible to lower the ionic conductance of the electrolytic solution, and to maintain a high input/output characteristic. Furthermore, the content of sultone compounds in the nonaqueous electrolytic solution of the nonaqueous lithium power storage element is preferably 0.5 weight % to 10 weight % and more preferably 1 weight % to 5 weight %, from the viewpoint of obtaining both a high input/output characteristic and high durability.

Examples of cyclic phosphazenes include ethoxypentafluorocyclotriphosphazene, diethoxytetrafluorocyclotriphosphazene and phenoxypentafluorocyclotriphosphazene, and preferably one or more selected from these is used.

The content of the cyclic phosphazene in the nonaqueous electrolytic solution is preferably 0.5 weight % to 20 weight % based on the total amount of the nonaqueous electrolytic solution. If the value is 0.5 weight % or greater, it will be possible to suppress decomposition of the electrolytic solution at high temperature and to reduce gas generation. If the value is no greater than 20 weight %, on the other hand, it will be possible to lower the ionic conductance of the electrolytic solution, and to maintain a high input/output characteristic. For these reasons, the cyclic phosphazene content is preferably 2 weight % to 15 weight % and more preferably 4 weight % to 12 weight %.

These cyclic phosphazenes may be used alone, or two or more may be used in admixture.

Examples of acyclic fluoroethers include $HCF_2CF_2OCH_2CF_2CF_2H$, $CF_3CFHCF_2OCH_2CF_2CF_2H$, $HCF_2CF_2CH_2OCH_2CF_2CF_2H$ and $CF_3CFHCF_2OCH_2CF_2CFHCF_3$, among which $HCF_2CF_2OCH_2CF_2CF_2H$ is preferred from the viewpoint of electrochemical stability.

The content of the acyclic fluoroether is preferably 0.5 weight % to 15 weight %, and more preferably 1 weight % to 10 weight %, based on the total amount of the nonaqueous electrolytic solution. If the acyclic fluoroether content is 0.5 weight % or higher, the stability of the nonaqueous electrolytic solution against oxidative decomposition will be increased and a power storage element with high durability during high temperature will be obtained. If the acyclic fluoroether content is 15 weight % or lower, on the other hand, the electrolyte salt solubility will be kept satisfactory and high ionic conductance of the nonaqueous electrolytic solution will be maintained, thus allowing a high input/output characteristic to be exhibited.

The acyclic fluoroether used may be a single type or a mixture of two or more types.

The fluorinated cyclic carbonate used is preferably one selected from among fluoroethylene carbonate (FEC) and difluoroethylene carbonate (dFEC), from the viewpoint of compatibility with other nonaqueous solvents.

The content of the fluorine-containing cyclic carbonate is preferably 0.5 weight % to 10 weight %, and more preferably 1 weight % to 5 weight %, with respect to the total amount of the nonaqueous electrolytic solution. If the fluorine-containing cyclic carbonate content is 0.5 weight % or higher, it will be possible to form a satisfactory coating film on the negative electrode, and reductive decomposition of the electrolytic solution on the negative electrode will be suppressed, to obtain a power storage element with high durability at high temperature. If the fluorine-containing cyclic carbonate content is 10 weight % or lower, on the other hand, the electrolyte salt solubility will be kept satisfactory and high ionic conductance of the nonaqueous electrolytic solution will be maintained, thus allowing a high input/output characteristic to be exhibited.

The fluorine-containing cyclic carbonate may be used as a single type or as a mixture of two or more types.

The cyclic carbonate is preferably vinylene carbonate.

The content of the cyclic carbonate is preferably 0.5 weight % to 10 weight % and more preferably 1 weight % to 5 weight %, with respect to the total amount of the nonaqueous electrolytic solution. If the cyclic carbonate content is 0.5 weight % or higher, it will be possible to form a satisfactory coating film on the negative electrode, and reductive decomposition of the electrolytic solution on the negative electrode will be suppressed, to obtain a power storage element with high durability at high temperature. If the cyclic carbonate content is 10 weight % or lower, on the other hand, the electrolyte salt solubility will be kept satisfactory and high ionic conductance of the nonaqueous electrolytic solution will be maintained, thus allowing a high input/output characteristic to be exhibited.

Examples of cyclic carboxylates include γ-butyrolactone, γ-valerolactone, γ-caprolactone and ε-caprolactone, and preferably at least one selected from these is used. Particularly preferred among these is γ-butyrolactone, from the viewpoint of improving the cell characteristic due to improved lithium ion dissociation.

The content of the cyclic carboxylate is preferably 0.5 weight % to 15 weight % and more preferably 1 weight % to 5 weight %, with respect to the total amount of the nonaqueous electrolytic solution. If the cyclic acid anhydride content is 0.5 weight % or higher, it will be possible to form a satisfactory coating film on the negative electrode, and reductive decomposition of the electrolytic solution on the negative electrode will be suppressed, to obtain a power storage element with high durability during periods of high temperature. If the cyclic carboxylate content is 5 weight % or lower, on the other hand, the electrolyte salt solubility will be kept satisfactory and high ionic conductance of the nonaqueous electrolytic solution will be maintained, thus allowing a high input/output characteristic to be exhibited.

A cyclic carboxylate may be used alone, or two or more may be used in admixture.

The cyclic acid anhydride is preferably one or more selected from among succinic anhydride, maleic anhydride, citraconic anhydride and itaconic anhydride. Selection is most preferably made from succinic anhydride and maleic anhydride, from the viewpoint of ready industrial availability to reduce production cost of the electrolytic solution, and from the viewpoint of easier dissolution in the nonaqueous electrolytic solution.

The content of the cyclic acid anhydride is preferably 0.5 weight % to 15 weight % and more preferably 1 weight % to 10 weight %, with respect to the total amount of the nonaqueous electrolytic solution. If the cyclic acid anhydride content is 0.5 weight % or higher, it will be possible to form a satisfactory coating film on the negative electrode, and reductive decomposition of the electrolytic solution on the negative electrode will be suppressed, to obtain a power storage element with high durability during periods of high temperature. If the cyclic acid anhydride content is 10 weight % or lower, on the other hand, the electrolyte salt solubility will be kept satisfactory and high ionic conductance of the nonaqueous electrolytic solution will be maintained, thus allowing a high input/output characteristic to be exhibited.

These cyclic acid anhydrides may be used alone, or two or more may be used in admixture.

[Assembly Step]

An electrode laminated body obtained by the assembly step comprises a positive electrode terminal and negative electrode terminal connected to a laminated body formed by laminating a positive electrode precursor and negative electrode cut into the shape of a sheet, via a separator. A wound electrode comprises a positive electrode terminal and negative electrode terminal connected to a wound body formed by winding a positive electrode precursor and negative electrode, via a separator. The shape of the wound electrode may be cylindrical or flat.

The method of connecting the positive electrode terminal and negative electrode terminal is not particularly restricted, and a method such as resistance welding or ultrasonic welding may be employed.

The terminal-connected electrode laminated body or wound electrode is preferably dried to remove the residual solvent. The drying method is not restricted, and drying may be carried out by vacuum drying or the like. The residual solvent is preferably no greater than 1.5% per weight of the positive electrode active material layer or negative electrode active material layer. It is not preferred if the residual solvent is greater than 1.5%, because the solvent will remain in the system and impair the self-discharge property.

The dried electrode laminated body or wound electrode is preferably stored in an casing, which is typically a metal can or laminate film, in a dry environment with a dew point of no higher than −40° C., and is preferably sealed, leaving only one of the openings. It is not preferred if the dew point is higher than −40° C., because moisture will adhere to the electrode laminated body or wound electrode, often resulting in residue of water in the system and impairing the self-discharge property. The method of sealing the casing is not particularly restricted, and a method such as heat sealing or impulse sealing may be employed.

[Filling, Impregnation and Sealing Step]

Upon completion of the assembly step, the electrode laminated body housed in the casing is filled with the nonaqueous electrolytic solution. After completion of the filling step, impregnation is again carried out and the positive electrode, negative electrode and separator are preferably thoroughly wetted with the nonaqueous electrolytic solution. If the electrolytic solution has not wetted at least a portion of the positive electrode, negative electrode and separator, then in the lithium doping step described below, doping will proceed in a non-uniform manner, resulting in increased resistance or lower durability of the obtained nonaqueous lithium power storage element. The method of impregnation is not particularly restricted, and for example, the method used may be setting the filled nonaqueous lithium power storage element in a pressure reduction chamber with the casing in an opened state, using a vacuum pump to bring the interior of the chamber to a reduced pressure state, and then restoring it to atmospheric pressure. Upon completion of the impregnation step, the nonaqueous lithium power storage element with the casing in an opened state is sealed under reduced pressure, to hermetically seal it.

[Lithium Doping Step]

As a preferred step for the lithium doping step, a voltage is applied between the positive electrode precursor and the negative electrode to decompose the lithium compound, thereby decomposing the lithium compound in the positive electrode precursor and releasing lithium ions, and reducing the lithium ions at the negative electrode so that the negative electrode active material layer is predoped with lithium ions.

During the lithium doping step, gas such as $CO_2$ is generated with oxidative decomposition of the lithium compound in the positive electrode precursor. It is therefore preferable to provide means for releasing the generated gas out of the casing during application of the voltage. Examples of such means include a method of applying a voltage with a portion of the casing in an open state; and a method of applying voltage with appropriate outgassing means such as a degassing valve or gas permeable film set beforehand on a portion of the casing.

[Aging Step]

After the lithium doping step, the nonaqueous lithium power storage element is preferably subjected to aging. For the aging step, the solvent in the electrolytic solution is decomposed at the negative electrode, and a lithium ion-permeable solid polymer coating film is formed on the negative electrode surface.

The method of aging is not particularly restricted, and for example, a method of reacting the solvent in the electrolytic solution in a high-temperature environment may be used.

[Degassing Step]

After completion of the aging step, preferably degassing is further carried out to reliably remove the gas remaining in the electrolytic solution, positive electrode and negative electrode. Any gas remaining in at least portions of the electrolytic solution, positive electrode and negative electrode will interfere with ion conduction, thus increasing the resistance of the obtained nonaqueous lithium power storage element.

The method of degassing is not particularly restricted, and for example, the method used may be setting the nonaqueous lithium power storage element in a pressure reduction chamber with the casing in an opened state, and using a vacuum pump to bring the interior of the chamber to a reduced pressure state.

<Design of Positive Electrode and Negative Electrode for Suppressing Resistance Increase During High Load Charge/Discharge Cycling>

In high load charge/discharge cycling, the ions in the electrolytic solution migrate and diffuse between the positive electrode and negative electrode during charge/discharge. Since a greater charge/discharge load means that the ions in the non-aqueous electrolytic solution must migrate and diffuse faster, uneven distribution of ions occurs at the positive electrode or negative electrode, and the lithium salt concentration in the nonaqueous electrolytic solution is lowered, resulting in increased resistance. Consequently, the amount of electrolytic solution held in the positive electrode and negative electrode can be increased to suppress the increased resistance during high load charge/discharge cycling. According to the fourth aspect of the invention, $C_{x1}/C_{y1}$ is 1.02 to 1.35, where $C_{x1}$ (g/m$^2$) is the basis weight of the positive electrode active material layer on one side ($C_x$ side) of the positive electrode, and $C_{y1}$ (g/m$^2$) is the basis weight of the positive electrode active material layer on the other side ($C_y$ side), and $A_{x1}/A_{y1}$ is 0.74 to 0.98, where $A_{y1}$ (g/m$^2$) is the basis weight of the negative electrode active material layer on one side ($A_y$ side) of the negative electrode that is facing the $C_y$ side, and $A_{x1}$ (g/m$^2$) is the basis weight of the negative electrode active material layer on the other side ($A_x$ side), so that resistance increase during high load charge/discharge cycling can be suppressed.

When the electrode laminated body is composed of a plurality of positive electrodes and negative electrodes, it is sufficient to satisfy $C_{x1}/C_{y1}$=1.02 to 1.35 and $A_{x1}/A_{y1}$=0.74 to 0.98 for at least one combination of positive electrode and negative electrode in the electrode laminated body.

$C_{x1}$ and $C_{y1}$ are each preferably 5 to 100 and more preferably 10 to 50. If $C_{x1}$ and $C_{y1}$ are 5 or greater it will be possible to increase the energy density. If $C_{x1}$ and $C_{y1}$ are no greater than 100, the output characteristic will be excellent.

Also, $A_{x1}$ and $A_{y1}$ are each preferably 5 to 100. They are more preferably 10 to 50. If $A_{x1}$ and $A_{y1}$ are 5 or greater it will be possible to increase the energy density. If $A_{x1}$ and $A_{y1}$ are no greater than 100, the output characteristic will be excellent.

Since the amount of nonaqueous electrolytic solution held in the electrode is proportional to the basis weight of the active material layer, the side with a large basis weight of the positive electrode active material layer ($C_x$ side) and the side with a small basis weight of the negative electrode active material layer ($A_x$ side) are set facing each other, while the side with a small basis weight of the positive electrode active material layer ($C_y$ side) and the side with a large basis weight of the negative electrode active material layer ($A_y$ side) are set facing each other, to form a balance of the nonaqueous electrolytic solution held between the electrodes, and to allow resistance increase during high load charge/discharge cycling to be suppressed. However, since potential variation of the positive electrode and negative electrode increases in inverse proportion to the basis weight of the active material layer, the potential variation increases on the $C_y$ side. Consequently, although resistance increase due to uneven distribution of ions in the nonaqueous electrolytic solution during high load charge/discharge cycling can be suppressed, the $C_y$ side that has large potential variation is exposed to a high potential, and gas generation and resistance increase result due to decomposition of the lithium compound.

Considering this, $C_{x2}$ and $C_{y2}$ are each 0.10 to 20.0 and $C_{y2}/C_{x2}$ is 0.10 to 0.95, where $C_{x2}$ (g/m$^2$) is the basis weight of the lithium compound on the $C_x$ side and $C_{y2}$ (g/m$^2$) is the basis weight of the lithium compound on the $C_y$ side, thus making it possible to suppress decomposition of lithium compound due to potential variation. If $C_{y2}/C_{x2}$ is 0.10 or greater, fluorine ions produced during high load charge/discharge cycling can be trapped by the lithium compound in the positive electrode, thus allowing resistance increase to be suppressed. If $C_{y2}/C_{x2}$ is no greater than 0.95, potential variation on the $C_y$ side during high load charge/discharge cycling can be suppressed, and it is possible to suppress resistance increase as a result of suppressed decomposition of the lithium compound. If $C_{x2}$ and $C_{y2}$ are 0.1 or greater, it is possible to suppress resistance increase during high load charge/discharge cycling. If $C_{x1}$ and $C_{y1}$ are no greater than 20.0 it will be possible to increase the energy density.

In addition, $(C_{x1}+C_{x2})A_{x1}/(C_{y1}+C_{y2})A_{y1}$ is preferably 0.80 to 1.32. If $(C_{x1}+C_{x2})A_{x1}/(C_{y1}+C_{y2})A_{y1}$ is less than 0.80 or greater than 1.32, potential variation on the $C_y$ side during high load charge/discharge cycling will increase, and the resistance will increase due to decomposition of the lithium compound.

The dispersed state of lithium carbonate in the positive electrode active material layer can be evaluated by microscopic Raman spectroscopy, and preferably $S_x$ and $S_y$ are each 1 to 40 and $S_x/S_y$ is 1.00 to 2.00, where $S_x\%$ is the area of carbonate ion mapping in an image obtained by microscopic Raman spectroscopy on the $C_x$ side, and $S_y\%$ is the area of carbonate ion mapping in an image obtained by microscopic Raman spectroscopy on the $C_y$ side. If $S_x/S_y$ is 1.00 or greater, it will be possible to suppress decomposition of the lithium compound on the $C_y$ side which has large potential variation during high load charge/discharge cycling, and resistance increase can be suppressed. If $S_x/S_y$ is no greater than 2.00, gas generation under high-temperature environmental conditions can be suppressed.

<Suppression of Lithium Compound Decomposition and Deposition on Positive Electrode and Negative Electrode Under High-Temperature Environmental Conditions>

The $C_y$ side of the positive electrode active material layer contains one or more compounds represented by the following formulas (1) to (3):

[Chem. 4]

$$LiX^1\text{—}OR^1O\text{—}X^2Li \quad (1)$$

{where $R^1$ is an alkylene group of 1 to 4 carbon atoms or a halogenated alkylene group of 1 to 4 carbon atoms, and $X^1$ and $X^2$ each respectively and independently represent —$(COO)_n$ (where n is 0 or 1)},

[Chem. 5]

$$LiX^1\text{—}OR^1O\text{—}X^2R^2 \quad (2)$$

{where $R^1$ is an alkylene group of 1 to 4 carbon atoms or a halogenated alkylene group of 1 to 4 carbon atoms, $R^2$ is hydrogen, an alkyl group of 1 to 10 carbon atoms, a mono- or polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms, or an aryl group, and $X^1$ and $X^2$ each respectively and independently represent —$(COO)_n$ (where n is 0 or 1)}, and

[Chem. 6]

$$R^2X^1\text{—}OR^1O\text{—}X^2R^3 \quad (3)$$

{where $R^1$ is an alkylene group of 1 to 4 carbon atoms or a halogenated alkylene group of 1 to 4 carbon atoms, $R^2$ and $R^3$ each respectively and independently represent hydrogen, an alkyl group of 1 to 10 carbon atoms, a polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms or an aryl group, and $X^1$ and $X^2$ each respectively and independently represent —$(COO)_n$ (where n is 0 or 1)}, and $C_{y3}$ is preferably $1.60\times10^{-4}$ to $300\times10^{-4}$ and more preferably $5.0\times10^{-4}$ mol/g to $150\times10^{-4}$, where $C_{y3}$ (mol/g) is the content per unit weight on the $C_y$ side of the positive electrode active material layer.

Although it is possible to suppress resistance increase during high load charge/discharge cycling by including a lithium compound on the $C_y$ side, the lithium compound also gradually decomposes when exposed to a high-temperature, high-voltage environment, resulting in gas generation. Consequently, by including a compound represented by formulas (1) to (3) on the $C_y$ side, it is possible to suppress decomposition of lithium compound in high-temperature, high-voltage environment conditions. If $C_{y3}$ is $1.60\times10^{-4}$ or greater, the high-temperature durability will be excellent. If $C_{y3}$ is no greater than $300\times10^{-4}$, the output characteristic will be excellent.

Particularly preferred compounds of formula (1) are the compounds represented by $LiOC_2H_4OLi$, $LiOC_3H_6OLi$, $LiOC_2H_4OCOOLi$, $LiOCOOC_3H_6OLi$, $LiOCOOC_2H_4OCOOLi$ and $LiOCOOC_3H_6OCOOLi$.

Particularly preferred compounds of formula (2) are the compounds represented by $LiOC_2H_4OH$, $LiOC_3H_6OH$, $LiOC_2H_4OCOOH$, $LiOC_3H_6OCOOH$, $LiOCOOC_2H_4OCOOH$, $LiOCOOC_3H_6OCOOH$, $LiOC_2H_4OCH_3$, $LiOC_3H_6OCH_3$, $LiOC_2H_4OCOOCH_3$, $LiOC_3H_6OCOOCH_3$, $LiOCOOC_2H_4OCOOCH_3$, $LiOCOOC_3H_6OCOOCH_3$, $LiOC_2H_4OC_2H_5$, $LiOC_3H_6OC_2H_5$, $LiOC_2H_4OCOOC_2H_5$, $LiOC_3H_6OCOOC_2H_5$, $LiOCOOC_2H_4OCOOC_2H_5$ and $LiOCOOC_3H_6OCOOC_2H_5$.

Particularly preferred compounds of formula (3) are the compounds represented by $HOC_2H_4OH$, $HOC_3H_6OH$, $HOC_2H_4OCOOH$, $HOC_3H_6OCOOH$, $HOCOOC_2H_4OCOOH$, $HOCOOC_3H_6OCOOH$, $HOC_2H_4OCH_3$, $HOC_3H_6OCH_3$, $HOC_2H_4OCOOCH_3$, $HOC_3H_6OCOOCH_3$, $HOCOOC_2H_4OCOOCH_3$, $HOCOOC_3H_6OCOOCH_3$, $HOC_2H_4OC_2H_5$, $HOC_3H_6OC_2H_5$, $HOC_2H_4OCOOC_2H_5$, $HOC_3H_6OCOOC_2H_5$, $HOCOOC_2H_4OCOOC_2H_5$, $HOCOOC_3H_6OCOOC_2H_5$, $CH_3OC_2H_4OCH_3$, $CH_3OC_3H_6OCH_3$, $CH_3OC_2H_4OCOOCH_3$, $CH_3OC_3H_6OCOOCH_3$, $CH_3OCOOC_2H_4OCOOCH_3$, $CH_3OCOOC_3H_6OCOOCH_3$, $CH_3OC_2H_4OC_2H_5$, $CH_3OC_3H_6OC_2H_5$, $CH_3OC_2H_4OCOOC_2H_5$, $CH_3OC_3H_6OCOOC_2H_5$, $CH_3OCOOC_2H_4OCOOC_2H_5$, $CH_3OCOOC_3H_6OCOOC_2H_5$, $C_2H_5OOC_2H_4OC_2H_5$, $C_2H_5OC_3H_6OC_2H_5$, $C_2H_5OC_2H_4OCOOC_2H_5$, $C_2H_5OC_3H_6OCOOC_2H_5$, $C_2H_5OCOOC_2H_4OCOOC_2H_5$ and $C_2H_5OCOOC_3H_6OCOOC_2H_5$.

Examples of methods for adding a compound represented by formulas (1) to (3) into the positive electrode active material layer include a method of mixing the compound into the positive electrode active material layer, a method of adsorbing the compound onto the positive electrode active material layer, and a method of electrochemically depositing the compound in the positive electrode active material layer. Preferred among these is a method of adding precursors that can decompose in the nonaqueous electrolytic solution to produce the compounds, and utilizing decomposition reaction of the precursor in the step of fabricating the power storage element, to accumulate the compounds in the positive electrode active material layer.

As precursors that form compounds represented by formulas (1) to (3) it is preferred to use one or more organic solvents selected from the group consisting of ethylene carbonate, propylene carbonate, butylene carbonate, vinylene carbonate and fluoroethylene carbonate, with ethylene carbonate and propylene carbonate being more preferred for use.

When a compound represented by formulas (1) to (3) is added to the $A_y$ side of the negative electrode active material layer facing the $C_y$ side, preferably $C_{y3}/A_{y3}$ is 0.2 to 20, where $A_{y3}$ (mol/g) is its content. If $C_{y3}/A_{y3}$ is 0.2 or greater, decomposition of the lithium compound on the $C_y$ side can be suppressed, and the high-temperature durability will be excellent. If $C_{y3}/A_{y3}$ is no greater than 20, the output characteristic will be excellent.

<Evaluation of Properties of Nonaqueous Lithium Power Storage Elements>

(Electrostatic Capacitance)

Throughout the present specification, the electrostatic capacitance Fa (F) is the value obtained by the following method.

First, in a thermostatic bath set to 25° C., a cell corresponding to the nonaqueous lithium power storage element is subjected to constant-current charge at the 20 C current value until 3.8 V is reached, and then constant-voltage charge is carried out for 30 minutes in total with application of a constant voltage of 3.8 V. Next, the capacitance after constant-current discharge to 2.2 V at a 2 C current value is recorded as Q (C). The obtained values of Q and voltage change $\Delta V_x$ (V) are used to calculate the electrostatic capacitance value $F=Q/\Delta V_x=Q/(3.8-2.2)$.

The current discharge rate (also referred to as "C rate") is the relative proportion of the current during discharge with respect to the service capacity, and generally the current value at which discharge is completed at 1 hour, with constant-current discharge from the maximum voltage to the minimum voltage, is defined as 1 C. Throughout the present specification, 1 C is the current value such that discharge is complete at 1 hour, upon constant-current discharge from a maximum voltage of 3.8 V to a minimum voltage of 2.2 V.

(Internal Resistance)

Throughout the present specification, the internal resistance Ra (Ω) is the value obtained by the following method:

First, in a thermostatic bath set to 25° C., the nonaqueous lithium power storage element is subjected to constant-current charge at the 20 C current value until 3.8 V is reached, and then constant-voltage charge is carried out for 30 minutes in total with application of a constant voltage of 3.8 V. Next, constant-current discharge is carried out to 2.2 V with a sampling interval of 0.1 second and the 20 C current value, to obtain a discharge curve (time-voltage). From the discharge curve, with a voltage of Vo at discharge time=0 seconds, obtained by extrapolating by linear approximation from the voltage values at discharge times of 2 seconds and 4 seconds, the value is calculated from voltage drop $\Delta V=3.8-Vo$, with $Ra=\Delta V/(20\ C\ \text{current value})$.

(Electrical Energy)

Throughout the present specification, the electrical energy E (Wh) is the value obtained by the following method:

It is the value calculated as electrical energy $E=F\times(3.8^2-2.2^2)/7200$, using the electrostatic capacitance Fa (F) calculated by the method described above.

(Volume)

The volume of the power storage element is not particularly prescribed, but it is the volume of the portion of the electrode laminated body or wound electrode in which the region where the positive electrode active material layer and negative electrode active material layer are stacked is housed by the casing.

For example, in the case of an electrode laminated body or wound electrode housed with a laminate film, the regions of the electrode laminated body or wound electrode where the positive electrode active material layer and negative electrode active material layer are present are housed in a cup-shaped laminate film, but the volume $(V_x)$ of the power storage element is calculated by $V_x=l_x\times w_x\times t_x$, using the outer length $(l_x)$ and outer width $(w_x)$ of the cup-shaped portion, and the thickness $(t_x)$ of the power storage element including the laminate film.

In the case of an electrode laminated body or wound electrode housed in a rectilinear metal can, the volume of the outer dimensions of the metal can is simply used as the volume of the power storage element. Namely, the volume $(V_y)$ of the power storage element is calculated by $V_y=l_y\times w_y\times t_y$, based on the outer length $(l_y)$ and outer width $(w_y)$, and outer thickness $(t_y)$, of the rectilinear metal can.

Even in the case of a wound electrode housed in a cylindrical metal can, the volume of the outer dimensions of the metal can is used as the volume of the power storage element. Namely, the volume $(V_z)$ of the power storage element is calculated by $V_z=3.14\times r\times l_z$, using the outer radius (r) and outer length $(l_z)$ of the bottom face or top face of the cylindrical metal can.

(Charge/Discharge Cycle Test Under High Load)

Throughout the present specification, the capacity retention after charge/discharge cycle testing under high load is measured by the following method: First, in a thermostatic bath set to 25° C., a cell corresponding to the nonaqueous lithium power storage element is subjected to constant-current charge at the 200 C or 300 C current value until 3.8 V is reached, and then constant-current discharge is carried out at the 200 C or 300 C current value until 2.2 V is reached. The charge/discharge step is repeated 60,000 times, and then after reaching a voltage of 4.5 V at the 20 C current value, charge is carried out for 1 hour at constant voltage. Next, Fb is determined by measuring the electrostatic capacitance by the method described above, and is compared with the electrostatic capacitance Fa before start of the test, to determine the capacity retention after charge/discharge cycle testing under high load, with respect to before start of the test. It is preferred if Fb/Fa is 1.01 or greater, because it will be possible to extract a sufficient capacity of energy even with a power storage element that has undergone prolonged charge/discharge, for example, and the power storage element replacement cycle can be extended.

(Change in Resistance after High Load Charge/Discharge Cycling)

Following 60,000 times repeated high load charge/discharge cycling, the internal resistance Rb after high load charge/discharge cycling is measured by the internal resistance measurement method described above. Rb/Ra is recorded as the change in resistance after high load charge/discharge cycling. According to the third aspect of the invention, the change in resistance Rb/Ra after charge/discharge cycle testing under high load is preferably no greater than 2.0, more preferably no greater than 1.5 and even more preferably no greater than 1.2. If the change in resistance after charge/discharge cycle testing under high load is no greater than 2.0, the properties of the nonaqueous lithium power storage element will be maintained even with repeated charge/discharge, and it will therefore be possible to obtain an excellent input/output characteristic in a prolonged stable manner, leading to a longer usable life of the nonaqueous lithium power storage element. The lower limit for Rb/Ra is preferably 0.9 or greater.

(Gas Generation Volume after High-Temperature Storage Test)

For the purpose of the present specification, the gas generation volume in the high-temperature storage test is measured by the following method:

First, in a thermostatic bath set to 25° C., a cell corresponding to the nonaqueous lithium power storage element is subjected to constant-current charge at the 100 C current value until 4.0 V is reached, and then constant-voltage charge is carried out for 10 minutes with application of a constant voltage of 4.0 V. Next, the nonaqueous lithium power storage element was stored in a 60° C. environment, and every 2 weeks it was removed from the 60° C. environment and subjected to charge with a cell voltage of 4.0 V in the charge step described above, after which the nonaqueous lithium power storage element was stored in a 60° C. environment. This step was repeated, and the cell volume Va before the start of storage and the cell volume Vb after two months of the storage test were measured by Archimedes' method. The solvent used for measurement of the volume by Archimedes' method is not particularly restricted, but preferably a solvent is used which has an electric conductivity of no greater than 10 µS/cm, and does not result in electrolysis when used to immerse the nonaqueous lithium power storage element. Purified water and fluorine-based inert liquids, for example, are suitable for use. In particular, fluorine-based inert liquids such as FLUO-RINERT (registered trademark of 3M Co. Japan) FC-40 and FC-43 are preferably used because they have high specific gravity and excellent electrical insulating properties. Vb−Va is the gas quantity generated after 2 months of storage with a cell voltage of 4.0 V and an environmental temperature of 60° C., and the value of B=(Vb−Va)/Fa is the normalized gas quantity generated in a high-temperature storage test, normalized with respect to the electrostatic capacitance Fa.

The resistance value obtained for the cell after the high-temperature storage test, according to the internal resistance measuring method described above, is recorded as the internal resistance Rc (Ω) after the high-temperature storage test.

The nonaqueous lithium power storage element of this embodiment preferably simultaneously satisfies both of the following conditions (a) and (b):

(a) Rc/Ra is no greater than 3.0, and (b) the value B, determined by normalizing the gas quantity Vb−Va (cc), generated after storage for 2 months at a cell voltage of 4 V and an environmental temperature of 60° C., with respect to the electrostatic capacitance Fa, is no greater than $5 \times 10^{-3}$ cc/F, where Rc (Ω) is the internal resistance at a cell voltage of 3.8 V, as measured above, Ra (Ω) is the internal resistance before storage and Fa (F) is the electrostatic capacitance before storage.

Regarding condition (a), Rc/Ra is preferably no greater than 3.0, more preferably no greater than 1.5 and even more preferably no greater than 1.2, from the viewpoint of exhibiting sufficient charge capacity and service capacity for high current, even upon exposure to high-temperature environmental conditions for a prolonged period. If Rc/Ra is below this upper limit it will be possible to stably obtain an excellent output characteristic for long periods, thus helping to prolong the usable life of the device.

For condition (b), the value of B, determined by normalizing the gas quantity generated upon storage for 2 months with a cell voltage of 4.0 V and an environmental temperature of 60° C. with respect to the electrostatic capacitance Fa, is preferably no greater than $30 \times 10^{-3}$ cc/F, more preferably no greater than $15 \times 10^{-3}$ cc/F and even more preferably no greater than $5 \times 10^{-3}$ cc/F, as the value measured at 25° C., from the viewpoint of avoiding reduced properties of the element by the generated gas. If the generated gas quantity under these conditions is less than this upper limit, there will be no risk of expansion of the cell by gas generation when the device is exposed to high temperature for prolonged periods. It will thus be possible to obtain a power storage element having sufficient safety and durability.

<Method of Identifying Lithium Compound in Electrode>

The method of identifying a lithium compound in the positive electrode is not particularly restricted, and it may be identification by the following methods, for example. For identification of a lithium compound, it is preferred to carry out the identification by combining the different analysis methods described below.

For measurement by SEM-EDX, Raman or XPS described below, preferably the nonaqueous lithium power storage element is disassembled in an argon box, the positive electrode is removed, and measurement is performed after washing the electrolyte adhering to the positive electrode surface. Since the method of washing the positive electrode only needs to wash off the electrolyte adhering to the positive electrode surface, a carbonate solvent such as dimethyl carbonate, ethylmethyl carbonate or diethyl carbonate may be suitably used. The washing method may be, for example, immersion of the positive electrode for 10 minutes or longer in a diethyl carbonate solvent in an amount of 50 to 100 times the weight of the positive electrode, and subsequent reimmersion of the positive electrode after exchange of the solvent. This is followed by removal of the positive electrode from the diethyl carbonate, vacuum drying (under conditions such that the diethyl carbonate residue in the positive electrode is no greater than 1 weight % with a temperature of 0 to 200° C., a pressure of 0 to 20 kPa and a time of 1 to 40 hours. The diethyl carbonate residue can be quantified by GC/MS measurement of water after distilled water washing and liquid volume adjustment, based on a predrawn calibration curve, as described below.), and then analysis by SEM-EDX, Raman and XPS.

In the ion chromatography described below, the water after washing of the positive electrode with distilled water is analyzed to allow identification of the anion.

When the lithium compound cannot be identified by this analysis method, 7Li-solid NMR, XRD (X-ray diffraction), TOF-SIMS (Time-Of-Flight Secondary Ion Mass Spectrometry), AES (Auger Electron Spectroscopy), TPD/MS (Temperature Programmed Desorption/Mass Spectrometry), DSC (Differential Scanning Calorimetry) or the like may be used as an alternative analysis method to identify the lithium compound.

[Scanning Electron Microscope-Energy Dispersive X-Ray Analysis (SEM-EDX)]

The oxygen-containing lithium compound and positive electrode active material can be discriminated by oxygen mapping based on an SEM-EDX image of the positive electrode surface measured at an observational magnification of 1000-4000×. As an example of measurement of an SEM-EDX image, it can be measured with an acceleration voltage of 10 kV, an emission current of 10 µA and a measuring pixel count of 256×256 pixels, and a number of scans of 50. In order to prevent electrification of the sample, surface treatment with gold, platinum, osmium or the like may be carried out by a method such as vacuum vapor deposition or sputtering. The method of measuring the SEM-EDX image is preferably with adjustment of the luminance and contrast so that no pixel reaches the maximum luminance value in the mapping image, and the average value of brightness is in the range of 40% to 60% of the maximum luminance value. In the obtained oxygen mapping, particles containing a bright portion equal to 50% or more of the area thereof when binarized based on the average value of brightness with respect to the resulting oxygen mapping were considered to be lithium compound.

[Microscopic Raman Spectroscopy]

The lithium compound comprising carbonate ion, and the positive electrode active material can be discriminated by a Raman imaging of the positive electrode surface measured at an observational magnification of 1000-4000×. As an example for the measuring conditions, measurement may be performed with an excitation light of 532 nm, an excitation light intensity of 1%, 50× long operation of objective lens, a diffraction lattice of 1800 gr/mm, point scanning as the mapping system (slit: 65 mm, binning: 5 pix), a 1 mm step, an exposure time per point of 3 seconds, a number of scans of 1, and a noise filter. For the measured Raman spectrum, a straight baseline is set in the range of 1071 to 1104 cm$^{-1}$, a value positive from the baseline is considered a carbonate ion peak followed by integration of the frequency thereof, but the frequency of the noise relative to the peak area of carbonate ions approximated by a Gaussian function is subtracted from the carbonate ion frequency distribution.

[X-Ray Photoelectron Spectroscopy (XPS)]

The electronic state of lithium can be analyzed by XPS to discriminate the bonded state of the lithium. As an example for the measuring conditions, measurement may be performed with monochromatized AlKα as the X-ray source, an X-ray beam diameter of 100 μmφ (25 W, 15 kV), narrow scan for path energy (58.70 eV), with charge neutralization, narrow scan for sweeping: 10 times (carbon, oxygen), 20 times (fluorine), 30 times (phosphorus), 40 times (lithium), 50 times (silicon), narrow scan for energy step: 0.25 eV. The surface of the positive electrode is preferably cleaned by sputtering before XPS measurement. As the sputtering conditions, cleaning of the positive electrode surface may be carried out, for example, with an acceleration voltage of 1.0 kV, and 1 minute in a range of 2 mm×2 mm (1.25 nm/min as $SiO_2$). In the obtained XPS spectrum, the following assignments may be made: a peak having Li1s bonding energy of 50 to 54 eV as a $LiO_2$ or Li—C bond, a peak having Li1s bonding energy of 55 to 60 eV as LiF, $Li_2CO_3$, $Li_xPO_yF_z$ (x, y and z are integers of 1 to 6), a peak having C1s bonding energy of 285 eV as a C—C bond, a peak having C1s bonding energy of 286 eV as a C—O bond, a peak having C1s bonding energy of 288 eV as COO, a peak having C1s bonding energy of 290 to 292 eV as $CO_3^{2-}$ and C—F bonds, a peak having O1s bonding energy of 527 to 530 eV as $O^{2-}$ ($Li_2O$), a peak having O1s bonding energy of 531 to 532 eV as CO, $CO_3$, OH, $PO_x$ (x is an integer of 1 to 4) or $SiO_x$ (x is an integer of 1 to 4), a peak having O1s bonding energy of 533 eV as C—O, $SiO_x$ (x is an integer of 1 to 4), a peak having F1s bonding energy of 685 eV as LiF, a peak having F1s bonding energy of 687 eV as a C—F bond, $Li_xPO_yF_z$ (x, y and z are integers of 1 to 6), $PF_6^-$, and a peak having P2p bonding energy of 133 eV as $PO_x$ (x is an integer of 1 to 4), a peak having P2p bonding energy of 134 to 136 eV as $PF_x$ (x is an integer of 1 to 6), a peak having Si2p bonding energy of 99 eV as Si or silicide, a peak having Si2p bonding energy of 101 to 107 eV as $Si_xO_y$ (x and y are any integers). When peaks overlap in the obtained spectrum, the spectrum is preferably assigned upon separating the peaks with the assumption of a Gaussian function or Lorentz function. The lithium compound that is present can be identified based on the obtained results of measuring the electronic state, and the existing element ratio.

[Ion Chromatography]

Anion species eluted in water can be identified by analyzing the distilled water washing fluid from the positive electrode, by ion chromatography. The columns used may be an ion-exchange type, ion-exclusion type and reversed-phase ion pair type. The detector used may be an electric conductivity detector, ultraviolet-visible absorption intensity detector or electrochemical detector, and a suppressor system with a suppressor installed before the detector, or a non-suppressor system without installation of a suppressor, using a solution with low electric conductivity as the eluent, may be used. Since measurement can also be carried out by combining a mass spectrometer or charged particle detection with the detector, it is preferred to combine an appropriate column and detector, depending on the lithium compound identified from the results of analysis by SEM-EDX, Raman or XPS.

The sample retention time will depend on the conditions such as the column and eluent used and is the same for each ion species component, while the size of the peak response differs for each ion species but is proportional to the concentration. By liminarily measuring a standard solution of known concentration with ensured traceability, it is possible to qualitatively and quantitatively analyze the ion species components.

<Alkali Metal Element Quantitation Method: ICP-MS>

The acid in the measuring sample is decomposed using a strong acid such as concentrated nitric acid, concentrated hydrochloric acid or aqua regalis, and the obtained solution is diluted with purified water to an acid concentration of 2% to 3%. The acid decomposition may be decomposition with appropriate heating and pressure. The obtained diluted solution is analyzed by ICP-MS, during which time it is preferred to add an element of known amount as an internal standard. When the alkali metal element to be measured is at a concentration above the measurable limit, it is preferably further diluted while maintaining the acid concentration of the diluted solution. Each element can be quantified from the obtained measurement results, based on a calibration curve predrawn using a standard solution for chemical analysis.

<Method of Quantifying Lithium Compound>

A method of quantifying the lithium compound in the positive electrode will now be described. The positive electrode may be washed with an organic solvent and subsequently washed with distilled water, and the lithium compound quantified from the change in positive electrode weight before and after the washing with distilled water. The area of the positive electrode to be measured is not particularly restricted, but from the viewpoint of reducing measurement variation it is preferably 5 cm$^2$ to 200 cm$^2$ and more preferably 25 cm$^2$ to 150 cm$^2$. Measurement reproducibility can be ensured if the area is at least 5 cm$^2$. The handleability of the sample will be excellent if the area is no greater than 200 cm$^2$. Washing with an organic solvent is sufficient if it can remove electrolytic solution decomposition products that have accumulated on the positive electrode surface, and therefore while the organic solvent is not particularly restricted, elution of the lithium compound can be suppressed by using an organic solvent with a solubility of no greater than 2% for the lithium compound, and it is therefore preferred. For example, polar solvents such as methanol, ethanol, acetone and methyl acetate may be suitably used.

The method of washing the positive electrode is thorough immersion of the positive electrode for 3 days or longer in a methanol solution at a 50- to 100-fold amount with respect to the weight of the positive electrode. During the procedure, certain measures are preferred such as capping the vessel so that the methanol does not volatilize off. The positive electrode is then removed from the methanol and subjected to vacuum drying (under conditions such that the methanol residue in the positive electrode is no greater than 1 weight % under the conditions of a temperature of 100 to 200° C., a pressure of 0 to 10 kPa and a time of 5 to 20 hours. The methanol residue can be quantified by GC/MS measurement of water after distilled water washing with distilled water, based on a predrawn calibration curve, as described below), and the weight of the positive electrode at that time is recorded as $M_0$ (g). The positive electrode is thoroughly immersed for 3 days or longer in distilled water at a 100-fold amount (100 $M_0$ (g)) with respect to the weight of the positive electrode. During the procedure, certain measures are preferred such as capping the vessel so that the distilled water does not volatilize off. After immersion for 3 days or longer, the positive electrode is removed from the distilled water (for the aforementioned ion chromatography measurement, the liquid volume is adjusted so that the amount of distilled water is 100 $M_0$ (g)), and vacuum drying is performed in the same manner as for the methanol washing described above. The weight of the positive electrode at this time is recorded as $M_1$ (g), and then the positive electrode active material layer is removed from the power collector using a spatula, brush, bristles or the like, for measurement of the weight of the obtained positive electrode power collector. If the weight of the obtained positive electrode power collector is represented as $M_2$ (g), the weight % Z of the lithium compound in the positive electrode can be calculated by formula (4).

[Math. 4]

$$Z=100\times[1-(M_1-M_2)/(M_0-M_2)] \quad (4)$$

<Methods of Measuring Basis Weight of Positive Electrode Active Material Layer and Lithium Compound Amount, Calculation of $C_{x1}$, $C_{y1}$, $C_{x2}$, $C_{y2}$>

The positive electrode that has been washed with the polar solvent and vacuum dried in the manner described above is cut in half, one half being used as positive electrode $C_{x0}$ and the other as positive electrode $C_{y0}$, with areas designated as $X_C$ (m²) and $Y_C$ (m²), respectively. The positive electrode active material layer on the $C_y$ side of the positive electrode $C_{x0}$ and the positive electrode active material layer on the $C_x$ side of the positive electrode $C_{y0}$ are removed off using a spatula, brush, bristles or the like, recording the weight of the positive electrode $C_{x0}$ as $M_{0x}$ (g) and the weight of the positive electrode $C_{y0}$ as $M_{0y}$ (g). Next, the positive electrode $C_{x0}$ and positive electrode $C_{y0}$ are thoroughly immersed in distilled water for 3 days or longer, in an amount of 100- to 150-fold of their respective weights. During the immersion it is preferred for the vessel to be capped so that the distilled water does not volatilize, and preferably the solution is periodically stirred to promote elution of the lithium compound. After immersion for 3 days or longer, the positive electrode $C_{x0}$ and positive electrode $C_{y0}$ are removed from the distilled water and vacuum dried in the same manner as for the ethanol washing described above. After vacuum drying, the weights of the positive electrode $C_{x0}$ and positive electrode $C_{y0}$ are recorded as $M_{1x}$ (g) and $M_{1y}$ (g), respectively. Next, in order to measure the weights of the power collectors of the obtained positive electrode $C_{x0}$ and positive electrode $C_{y0}$, the positive electrode active material layers remaining on the positive electrode $C_{x0}$ and positive electrode $C_{y0}$ are removed using a spatula, brush, bristles or the like. Using $M_{2x}$(g) and $M_2y$ (g) as the weights of the obtained positive electrode power collectors, the basis weight $C_{x1}$ (g/m²) of the positive electrode active material layer of the positive electrode $C_{x0}$ and the basis weight $C_{y1}$ (g/m²) of the positive electrode active material layer of the positive electrode $C_{y0}$ can be calculated by formula (5).

[Math. 5]

$$C_{x1}=(M_{1x}-M_{2x})/X_C, \text{ and}$$

$$C_{y1}=(M_{1y}-M_{2y})/X_C, \quad (5)$$

The amount of lithium compound $C_{x2}$ (g/m²) per area of $C_{x0}$ and the amount of lithium compound $C_{y2}$ (g/m²) per area of $C_{y0}$ can be calculated by the following formula (6).

[Math. 5]

$$C_{x2}=(M_{0x}-M_{1x})/X_C, \text{ and}$$

$$C_{y2}=(M_{0y}-M_{1y})/X_C, \quad (6)$$

Incidentally, when multiple lithium compounds are present in the positive electrode active material layer; or when it contains an oxide such as $M_2O$, a hydroxide such as MOH, a halide such as MF or MCl, an oxalate such as $M_2(CO_2)_2$ or a carboxylate such as RCOOM (where R is H, an alkyl group or an aryl group), with one or more selected from among Na, K, Rb and Cs as M in the formulas, in addition to the lithium compound; or when the positive electrode active material layer includes an alkaline earth metal carbonate selected from among $BeCO_3$, $MgCO_3$, $CaCO_3$, $SrCO_3$ and $BaCO_3$, or an alkaline earth metal oxide, alkaline earth metal hydroxide, alkaline earth metal halide, alkaline earth metal oxalate or alkaline earth metal carboxylate, their total amounts are calculated as the amount of lithium compound.

<Calculation of Basis Weight of Negative Electrode Active Material Layer, Calculation of $A_{x1}$ and $A_{y1}$>

The method of quantifying the basis weight of the negative electrode active material layer will now be described. The negative electrode is cut out from the electrode laminated body in an argon box, and washed with an organic solvent. The organic solvent used for washing may be any solvent that removes the electrolytic solution decomposition products deposited on the negative electrode surface and reacts with lithium ion in the negative electrode, without any particular restrictions, and alcohols such as methanol, ethanol and isopropanol, and their mixed solvents, are suitable for use. The area of the negative electrode to be measured is not particularly restricted, but from the viewpoint of reducing measurement variation it is preferably 5 cm² to 200 cm² and more preferably 25 cm² to 150 cm². Measurement reproducibility can be ensured if the area is at least 5 cm². The handleability of the sample will be excellent if the area is no greater than 200 cm²

The method of washing the negative electrode is thorough immersion of the negative electrode for 3 days or longer in an ethanol solution at a 50- to 100-fold amount with respect to the weight of the negative electrode. During the immersion, the vessel is preferably capped, for example, so that the ethanol does not volatilize off. After immersion for 3 days or longer, the negative electrode is removed from the ethanol and vacuum dried. The vacuum drying conditions employed may be conditions such that the ethanol residue in the negative electrode is no greater than 1 weight % with a temperature of 100 to 200° C., a pressure of 0 to 10 kPa and a time of 5 to 20 hours. The ethanol residue can be quantified by GC/MS measurement of the organic solvent, based on a predrawn calibration curve, after immersing the vacuum dried negative electrode in an organic solvent such as dimethyl carbonate, diethyl carbonate or ethylmethyl carbonate.

The vacuum dried negative electrode is cut in half, one half being used as negative electrode $A_{x0}$ and the other half as negative electrode $A_{y0}$, and the areas are recorded as $X_A$ (m$^2$) and $Y_A$ (m$^2$), respectively. The negative electrode active material layer on the $A_y$ side of the negative electrode $A_{x0}$ and the negative electrode active material layer on the $A_x$ side of the negative electrode $A_{y0}$ are removed off using a spatula, brush, bristles or the like, recording the weight of the negative electrode $A_{x0}$ as $M_{0xA}$ (g) and the weight of the negative electrode $A_{y0}$ as $M_{0yA}$ (g). Next, in order to measure the weights of the power collectors of the obtained negative electrode $A_{x0}$ and negative electrode $A_{y0}$, the negative electrode active material layers remaining on the negative electrode $A_{x0}$ and negative electrode $A_{y0}$ are removed using a spatula, brush, bristles or the like. Using $M_{1xA}$ (g) and $M_{1yA}$ (g) as the weights of the obtained negative electrode power collectors, the basis weight of the negative electrode active material layer $A_{x1}$ (g/m$^2$) of the negative electrode $A_{x0}$ and the basis weight of the negative electrode active material layer $A_{y1}$ (g/m$^2$) of the negative electrode $A_{y0}$ can be calculated by formula (7).

[Math. 7]

$$A_{x1}=(M_{0xA}-M_{1xA})/X_A, \text{ and}$$

$$A_{y1}=(M_{0yA}-M_{1yA})/Y_A \qquad (7)$$

EXAMPLES

The invention will now be further explained through examples and comparative examples.

However, it is to be understood that the invention is not limited in any way by these examples.

An embodiment according to the first aspect will now be explained in detail.

Example 1

<Preparation of Positive Electrode Active Material>

Preparation Example 1a

Crushed coconut shell carbide was subjected to carbonization in a small carbonizing furnace, at 500° C. for 3 hours in nitrogen, to obtain a carbide. The obtained carbide was placed in an activating furnace, water vapor was introduced into the activating furnace at 1 kg/h in a heated state using a preheating furnace, and the temperature was increased to 900° C. over 8 hours for activation. The activated carbide was cooled under a nitrogen atmosphere to obtain activated carbon. The obtained activated carbon was flow-rinsed with water for 12 hours and then drained. After then drying for 10 hours in an electrodesiccator kept at 125° C., it was pulverized for 1 hour with a ball mill to obtain activated carbon 1a.

A laser diffraction particle size distribution analyzer (SALD-2000J) by Shimadzu Corp. was used to measure the mean particle diameter of the activated carbon 1a, which was found to be 12.7 μm. A pore distribution measuring apparatus (AUTOSORB-1 AS-1-MP) by Yuasa-Ionics, Inc. was also used to measure the pore distribution. As a result, the BET specific surface area was 2330 m$^2$/g, the mesopore volume ($V_1$) was 0.52 cc/g, the micropore volume ($V_2$) was 0.88 cc/g, and $V_1/V_2$=0.59.

Preparation Example 2a

For the phenol resin, after carbonization for 2 hours in a furnace at 600° C. under a nitrogen atmosphere, it was pulverized with a ball mill and sorted, to obtain a carbide having a mean particle diameter of 7 μm. The carbide and KOH were mixed at a weight ratio of 1:5, and heated for 1 hour in a furnace at 800° C. under a nitrogen atmosphere, for activation. The mixture was subsequently stirred and rinsed for 1 hour in dilute hydrochloric acid adjusted to a concentration of 2 mol/L, and then boiled and rinsed with distilled water until the pH stabilized to between 5 and 6, after which it was dried to produce activated carbon 2a.

A laser diffraction particle size distribution analyzer (SALD-2000J) by Shimadzu Corp. was used to measure the mean particle diameter of the activated carbon 2a, which was found to be 7.0 μm. A pore distribution measuring apparatus (AUTOSORB-1 AS-1-MP) by Yuasa-Ionics, Inc. was also used to measure the pore distribution. As a result, the BET specific surface area was 3627 m$^2$/g, the mesopore volume ($V_1$) was 1.50 cc/g, the micropore volume ($V_2$) was 2.28 cc/g, and $V_1/V_2$=0.66.

<Pulverization of Lithium Carbonate>

Using a pulverizer (LNM liquid nitrogen bead mill) by Aimex Corp., 200 g of lithium carbonate with a mean particle diameter of 53 μm was cooled to −196° C. with liquid nitrogen and pulverized for 20 minutes at a peripheral velocity of 10.0 m/s, using dry ice beads. The mean particle diameter of lithium carbonate 1, which was obtained by brittle fracture while preventing heat denaturation at −196° C., was measured to be 1.8 μm.

<Production of Positive Electrode Precursor>

The activated carbon 2a was used as a positive electrode active material to produce a positive electrode precursor, with lithium carbonate 1 as the lithium compound.

After mixing 55.5 parts by weight of activated carbon 2a, 32.0 parts by weight of lithium carbonate 1, 3.0 parts by weight of Ketchen black, 1.5 parts by weight of PVP (polyvinylpyrrolidone), 8.0 parts by weight of PVDF (polyvinylidene fluoride) and NMP (N-methylpyrrolidone), the mixture was dispersed using a FILMIX® thin-film rotating-type high speed mixer by Primix Corp., under conditions with a circumferential speed of 17 m/s, to obtain a coating solution. The viscosity (ηb) and TI value of the obtained coating solution were measured using a TVE-35H E-type viscometer by Toki Sangyo Co., Ltd. As a result, the viscosity (ηb) was 2,300 mPa·s and the TI value was 3.2. The degree of dispersion of the obtained coating solution was measured using a fineness gauge by Yoshimitsu Seiki Co. As a result, the granularity was 32 μm. The coating solution was coated onto one or both sides of an aluminum foil with a thickness of 15 μm using a die coater by Toray Engineering Co., Ltd. under conditions with a coating speed of 1 m/s, and dried at a drying temperature of 120° C. to obtain positive electrode precursor 1 (one side) and positive electrode precursor 1 (both sides). The obtained positive electrode precursor 1 (one side) and positive electrode precursor 1 (both sides) were pressed using a roll press under conditions with a pressure of 6 kN/cm and a pressed portion surface temperature of 25° C. The film thickness of the positive electrode active material layer of the obtained positive electrode precursor 1 (one side) and positive electrode precursor 1 (both sides) were determined by subtracting the thickness of the aluminum foil from the average thickness measured at 10 arbitrary locations of the positive electrode precursor 1 using a Linear Gauge Sensor GS-551 by Ono Sokki Co., Ltd. As a result, the film thickness per side of the positive electrode active material layers was 62 μm.

Preparation of Negative Electrode Active Material:
Preparation Example 1a₁

The BET specific surface area and pore distribution of commercially available coconut shell activated carbon was measured by the method described above, using a pore distribution measuring apparatus (AUTOSORB-1 AS-1-MP) by Yuasa-Ionics, Inc. As a result, the BET specific surface area was 1,790 m$^2$/g, the mesopore volume ($V_1$) was 0.199 cc/g, the micropore volume ($V_2$) was 0.698 cc/g, $V_1/V_2$=0.29, and the mean pore size was 20.1 Å.

A 300 g portion of the coconut shell activated carbon was placed into a stainless steel mesh basket and placed on a stainless steel vat containing 540 g of coal-based pitch (softening point: 50° C.), and both were set in an electric furnace (furnace inner usable dimension: 300 mm×300 mm×300 mm), for thermal reaction to obtain composite porous carbon material 1a₁. The heat treatment was carried out under a nitrogen atmosphere, with temperature increase to 600° C. over a period of 8 hours, and 4 hours of holding at the same temperature. This was followed by natural cooling to 60° C., after which the composite carbon material 1a₁ was removed out of the furnace.

The BET specific surface area and pore distribution of the obtained composite carbon material 1a₁ were measured by the same methods as described above. As a result, the BET specific surface area was 262 m$^2$/g, the mesopore volume (Vm1) was 0.186 cc/g, the micropore volume (Vm2) was 0.082 cc/g and Vm1/Vm2=2.27. Also, for composite carbon material 1a₁, the weight ratio of coal-based pitch-derived carbonaceous material with respect to activated carbon was 78%.

<Production of Negative Electrode>

Composite carbon material 1a₁ was used as a negative electrode active material to produce a negative electrode.

After mixing 84 parts by weight of composite carbon material 1a₁, 10 parts by weight of acetylene black, 6 parts by weight of PVdF (polyvinylidene fluoride) and NMP (N-methylpyrrolidone), the mixture was dispersed using a FILMIX® thin-film rotating-type high speed mixer by Primix Corp., under conditions with a peripheral velocity of 17 m/s, to obtain a coating solution. The viscosity (ηb) and TI value of the obtained coating solution were measured using a TVE-35H E-type viscometer by Toki Sangyo Co., Ltd. As a result, the viscosity (ηb) was 2,789 mPa·s and the TI value was 4.3. The coating solution was coated onto both sides of an electrolytic copper foil with a thickness of 10 μm using a die coater by Toray Engineering Co., Ltd. under conditions with a coating speed of 2 m/s, and dried at a drying temperature of 120° C. to obtain negative electrode 1. The obtained negative electrode 1 was pressed using a roll press under conditions with a pressure of 5 kN/cm and a pressed portion surface temperature of 25° C. The film thickness of the negative electrode active material layer of the obtained negative electrode 1 was determined by subtracting the thickness of the copper foil from the average thickness measured at 10 arbitrary locations of negative electrode 1 using a Linear Gauge Sensor GS-551 by Ono Sokki Co., Ltd. As a result, the film thickness per side of the negative electrode active material layers was 40 m.

[Measurement of Capacitance Per Unit Weight of Negative Electrode]

The obtained negative electrode 1 was cut out to a single size of 1.4 cm×2.0 cm (2.8 cm$^2$), and of the negative electrode active material layers that were coated onto both sides of the copper foil, the layer on one side was removed using a spatula, brush or bristles to produce a working electrode, and metal lithium was used as the counter electrode and reference electrode, to fabricate an electrochemical cell in an argon box, using a nonaqueous solution of LiPF$_6$ dissolved to a concentration of 1.0 mol/L in a mixed solvent of ethylene carbonate (EC) and ethylmethyl carbonate (EMC) at a volume ratio of 1:1, as the electrolytic solution.

The initial charging capacitance of the obtained electrochemical cell was measured by the following procedure using a charge/discharge apparatus (TOSCAT-3100U) by Toyo System Co., Ltd.

The electrochemical cell was subjected to constant-current charge at a temperature of 25° C., with a current value of 0.5 mA/cm$^2$ until reaching a voltage value of 0.01 V, and then to constant-voltage charge until the current value reached 0.01 mA/cm$^2$. When the charge capacity during constant-current charge and constant-voltage charge was evaluated as the initial charge capacity, it was found to be 1.6 mAh, and the capacitance per unit weight of negative electrode 1 (lithium ion doping amount) was 1460 mAh/g.

<Preparation of Electrolytic Solution>

As an organic solvent there was used a mixed solvent of ethylene carbonate (EC):ethyl methyl carbonate (EMC)=33:67 (volume ratio), and each electrolyte salt was dissolved so that the concentration ratio of LiN(SO$_2$F)$_2$ and LiPF$_6$ was 75:25 (molar ratio) with respect to the total electrolytic solution and the total concentration of LiN(SO$_2$F)$_2$ and LiPF$_6$ was 1.2 mol/L, to obtain nonaqueous electrolytic solution 1. The concentrations of LiN(SO$_2$F)$_2$ and LiPF$_6$ in electrolytic solution 1 were 0.9 mol/L and 0.3 mol/L, respectively.

<Fabrication of Nonaqueous Lithium Power Storage Element>

The obtained positive electrode precursor 1 was cut into two positive electrode precursors 1 (one side) and 19 positive electrode precursors 1 (both sides), with the positive electrode active material layers at sizes of 10.0 cm×10.0 cm (100 cm$^2$). Next, 20 negative electrodes 1 were cut out with the negative electrode active material layers at sizes of 10.1 cm×10.1 cm (102 cm$^2$), and 40 10.3 cm×10.3 cm (106 cm$^2$) polyethylene separators (thickness: 10 μm, product of ASAHI KASEI KABUSHIKI KAISHA) were prepared. These were laminated in the order: positive electrode precursor, separator, negative electrode, with the positive electrode active material layers and negative electrode active material layers facing each other across the separators, and positive electrode precursors 1 (one side) as the outermost layers, to obtain an electrode laminated body. The positive electrode terminal and negative electrode terminal were ultrasonically welded to the obtained electrode laminated body and placed in a vessel formed of an aluminum laminate package material, and 3 sides including the electrode terminal section were sealed by heat sealing. Approximately 80 g of the nonaqueous electrolytic solution was injected into the electrode laminated body housed in the aluminum laminate package material under atmospheric pressure, in a dry air environment with a temperature of 25° C. and a dew point of no higher than −40° C., to fabricate a total of two nonaqueous lithium power storage elements. Next, the nonaqueous lithium power storage element was placed in a pressure reduction chamber and the pressure was reduced from atmospheric pressure to −87 kPa, after which it was restored to atmospheric pressure and allowed to stand for 5 minutes. The step of reducing the pressure from atmospheric pressure to −87 kPa and then restoring to atmospheric pressure was subsequently repeated 4 times, and it was then allowed to stand for 15 minutes. The pressure was again reduced from atmospheric pressure to −91 kPa, and then restored to atmospheric pressure. A step of pressure reduction and restoration to atmospheric pressure in the same manner was repeated 7 times. (The pressure reduction was to −95, −96, −97, −81, −97, −97 and −97 kPa, respectively). The electrode laminated body was impregnated with the nonaqueous electrolytic solution by this procedure.

Next, the nonaqueous lithium power storage element was placed in a pressure-reducing sealing machine, and with the pressure reduced to −95 kPa, it was sealed at 180° C. for 10 seconds at a pressure of 0.1 MPa to seal the aluminum laminate package material.

[Lithium Doping Step]

The obtained nonaqueous lithium power storage element was placed in an argon box at a temperature of 25° C., a dew point of −60° C. and an oxygen concentration of 1 ppm. The excess portion of the aluminum laminate package material of the nonaqueous lithium power storage element was cut to unseal it, and it was subjected to initial charging by a method of constant-current charge using a power source by Matsusada Precision, Inc. (P4LT18-0.2), with a current value of 50 mA until reaching a voltage of 4.5 V, followed by constant-voltage charge at 4.5 V continued for 72 hours, for lithium doping of the negative electrode. Upon completion of the lithium doping, a heat sealer by Fuji Impulse Co., Ltd. (FA-300) was used to seal the aluminum laminate.

[Aging Step]

The lithium-doped nonaqueous lithium power storage element was removed from the argon box and subjected to constant-current discharge in an environment of 25° C. at 50 mA until reaching a voltage of 3.0 V, and then constant-current discharge at 3.0 V for 1 hour, to adjust the voltage to 3.0 V. The nonaqueous lithium power storage element was then stored for 48 hours in a thermostatic bath at 60° C.

[Degassing Step]

A portion of the aluminum laminate package material of the aged nonaqueous lithium power storage element was unsealed in a dry air environment with a temperature of 25° C. and a dew point of −40° C. Next, the nonaqueous lithium power storage element was placed in a pressure reduction chamber, and a step of using a diaphragm pump (N816.3KT.45.18 by KNF Co.) for pressure reduction over a period of 3 minutes from atmospheric pressure to −80 kPa, followed by restoration to atmospheric pressure over a period of 3 minutes, was repeated 3 times. Next, the nonaqueous lithium power storage element was placed in a pressure-reducing sealing machine, and after pressure reduction to −90 kPa, it was sealed at 200° C. for 10 seconds at a pressure of 0.1 MPa to seal the aluminum laminate package material.

<Evaluation of Nonaqueous Lithium Power Storage Elements>

[Measurement of Electrostatic Capacitance Fa]

One of the nonaqueous lithium power storage elements obtained in the step described above was subjected to constant-current charge using a charge/discharge apparatus (5 V, 360 A) by Fujitsu Telecom Networks, Fukushima Ltd. in a thermostatic bath set to 25° C., with a 2 C current value (1 A) until reaching 3.8 V, and then constant-voltage charge was carried out with application of a constant voltage of 3.8 V for a total of 30 minutes. Next, with the capacitance after constant-current discharge to 2.2 V at the 2 C current value (1 A) as Q (C), F=Q/(3.8-2.2) was calculated as the electrostatic capacitance Fa, to be 1677 F.

[Calculation of Ra·Fa]

The nonaqueous lithium power storage element obtained in the step described above was subjected to constant-current charge using a charge/discharge apparatus (5 V, 360 A) by Fujitsu Telecom Networks, Fukushima Ltd. in a thermostatic bath set to 25° C., with the 20 C current value (15 A) until reaching 3.8 V, and then constant-voltage charge was carried out with application of a constant voltage of 3.8 V for a total of 30 minutes. Next, constant-current discharge was carried out to 2.2 V with a sampling time of 0.1 second and the 20 C current value (15 A), to obtain a discharge curve (time-voltage). From the discharge curve, with a voltage of Eo at discharge time=0 seconds, obtained by extrapolating by linear approximation from the voltage values at discharge times of 2 seconds and 4 seconds, the internal resistance Ra was calculated from the voltage drop $\Delta E=3.8-Eo$ and $R=\Delta E/(20$ C current value), to be 0.50 mΩ.

The product Ra·Fa of the electrostatic capacitance F and the internal resistance Ra at 25° C. was 0.84 ΩF.

[Calculation of Electrical Energy]

The volume of the nonaqueous lithium power storage element was measured by the method described above, and the electrical energy was calculated to be 43.7 Wh/L.

[Charge/Discharge Cycle Test Under High Load]

The nonaqueous lithium power storage element obtained in the above step was subjected to constant-current charge in a thermostatic bath set to 25° C., using a charge/discharge apparatus (5 V, 360 A) by Fujitsu Telecom Networks, Fukushima Ltd. at the 200 C current value (150 A) until reaching 3.8 V, and then a charge/discharge step in which constant-current discharge was carried out at the 200 C current value until reaching 2.2 V was repeated 60,000 times without pause. Upon completion of the cycle, charging was carried out at the 20 C current value (15 A) to 4.5 V, and constant-voltage charge was carried out continuously for 1 hour afterwards. The electrostatic capacitance Fb was then measured to be 1732 F, and Fb/Fa=1.03.

<Calculation of $X_1$, $Y_1$, $A_1$ and $A_2$>

[Preparation of Positive Electrode Sample]

The other nonaqueous lithium power storage element obtained in the step described above was disassembled in an argon box with a dew point temperature of −72° C., and the positive electrode coated on both sides with the positive electrode active material layer was cut out to a size of 10 cm×5 cm and immersed in 30 g of a diethyl carbonate solvent, occasionally moving the positive electrode with a pincette, and was washed for 10 minutes. The positive electrode was then removed out and air-dried for 5 minutes in an argon box, and the positive electrode was immersed in 30 g of freshly prepared diethyl carbonate solvent and washed for 10 minutes by the same method as described above. The positive electrode was removed from the argon box, and a vacuum dryer (DP33 by Yamato Scientific Co., Ltd.) was used for drying for 20 hours at a temperature of 25° C. and a pressure of 1 kPa, to obtain positive electrode sample 1.

[SEM and EDX Measurement of Positive Electrode Surface]

A small 1 cm×1 cm piece was cut out from positive electrode sample 1, and the front side was coated by sputtering of gold in a vacuum of 10 Pa. Next, the positive electrode surface was measured by SEM and EDX with atmospheric exposure, under the conditions described below.

(SEM-EDX Measuring Conditions)

Measuring apparatus: FE-SEM S-4700 Electrolytic emission scanning electron microscope by Hitachi High-Technologies Corp.

Acceleration voltage: 10 kV

Emission current: 10 μA

Measurement magnification: 2000×

Electron beam incident angle: 90°
X-ray take-off angle: 30°
Dead time: 15%
Mapping elements: C, O, F
Measurement pixel count 256×256 pixels
Measuring time: 60 sec
Number of scans: 50
Adjustment of the luminance and contrast so that no pixel reached the maximum luminance value in the mapping image and the average value of brightness fell within the range of 40% to 60% of the maximum luminance value.

(SEM-EDX Analysis)

Image analysis software (ImageJ) was used for binarization based on the average value of brightness, for the obtained oxygen mapping and fluorine mapping. The oxygen mapping area during this time was 16.7% of the total image, and the fluorine mapping area was 32.7%. The area of overlap between oxygen mapping and fluorine mapping obtained by binarization was 13.9% of the total image, and by defining $A_1$ (%) as the area overlap ratio of fluorine mapping with respect to oxygen mapping, it was possible to calculate:

$$A_1 = 100 \times 13.9/16.7$$

as 83.2%.

[SEM and EDX Measurement of Positive Electrode Cross-Section]

A small 1 cm×1 cm piece was cut out from positive electrode sample 1, and an SM-09020CP by JEOL Ltd. was used to create a cross-section perpendicular to the in-plane direction of positive electrode sample 1 using argon gas, under conditions with an acceleration voltage of 4 kV and a beam diameter of 500 μm. Next, SEM and EDX measurement of the positive electrode cross-section were carried out by the methods described above.

The images obtained from SEM and EDX of the measured positive electrode cross-section were subjected to image analysis using image analysis software (ImageJ), and $X_1$ and $Y_1$ were calculated. The cross-sectional area S was determined for all of the particles X and Y observed in the cross-sectional SEM image, the lithium compound particles X being the particles containing a bright portion equal to 50% or more of the area thereof when binarized based on the average value of brightness with respect to the obtained oxygen mapping, and the positive electrode active material particles Y being the other particles, and the particle diameter d was determined by calculation using the following formula (1). ($\pi$ is the circular constant)

[Math. 8]

$$d = 2 \times (S/\pi)^{1/2} \quad (1)$$

Each obtained particle diameter d was used to determine the volume-average particle diameters $X_0$ and $Y_0$, by the following formula (2).

[Math. 9]

$$X_0(Y_0) = \Sigma[4/3\pi \times (d/2)^3 \times d]/\Sigma[4/3\pi \times (d/2)^3] \quad (2)$$

Measurement was performed at a total of 5 locations, varying the visual field of the positive electrode cross-section, and the mean particle diameter $X_1$ was 0.7 μm and $Y_1$ was 6.7 μm, as the mean values of $X_0$ and $Y_0$, respectively.

Next, the oxygen mapping and fluorine mapping were binarized in the same manner as above, for the SEM-EDX of the obtained positive electrode cross-section, and the area overlap ratio $A_2$ of fluorine mapping with respect to oxygen mapping was calculated to be 39.5%.

<Quantitation of Lithium Compound>

The obtained positive electrode sample 1 was cut out to a size of 5 cm×5 cm (weight: 0.256 g) and immersed in 20 g of methanol, and the vessel was capped and allowed to stand for 3 days in an environment at 25° C. The positive electrode was then removed out and vacuum dried for 10 hours under conditions of 120° C., 5 kPa. The positive electrode weight $M_0$ during this time was 0.250 g, and the methanol solution after washing was measured by GC/MS under conditions with a predrawn calibration curve, confirming a diethyl carbonate abundance of less than 1%. Next, the positive electrode was impregnated with 25.00 g of distilled water, and the vessel was capped and allowed to stand for 3 days in an environment at 45° C. The positive electrode was then removed out and vacuum dried for 12 hours under conditions of 150° C., 3 kPa. The positive electrode weight $M_1$ during this time was 0.236 g, and the distilled water after washing was measured by GC/MS under conditions with a predrawn calibration curve, confirming a methanol abundance of less than 1%. Next, a spatula, brush or bristles were used to remove off the active material layer from the positive electrode power collector, and the weight $M_2$ of the positive electrode power collector was measured to be 0.099 g. The lithium carbonate amount Z in the positive electrode was quantified by formula (4) to be 9.3 weight %.

Example 2

A nonaqueous lithium power storage element was fabricated by the same method as Example 1, except that charging of the nonaqueous lithium power storage element was initial charging by a method of constant-current charge at a current value of 100 mA until reaching a voltage of 4.6 V, followed by constant-voltage charge at 4.6 V continued for 40 hours, for lithium doping at the negative electrode.

Example 3

A nonaqueous lithium power storage element was fabricated by the same method as Example 1, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

Example 4

A nonaqueous lithium power storage element was fabricated by the same method as Example 1, except that pulverization of the lithium carbonate was carried out by cooling to −196° C. with liquid nitrogen, and then using φ1.0 mm zirconia beads for pulverization for 10 minutes at a peripheral velocity of 10.0 m/s.

Example 5

A nonaqueous lithium power storage element was fabricated by the same method as Example 1, except that pulverization of the lithium carbonate was carried out by cooling to −196° C. with liquid nitrogen, and then using φ1.0 mm zirconia beads for pulverization for 5 minutes at a peripheral velocity of 10.0 m/s.

Example 6

A nonaqueous lithium power storage element was fabricated by the same method as Example 1, except that pulverization of the lithium carbonate was carried out by cooling to −196° C. with liquid nitrogen, and then using φ1.0 mm zirconia beads for pulverization for 3 minutes at a peripheral velocity of 10.0 m/s.

Example 7

A nonaqueous lithium power storage element was fabricated by the same method as Example 1, except that pulverization of the lithium carbonate was carried out by cooling to −196° C. with liquid nitrogen and then using φ1.0 mm zirconia beads for pulverization for 20 minutes at a peripheral velocity of 10.0 m/s, and charging of the nonaqueous lithium power storage element was initial charging by a method of constant-current charge at a current value of 200 mA until reaching a voltage of 4.5 V, followed by constant-voltage charge at 4.5 V continued for 20 hours, in an environment at 45° C., for lithium doping at the negative electrode.

Example 8

A nonaqueous lithium power storage element was fabricated by the same method as Example 7, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

Example 9

A nonaqueous lithium power storage element was fabricated by the same method as Example 7, except that charging of the nonaqueous lithium power storage element was initial charging by a method of constant-current charge at a current value of 200 mA until reaching a voltage of 4.3 V, followed by constant-voltage charge at 4.5 V continued for 5 hours, for lithium doping at the negative electrode.

Example 10

A nonaqueous lithium power storage element was fabricated by the same method as Example 7, except that pulverization of the lithium carbonate was carried out by cooling to −196° C. with liquid nitrogen, and then using φ1.0 mm zirconia beads for pulverization for 5 minutes at a peripheral velocity of 10.0 m/s.

Example 11

A nonaqueous lithium power storage element was fabricated by the same method as Example 10, except that charging of the nonaqueous lithium power storage element was initial charging by a method of constant-current charge at a current value of 200 mA until reaching a voltage of 4.3 V, followed by constant-voltage charge at 4.3 V continued for 2 hours, for lithium doping at the negative electrode.

Example 12

A nonaqueous lithium power storage element was fabricated by the same method as Example 10, except that charging of the nonaqueous lithium power storage element was initial charging by a method of constant-current charge at a current value of 200 mA until reaching a voltage of 4.5 V, followed by constant-voltage charge at 4.5 V continued for 6 hours, for lithium doping at the negative electrode.

Example 13

A nonaqueous lithium power storage element was fabricated by the same method as Example 10, except that charging of the nonaqueous lithium power storage element was initial charging by a method of constant-current charge at a current value of 200 mA until reaching a voltage of 4.5 V, followed by constant-voltage charge at 4.5 V continued for 1 hour, for lithium doping at the negative electrode.

Example 14

A nonaqueous lithium power storage element was fabricated by the same method as Example 10, except that charging of the nonaqueous lithium power storage element was initial charging by a method of constant-current charge at a current value of 100 mA until reaching a voltage of 4.2 V, followed by constant-voltage charge at 4.2 V continued for 1 hour, for lithium doping at the negative electrode.

Comparative Example 1

A nonaqueous lithium power storage element was fabricated by the same method as Example 1, except that pulverization of the lithium carbonate was carried out in an environment at 25° C., using φ1.0 mm zirconia beads for pulverization for 5 minutes at a peripheral velocity of 10.0 m/s.

Comparative Example 2

A nonaqueous lithium power storage element was fabricated by the same method as Comparative Example 1, except that charging of the nonaqueous lithium power storage element was initial charging by a method of constant-current charge at a current value of 100 mA until reaching a voltage of 4.6 V, followed by constant-voltage charge at 4.6 V continued for 40 hours, for lithium doping at the negative electrode.

Comparative Example 3

A nonaqueous lithium power storage element was fabricated by the same method as Comparative Example 1, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

Comparative Example 4

A nonaqueous lithium power storage element was fabricated by the same method as Example 1, except that pulverization of the lithium carbonate was carried out in an environment at 25° C., using φ1.0 mm zirconia beads for pulverization for 2 minutes at a peripheral velocity of 10.0 m/s.

Comparative Example 5

A nonaqueous lithium power storage element was fabricated by the same method as Comparative Example 4, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

Comparative Example 6

A nonaqueous lithium power storage element was fabricated by the same method as Comparative Example 4, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

Comparative Example 7

A nonaqueous lithium power storage element was fabricated by the same method as Comparative Example 1, except that charging of the nonaqueous lithium power storage element was initial charging by a method of constant-current charge at a current value of 200 mA until reaching a voltage of 4.5 V, followed by constant-voltage charge at 4.5 V continued for 20 hours, in an environment at 45° C., for lithium doping at the negative electrode.

Comparative Example 8

A nonaqueous lithium power storage element was fabricated by the same method as Comparative Example 7, except that charging of the nonaqueous lithium power storage element was initial charging by a method of constant-current charge at a current value of 100 mA until reaching a voltage of 4.6 V, followed by constant-voltage charge at 4.6 V continued for 40 hours, for lithium doping at the negative electrode.

Comparative Example 9

A nonaqueous lithium power storage element was fabricated by the same method as Comparative Example 7, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

Comparative Example 10

A nonaqueous lithium power storage element was fabricated by the same method as Comparative Example 1, except that charging of the nonaqueous lithium power storage element was initial charging by a method of constant-current charge at a current value of 200 mA until reaching a voltage of 4.5 V, followed by constant-voltage charge at 4.5 V continued for 20 hours, in an environment at 0° C., for lithium doping at the negative electrode.

Comparative Example 11

A nonaqueous lithium power storage element was fabricated by the same method as Comparative Example 10, except that charging of the nonaqueous lithium power storage element was initial charging by a method of constant-current charge at a current value of 100 mA until reaching a voltage of 4.6 V, followed by constant-voltage charge at 4.6 V continued for 40 hours, for lithium doping at the negative electrode.

Comparative Example 12

A nonaqueous lithium power storage element was fabricated by the same method as Comparative Example 10, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

The evaluation results for the nonaqueous lithium power storage elements of Examples 1 to 14 and Comparative Examples 1 to 12 are shown in Table 1.

TABLE 1

| | Fa [F] | Ra [mΩ] | Fa · Ra [ΩF] | E/V [Wh/L] | Fb [F] | Fb/Fa | $X_1$ [μm] | $Y_1$ [μm] | Z [%] | $A_1$ [%] | $A_2$ [%] |
|---|---|---|---|---|---|---|---|---|---|---|---|
| Example 1 | 1677 | 0.50 | 0.84 | 43.7 | 1732 | 1.03 | 0.7 | 6.7 | 9.3 | 83.2 | 39.5 |
| Example 2 | 1652 | 0.53 | 0.87 | 42.4 | 1721 | 1.04 | 1.1 | 6.8 | 12.1 | 72.3 | 29.3 |
| Example 3 | 1635 | 0.55 | 0.91 | 41.7 | 1704 | 1.04 | 1.3 | 7.0 | 18.7 | 55.1 | 18.8 |
| Example 4 | 1663 | 0.51 | 0.85 | 43.0 | 1677 | 1.01 | 3.2 | 6.9 | 10.1 | 93.4 | 57.3 |
| Example 5 | 1652 | 0.58 | 0.95 | 41.9 | 1680 | 1.02 | 5.1 | 6.7 | 13.5 | 86.6 | 46.5 |
| Example 6 | 1646 | 0.63 | 1.03 | 39.9 | 1674 | 1.02 | 6.6 | 6.7 | 17.2 | 77.9 | 32.6 |
| Example 7 | 1698 | 0.41 | 0.69 | 45.5 | 1753 | 1.03 | 0.3 | 7.1 | 3.5 | 97.4 | 58.1 |
| Example 8 | 1688 | 0.45 | 0.77 | 44.5 | 1758 | 1.04 | 0.8 | 7.0 | 7.3 | 85.2 | 43.5 |
| Example 9 | 1708 | 0.50 | 0.86 | 45.1 | 1757 | 1.03 | 1.2 | 7.1 | 9.7 | 72.4 | 33.1 |
| Example 10 | 1674 | 0.55 | 0.93 | 42.4 | 1742 | 1.04 | 3.5 | 7.0 | 12.2 | 72.2 | 27.9 |
| Example 11 | 1662 | 0.55 | 0.91 | 41.9 | 1736 | 1.04 | 6.3 | 6.9 | 19.1 | 43.3 | 12.5 |
| Example 12 | 1725 | 0.49 | 0.84 | 45.5 | 1761 | 1.02 | 4.1 | 7.0 | 10.1 | 64.7 | 26.6 |
| Example 13 | 1679 | 0.39 | 0.65 | 44.1 | 1768 | 1.05 | 5.8 | 6.9 | 15.6 | 49.1 | 15.9 |
| Example 14 | 1637 | 0.43 | 0.70 | 42.4 | 1712 | 1.05 | 6.1 | 7.1 | 19.3 | 44.2 | 13.3 |
| Comp. Example 1 | 1218 | 1.46 | 1.78 | 32.5 | 1165 | 0.96 | 10.7 | 7.2 | 21.1 | 36.7 | 7.5 |
| Comp. Example 2 | 1071 | 1.74 | 1.86 | 26.5 | 1009 | 0.94 | 12.5 | 6.9 | 23.1 | 27.7 | 5.5 |
| Comp. Example 3 | 896 | 1.85 | 1.65 | 23.1 | 822 | 0.92 | 12.5 | 6.9 | 23.1 | 14.9 | 3.8 |
| Comp. Example 4 | 1063 | 1.37 | 1.46 | 27.3 | 986 | 0.93 | 13.1 | 7.0 | 24.7 | 32.7 | 5.7 |
| Comp. Example 5 | 811 | 2.06 | 1.67 | 20.0 | 680 | 0.84 | 15.3 | 7.1 | 25.8 | 23.3 | 4.4 |
| Comp. Example 6 | 554 | 2.90 | 1.61 | 13.3 | 340 | 0.61 | 16.4 | 6.9 | 27.3 | 15.3 | 5.2 |
| Comp. Example 7 | 1330 | 1.31 | 1.74 | 35.3 | 1264 | 0.95 | 8.2 | 7.0 | 21.2 | 37.3 | 8.3 |
| Comp. Example 8 | 1219 | 1.55 | 1.89 | 32.5 | 1144 | 0.94 | 8.8 | 7.1 | 23.2 | 32.2 | 5.8 |
| Comp. Example 9 | 1161 | 1.73 | 2.00 | 30.5 | 1016 | 0.88 | 9.5 | 7.0 | 24.7 | 25.8 | 5.2 |

TABLE 1-continued

|  | Fa [F] | Ra [mΩ] | Fa · Ra [ΩF] | E/V [Wh/L] | Fb [F] | Fb/Fa | $X_1$ [μm] | $Y_1$ [μm] | Z [%] | $A_1$ [%] | $A_2$ [%] |
|---|---|---|---|---|---|---|---|---|---|---|---|
| Comp. Example 10 | 896 | 2.32 | 2.07 | 22.7 | 693 | 0.77 | 12.2 | 6.9 | 23.4 | 24.3 | 4.3 |
| Comp. Example 11 | 703 | 2.65 | 1.86 | 18.6 | 556 | 0.79 | 14.1 | 7.0 | 25.3 | 19.5 | 3.6 |
| Comp. Example 12 | 511 | 3.08 | 1.58 | 11.6 | 309 | 0.61 | 15.3 | 7.2 | 25.9 | 11.2 | 1.5 |

Example 15

<Pulverization of Lithium Carbonate>

Using a pulverizer (LNM liquid nitrogen bead mill) by Aimex Corp., 200 g of lithium carbonate with a mean particle diameter of 53 μm was cooled to −196° C. with liquid nitrogen and then pulverized for 30 minutes at a peripheral velocity of 10.0 m/s, using φ1.0 mm zirconia beads. The mean particle diameter of lithium carbonate 2, which was obtained by brittle fracture while preventing heat denaturation at −196° C., was measured to be 3.8 μm.

<Production of Positive Electrode Precursor>

The activated carbon 1a was used as a positive electrode active material to produce a positive electrode precursor, with lithium carbonate 2 as the lithium compound.

After mixing 55.5 parts by weight of activated carbon 1a, 32.0 parts by weight of lithium carbonate 2, 3.0 parts by weight of Ketchen black, 1.5 parts by weight of PVP (polyvinylpyrrolidone), 8.0 parts by weight of PVDF (polyvinylidene fluoride) and NMP (N-methylpyrrolidone), the mixture was dispersed using a FILMIX® thin-film rotating-type high speed mixer by Primix Corp., under conditions with a peripheral velocity of 17 m/s, to obtain a coating solution. The viscosity (ηb) and TI value of the obtained coating solution were measured using a TVE-35H E-type viscometer by Toki Sangyo Co., Ltd. As a result, the viscosity (ηb) was 2,100 mPa·s and the TI value was 3.7. The degree of dispersion of the obtained coating solution was measured using a fineness gauge by Yoshimitsu Seiki Co. As a result, the granularity was 42 μm. The coating solution was coated onto one or both sides of an aluminum foil with a thickness of 15 μm using a die coater by Toray Engineering Co., Ltd. under conditions with a coating speed of 1 m/s, and dried at a drying temperature of 120° C. to obtain positive electrode precursor 2 (one side) and positive electrode precursor 2 (both sides). The obtained positive electrode precursor 2 (one side) and positive electrode precursor 2 (both sides) were pressed using a roll press under conditions with a pressure of 6 kN/cm and a pressed portion surface temperature of 25° C. The film thickness of the positive electrode active material layer of the obtained positive electrode precursor 2 (one side) and positive electrode precursor 2 (both sides) were determined by subtracting the thickness of the aluminum foil from the average thickness measured at 10 arbitrary locations of the positive electrode precursor 2 using a Linear Gauge Sensor GS-551 by Ono Sokki Co., Ltd. As a result, the film thickness per side of the positive electrode active material layers was 58 μm.

<Preparation of Negative Electrode Active Material: Preparation Example $2a_1$>

The BET specific surface area and pore distribution of commercially available artificial graphite was measured by the method described above, using a pore distribution measuring apparatus (AUTOSORB-1 AS-1-MP) by Yuasa-Ionics, Inc. As a result, the BET specific surface area was 3.1 m²/g and the mean particle diameter was 4.8 μm.

A 300 g portion of the artificial graphite was placed into a stainless steel mesh basket and placed on a stainless steel vat containing 30 g of coal-based pitch (softening point: 50° C.), and both were set in an electric furnace (furnace inner usable dimension: 300 mm×300 mm×300 mm), for thermal reaction to obtain composite porous carbon material $2a_1$. The heat treatment was carried out under a nitrogen atmosphere, with temperature increase to 1000° C. over a period of 12 hours, and 5 hours of holding at the same temperature. This was followed by natural cooling to 60° C., after which the composite carbon material $2a_1$ was removed out of the furnace.

The BET specific surface area and pore distribution of the obtained composite carbon material $2a_1$ were measured by the same methods as described above. As a result, the BET specific surface area was 6.1 m²/g and the mean particle diameter was 4.9 μm. Also, for composite carbon material $2a_1$, the weight ratio of coal-based pitch-derived carbonaceous material with respect to activated carbon was 2.0%.

<Production of Negative Electrode>

Composite carbon material $2a_1$ was used as a negative electrode active material to produce a negative electrode.

After mixing 84 parts by weight of composite carbon material $2a_1$, 10 parts by weight of acetylene black, 6 parts by weight of PVdF (polyvinylidene fluoride) and NMP (N-methylpyrrolidone), the mixture was dispersed using a FILMIX thin-film rotating-type high speed mixer by Primix Corp., under conditions with a peripheral velocity of 17 m/s, to obtain a coating solution. The viscosity (ηb) and TI value of the obtained coating solution were measured using a TVE-35H E-type viscometer by Toki Sangyo Co., Ltd. As a result, the viscosity (ηb) was 2,326 mPa·s and the TI value was 2.7. The coating solution was coated onto both sides of an electrolytic copper foil with a thickness of 10 μm using a die coater by Toray Engineering Co., Ltd. under conditions with a coating speed of 2 m/s, and dried at a drying temperature of 120° C. to obtain negative electrode 2. The obtained negative electrode 2 was pressed using a roll press under conditions with a pressure of 5 kN/cm and a pressed portion surface temperature of 25° C. The film thickness of the negative electrode active material layer of the obtained negative electrode 2 was determined by subtracting the thickness of the copper foil from the average thickness measured at 10 arbitrary locations of negative electrode 2 using a Linear Gauge Sensor GS-551 by Ono Sokki Co., Ltd. As a result, the film thickness per side of the negative electrode active material layers was 30 μm.

The lithium ion doping amount per unit weight was measured by the method described above to be 545 mAh/g.

<Fabrication of Nonaqueous Lithium Power Storage Element>

A nonaqueous lithium power storage element was fabricated by the same method as Example 1, except for using the positive electrode precursor 2 (one side), positive electrode precursor 2 (both sides) and negative electrode 2.

Example 16

A nonaqueous lithium power storage element was fabricated by the same method as Example 15, except that charging of the nonaqueous lithium power storage element was initial charging by a method of constant-current charge at a current value of 100 mA until reaching a voltage of 4.6 V, followed by constant-voltage charge at 4.6 V continued for 40 hours, for lithium doping at the negative electrode.

Example 17

A nonaqueous lithium power storage element was fabricated by the same method as Example 15, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

Example 18

A nonaqueous lithium power storage element was fabricated by the same method as Example 15, except that pulverization of the lithium carbonate was carried out by cooling to −196° C. with liquid nitrogen, and then using φ1.0 mm zirconia beads for pulverization for 10 minutes at a peripheral velocity of 10.0 m/s.

Example 19

A nonaqueous lithium power storage element was fabricated by the same method as Example 15, except that pulverization of the lithium carbonate was carried out by cooling to −196° C. with liquid nitrogen, and then using φ1.0 mm zirconia beads for pulverization for 5 minutes at a peripheral velocity of 10.0 m/s.

Example 20

A nonaqueous lithium power storage element was fabricated by the same method as Example 15, except that pulverization of the lithium carbonate was carried out by cooling to −196° C. with liquid nitrogen, and then using φ1.0 mm zirconia beads for pulverization for 3 minutes at a peripheral velocity of 10.0 m/s.

Example 21

A nonaqueous lithium power storage element was fabricated by the same method as Example 15, except that pulverization of the lithium carbonate was carried out by cooling to −196° C. with liquid nitrogen and then using φ1.0 mm zirconia beads for pulverization for 20 minutes at a peripheral velocity of 10.0 m/s, and charging of the nonaqueous lithium power storage element was initial charging by a method of constant-current charge at a current value of 200 mA until reaching a voltage of 4.5 V, followed by constant-voltage charge at 4.5 V continued for 20 hours, in an environment at 45° C., for lithium doping at the negative electrode.

Example 22

A nonaqueous lithium power storage element was fabricated by the same method as Example 21, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

Example 23

A nonaqueous lithium power storage element was fabricated by the same method as Example 21, except that charging of the nonaqueous lithium power storage element was initial charging by a method of constant-current charge at a current value of 200 mA until reaching a voltage of 4.3 V, followed by constant-voltage charge at 4.5 V continued for 5 hours, for lithium doping at the negative electrode.

Example 24

A nonaqueous lithium power storage element was fabricated by the same method as Example 21, except that pulverization of the lithium carbonate was carried out by cooling to −196° C. with liquid nitrogen, and then using φ1.0 mm zirconia beads for pulverization for 5 minutes at a peripheral velocity of 10.0 m/s.

Example 25

A nonaqueous lithium power storage element was fabricated by the same method as Example 24, except that charging of the nonaqueous lithium power storage element was initial charging by a method of constant-current charge at a current value of 200 mA until reaching a voltage of 4.3 V, followed by constant-voltage charge at 4.3 V continued for 2 hours, for lithium doping at the negative electrode.

Example 26

A nonaqueous lithium power storage element was fabricated by the same method as Example 24, except that charging of the nonaqueous lithium power storage element was initial charging by a method of constant-current charge at a current value of 200 mA until reaching a voltage of 4.5 V, followed by constant-voltage charge at 4.5 V continued for 6 hours, for lithium doping at the negative electrode.

Example 27

A nonaqueous lithium power storage element was fabricated by the same method as Example 24, except that charging of the nonaqueous lithium power storage element was initial charging by a method of constant-current charge at a current value of 200 mA until reaching a voltage of 4.5 V, followed by constant-voltage charge at 4.5 V continued for 1 hour, for lithium doping at the negative electrode.

Example 28

A nonaqueous lithium power storage element was fabricated by the same method as Example 24, except that charging of the nonaqueous lithium power storage element was initial charging by a method of constant-current charge at a current value of 100 mA until reaching a voltage of 4.2 V, followed by constant-voltage charge at 4.2 V continued for 1 hour, for lithium doping at the negative electrode.

Comparative Example 13

A nonaqueous lithium power storage element was fabricated by the same method as Example 15, except that pulverization of the lithium carbonate was carried out in an environment at 25° C., using φ1.0 mm zirconia beads for pulverization for 5 minutes at a peripheral velocity of 10.0 m/s.

Comparative Example 14

A nonaqueous lithium power storage element was fabricated by the same method as Comparative Example 13, except that charging of the nonaqueous lithium power storage element was initial charging by a method of constant-current charge at a current value of 100 mA until reaching a voltage of 4.6 V, followed by constant-voltage charge at 4.6 V continued for 40 hours, for lithium doping at the negative electrode.

Comparative Example 15

A nonaqueous lithium power storage element was fabricated by the same method as Comparative Example 13, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

Comparative Example 16

A nonaqueous lithium power storage element was fabricated by the same method as Example 13, except that pulverization of the lithium carbonate was carried out in an environment at 25° C., using φ1.0 mm zirconia beads for pulverization for 2 minutes at a circumferential speed of 10.0 m/s.

Comparative Example 17

A nonaqueous lithium power storage element was fabricated by the same method as Comparative Example 16, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

Comparative Example 18

A nonaqueous lithium power storage element was fabricated by the same method as Comparative Example 16, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

Comparative Example 19

A nonaqueous lithium power storage element was fabricated by the same method as Comparative Example 13, except that pulverization of the nonaqueous lithium power storage element was initial charging by a method of constant-current charge at a current value of 200 mA until reaching a voltage of 4.5 V, followed by constant-voltage charge at 4.5 V continued for 20 hours, in an environment at 45° C., for lithium doping at the negative electrode.

Comparative Example 20

A nonaqueous lithium power storage element was fabricated by the same method as Comparative Example 19, except that charging of the nonaqueous lithium power storage element was initial charging by a method of constant-current charge at a current value of 100 mA until reaching a voltage of 4.6 V, followed by constant-voltage charge at 4.6 V continued for 40 hours, for lithium doping at the negative electrode.

Comparative Example 21

A nonaqueous lithium power storage element was fabricated by the same method as Comparative Example 19, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

Comparative Example 22

A nonaqueous lithium power storage element was fabricated by the same method as Comparative Example 13, except that charging of the nonaqueous lithium power storage element was initial charging by a method of constant-current charge at a current value of 200 mA until reaching a voltage of 4.5 V, followed by constant-voltage charge at 4.5 V continued for 20 hours, in an environment at 0° C., for lithium doping at the negative electrode.

Comparative Example 23

A nonaqueous lithium power storage element was fabricated by the same method as Comparative Example 22, except that charging of the nonaqueous lithium power storage element was initial charging by a method of constant-current charge at a current value of 100 mA until reaching a voltage of 4.6 V, followed by constant-voltage charge at 4.6 V continued for 40 hours, for lithium doping at the negative electrode.

Comparative Example 24

A nonaqueous lithium power storage element was fabricated by the same method as Comparative Example 22, except that charging of the nonaqueous lithium power storage element was initial charging by a method of constant-current charge at a current value of 200 mA until reaching a voltage of 4.3 V, followed by constant-voltage charge at 4.3 V continued for 10 hours, for lithium doping at the negative electrode.

The evaluation results for the nonaqueous lithium power storage elements of Examples 15 to 28 and Comparative Examples 13 to 24 are shown in Table 2.

TABLE 2

|  | Fa [F] | Ra [mΩ] | Fa·Ra [ΩF] | E/V [Wh/L] | Fb [F] | Fb/Fa | $X_1$ [μm] | $Y_1$ [μm] | Z [%] | $A_1$ [%] | $A_2$ [%] |
|---|---|---|---|---|---|---|---|---|---|---|---|
| Example 15 | 1601 | 0.62 | 0.99 | 46.1 | 1653 | 1.03 | 1.2 | 13.3 | 9.8 | 87.4 | 41.5 |
| Example 16 | 1547 | 0.66 | 1.03 | 43.1 | 1611 | 1.04 | 1.9 | 13.1 | 12.5 | 74.5 | 30.2 |
| Example 17 | 1442 | 0.74 | 1.07 | 37.6 | 1502 | 1.04 | 2.0 | 12.3 | 18.1 | 53.4 | 18.2 |
| Example 18 | 1452 | 0.69 | 1.01 | 37.9 | 1464 | 1.01 | 4.7 | 12.2 | 9.7 | 89.7 | 55.0 |
| Example 19 | 1547 | 0.73 | 1.13 | 42.5 | 1573 | 1.02 | 8.7 | 13.1 | 13.9 | 89.2 | 47.9 |
| Example 20 | 1542 | 0.79 | 1.22 | 40.5 | 1568 | 1.02 | 9.9 | 13.1 | 17.7 | 80.2 | 33.6 |
| Example 21 | 1528 | 0.54 | 0.82 | 42.7 | 1578 | 1.03 | 0.5 | 12.6 | 3.5 | 96.4 | 57.5 |
| Example 22 | 1458 | 0.62 | 0.91 | 38.4 | 1519 | 1.04 | 1.2 | 12.1 | 6.9 | 80.9 | 41.3 |
| Example 23 | 1615 | 0.63 | 1.02 | 46.7 | 1661 | 1.03 | 2.1 | 13.2 | 10.1 | 75.3 | 34.4 |
| Example 24 | 1598 | 0.69 | 1.10 | 44.8 | 1662 | 1.04 | 6.2 | 13.3 | 12.8 | 75.8 | 29.3 |
| Example 25 | 1496 | 0.72 | 1.08 | 39.3 | 1562 | 1.04 | 9.9 | 12.6 | 18.9 | 42.9 | 12.4 |
| Example 26 | 1584 | 0.63 | 1.00 | 44.4 | 1617 | 1.02 | 6.7 | 12.8 | 10.2 | 65.3 | 26.9 |
| Example 27 | 1495 | 0.51 | 0.77 | 40.5 | 1575 | 1.05 | 8.9 | 12.4 | 15.3 | 48.1 | 15.6 |
| Example 28 | 1532 | 0.54 | 0.83 | 43.1 | 1603 | 1.05 | 9.5 | 13.1 | 19.9 | 45.5 | 13.7 |
| Comp. Example 13 | 1163 | 1.81 | 2.10 | 34.3 | 1112 | 0.96 | 18.9 | 13.3 | 22.2 | 38.5 | 7.9 |
| Comp. Example 14 | 983 | 2.24 | 2.20 | 25.8 | 927 | 0.94 | 20.4 | 12.8 | 23.3 | 28.0 | 5.6 |
| Comp. Example 15 | 798 | 2.45 | 1.96 | 21.2 | 732 | 0.92 | 19.2 | 12.4 | 22.6 | 14.6 | 3.7 |
| Comp. Example 16 | 947 | 1.82 | 1.72 | 25.1 | 878 | 0.93 | 20.1 | 12.4 | 24.2 | 32.0 | 5.6 |
| Comp. Example 17 | 715 | 2.76 | 1.97 | 18.0 | 600 | 0.84 | 23.0 | 12.3 | 25.0 | 22.6 | 4.3 |
| Comp. Example 18 | 509 | 3.74 | 1.90 | 13.0 | 312 | 0.61 | 26.8 | 12.8 | 27.6 | 15.5 | 5.3 |
| Comp. Example 19 | 1185 | 1.74 | 2.06 | 32.4 | 1126 | 0.95 | 12.6 | 12.4 | 20.8 | 36.6 | 8.1 |
| Comp. Example 20 | 1131 | 1.97 | 2.23 | 32.3 | 1061 | 0.94 | 14.6 | 13.0 | 23.7 | 32.8 | 5.9 |
| Comp. Example 21 | 1066 | 2.22 | 2.37 | 29.8 | 933 | 0.88 | 15.5 | 12.8 | 24.9 | 26.1 | 5.3 |
| Comp. Example 22 | 798 | 3.07 | 2.45 | 20.8 | 617 | 0.77 | 18.7 | 12.4 | 22.9 | 23.8 | 4.2 |
| Comp. Example 23 | 633 | 3.48 | 2.20 | 17.5 | 500 | 0.79 | 22.1 | 12.6 | 25.0 | 19.3 | 3.6 |
| Comp. Example 24 | 474 | 3.93 | 1.86 | 11.5 | 287 | 0.61 | 25.5 | 13.0 | 26.4 | 11.4 | 1.5 |

Evaluation of Examples 1 to 28 and Comparative Examples 1 to 24

It is believed that by pulverizing the lithium carbonate under conditions with a cryogenic temperature of −196° C., it was not affected by temperature increase during pulverization, and formation of defects in the lithium carbonate particle surfaces could be suppressed. As a result, presumably, it was possible to suppress reaggregation of the lithium carbonate particles, and to disperse the lithium carbonate particles in the positive electrode active material layer in a micronized state, so that lithium carbonate was present in the gaps between the positive electrode active material, thus ensuring electron conduction between the positive electrode active material and resulting in a nonaqueous lithium power storage element with high output. In addition, it is thought that the charge/discharge characteristic under high load was improved because the fluorine compounds produced by decomposition of the $LiPF_6$ electrolyte accumulated in a uniform manner on the surface of the lithium carbonate particles.

Example 29

Using a pulverizer (LNM liquid nitrogen bead mill) by Aimex Corp., 200 g of lithium hydroxide with a mean particle diameter of 73 μm was cooled to −196° C. with liquid nitrogen and pulverized for 60 minutes at a peripheral velocity of 10.0 m/s, using dry ice beads. The mean particle diameter of lithium hydroxide 1, which was obtained by brittle fracture while preventing heat denaturation at −196° C., was measured to be 2.4 μm.

A nonaqueous lithium power storage element was fabricated by the same method as Example 1, except for using the obtained lithium hydroxide 1. When the obtained nonaqueous lithium power storage element was evaluated in the same manner as Example 1, Fa was 1540 F, Ra was 0.62 mΩ, Fa·Ra was 0.95 ΩF, E/V was 38.2 Wh/L, Fb was 1588 F, Fb/Fa was 1.03, $X_1$ was 0.5 μm, $Y_1$ was 7.1 μm, Z was 10.1%, $A_1$ was 79.3% and $A_2$ was 36.3%.

Comparative Example 25

A nonaqueous lithium power storage element was fabricated by the same method as Example 29, except that pulverization of the lithium hydroxide was carried out in an environment at 25° C., using φ1.0 mm zirconia beads for pulverization for 5 minutes at a peripheral velocity of 10.0 m/s, for use as the lithium compound. When the obtained nonaqueous lithium power storage element was evaluated in the same manner as Example 1, Fa was 845 F, Ra was 2.54 mΩ, Fa·Ra was 2.15 ΩF, E/V was 25.2 Wh/L, Fb was 808 F, Fb/Fa was 0.97, $X_1$ was 9.6 μm, $Y_1$ was 7.1 μm, Z was 22.1%, $A_1$ was 31.3% and $A_2$ was 6.0%.

Example 30

Using a pulverizer (LNM liquid nitrogen bead mill) by Aimex Corp., 200 g of lithium oxide with a mean particle diameter of 83 μm was cooled to −196° C. with liquid nitrogen and pulverized for 120 minutes at a peripheral velocity of 10.0 m/s, using dry ice beads. The mean particle diameter of lithium oxide 1, which was obtained by brittle fracture while preventing heat denaturation at −196° C., was measured to be 3.5 μm.

A nonaqueous lithium power storage element was fabricated by the same method as Example 1, except for using the obtained lithium oxide 1. When the obtained nonaqueous lithium power storage element was evaluated in the same manner as Example 1, Fa was 1620 F, Ra was 0.59 mΩ, Fa·Ra was 0.96 ΩF, E/V was 40.1 Wh/L, Fb was 1657 F, Fb/Fa was 1.02, $X_1$ was 1.4 μm, $Y_1$ was 7.0 μm, Z was 12.1%, $A_1$ was 82.4% and $A_2$ was 42.2%.

Comparative Example 26

A nonaqueous lithium power storage element was fabricated by the same method as Example 30, except that pulverization of the lithium oxide was carried out in an environment at 25° C., using φ1.0 mm zirconia beads for pulverization for 5 minutes at a peripheral velocity of 10.0 m/s, for use as the lithium compound. When the obtained nonaqueous lithium power storage element was evaluated in the same manner as Example 1, Fa was 877 F, Ra was 2.65 mΩ, Fa·Ra was 2.32 ΩF, E/V was 26.2 Wh/L, Fb was 837 F, Fb/Fa was 0.95, $X_1$ was 13.4 μm, $Y_1$ was 7.0 μm, Z was 23.8%, $A_1$ was 29.3% and $A_2$ was 4.7%.

Example 31

<Preparation of Positive Electrode Active Material>

Preparation Example 1b

Crushed coconut shell carbide was subjected to carbonization in a small carbonizing furnace, at 500° C. for 3 hours in nitrogen, to obtain a carbide. The obtained carbide was placed in an activating furnace, water vapor was introduced into the activating furnace at 1 kg/h in a heated state using a preheating furnace, and the temperature was increased to 900° C. over 8 hours for activation. The activated carbide was cooled under a nitrogen atmosphere to obtain activated carbon. The obtained activated carbon was flow-rinsed for 12 hours and then drained. After then drying for 10 hours in an electrodesiccator kept at 125° C., it was pulverized for 30 minutes with a ball mill to obtain activated carbon 1b.

The mean particle diameter of activated carbon 1b was measured to be 17.7 μm. As a result of measuring the pore distribution in the manner described above, the BET specific surface area was 2289 m$^2$/g, the mesopore volume ($V_1$)k was 0.56 cc/g, the micropore volume ($V_2$) was 0.82 cc/g, and $V_1/V_2$=0.68.

A nonaqueous lithium power storage element was fabricated by the same method as Example 15, except for using the obtained activated carbon 1b. When the obtained nonaqueous lithium power storage element was evaluated in the same manner as Example 1, Fa was 1612 F, Ra was 0.79 mΩ, Fa·Ra was 1.27 ΩF, E/V was 40.5 Wh/L, Fb was 1661 F, Fb/Fa was 1.03, $X_1$ was 1.6 μm, $Y_1$ was 7.1 μm, Z was 12.2%, $A_1$ was 81.1% and $A_2$ was 39.2%.

Comparative Example 27

Preparation Example 1c

Activated carbon 1c was obtained by the same method as Example 31, except that pulverizing with a ball mill was carried out for 10 minutes.

The mean particle diameter of activated carbon 1c was measured to be 24.5 μm. As a result of measuring the pore distribution in the manner described above, the BET specific surface area was 2216 m$^2$/g, the mesopore volume ($V_1$)k was 0.52 cc/g, the micropore volume ($V_2$) was 0.83 cc/g, and $V_1/V_2$=0.63.

Pulverization of lithium carbonate was carried out in an environment at 25° C., using φ1.0 mm zirconia beads for pulverization for 2 minutes at a peripheral velocity of 10.0 m/s, to obtain lithium carbonate 3 having a mean particle diameter of 16.5 μm.

A nonaqueous lithium power storage element was fabricated by the same method as Example 15, except for using the obtained activated carbon 1b and lithium carbonate 3. When the obtained nonaqueous lithium power storage element was evaluated in the same manner as Example 1, Fa was 759 F, Ra was 3.16 mΩ, Fa·Ra was 2.40 ΩF, E/V was 23.5 Wh/L, Fb was 681 F, Fb/Fa was 0.90, $X_1$ was 11.6 μm, $Y_1$ was 24.4 μm, Z was 24.3%, $A_1$ was 27.1% and $A_2$ was 3.2%.

An embodiment according to the second aspect will now be explained in detail.

Example 32

<Preparation of Positive Electrode Active Material>

Preparation Example 1d

Crushed coconut shell carbide was placed in a small carbonizing furnace and subjected to carbonization at 500° C. for 3 hours under a nitrogen atmosphere, to obtain a carbide. The obtained carbide was placed in an activating furnace, water vapor in a heated state using a preheating furnace was introduced into the activating furnace at 1 kg/h, and the temperature was increased to 900° C. over 8 hours for activation. The activated carbide was cooled under a nitrogen atmosphere to obtain activated carbon. The obtained activated carbon was flow-rinsed with water for 10 hours, drained, and dried for 10 hours in an electrodesiccator held at 115° C., and then it was pulverized for 1 hour with a ball mill to obtain activated carbon 1d.

A laser diffraction particle size distribution analyzer (SALD-2000J) by Shimadzu Corp. was used to measure the mean particle diameter of the activated carbon 1d, which was found to be 4.2 μm. Also, a pore distribution measuring apparatus (AUTOSORB-1 AS-1-MP) by Yuasa-Ionics, Inc. was used to measure the pore distribution of the activated carbon 1d. As a result, the BET specific surface area was 2360 m$^2$/g, the mesopore volume ($V_1$) was 0.52 cc/g, the micropore volume ($V_2$) was 0.88 cc/g, and $V_1/V_2$=0.59.

Preparation Example 2b

A phenol resin was placed in a furnace and subjected to carbonization at 600° C. for 2 hours under a nitrogen atmosphere, and was then pulverized with a ball mill and sorted, to obtain a carbide having a mean particle diameter of 7 μm. The obtained carbide was mixed with KOH at a weight ratio of 1:5, and the mixture was placed in a furnace and heated at 800° C. for 1 hour under a nitrogen atmosphere and activated. The activated carbide was removed out and stirred and rinsed for 1 hour in dilute hydrochloric acid adjusted to a concentration of 2 mol/L, and then boiled and rinsed with distilled water until the pH stabilized to between 5 and 6, after which it was dried to produce activated carbon 2b.

A laser diffraction particle size distribution analyzer (SALD-2000J) by Shimadzu Corp. was used to measure the mean particle diameter of the activated carbon 2b, which was found to be 7.0 μm. Also, a pore distribution measuring apparatus (AUTOSORB-1 AS-1-MP) by Yuasa-Ionics, Inc. was used to measure the pore distribution of the activated carbon 2b. As a result, the BET specific surface area was 3627 m$^2$/g, the mesopore volume ($V_1$) was 1.50 cc/g, the micropore volume ($V_2$) was 2.28 cc/g, and $V_1/V_2$=0.66.

<Pulverization of Lithium Carbonate>

Using a pulverizer (LNM liquid nitrogen bead mill) by Aimex Corp., 200 g of lithium carbonate with a mean particle diameter of 53 μm was cooled to −196° C. with liquid nitrogen and pulverized for 20 minutes at a peripheral velocity of 10.0 m/s, using dry ice beads, to obtain lithium carbonate 3. By cooling to −196° C. it is possible to cause brittle fracture while preventing heat denaturation of the lithium carbonate. The mean particle diameter of the obtained lithium carbonate 3 was measured to be 1.8 μm.

<Production of Positive Electrode Precursor>

The activated carbon 2b was used as a positive electrode active material to produce a positive electrode precursor, with lithium carbonate 3 as the lithium compound.

After mixing 55.5 parts by weight of activated carbon 2b, 32.0 parts by weight of lithium carbonate 3, 3.0 parts by weight of Ketchen black, 1.5 parts by weight of PVP (polyvinylpyrrolidone), 8.0 parts by weight of PVDF (polyvinylidene fluoride) and NMP (N-methylpyrrolidone), the mixture was dispersed using a FILMIX® thin-film rotating-type high speed mixer by Primix Corp., under conditions with a circumferential speed of 17 m/s, to obtain coating solution 1. The viscosity ($\eta$b) and TI value of the obtained coating solution 1 were measured using a TVE-35H E-type viscometer by Toki Sangyo Co., Ltd. As a result, the viscosity ($\eta$b) was 2,300 mPa·s and the TI value was 3.2. The degree of dispersion of the obtained coating solution 1 was measured using a fineness gauge by Yoshimitsu Seiki Co. As a result, the granularity was 32 μm. Coating solution 1 was coated onto one or both sides of an aluminum foil with a thickness of 15 μm using a double-side die coater by Toray Engineering Co., Ltd. under conditions with a coating speed of 1 m/s, and dried at a drying temperature of 120° C. to obtain positive electrode precursor 3 (one side) and positive electrode precursor 3 (both sides). During coating of the coating solution 1 onto both sides of the aluminum foil, the discharge pressure of the top face die was 55 kPa, and the discharge pressure of the bottom face die was 60 kPa. The obtained positive electrode precursor 3 (one side) and positive electrode precursor 3 (both sides) were pressed using a roll press under conditions with a pressure of 6 kN/cm and a pressed portion surface temperature of 25° C. The total thickness of the positive electrode precursor 3 (both sides) was measured at 10 arbitrary locations of the positive electrode precursor 3 (both sides) using a Linear Gauge Sensor GS-551. by Ono Sokki Co., Ltd. The thickness of the aluminum foil was subtracted from the mean value for the measured total thickness, to determine the film thickness of the positive electrode active material layer of the positive electrode precursor 3 (both sides). As a result, the film thickness of the positive electrode active material layer was 58 μm on the top face and 61 μm on the bottom face.

Preparation of Negative Electrode Active Material: Preparation Example 2a$_2$

The BET specific surface area and pore distribution of commercially available artificial graphite was measured by the method described above, using a pore distribution measuring apparatus (AUTOSORB-1 AS-1-MP) by Yuasa-Ionics, Inc. As a result, the BET specific surface area was 3.1 m$^2$/g and the mean particle diameter was 4.8 μm.

A 300 g portion of the artificial graphite was placed into a stainless steel mesh basket and placed on a stainless steel vat containing 30 g of coal-based pitch (softening point: 50° C.), and both were set in an electric furnace (furnace inner usable dimension: 300 mm×300 mm×300 mm). This was increased in temperature to 1000° C. for 12 hours under a nitrogen atmosphere, and kept at the same temperature for 5 hours for thermal reaction to obtain composite porous carbon material 2a$_2$. The obtained composite porous carbon material 2a$_2$ was cooled to 60° C. by natural cooling, and then removed out of the electric furnace.

The BET specific surface area and pore distribution of the obtained composite porous carbon material 2a$_2$ were measured by the same methods as described above. As a result, the BET specific surface area was 6.1 m$^2$/g and the mean particle diameter was 4.9 μm. Also, for composite porous carbon material 2a$_2$, the weight ratio of coal-based pitch-derived carbonaceous material with respect to activated carbon was 2.0%.

<Production of Negative Electrode>

Composite porous carbon material 2a$_2$ was used as a negative electrode active material to produce a negative electrode.

After mixing 84 parts by weight of composite porous carbon material 2a$_2$, 10 parts by weight of acetylene black, 6 parts by weight of PVdF (polyvinylidene fluoride) and NMP (N-methylpyrrolidone), the mixture was dispersed using a FILMIX thin-film rotating-type high speed mixer by Primix Corp., under conditions with a peripheral velocity of 17 m/s, to obtain a coating solution. The viscosity ($\eta$b) and TI value of the obtained coating solution were measured using a TVE-35H E-type viscometer by Toki Sangyo Co., Ltd. As a result, the viscosity ($\eta$b) was 2,326 mPa·s and the TI value was 2.7. The coating solution was coated onto both sides of an electrolytic copper foil with a thickness of 10 μm using a die coater by Toray Engineering Co., Ltd. under conditions with a coating speed of 2 m/s, and dried at a drying temperature of 120° C. to obtain negative electrode 3. The obtained negative electrode 3 was pressed using a roll press under conditions with a pressure of 5 kN/cm and a pressed portion surface temperature of 25° C. The total thickness of the pressed negative electrode 3 was measured at 10 arbitrary locations of negative electrode 3, using a Linear Gauge Sensor GS-551 by Ono Sokki Co., Ltd. The total thickness of the copper foil was subtracted from the mean value of the measured film thickness, to determine the film thickness of the negative electrode active material layer of negative electrode 3. As a result, the film thickness of the negative electrode active material layers was 30 μm per side.

[Measurement of Capacitance Per Unit Weight of Negative Electrode]

One piece of the obtained negative electrode 3 was cut out to a size of 1.4 cm×2.0 cm (2.8 cm$^2$), and the negative electrode active material layer coated onto both sides of the copper foil was removed on one side using a spatula, brush or bristles to obtain a working electrode. Metal lithium was used as the counter electrode and reference electrode, to fabricate an electrochemical cell in an argon box, using a nonaqueous solution of LiPF$_6$ dissolved to a concentration of 1.0 mol/L in a mixed solvent of ethylene carbonate (EC) and ethylmethyl carbonate (EMC) at a volume ratio of 1:1, as the electrolytic solution.

The initial charging capacitance of the obtained electrochemical cell was measured by the following procedure using a charge/discharge apparatus (TOSCAT-3100U) by Toyo System Co., Ltd.

The electrochemical cell was subjected to constant-current charge at a temperature of 25° C., with a current value of 0.5 mA/cm$^2$ until reaching a voltage value of 0.01 V, and then to constant-voltage charge until the current value reached 0.01 mA/cm$^2$. When the charge capacity during constant-current charge and constant-voltage charge was evaluated as the initial charge capacity, it was found to be 0.74 mAh, and the capacitance per unit weight of negative electrode 3 (lithium ion doping amount) was 545 mAh/g.

<Preparation of Electrolytic Solution>

As an organic solvent there was used a mixed solvent of ethylene carbonate (EC):ethyl methyl carbonate (EMC)=33:67 (volume ratio), and each electrolyte salt was dissolved so that the concentration ratio of LiN(SO$_2$F)$_2$ and LiPF$_6$ was 75:25 (molar ratio) with respect to the total electrolytic solution and the total concentration of LiN(SO$_2$F)$_2$ and LiPF$_6$ was 1.2 mol/L, to obtain nonaqueous electrolytic solution 2. The concentrations of LiN(SO$_2$F)$_2$ and LiPF$_6$ in nonaqueous electrolytic solution 2 were 0.9 mol/L and 0.3 mol/L, respectively.

<Fabrication of Nonaqueous Lithium Power Storage Element>

The obtained positive electrode precursor 3 was cut into two positive electrode precursors 3 (one side) and 19 positive electrode precursors 3 (both sides), with the positive electrode active material layers at sizes of 10.0 cm×10.0 cm (100 cm$^2$). Twenty negative electrodes 3 were then cut out, with the negative electrode active material layers at sizes of 10.1 cm×10.1 cm (102 cm$^2$). Also, 40 10.3 cm×10.3 cm (106 cm$^2$) polyethylene separators (by ASAHI KASEI KABUSHIKI KAISHA, thickness: 10 μm) were prepared. These were laminated in the order: positive electrode precursor 3, separator, negative electrode 3, with the positive electrode active material layers and negative electrode active material layers facing each other across the separators, and positive electrode precursors 3 (one side) as the outermost layers, to obtain an electrode laminated body. The positive electrode terminal and negative electrode terminal were ultrasonically welded to the obtained electrode laminated body and placed in a vessel formed of an aluminum laminate package material equipped with a check-valved degassing valve, and 3 sides including the electrode terminal section were sealed by heat sealing.

Approximately 80 g of the nonaqueous electrolytic solution 1 was injected into the electrode laminated body housed in the aluminum laminate package material, in a dry air environment at atmospheric pressure, a temperature of 25° C. and a dew point of no higher than −40° C. Next, it was placed in a pressure reduction chamber and the pressure was reduced from atmospheric pressure to −87 kPa, after which it was restored to atmospheric pressure and allowed to stand for 5 minutes. The step of reducing the pressure from atmospheric pressure to −87 kPa and then restoring to atmospheric pressure was subsequently repeated 4 times, and it was then allowed to stand for 15 minutes. The pressure was again reduced from atmospheric pressure to −91 kPa, and then restored to atmospheric pressure. The step of pressure reduction and restoration to atmospheric pressure in the same manner was repeated a total of 7 times (pressure reduction from atmospheric pressure to −95, −96, −97, −81, −97, −97 and −97 kPa, respectively). The electrode laminated body was impregnated with the nonaqueous electrolytic solution 2 by this procedure.

Next, the electrode laminated body impregnated with the nonaqueous electrolytic solution 2 was placed in a pressure-reducing sealing machine, and with the pressure reduced to −95 kPa, it was sealed at 180° C. for 10 seconds at a pressure of 0.1 MPa to seal the aluminum laminate package material.

[Lithium Doping Step]

The obtained electrode laminated body was subjected to initial charging by a method of constant-current charging in a thermostatic bath at a temperature of 25° C., using a charge/discharge apparatus (ACDS-10APS-05N) by Aska Electronic Co., Ltd., with a current value of 1 A until reaching a voltage of 4.5 V, followed by constant-voltage charge at 4.5 V continued for 20 hours, for lithium doping of the negative electrode.

[Aging Step]

The lithium-doped electrode laminated body was removed from the argon box and subjected to constant-current discharge in an environment of 25° C. at 50 mA until reaching a voltage of 3.0 V, and then constant-current discharge at 3.0 V for 1 hour, to adjust the voltage to 3.0 V.

The electrode laminated body was then stored for 48 hours in a thermostatic bath at 60° C.

[Degassing Step]

A portion of the aluminum laminate package material of the aged electrode laminated body was unsealed in a dry air environment with a temperature of 25° C. and a dew point of −40° C. Next, the electrode laminated body was placed in a pressure reduction chamber, and a step of using a diaphragm pump (N816.3KT.45.18 by KNF Co.) for pressure reduction over a period of 3 minutes from atmospheric pressure to −80 kPa, followed by restoration to atmospheric pressure over a period of 3 minutes, was repeated 3 times. Next, the electrode laminated body was placed in a pressure-reducing sealing machine and the pressure was reduced to −90 kPa, after which it was sealed at 200° C. for 10 seconds at a pressure of 0.1 MPa to seal the aluminum laminate package material. Two nonaqueous lithium power storage elements were fabricated by this step.

<Evaluation of Nonaqueous Lithium Power Storage Elements>

[Measurement of Electrostatic Capacitance Fa]

One of the obtained nonaqueous lithium power storage elements was subjected to constant-current charge using a charge/discharge apparatus (5 V, 360 A) by Fujitsu Telecom Networks, Fukushima Ltd. in a thermostatic bath set to 25° C., with a 2 C current value (1.5 A) until reaching 3.8 V, and then constant-voltage charge was carried out with application of a constant voltage of 3.8 V for a total of 30 minutes. Next, with the capacitance after constant-current discharge to 2.2 V at the 2 C current value (1.5 A) as Q (C), F=Q/(3.8−2.2) was calculated as the electrostatic capacitance Fa, to be 1759 F.

[Calculation of Internal Resistance Ra]

The same nonaqueous lithium power storage element was subjected to constant-current charge using a charge/discharge apparatus (5 V, 360 A) by Fujitsu Telecom Networks, Fukushima Ltd. in a thermostatic bath set to 25° C., with a 20 C current value (10 A) until reaching 3.8 V, and then constant-voltage charge was carried out with application of a constant voltage of 3.8 V for a total of 30 minutes. Next, constant-current discharge was carried out to 2.2 V with a sampling time of 0.1 second and the 20 C current value (10 A), to obtain a discharge curve (time-voltage). From the discharge curve, with a voltage of Eo at discharge time=0 seconds, obtained by extrapolating by linear approximation from the voltage values at discharge times of 2 seconds and 4 seconds, the internal resistance Ra was calculated from the voltage drop ΔE=3.8−Eo and R=ΔE/(20 C current value), to be 0.52 mΩ.

[High-Temperature Storage Test]

The same nonaqueous lithium power storage element was subjected to constant-current charge using a charge/discharge apparatus (5 V, 360 A) by Fujitsu Telecom Networks, Fukushima Lyd. in a thermostatic bath set to 25° C., with a 100 C current value until reaching 4.0 V, and then constant-voltage charge was carried out with application of a constant voltage of 4.0 V for a total of 10 minutes. The cell was then stored in a 60° C. environment, and every 2 weeks it was removed out from the 60° C. environment, the cell voltage was charged to 4.0 V by the same charging step, and the cell was again stored in a 60° C. environment. This step was repeated for a period of 2 months, and the cell volume Va before start of the storage test and the volume Vb of the cell after two months of the storage test were measured by Archimedes' method in a 25° C. environment, using FLUORINERT (registered trademark of 3M Co. Japan) FC-40 as the measuring solvent. The value of B, as the gas generation volume determined by Vb−Va normalized by the electrostatic capacitance Fa, was $1.72 \times 10^{-3}$ cc/F.

The internal resistance Rc calculated with respect to the nonaqueous lithium power storage element after the same high-temperature storage test was 0.59 mΩ, and the Rc/Ra value was 1.13.

<Quantitation of Lithium Compound>
[Preparation of Positive Electrode Sample]

The remaining nonaqueous lithium power storage element that has been obtained was disassembled in an argon box with a dew point temperature of −72° C., and the positive electrode (both sides) coated on both sides with the positive electrode active material layer was cut out to a size of 10 cm×10 cm and immersed in 30 g of a diethyl carbonate solvent, occasionally moving the positive electrode with a pincette, and was washed for 10 minutes. The positive electrode was then removed out and air-dried for 5 minutes in an argon box, and the positive electrode was immersed in 30 g of freshly prepared diethyl carbonate solvent and washed for 10 minutes by the same method as described above. The washed positive electrode was removed from the argon box, and a vacuum dryer (DP33 by Yamato Scientific Co., Ltd.) was used for drying for 20 hours at a temperature of 25° C. and a pressure of 1 kPa, to obtain positive electrode sample 2.

<Calculation of $C_{y1}$, $C_{x1}$, $C_{y2}$ and $C_{x2}$>

Two pieces of the obtained positive electrode sample 2 were cut out to sizes of 5 cm×5 cm (weight: 0.259 g), and used as positive electrode sample 2-1 and positive electrode sample 2-2, respectively. The positive electrode active material layer on the front side of the positive electrode sample 2-1 and the back side of the positive electrode sample 2-2 was removed using a spatula, brush or bristles, and each was immersed in 20 g of ethanol, and the vessel was capped and allowed to stand for 3 days in a 25° C. environment. The positive electrode samples were then removed out and vacuum dried for 10 hours under conditions of 120° C., 5 kPa. After vacuum drying, the weight $M_{01}$ of the positive electrode sample 2-1 was 0.176 g and the weight $M_{02}$ of the positive electrode sample 2-2 was 0.183 g. The ethanol solution after washing was measured by GC/MS under conditions with a predrawn calibration curve, and a diethyl carbonate abundance of less than 1% was confirmed. Next, positive electrode sample 2-1 and positive electrode sample 2-2 were each thoroughly wetted with 20.0 g of distilled water, and the vessel was capped and allowed to stand for 3 days in a 45° C. environment. The positive electrodes were then removed out and vacuum dried for 12 hours under conditions of 150° C., 3 kPa. After vacuum drying, the weight $M_{11}$ was 0.170 g and the weight $M_{12}$ was 0.174 g. The distilled water after washing was measured by GC/MS under conditions with a predrawn calibration curve, and an ethanol abundance of less than 1% was confirmed. Next, a spatula, brush or bristles were used to remove off all of the positive electrode active material layer of the positive electrode sample 2-1 and positive electrode sample 2-2, and the weights $M_{21}$ and $M_{22}$ of the positive electrode power collectors were measured to be 0.100 g each. The basis weights of the positive electrodes were $C_{y1}$=30.4 g/m² and $C_{x1}$=33.2 g/m², according to formula (5). The lithium compound amounts were $C_{y2}$=2.4 g/m² and $C_{x2}$=3.6 g/m², according to formula (6).

Therefore, $C_{y1}/C_{x1}$ was 0.92 and $C_{y2}/C_{x2}$ was 0.67.

<Calculation of $A_1$ and $A_2$>
[SEM and EDX Measurement of Positive Electrode Surface]

A small 1 cm×1 cm piece was cut out from the remaining positive electrode sample 2, and the front side was coated by sputtering of gold in a vacuum of 10 Pa. Next, the positive electrode surface was measured by SEM and EDX with atmospheric exposure, under the conditions described below.

(SEM-EDX Measuring Conditions)
    Measuring apparatus: FE-SEM S-4700 Electrolytic emission scanning electron microscope by Hitachi High-Technologies Corp.
    Acceleration voltage: 10 kV
    Emission current: 10 µA
    Measurement magnification: 2000×
    Electron beam incident angle: 90°
    X-ray take-off angle: 30°
    Dead time: 15%
    Mapping elements: C, O, F
    Measurement pixel count 256×256 pixels
    Measuring time: 60 sec
    Number of scans: 50
    Adjustment of the luminance and contrast so that no pixel reached the maximum luminance in the mapping image, and the average value of brightness fell within the range of 40% to 60% of the maximum luminance value.

(SEM-EDX Analysis)

Image analysis software (ImageJ) was used for binarization based on the average value of brightness, for the obtained oxygen mapping and fluorine mapping. The oxygen mapping area during this time was 14.5% of the total image, and the fluorine mapping area was 32.2%. The area of overlap between oxygen mapping and fluorine mapping obtained by binarization was 12.1% of the total image, and by using $A_1$ (%) as the area overlap ratio of fluorine mapping with respect to oxygen mapping it was possible to calculate: $A_1$=100×12.1/14.5, as 83.4%.

[SEM and EDX Measurement of Positive Electrode Cross-Section]

A small 1 cm×1 cm piece was cut out from positive electrode sample 2, and an SM-09020CP by JEOL Ltd., was used to create a cross-section perpendicular to the in-plane direction of positive electrode sample 2 using argon gas, under conditions with an acceleration voltage of 4 kV and a beam diameter of 500 µm. Next, SEM and EDX measurement of the positive electrode cross-section were carried out by the methods described above.

The images obtained from SEM and EDX of the measured positive electrode cross-section were subjected to image analysis using image analysis software (ImageJ), and $X_1$ and $Y_1$ were calculated. The cross-sectional area S was determined for all of the particles X and Y observed in the cross-sectional SEM image, the lithium compound particles X being the particles containing a bright portion equal to 50% or more of the area thereof when binarized based on the average value of brightness with respect to the obtained oxygen mapping, and the positive electrode active material particles Y being the other particles, and the particle diameter d was determined by calculation using the following formula (1). ($\pi$ is the circular constant)

[Math. 10]

$$d = 2 \times (S/\pi)^{1/2} \qquad (1)$$

Each obtained particle diameter d was used to determine the volume-average particle diameters $X_0$ and $Y_0$, by the following formula (2).

[Math. 11]

$$X_0(Y_0) = \Sigma[4/3\pi \times (d/2)^3 \times d] / \Sigma[4/3\pi \times (d/2)^3] \qquad (2)$$

Measurement was performed at a total of 5 locations, varying the visual field of the positive electrode cross-section, and the mean particle diameter $X_1$ was 1.4 μm and $Y_1$ was 7.1 μm, as the mean values of $X_0$ and $Y_0$, respectively.

Next, the oxygen mapping and fluorine mapping were binarized in the same manner as above, for the SEM-EDX of the obtained positive electrode cross-section, and the area overlap ratio $A_2$ of fluorine mapping with respect to oxygen mapping was calculated to be 35.4%.

Example 33

A nonaqueous lithium power storage element was fabricated by the same method as Example 32, except that for initial charging of the nonaqueous lithium power storage element in the lithium doping step, constant-current charge was carried out at a current value of 1 A until reaching a voltage of 4.5 V, and then constant-voltage charge was carried out at 4.5 V continuously for 40 hours, for lithium doping at the negative electrode.

Example 34

A nonaqueous lithium power storage element was fabricated by the same method as Example 32, except that for initial charging of the nonaqueous lithium power storage element in the lithium doping step, constant-current charge was carried out at a current value of 1 A until reaching a voltage of 4.5 V, and then constant-voltage charge was carried out at 4.5 V continuously for 80 hours, for lithium doping at the negative electrode.

Example 35

A nonaqueous lithium power storage element was fabricated by the same method as Example 32, except that for initial charging of the nonaqueous lithium power storage element in the lithium doping step, constant-current charge was carried out at a current value of 1 A until reaching a voltage of 4.5 V, and then constant-voltage charge was carried out at 4.5 V continuously for 10 hours, for lithium doping at the negative electrode.

Example 36

A nonaqueous lithium power storage element was fabricated by the same method as Example 32, except that for initial charging of the nonaqueous lithium power storage element in the lithium doping step, constant-current charge was carried out at a current value of 1 A until reaching a voltage of 4.2 V, and then constant-voltage charge was carried out at 4.2 V continuously for 10 hours, for lithium doping at the negative electrode.

Example 37

A nonaqueous lithium power storage element was fabricated by the same method as Example 32, except that for initial charging of the nonaqueous lithium power storage element in the lithium doping step, constant-current charge was carried out at a current value of 1 A until reaching a voltage of 4.2 V, and then constant-voltage charge was carried out at 4.2 V continuously for 3 hours, for lithium doping at the negative electrode.

Example 38

A nonaqueous lithium power storage element was fabricated by the same method as Example 32, except that for initial charging of the nonaqueous lithium power storage element in the lithium doping step, constant-current charge was carried out at a current value of 1 A until reaching a voltage of 4.2 V, and then constant-voltage charge was carried out at 4.2 V continuously for 2 hours, for lithium doping at the negative electrode.

Example 39

A nonaqueous lithium power storage element was fabricated by the same method as Example 32, except that the positive electrode precursor (both sides) was fabricated with a discharge pressure of 40 kPa at the top face die and a discharge pressure of 60 kPa at the bottom face die, during coating of the positive electrode precursor (both sides).

Example 40

A nonaqueous lithium power storage element was fabricated by the same method as Example 33, except that the positive electrode precursor (both sides) was fabricated with a discharge pressure of 40 kPa at the top face die and a discharge pressure of 60 kPa at the bottom face die, during coating of the positive electrode precursor (both sides).

Example 41

A nonaqueous lithium power storage element was fabricated by the same method as Example 34, except that the positive electrode precursor (both sides) was fabricated with a discharge pressure of 40 kPa at the top face die and a discharge pressure of 60 kPa at the bottom face die, during coating of the positive electrode precursor (both sides).

Example 42

A nonaqueous lithium power storage element was fabricated by the same method as Example 32, except that the positive electrode precursor (both sides) was fabricated with a discharge pressure of 55 kPa at the top face die and a discharge pressure of 58 kPa at the bottom face die, during coating of the positive electrode precursor (both sides).

Example 43

A nonaqueous lithium power storage element was fabricated by the same method as Example 33, except that the positive electrode precursor (both sides) was fabricated with a discharge pressure of 55 kPa at the top face die and a discharge pressure of 58 kPa at the bottom face die, during coating of the positive electrode precursor (both sides).

Example 44

A nonaqueous lithium power storage element was fabricated by the same method as Example 39, except that for initial charging of the nonaqueous lithium power storage element in the lithium doping step, constant-current charge was carried out at a current value of 1 A until reaching a voltage of 4.2 V, and then constant-voltage charge was carried out at 4.2 V continuously for 10 hours, in a thermostatic bath at 45° C., for lithium doping at the negative electrode.

Example 45

A nonaqueous lithium power storage element was fabricated by the same method as Example 39, except that for initial charging of the nonaqueous lithium power storage element in the lithium doping step, constant-current charge was carried out at a current value of 1 A until reaching a voltage of 4.2 V, and then constant-voltage charge was carried out at 4.2 V continuously for 5 hours, in a thermostatic bath at 45° C., for lithium doping at the negative electrode.

Comparative Example 28

A nonaqueous lithium power storage element was fabricated by the same method as Example 32, except that for initial charging of the nonaqueous lithium power storage element in the lithium doping step, constant-current charge was carried out at a current value of 1 A until reaching a voltage of 4.7 V, and then constant-voltage charge was carried out at 4.7 V continuously for 50 hours, in a thermostatic bath at 80° C., for lithium doping at the negative electrode.

Comparative Example 29

Mixing 52.5 parts by weight of activated carbon 2b, 35.0 parts by weight of lithium carbonate 3, 3.0 parts by weight of Ketchen black, 1.5 parts by weight of PVP (polyvinylpyrrolidone), 8.0 parts by weight of PVDF (polyvinylidene fluoride) and NMP (N-methylpyrrolidone), coating solution 2 was prepared by the same method as Example 32. A positive electrode precursor 4 (both sides) was fabricated by the same method as Example 32, with coating solution 1 being coated onto the front side of a 15 μm aluminum foil with a die discharge pressure of 50 kPa, and coating solution 2 being coated onto the back side of the aluminum foil with a die discharge pressure of 50 kPa.

A nonaqueous lithium power storage element was fabricated by the same method as Example 32, except for using two positive electrode precursors 3 (one side), 19 positive electrode precursors 4 (both sides) and 20 negative electrodes 3.

Comparative Example 30

A nonaqueous lithium power storage element was fabricated by the same method as Comparative Example 29, except that for initial charging of the nonaqueous lithium power storage element in the lithium doping step, constant-current charge was carried out at a current value of 1 A until reaching a voltage of 4.5 V, and then constant-voltage charge was carried out at 4.5 V continuously for 10 hours, for lithium doping at the negative electrode.

Comparative Example 31

A nonaqueous lithium power storage element was fabricated by the same method as Comparative Example 29, except that for initial charging of the nonaqueous lithium power storage element in the lithium doping step, constant-current charge was carried out at a current value of 1 A until reaching a voltage of 4.3 V, and then constant-voltage charge was carried out at 4.3 V continuously for 10 hours, for lithium doping at the negative electrode.

Comparative Example 32

A nonaqueous lithium power storage element was fabricated by the same method as Comparative Example 29, except that for initial charging of the nonaqueous lithium power storage element in the lithium doping step, constant-current charge was carried out at a current value of 1 A until reaching a voltage of 4.2 V, and then constant-voltage charge was carried out at 4.2 V continuously for 2 hours, for lithium doping at the negative electrode.

Comparative Example 33

A nonaqueous lithium power storage element was fabricated by the same method as Comparative Example 29, except that for initial charging of the nonaqueous lithium power storage element in the lithium doping step, constant-current charge was carried out at a current value of 1 A until reaching a voltage of 4.2 V, and then constant-voltage charge was carried out at 4.2 V continuously for 1 hour, for lithium doping at the negative electrode.

Comparative Example 34

Mixing 50.0 parts by weight of activated carbon 2b, 37.5 parts by weight of lithium carbonate 3, 3.0 parts by weight of Ketchen black, 1.5 parts by weight of PVP (polyvinylpyrrolidone), 8.0 parts by weight of PVDF (polyvinylidene fluoride) and NMP (N-methylpyrrolidone), coating solution 3 was prepared by the same method as Example 32. A positive electrode precursor 5 (both sides) was fabricated by the same method as Example 32, with coating solution 1 being coated onto the front side of a 15 μm aluminum foil with a die discharge pressure of 50 kPa, and coating solution 3 being coated onto the back side of the aluminum foil with a die discharge pressure of 50 kPa.

A nonaqueous lithium power storage element was fabricated by the same method as Example 32, except for using two positive electrode precursors 3 (one side), 19 positive electrode precursors 5 (both sides) and 20 negative electrodes 3.

Comparative Example 35

A nonaqueous lithium power storage element was fabricated by the same method as Comparative Example 34, except that for initial charging of the nonaqueous lithium power storage element in the lithium doping step, constant-current charge was carried out at a current value of 1 A until reaching a voltage of 4.5 V, and then constant-voltage charge was carried out at 4.5 V continuously for 10 hours, for lithium doping at the negative electrode.

Comparative Example 36

A nonaqueous lithium power storage element was fabricated by the same method as Comparative Example 34, except that for initial charging of the nonaqueous lithium power storage element in the lithium doping step, constant-current charge was carried out at a current value of 1 A until reaching a voltage of 4.3 V, and then constant-voltage charge was carried out at 4.3 V continuously for 10 hours, for lithium doping at the negative electrode.

Comparative Example 37

A nonaqueous lithium power storage element was fabricated by the same method as Comparative Example 34, except that for initial charging of the nonaqueous lithium power storage element in the lithium doping step, constant-current charge was carried out at a current value of 1 A until reaching a voltage of 4.2 V, and then constant-voltage charge was carried out at 4.2 V continuously for 2 hours, for lithium doping at the negative electrode.

The evaluation results for the nonaqueous lithium power storage elements of Examples 32 to 45 and Comparative Examples 28 to 37 are shown in Table 3.

measured by the method described above, using a pore distribution measuring apparatus (AUTOSORB-1 AS-1-MP) by Yuasa-Ionics, Inc. As a result, the BET specific surface area was 1,790 m²/g, the mesopore volume ($V_1$) was

TABLE 3

|  | Fa [F] | Ra [mΩ] | Rc [mΩ] | Rc/Ra | B × 10⁻³ [cc/F] | $C_{y1}$ [g/m²] | $C_{x1}$ [g/m²] | $C_{y2}$ [g/m²] | $C_{x2}$ [g/m²] | $C_{y1}/C_{x1}$ | $C_{y2}/C_{x2}$ | $X_1$ [μm] | $Y_1$ [μm] | $A_1$ [%] | $A_2$ [%] |
|---|---|---|---|---|---|---|---|---|---|---|---|---|---|---|---|
| Example 32 | 1759 | 0.52 | 0.59 | 1.13 | 1.72 | 30.4 | 33.2 | 2.4 | 3.6 | 0.92 | 0.67 | 1.4 | 7.1 | 83.4 | 35.4 |
| Example 33 | 1775 | 0.58 | 0.64 | 1.10 | 1.65 | 29.7 | 31.9 | 1.2 | 2.8 | 0.93 | 0.43 | 1.2 | 7.0 | 90.3 | 42.1 |
| Example 34 | 1791 | 0.61 | 0.65 | 1.07 | 1.47 | 28.6 | 31.1 | 0.4 | 2.3 | 0.92 | 0.17 | 0.7 | 6.8 | 97.6 | 58.2 |
| Example 35 | 1693 | 0.52 | 0.61 | 1.17 | 2.12 | 32.1 | 35.6 | 4.2 | 6.6 | 0.90 | 0.64 | 2.3 | 7.0 | 60.2 | 21.2 |
| Example 36 | 1645 | 0.55 | 0.62 | 1.13 | 2.42 | 35.2 | 40.3 | 7.1 | 10.3 | 0.87 | 0.69 | 2.4 | 7.1 | 45.2 | 14.8 |
| Example 37 | 1613 | 0.57 | 0.63 | 1.11 | 2.38 | 37.4 | 42.2 | 10.2 | 11.8 | 0.89 | 0.86 | 2.1 | 6.8 | 41.1 | 11.7 |
| Example 38 | 1598 | 0.61 | 0.69 | 1.13 | 2.56 | 39.2 | 42.9 | 11.8 | 12.6 | 0.91 | 0.94 | 2.2 | 6.9 | 42.4 | 10.6 |
| Example 39 | 1712 | 0.55 | 0.61 | 1.11 | 1.96 | 27.3 | 37.2 | 1.5 | 9.4 | 0.73 | 0.16 | 1.7 | 7.2 | 79.6 | 37.9 |
| Example 40 | 1736 | 0.57 | 0.62 | 1.09 | 1.89 | 26.9 | 35.1 | 1.0 | 7.4 | 0.77 | 0.14 | 1.5 | 7.1 | 86.8 | 43.6 |
| Example 41 | 1767 | 0.59 | 0.63 | 1.07 | 1.71 | 26.4 | 33.4 | 0.6 | 5.5 | 0.79 | 0.11 | 0.9 | 7.0 | 97.6 | 57.3 |
| Example 42 | 1779 | 0.51 | 0.57 | 1.12 | 1.69 | 31.1 | 32.2 | 2.9 | 3.2 | 0.97 | 0.91 | 1.1 | 6.9 | 85.5 | 39.7 |
| Example 43 | 1791 | 0.52 | 0.58 | 1.12 | 1.48 | 30.5 | 31.3 | 2.3 | 2.5 | 0.97 | 0.92 | 0.6 | 6.8 | 94.7 | 53.3 |
| Example 44 | 1731 | 0.61 | 0.67 | 1.10 | 1.97 | 27.1 | 38.3 | 1.1 | 9.8 | 0.71 | 0.11 | 1.3 | 7.1 | 87.5 | 46.5 |
| Example 45 | 1689 | 0.59 | 0.66 | 1.12 | 2.31 | 27.4 | 38.8 | 1.5 | 10.1 | 0.71 | 0.15 | 1.5 | 7.0 | 79.7 | 36.8 |
| Comp. Example 28 | 1381 | 1.02 | 1.56 | 1.53 | 9.45 | 28.2 | 29.6 | 0.0 | 0.1 | 0.95 | 0.00 | — | 7.1 | — | — |
| Comp. Example 29 | 1689 | 0.56 | 1.02 | 1.82 | 4.32 | 31.4 | 32.2 | 3.2 | 2.5 | 0.98 | 1.28 | 1.5 | 6.9 | 85.3 | 33.2 |
| Comp. Example 30 | 1631 | 0.58 | 1.12 | 1.93 | 5.86 | 32.2 | 33.1 | 4.6 | 3.3 | 0.97 | 1.39 | 1.8 | 6.8 | 65.9 | 24.3 |
| Comp. Example 31 | 1575 | 0.61 | 1.32 | 2.16 | 7.46 | 37.4 | 37.9 | 9.6 | 7.0 | 0.99 | 1.37 | 2.1 | 7.1 | 45.2 | 13.2 |
| Comp. Example 32 | 1367 | 0.64 | 1.65 | 2.58 | 9.86 | 40.1 | 40.5 | 11.2 | 9.1 | 0.99 | 1.23 | 2.2 | 7.0 | 36.2 | 8.6 |
| Comp. Example 33 | 1211 | 0.71 | 1.98 | 2.79 | 12.13 | 43.1 | 44.1 | 13.6 | 11.7 | 0.98 | 1.16 | 2.3 | 7.1 | 31.3 | 5.3 |
| Comp. Example 34 | 1621 | 0.57 | 1.21 | 2.12 | 6.32 | 32.2 | 33.1 | 5.2 | 3.1 | 0.97 | 1.68 | 1.4 | 6.9 | 75.8 | 36.3 |
| Comp. Example 35 | 1511 | 0.58 | 1.32 | 2.28 | 8.21 | 34.2 | 35.4 | 7.2 | 5.3 | 0.97 | 1.36 | 1.6 | 7.2 | 57.3 | 25.4 |
| Comp. Example 36 | 1426 | 0.62 | 1.54 | 2.48 | 9.76 | 36.2 | 37.5 | 9.1 | 7.2 | 0.97 | 1.26 | 2.0 | 7.1 | 41.1 | 13.3 |
| Comp. Example 37 | 1217 | 0.68 | 1.87 | 2.75 | 11.07 | 38.7 | 39.9 | 11.5 | 9.6 | 0.97 | 1.20 | 2.3 | 7.1 | 34.3 | 7.8 |

Example 46

<Pulverization of Lithium Carbonate>

A 200 g portion of lithium carbonate having a mean particle diameter of 53 μm was allowed to stand for 5 hours in a high-temperature, high-humidity chamber (SML-2, product of Espec Corp.), at a humidity of 70% and a temperature of 45° C. A pulverizer (LNM liquid nitrogen bead mill) by Aimex Corp. was then used for cooling to −196° C. with liquid nitrogen and φ1.0 mm zirconia beads were used for pulverization for 30 minutes at a peripheral velocity of 10.0 m/s, to obtain lithium carbonate 4. By cooling to −196° C. it is possible to cause brittle fracture while preventing heat denaturation of the lithium carbonate. The mean particle diameter of the obtained lithium carbonate 4 was measured to be 4.5 μm.

<Production of Positive Electrode Precursor>

Mixing 48.0 parts by weight of activated carbon 1d, 43.0 parts by weight of lithium carbonate 4, 2.5 parts by weight of Ketchen black, 1.5 parts by weight of PVP (polyvinylpyrrolidone), 5.0 parts by weight of PVDF (polyvinylidene fluoride) and NMP (N-methylpyrrolidone), coating solution 4 was prepared by the same method as Example 32. A positive electrode precursor 6 (both sides) was fabricated by the same method as Example 32, with coating solution 4 being coated onto both sides of a 15 μm aluminum foil, at a die discharge pressure of 55 kPa on the top face and a die discharge pressure of 60 kPa on the bottom face. In addition, a positive electrode precursor 6 (one side) was fabricated with coating of coating solution 4 onto one side of a 15 μm aluminum foil at a die discharge pressure of 55 kPa.

Preparation of Negative Electrode Active Material: Preparation Example 1a₂

The BET specific surface area and pore distribution of commercially available coconut shell activated carbon was 0.199 cc/g, the micropore volume ($V_2$) was 0.698 cc/g, $V_1/V_2=0.29$, and the mean pore size was 20.1 Å.

A 300 g portion of the coconut shell activated carbon was placed into a stainless steel mesh basket and placed on a stainless steel vat containing 540 g of coal-based pitch (softening point: 50° C.), and both were set in an electric furnace (furnace inner usable dimension: 300 mm×300 mm×300 mm). This was increased in temperature to 600° C. for 8 hours under a nitrogen atmosphere, and kept at the same temperature for 4 hours for thermal reaction to obtain composite porous carbon material 1a₂. The obtained composite porous carbon material 1a₂ was cooled to 60° C. by natural cooling, and then removed out of the electric furnace.

The BET specific surface area and pore distribution of the obtained composite porous carbon material 1a₂ were measured by the same methods as described above. As a result, the BET specific surface area was 262 m²/g, the mesopore volume (Vm1) was 0.186 cc/g, the micropore volume (Vm2) was 0.082 cc/g and Vm1/Vm2=2.27. Also, for composite porous carbon material 1a₂, the weight ratio of coal-based pitch-derived carbonaceous material with respect to activated carbon was 78%.

<Production of Negative Electrode>

Composite porous carbon material 1a₂ was used as a negative electrode active material to produce a negative electrode.

After mixing 84 parts by weight of composite porous carbon material 1a₂, 10 parts by weight of acetylene black, 6 parts by weight of PVdF (polyvinylidene fluoride) and NMP (N-methylpyrrolidone), the mixture was dispersed using a FILMIX® thin-film rotating-type high speed mixer by Primix Corp., under conditions with a peripheral velocity of 17 m/s, to obtain a coating solution. The viscosity (ηb) and TI value of the obtained coating solution were measured using a TVE-35H E-type viscometer by Toki Sangyo Co., Ltd. As a result, the viscosity (ηb) was 2,789 mPa·s and the TI value was 4.3. The coating solution was coated onto both sides of an electrolytic copper foil with a thickness of 10 μm using a die coater by Toray Engineering Co., Ltd. under conditions with a coating speed of 2 m/s, and dried at a drying temperature of 120° C. to obtain negative electrode 4. The obtained negative electrode 4 was pressed using a roll press under conditions with a pressure of 5 kN/cm and a pressed portion surface temperature of 25° C. The total thickness of the pressed negative electrode 4 was measured at 10 arbitrary locations of negative electrode 4, using a Linear Gauge Sensor GS-551 by Ono Sokki Co., Ltd. The total thickness of the copper foil was subtracted from the mean value of the measured film thickness, to determine the film thickness of the negative electrode active material layer of negative electrode 4. As a result, the film thickness of the negative electrode active material layers was 40 μm per side.

[Measurement of Capacitance Per Unit Weight of Negative Electrode]

One piece of the obtained negative electrode 4 was cut out to a size of 1.4 cm×2.0 cm (2.8 cm$^2$), and the negative electrode active material layer coated onto both sides of the copper foil was removed on one side using a spatula, brush or bristles to obtain a working electrode. Metal lithium was used as the counter electrode and reference electrode, to fabricate an electrochemical cell in an argon box, using a nonaqueous solution of $LiPF_6$ dissolved to a concentration of 1.0 mol/L in a mixed solvent of ethylene carbonate (EC) and ethylmethyl carbonate (EMC) at a volume ratio of 1:1, as the electrolytic solution.

The initial charging capacitance of the obtained electrochemical cell was measured by the following procedure using a charge/discharge apparatus (TOSCAT-3100U) by Toyo System Co., Ltd.

The electrochemical cell was subjected to constant-current charge at a temperature of 25° C., with a current value of 0.5 mA/cm$^2$ until reaching a voltage value of 0.01 V, and then to constant-voltage charge until the current value reached 0.01 mA/cm$^2$. When the charge capacity during constant-current charge and constant-voltage charge was evaluated as the initial charge capacity, it was found to be 1.6 mAh, and the capacitance per unit weight of negative electrode 2 (lithium ion doping amount) was 1460 mAh/g.

<Fabrication of Nonaqueous Lithium Power Storage Element>

A nonaqueous lithium power storage element was fabricated by the same method as Example 32, except for using two positive electrode precursors 4 (one side), 19 positive electrode precursors 4 (both sides) and 20 negative electrodes 2.

Example 47

A nonaqueous lithium power storage element was fabricated by the same method as Example 46, except that for initial charging of the nonaqueous lithium power storage element in the lithium doping step, constant-current charge was carried out at a current value of 1 A until reaching a voltage of 4.5 V, and then constant-voltage charge was carried out at 4.5 V continuously for 40 hours, for lithium doping at the negative electrode.

Example 48

A nonaqueous lithium power storage element was fabricated by the same method as Example 46, except that for initial charging of the nonaqueous lithium power storage element in the lithium doping step, constant-current charge was carried out at a current value of 1 A until reaching a voltage of 4.5 V, and then constant-voltage charge was carried out at 4.5 V continuously for 80 hours, for lithium doping at the negative electrode.

Example 49

A nonaqueous lithium power storage element was fabricated by the same method as Example 46, except that for initial charging of the nonaqueous lithium power storage element in the lithium doping step, constant-current charge was carried out at a current value of 1 A until reaching a voltage of 4.5 V, and then constant-voltage charge was carried out at 4.5 V continuously for 10 hours, for lithium doping at the negative electrode.

Example 50

A nonaqueous lithium power storage element was fabricated by the same method as Example 46, except that for initial charging of the nonaqueous lithium power storage element in the lithium doping step, constant-current charge was carried out at a current value of 1 A until reaching a voltage of 4.2 V, and then constant-voltage charge was carried out at 4.2 V continuously for 10 hours, for lithium doping at the negative electrode.

Example 51

A nonaqueous lithium power storage element was fabricated by the same method as Example 46, except that for initial charging of the nonaqueous lithium power storage element in the lithium doping step, constant-current charge was carried out at a current value of 1 A until reaching a voltage of 4.2 V, and then constant-voltage charge was carried out at 4.2 V continuously for 3 hours, for lithium doping at the negative electrode.

Example 52

A nonaqueous lithium power storage element was fabricated by the same method as Example 46, except that for initial charging of the nonaqueous lithium power storage element in the lithium doping step, constant-current charge was carried out at a current value of 1 A until reaching a voltage of 4.2 V, and then constant-voltage charge was carried out at 4.2 V continuously for 2 hours, for lithium doping at the negative electrode.

Example 53

A nonaqueous lithium power storage element was fabricated by the same method as Example 46, except that the positive electrode precursor (both sides) was fabricated with a discharge pressure of 40 kPa at the top face die and a discharge pressure of 60 kPa at the bottom face die, during coating of the positive electrode precursor (both sides).

Example 54

A nonaqueous lithium power storage element was fabricated by the same method as Example 47, except that the positive electrode precursor (both sides) was fabricated with a discharge pressure of 40 kPa at the top face die and a discharge pressure of 60 kPa at the bottom face die, during coating of the positive electrode precursor (both sides).

Example 55

A nonaqueous lithium power storage element was fabricated by the same method as Example 48, except that the positive electrode precursor (both sides) was fabricated with a discharge pressure of 40 kPa at the top face die and a discharge pressure of 60 kPa at the bottom face die, during coating of the positive electrode precursor (both sides).

Example 56

A nonaqueous lithium power storage element was fabricated by the same method as Example 46, except that the positive electrode precursor (both sides) was fabricated with a discharge pressure of 55 kPa at the top face die and a discharge pressure of 58 kPa at the bottom face die, during coating of the positive electrode precursor (both sides).

Example 57

A nonaqueous lithium power storage element was fabricated by the same method as Example 47, except that the positive electrode precursor (both sides) was fabricated with a discharge pressure of 55 kPa at the top face die and a discharge pressure of 58 kPa at the bottom face die, during coating of the positive electrode precursor (both sides).

Example 58

A nonaqueous lithium power storage element was fabricated by the same method as Example 53, except that for initial charging of the nonaqueous lithium power storage element in the lithium doping step, constant-current charge was carried out at a current value of 1 A until reaching a voltage of 4.2 V, and then constant-voltage charge was carried out at 4.2 V continuously for 10 hours, in a thermostatic bath at 45° C., for lithium doping at the negative electrode.

Example 59

A nonaqueous lithium power storage element was fabricated by the same method as Example 53, except that for initial charging of the nonaqueous lithium power storage element in the lithium doping step, constant-current charge was carried out at a current value of 1 A until reaching a voltage of 4.2 V, and then constant-voltage charge was carried out at 4.2 V continuously for 5 hours, in a thermostatic bath at 45° C., for lithium doping at the negative electrode.

Example 60

A nonaqueous lithium power storage element was fabricated by the same method as Example 46, except that the lithium carbonate was cooled to −196° C. with liquid nitrogen, and then pulverized for 10 minutes at a peripheral velocity of 10.0 m/s, using φ1.0 mm zirconia beads.

Example 61

A nonaqueous lithium power storage element was fabricated by the same method as Example 46, except that the lithium carbonate was cooled to −196° C. with liquid nitrogen, and then pulverized for 5 minutes at a peripheral velocity of 10.0 m/s, using φ1.0 mm zirconia beads.

Comparative Example 38

Lithium carbonate was pulverized for 5 minutes at a peripheral velocity of 10.0 m/s, using φ1.0 mm zirconia beads in an environment at 25° C., to obtain lithium carbonate 5.

Mixing 48.0 parts by weight of activated carbon 1d, 43.0 parts by weight of lithium carbonate 5, 2.5 parts by weight of Ketchen black, 1.5 parts by weight of PVP (polyvinylpyrrolidone), 5.0 parts by weight of PVDF (polyvinylidene fluoride) and NMP (N-methylpyrrolidone), coating solution 5 was prepared by the same method as Example 32. Mixing 55.0 parts by weight of activated carbon 1d, 36.0 parts by weight of lithium carbonate 5, 2.5 parts by weight of Ketchen black, 1.5 parts by weight of PVP (polyvinylpyrrolidone), 5.0 parts by weight of PVDF (polyvinylidene fluoride) and NMP (N-methylpyrrolidone), coating solution 6 was prepared by the same method as Example 32. A positive electrode precursor 7 (both sides) was fabricated by the same method as Example 32, with coating solution 5 being coated onto the front side of a 15 μm aluminum foil with a die discharge pressure of 50 kPa, and coating solution 6 being coated onto the back side of the aluminum foil with a die discharge pressure of 50 kPa. In addition, a positive electrode precursor 7 (one side) was fabricated with coating of coating solution 5 onto one side of a 15 μm aluminum foil at a die discharge pressure of 55 kPa.

A nonaqueous lithium power storage element was fabricated by the same method as Example 32, except for using two positive electrode precursors 7 (one side), 19 positive electrode precursors 7 (both sides) and 20 negative electrodes 4.

Comparative Example 39

A nonaqueous lithium power storage element was fabricated by the same method as Comparative Example 38, except that for initial charging of the nonaqueous lithium power storage element in the lithium doping step, constant-current charge was carried out at a current value of 1 A until reaching a voltage of 4.5 V, and then constant-voltage charge was carried out at 4.5 V continuously for 10 hours, for lithium doping at the negative electrode.

Comparative Example 40

A nonaqueous lithium power storage element was fabricated by the same method as Comparative Example 38, except that for initial charging of the nonaqueous lithium power storage element in the lithium doping step, constant-current charge was carried out at a current value of 1 A until reaching a voltage of 4.3 V, and then constant-voltage charge was carried out at 4.3 V continuously for 10 hours, for lithium doping at the negative electrode.

Comparative Example 41

A nonaqueous lithium power storage element was fabricated by the same method as Comparative Example 38, except that for initial charging of the nonaqueous lithium power storage element in the lithium doping step, constant-current charge was carried out at a current value of 1 A until reaching a voltage of 4.2 V, and then constant-voltage charge was carried out at 4.2 V continuously for 2 hours, for lithium doping at the negative electrode.

Comparative Example 42

A nonaqueous lithium power storage element was fabricated by the same method as Comparative Example 38, except that for initial charging of the nonaqueous lithium power storage element in the lithium doping step, constant-current charge was carried out at a current value of 1 A until reaching a voltage of 4.2 V, and then constant-voltage charge was carried out at 4.2 V continuously for 1 hour, for lithium doping at the negative electrode.

Comparative Example 43

Mixing 60.0 parts by weight of activated carbon 1d, 31.0 parts by weight of lithium carbonate 3, 2.5 parts by weight of Ketchen black, 1.5 parts by weight of PVP (polyvinylpyrrolidone), 5.0 parts by weight of PVDF (polyvinylidene fluoride) and NMP (N-methylpyrrolidone), coating solution 7 was prepared by the same method as Example 32. A positive electrode precursor 8 (both sides) was fabricated by the same method as Example 32, with coating solution 5 being coated onto the front side of a 15 μm aluminum foil with a die discharge pressure of 50 kPa, and coating solution 7 being coated onto the back side of the aluminum foil with a die discharge pressure of 50 kPa.

A nonaqueous lithium power storage element was fabricated by the same method as Example 32, except for using two positive electrode precursors 7 (one side), 19 positive electrode precursors 8 (both sides) and 20 negative electrodes 4.

Comparative Example 44

A nonaqueous lithium power storage element was fabricated by the same method as Comparative Example 43, except that for initial charging of the nonaqueous lithium power storage element in the lithium doping step, constant-current charge was carried out at a current value of 1 A until reaching a voltage of 4.5 V, and then constant-voltage charge was carried out at 4.5 V continuously for 10 hours, for lithium doping at the negative electrode.

Comparative Example 45

A nonaqueous lithium power storage element was fabricated by the same method as Comparative Example 43, except that for initial charging of the nonaqueous lithium power storage element in the lithium doping step, constant-current charge was carried out at a current value of 1 A until reaching a voltage of 4.3 V, and then constant-voltage charge was carried out at 4.3 V continuously for 10 hours, for lithium doping at the negative electrode.

Comparative Example 46

A nonaqueous lithium power storage element was fabricated by the same method as Comparative Example 43, except that for initial charging of the nonaqueous lithium power storage element in the lithium doping step, constant-current charge was carried out at a current value of 1 A until reaching a voltage of 4.2 V, and then constant-voltage charge was carried out at 4.2 V continuously for 2 hours, for lithium doping at the negative electrode.

Comparative Example 47

A nonaqueous lithium power storage element was fabricated by the same method as Comparative Example 43, except that the lithium carbonate was pulverized for 3 minutes at a peripheral velocity of 10.0 m/s, using φ1.0 mm zirconia beads in an environment at 25° C.

Comparative Example 48

A nonaqueous lithium power storage element was fabricated by the same method as Comparative Example 43, except that the lithium carbonate was pulverized for 2 minutes at a peripheral velocity of 10.0 m/s, using φ1.0 mm zirconia beads in an environment at 25° C.

Comparative Example 49

A nonaqueous lithium power storage element was fabricated by the same method as Comparative Example 43, except that the lithium carbonate was pulverized for 1 minute at a circumferential speed of 10.0 m/s, using φ1.0 mm zirconia beads in an environment at 25° C.

Comparative Example 50

A nonaqueous lithium power storage element was fabricated by the same method as Example 46, except that for initial charging of the nonaqueous lithium power storage element in the lithium doping step, constant-current charge was carried out at a current value of 1 A until reaching a voltage of 4.7 V, and then constant-voltage charge was carried out at 4.7 V continuously for 40 hours, at a temperature of 60° C., for lithium doping at the negative electrode.

Comparative Example 51

A nonaqueous lithium power storage element was fabricated by the same method as Example 46, except that for initial charging of the nonaqueous lithium power storage element in the lithium doping step, constant-current charge was carried out at a current value of 1 A until reaching a voltage of 4.7 V, and then constant-voltage charge was carried out at 4.7 V continuously for 40 hours, at a temperature of 70° C., for lithium doping at the negative electrode.

Comparative Example 52

A nonaqueous lithium power storage element was fabricated by the same method as Example 46, except that for initial charging of the nonaqueous lithium power storage element in the lithium doping step, constant-current charge was carried out at a current value of 1 A until reaching a voltage of 4.8 V, and then constant-voltage charge was carried out at 4.8 V continuously for 40 hours, at a temperature of 60° C., for lithium doping at the negative electrode.

The evaluation results for the nonaqueous lithium power storage elements of Examples 46 to 61 and Comparative Examples 38 to 52 are shown in Table 4.

TABLE 4

|  | Fa [F] | Ra [mΩ] | Rc [mΩ] | Rc/Ra | B × 10⁻³ [cc/F] | $C_{y1}$ [g/m²] | $C_{x1}$ [g/m²] | $C_{y2}$ [g/m²] | $C_{x2}$ [g/m²] | $C_{y1}/C_{x1}$ | $C_{y2}/C_{x2}$ | $X_1$ [μm] | $Y_1$ [μm] | $A_1$ [%] | $A_2$ [%] |
|---|---|---|---|---|---|---|---|---|---|---|---|---|---|---|---|
| Example 46 | 1421 | 0.50 | 0.58 | 1.16 | 1.84 | 33.4 | 35.1 | 5.3 | 7.1 | 0.95 | 0.75 | 1.4 | 13.1 | 80.9 | 34.8 |
| Example 47 | 1406 | 0.56 | 0.65 | 1.16 | 1.71 | 30.9 | 33.2 | 2.7 | 5.3 | 0.93 | 0.51 | 1.3 | 12.2 | 86.7 | 42.6 |
| Example 48 | 1336 | 0.63 | 0.67 | 1.06 | 1.54 | 30.0 | 31.1 | 0.7 | 3.4 | 0.96 | 0.21 | 0.7 | 12.4 | 97.8 | 58.3 |
| Example 49 | 1250 | 0.54 | 0.62 | 1.15 | 2.20 | 33.3 | 36.4 | 5.7 | 8.3 | 0.91 | 0.69 | 2.2 | 12.3 | 62.0 | 21.4 |
| Example 50 | 1303 | 0.58 | 0.62 | 1.07 | 2.75 | 37.4 | 40.3 | 9.3 | 12.1 | 0.93 | 0.77 | 2.3 | 12.8 | 47.5 | 13.7 |
| Example 51 | 1278 | 0.56 | 0.62 | 1.11 | 2.55 | 41.3 | 43.0 | 13.5 | 14.1 | 0.96 | 0.96 | 2.1 | 12.5 | 40.7 | 11.5 |
| Example 52 | 1217 | 0.62 | 0.69 | 1.11 | 2.69 | 46.3 | 47.5 | 18.6 | 19.5 | 0.97 | 0.95 | 2.2 | 12.7 | 42.8 | 10.6 |
| Example 53 | 1251 | 0.54 | 0.63 | 1.17 | 1.92 | 30.1 | 41.1 | 4.6 | 15.2 | 0.73 | 0.30 | 1.7 | 12.7 | 78.0 | 40.7 |
| Example 54 | 1389 | 0.55 | 0.62 | 1.13 | 1.98 | 29.3 | 39.6 | 3.2 | 13.7 | 0.74 | 0.23 | 1.6 | 13.2 | 83.3 | 43.7 |
| Example 55 | 1427 | 0.61 | 0.67 | 1.10 | 1.94 | 28.7 | 37.6 | 2.1 | 11.7 | 0.76 | 0.18 | 0.9 | 12.8 | 98.5 | 53 |
| Example 56 | 1355 | 0.53 | 0.56 | 1.06 | 1.81 | 37.2 | 39.2 | 13.2 | 13.8 | 0.95 | 0.96 | 1.1 | 12.5 | 88.1 | 38.9 |
| Example 57 | 1391 | 0.51 | 0.58 | 1.14 | 1.55 | 35.1 | 35.9 | 8.9 | 9.7 | 0.98 | 0.92 | 0.6 | 12.9 | 93.8 | 53.3 |
| Example 58 | 1305 | 0.58 | 0.70 | 1.21 | 1.93 | 33.0 | 46.3 | 6.7 | 18.9 | 0.71 | 0.35 | 1.4 | 13.1 | 83.1 | 49.9 |
| Example 59 | 1338 | 0.61 | 0.65 | 1.07 | 2.60 | 35.0 | 48.2 | 10.2 | 19.8 | 0.73 | 0.52 | 1.4 | 12.6 | 82.9 | 34.4 |
| Example 60 | 1411 | 0.53 | 0.62 | 1.17 | 1.77 | 33.7 | 35.4 | 5.5 | 7.4 | 0.95 | 0.74 | 5.6 | 13.1 | 83.8 | 35.4 |
| Example 61 | 1397 | 0.57 | 0.64 | 1.12 | 1.68 | 34.1 | 35.7 | 6.1 | 7.8 | 0.96 | 0.78 | 8.3 | 13.1 | 85.7 | 37.2 |
| Comp. Example 38 | 1257 | 0.90 | 1.58 | 1.76 | 6.88 | 33.3 | 35.1 | 5.5 | 4.1 | 0.95 | 1.34 | 3.5 | 13.1 | 37.2 | 7.9 |
| Comp. Example 39 | 1131 | 0.89 | 1.76 | 1.98 | 8.99 | 34.2 | 36.4 | 6.7 | 5.5 | 0.94 | 1.22 | 4.5 | 12.6 | 27.4 | 5.3 |
| Comp. Example 40 | 1092 | 0.88 | 1.96 | 2.23 | 12.87 | 38.5 | 40.6 | 10.5 | 9.6 | 0.95 | 1.09 | 5.1 | 13.1 | 14.3 | 4.1 |
| Comp. Example 41 | 986 | 0.98 | 2.50 | 2.55 | 16.33 | 42.1 | 42.5 | 14.5 | 11.4 | 0.99 | 1.27 | 5.3 | 12.7 | 12.1 | 2.5 |
| Comp. Example 42 | 911 | 1.10 | 2.91 | 2.65 | 21.34 | 48.6 | 50.2 | 20.6 | 19.2 | 0.97 | 1.07 | 5.1 | 13.2 | 9.4 | 1.4 |
| Comp. Example 43 | 1113 | 0.79 | 1.74 | 2.20 | 11.59 | 33.9 | 35.7 | 7.9 | 7.7 | 0.95 | 1.03 | 4.6 | 13.1 | 35.2 | 8.8 |
| Comp. Example 44 | 1028 | 0.85 | 2.04 | 2.40 | 13.08 | 35.3 | 38.3 | 9.5 | 9.3 | 0.92 | 1.02 | 3.5 | 13.1 | 28.8 | 5.4 |
| Comp. Example 45 | 1029 | 0.97 | 2.38 | 2.45 | 15.55 | 37.3 | 40.2 | 11.4 | 10.4 | 0.93 | 1.10 | 4.2 | 12.8 | 20.1 | 3.5 |
| Comp. Example 46 | 861 | 1.00 | 2.78 | 2.78 | 19.09 | 40.6 | 41.9 | 14.7 | 13.7 | 0.97 | 1.07 | 5.7 | 12.5 | 10.4 | 1.6 |
| Comp. Example 47 | 731 | 1.21 | 3.12 | 2.58 | 10.30 | 34.1 | 36.1 | 8.1 | 7.8 | 0.94 | 1.04 | 13.4 | 12.7 | 37.2 | 8.1 |
| Comp. Example 48 | 630 | 1.33 | 3.54 | 2.66 | 12.22 | 34.2 | 36.4 | 8.3 | 8 | 0.94 | 1.04 | 15.4 | 12.6 | 36.7 | 8.2 |
| Comp. Example 49 | 580 | 1.42 | 4.23 | 2.98 | 14.12 | 34.5 | 36.4 | 8.6 | 8.1 | 0.95 | 1.06 | 17.9 | 12.9 | 38.6 | 9.3 |
| Comp. Example 50 | 954 | 1.32 | 2.54 | 1.92 | 4.50 | 28.4 | 28.8 | 0.21 | 0.19 | 0.99 | 1.11 | 0.2 | 12.7 | 99.5 | 64.5 |
| Comp. Example 51 | 842 | 1.53 | 3.12 | 2.04 | 5.21 | 28.2 | 28.7 | 0.13 | 0.12 | 0.98 | 1.08 | 0.2 | 12.6 | 99.7 | 71.3 |
| Comp. Example 52 | 832 | 1.57 | 3.25 | 2.07 | 6.34 | 28.1 | 28.7 | 0.14 | 0.12 | 0.98 | 1.17 | 0.1 | 12.9 | 99.6 | 72.3 |

Without being limited to theory, based on Table 3 and Table 4, it is believed that when $C_{y2}/C_{x2}$ was 1.0 or greater, the lithium compound was exposed to high potential and had a high gas generation volume on the $C_y$ side which had a large change in potential, thus resulting in an increased gas quantity being generated in high-temperature storage testing, and a greater increase in resistance. Also, it is believed when $X_1>Y_1$, electron conduction between the positive electrode active material was inhibited by the lithium compounds with large particle sizes, thus increasing the internal resistance Ra. Presumably, when $A_1$ was no greater than 40% or $A_2$ was no greater than 10%, decomposition of the electrolytic solution was promoted on the surfaces of the lithium compounds, thus resulting in an increased gas quantity generated during high-temperature storage testing, and a greater increase in resistance. Also presumably, when $A_1$ was 99% or greater or $A_2$ was 60% or greater, excessive decomposition of the electrolyte took place, resulting in effects by generated by-products and thus a greater gas quantity generated during high-temperature storage testing, and a greater increase in resistance.

Without being limited to theory, it is believed that when pulverization of the lithium carbonate was under conditions with a cryogenic temperature of −196° C., it was possible to avoid the effects of temperature increase during pulverization and suppress formation of defects on the lithium carbonate particle surfaces, thus allowing reaggregation of the lithium carbonate particles to be suppressed as a result. Furthermore, it is believed that pretreatment of the lithium carbonate in an environment with a high dew point allowed activation of the lithium carbonate surfaces, and efficient decomposition of the $LiPF_6$ electrolyte on the lithium carbonate particle surfaces, resulting in uniform accumulation of generated fluorine compounds and an improved high-temperature storage characteristic and charge/discharge characteristic under high load.

An embodiment according to the third aspect will now be explained in detail.

Example 62

[Preparation of Activated Carbon]
[Activated Carbon 1e]

Crushed coconut shell carbide was placed in a small carbonizing furnace and subjected to carbonization at 500° C. for 3 hours under a nitrogen atmosphere, to obtain a carbide. The obtained carbide was placed in an activating furnace, water vapor in a heated state using a preheating furnace was introduced into the activating furnace at 1 kg/h, and the temperature was increased to 900° C. over 8 hours for activation. The activated carbide was cooled under a nitrogen atmosphere to obtain activated carbon. The obtained activated carbon was flow-rinsed for 10 hours, drained, and dried for 10 hours in an electrodesiccator held at 115° C., and then it was pulverized for 1 hour with a ball mill to obtain activated carbon 1e.

A laser diffraction particle size distribution analyzer (SALD-2000J) by Shimadzu Corp. was used to measure the mean particle diameter of the activated carbon 1e, which was found to be 4.2 μm. Also, as a result of measuring the pore distribution of activated carbon 1 using a pore distribution measuring apparatus by Yuasa-Ionics, Inc. (AUTOSORB-1 AS-1-MP), the BET specific surface area was 2,360 m²/g, the mesopore volume ($V_1$) was 0.52 cc/g, the micropore volume ($V_2$) was 0.88 cc/g and $V_1/V_2$=0.59.

[Activated Carbon 2c]

A phenol resin was placed in a furnace and subjected to carbonization at 600° C. for 2 hours under a nitrogen atmosphere, and was then pulverized with a ball mill and sorted, to obtain a carbide having a mean particle diameter of 7.0 µm. The obtained carbide was mixed with KOH at a weight ratio of 1:5, and the mixture was placed in a furnace and heated at 800° C. for 1 hour under a nitrogen atmosphere and activated. The activated carbide was removed out and stirred and rinsed for 1 hour in dilute hydrochloric acid adjusted to a concentration of 2 mol/L, and then boiled and rinsed with distilled water until the pH stabilized to between 5 and 6, after which it was dried to produce activated carbon 2c.

A laser diffraction particle size distribution analyzer (SALD-2000J) by Shimadzu Corp. was used to measure the mean particle diameter of the activated carbon 2c, which was found to be 7.1 µm. Also, as a result of measuring the pore distribution of activated carbon 2c using a pore distribution measuring apparatus by Yuasa-Ionics, Inc. (AUTOSORB-1 AS-1-MP), the BET specific surface area was 3,627 m²/g, the mesopore volume ($V_1$) was 1.50 cc/g, the micropore volume ($V_2$) was 2.28 cc/g and $V_1/V_2$=0.66.

[Production of Positive Electrode Precursor]

Activated carbon 1e obtained above was used as the positive electrode active material to produce a positive electrode precursor (single-sided positive electrode precursor and double-sided positive electrode precursor).

[Preparation of Positive Electrode Active Material Layer 1]

After mixing 57.5 parts by weight of activated carbon 1e, 30.0 parts by weight of lithium carbonate having a mean particle diameter of 2.4 µm, as a lithium compound, 3.0 parts by weight of Ketchen black, 1.5 parts by weight of PVP (polyvinylpyrrolidone), 8.0 parts by weight of PVDF (polyvinylidene fluoride) and NMP (N-methylpyrrolidone), the mixture was dispersed using a FILMIX® thin-film rotating-type high speed mixer by Primix Corp., under conditions with a peripheral velocity of 17 m/s, to obtain a coating solution. The coating solution was coated onto one side of an aluminum foil with a thickness of 15 µm and having no through-holes, using a die coater by Toray Engineering Co., Ltd. under conditions with a coating speed of 1 m/s, and dried at a drying temperature of 100° C. to obtain a single-sided positive electrode precursor 9 provided with a positive electrode active material layer 1.

[Preparation of Positive Electrode Active Material Layer 2]

After mixing 42.5 parts by weight of activated carbon 1e, 45.0 parts by weight of lithium carbonate having a mean particle diameter of 2.4 µm, as a lithium compound, 3.0 parts by weight of Ketchen black, 1.5 parts by weight of PVP (polyvinylpyrrolidone), 8.0 parts by weight of PVDF (polyvinylidene fluoride) and NMP (N-methylpyrrolidone), the mixture was dispersed using a FILMIX® thin-film rotating-type high speed mixer by Primix Corp., under conditions with a peripheral velocity of 17 m/s, to obtain a coating solution. The coating solution was coated onto one side of an aluminum foil with a thickness of 15 µm and having no through-holes, and onto the positive electrode power collector on the side of the obtained single-sided positive electrode precursor 9 without the positive electrode active material layer 1, using a die coater by Toray Engineering Co., Ltd. under conditions with a coating speed of 1 m/s, and dried at a drying temperature of 100° C. to obtain a single-sided positive electrode precursor 10 and double-sided positive electrode precursor provided with a positive electrode active material layer 2.

The obtained single-sided positive electrode precursor and double-sided positive electrode precursor were pressed using a roll press under conditions with a pressure of 4 kN/cm and a pressed portion surface temperature of 25° C.

[Production of Negative Electrode]

Preparation Example for Negative Electrode 5

A 150 g portion of commercially available coconut shell activated carbon having a mean particle diameter of 3.5 µm and a BET specific surface area of 1,801 m²/g was placed into a stainless steel mesh basket and set on a stainless steel vat containing 200 g of coal-based pitch (softening point: 120° C.), and both were set in an electric furnace (furnace inner usable dimension: 300 mm×300 mm×300 mm). The coconut shell activated carbon and coal-based pitch were increased in temperature to 700° C. over 8 hours under a nitrogen atmosphere, and were kept at the same temperature for 4 hours for thermal reaction to obtain composite carbon material $1a_3$. The obtained composite carbon material $1a_3$ was cooled to 60° C. by natural cooling, and then removed out of the electric furnace.

The mean particle diameter and BET specific surface area of the obtained composite carbon material $1a_3$ were measured by the same methods as described above. The results are shown in Table 5.

Composite carbon material $1a_3$ was used as a negative electrode active material to produce a negative electrode 5.

After mixing 82 parts by weight of composite carbon material $1a_3$, 6 parts by weight of acetylene black, 12 parts by weight of PVdF (polyvinylidene fluoride) and NMP (N-methylpyrrolidone), the mixture was dispersed using a FILMIX thin-film rotating-type high speed mixer by Primix Corp., under conditions with a peripheral velocity of 15 m/s, to obtain a coating solution. The viscosity (ηb) and TI value of the obtained coating solution were measured using a TVE-35H E-type viscometer by Toki Sangyo Co., Ltd., and as a result the viscosity (ηb) was 2,892 mPa·s and the TI value was 5.0. The coating solution was coated onto both sides of an electrolytic copper foil with a thickness of 10 µm and without through-holes, using a die coater by Toray Engineering Co., Ltd. under conditions with a coating speed of 1 m/s, and dried at a drying temperature of 85° C. to obtain negative electrode 5 (hereunder also referred to as "double-sided negative electrode"). The obtained negative electrode 5 was pressed using a roll press under conditions with a pressure of 4 kN/cm and a pressed portion surface temperature of 25° C. The film thickness of the obtained negative electrode 5 was measured at 10 arbitrary locations of negative electrode 5, using a Linear Gauge Sensor GS-551 by Ono Sokki Co., Ltd. The thickness of the copper foil was subtracted from the mean value of the measured film thickness, to determine the film thickness of the negative electrode active material layer of negative electrode 5. The film thickness of the negative electrode active material layers of negative electrode 5 was 40 µm per side.

Preparation Example for Negative Electrodes 6 and 7

Negative electrode active materials were produced and evaluated in the same manner as the preparation example for negative electrode 5, except that the base materials and their parts by weight, the parts by weight of the coal-based pitch and the heat treatment temperatures were adjusted as shown in Table 5. Also, the negative electrodes 6 and 7 were produced and evaluated in the same manner as the preparation example for negative electrode 5, except that the negative electrode active materials listed in Table 5 were used, and the coating solutions were adjusted to the coating solution compositions listed in Table 5. The results are shown in Table 5.

TABLE 5

| | Name | Base material Type | Base material Amount (parts by weight) | Pitch Amount (parts by weight) | Heat treatment temperature (° C.) | Carbonaceous material weight ratio (weight %) |
|---|---|---|---|---|---|---|
| Negative electrode 5 | Composite carbon material 1a$_3$ | Coconut shell activated carbon | 150 | 200 | 700 | 64 |
| Negative electrode 6 | Composite carbon material 1b | Carbon nano-particle | 150 | 200 | 1100 | 68 |
| Negative electrode 7 | Composite carbon material 2a | Artificial graphite | 150 | 15 | 1100 | 2 |

| | Negative electrode active material Mean particle diameter (μm) | Negative electrode active material BET specific surface area (m2/g) | Coating solution Solid content (parts by weight) Negative electrode active material | Coating solution Solid content (parts by weight) Acetylene black | Coating solution Solid content (parts by weight) PVdF | Negative electrode active material layer film thickness on each side (μm) |
|---|---|---|---|---|---|---|
| Negative electrode 5 | 3.6 | 243 | 82 | 6 | 12 | 40 |
| Negative electrode 6 | 5.4 | 277 | 80 | 2 | 18 | 40 |
| Negative electrode 7 | 5.0 | 8.4 | 80 | 8 | 12 | 20 |

The starting materials in Table 5 are the following.
Coconut shell activated carbon: mean particle diameter=3.5 μm, BET specific surface area=1,801 m$^2$/g
Carbon nanoparticles: mean particle diameter=5.3 μm, BET specific surface area=1,354 m$^2$/g, primary particle diameter=19 nm
Artificial graphite: mean particle diameter=4.9 μm, BET specific surface area=8.1 m$^2$/g
Pitch: coal-based pitch with softening point of 120° C.

[Preparation of Nonaqueous Electrolytic Solution]

As an organic solvent there was used a mixed solvent of ethylene carbonate (EC):methyl ethyl carbonate (EMC)=33:67 (volume ratio), each electrolyte salt was dissolved so that the concentration ratio of LiN(SO$_2$F)$_2$ and LiPF$_6$ was 25:75 (molar ratio) with respect to the total nonaqueous electrolytic solution and the total concentration of LiN(SO$_2$F)$_2$ and LiPF$_6$ was 1.2 mol/L, and the obtained solution was used as a nonaqueous electrolytic solution 3.

The concentrations of LiN(SO$_2$F)$_2$ and LiPF$_6$ in the prepared nonaqueous electrolytic solution 3 were 0.9 mol/L and 0.3 mol/L, respectively.

[Production of Nonaqueous Lithium Power Storage Element]

The obtained positive electrode precursor and negative electrode 5 were used to produce a plurality of nonaqueous lithium power storage elements under the conditions described below.

[Assembly]

The obtained double-sided negative electrode and single-sided and double-sided positive electrode precursors were cut to 10 cm×10 cm (100 cm$^2$). Using single-sided positive electrode precursor 9 on the uppermost side and single-sided positive electrode precursor 10 on the lowermost side, and further using 21 double-sided negative electrodes and 20 double-sided positive electrode precursors, lamination was performed with one side of the negative electrodes (the first negative electrode active material layer on the first side of the negative electrode power collector) facing the positive electrode active material layer 1, and the other side of the negative electrodes 5 (the second negative electrode active material layer on the second side of the negative electrode power collector) facing the positive electrode active material layer 2, and sandwiching 15 μm-thick microporous film separators between the negative electrodes 5 and positive electrode precursors. Next, a negative electrode terminal and positive electrode terminal were connected to the negative electrodes 5 and positive electrode precursors, respectively, by ultrasonic welding to obtain an electrode laminated body. The electrode laminated body was housed in an casing composed of an aluminum laminate package material, and the external bodies 3 at the electrode terminal section and bottom section were heat sealed under conditions with a temperature of 180° C., a seal time of 20 sec and a seal pressure of 1.0 MPa. The sealed body was vacuum dried under conditions with a temperature of 80° C., a pressure of 50 Pa and a drying time of 60 hr.

[Filling, Impregnation and Sealing Step]

Approximately 80 g of the nonaqueous electrolytic solution 3 was injected into the electrode laminated body housed in the aluminum laminate package material, in a dry air environment at atmospheric pressure, a temperature of 25° C. and a dew point of no higher than −40° C. Next, the aluminum laminate package material housing the electrode laminated body was placed in a pressure reduction chamber and the pressure was reduced from atmospheric pressure to −87 kPa, after which it was restored to atmospheric pressure and allowed to stand for 5 minutes. The step of reducing the pressure from atmospheric pressure to −87 kPa and then restoring to atmospheric pressure was subsequently repeated 4 times, and it was then allowed to stand for 15 minutes. The pressure was again reduced from atmospheric pressure to −91 kPa, and then restored to atmospheric pressure. The step of pressure reduction and restoration to atmospheric pressure in the same manner was repeated a total of 7 times (pressure reduction from atmospheric pressure to −95, −96, −97, −81, −97, −97 and −97 kPa, respectively). The electrode laminated body was impregnated with the nonaqueous electrolytic solution by this procedure.

Next, the electrode laminated body housed in the aluminum laminate package material and impregnated with the nonaqueous electrolytic solution 3 was placed in a pressure-reducing sealing machine, and with pressure reduction to −95 kPa, it was sealed at 180° C. for 10 seconds at a pressure of 0.1 MPa to seal the aluminum laminate package material and fabricate a nonaqueous lithium power storage element.

[Lithium Doping Step]

The obtained nonaqueous lithium power storage element was subjected to initial charging by a method of constant-current charging using a charge/charge/discharge apparatus (TOSCAT-3100U) by Toyo System Co., Ltd., in an environment of 45° C. with a current value of 50 mA until reaching a voltage of 4.6 V, followed by constant-voltage charge at 4.6 V continued for 40 hours, for lithium doping of the negative electrode 5.

[Aging Step]

The lithium-doped nonaqueous lithium power storage element was subjected to a constant-current/constant-voltage charge step, with constant-current discharge in a 60° C. environment at 100 mA until reaching a voltage of 2.0 V, followed by constant-current charge at 100 mA until reaching a voltage of 4.0 V, and further constant-current charge at 4.0 V for 50 hours.

[Degassing Step]

A portion of the aluminum laminate package material of the aged nonaqueous lithium power storage element was unsealed in a dry air environment with a temperature of 25° C. and a dew point of −40° C. Next, the nonaqueous lithium power storage element was placed in a pressure reduction chamber, and a step of using a diaphragm pump (N816.3KT.45.18) by KNF Co. for pressure reduction over a period of 3 minutes from atmospheric pressure to −80 kPa, followed by restoration to atmospheric pressure over a period of 3 minutes, was repeated 3 times. Next, the nonaqueous lithium power storage element was placed in a pressure-reducing sealing machine, and after pressure reduction to −90 kPa, it was sealed at 200° C. for 10 seconds at a pressure of 0.1 MPa to seal the aluminum laminate package material.

[Evaluation of Nonaqueous Lithium Power Storage Elements]

One of the obtained nonaqueous lithium power storage elements was subjected to [Charge/discharge cycle test under high load], as described below. The remaining nonaqueous lithium power storage element was used for [Solid $^7$Li-NMR measurement of negative electrode], [Analysis of negative electrode active material layer of negative electrode after use], [Solid 7Li-NMR measurement of positive electrode] and [Measurement of mean particle diameter of lithium compound in positive electrode], as described below.

[Charge/Discharge Cycle Test Under High Load]

For each of the obtained nonaqueous lithium power storage elements, a charge/discharge apparatus (5 V, 360 A) by Fujitsu Telecom Networks, Ltd. was used in a thermostatic bath set to 25° C., for measurement of the internal resistance Ra before the high load charge/discharge cycle test, by the method described above.

Next, a high load charge/discharge cycle test was carried out by the method described above, using a charge/discharge apparatus (5 V, 360 A) by Fujitsu Telecom Networks, Ltd. in a thermostatic bath set to 25° C., with the current value set to 300 C, and the internal resistance Rb after the high load charge/discharge cycle test was measured, to obtain Rb/Ra. The results are shown in Table 6.

[Solid $^7$Li-NMR Measurement of Negative Electrode]

Negative electrode 5 of the nonaqueous lithium power storage element obtained above was used for solid $^7$Li-NMR measurement of the negative electrode active material layer.

First, the nonaqueous lithium power storage element produced as described above was subjected to constant-current charge to 2.9 V with a current of 50 mA, using a charge/discharge apparatus (ACD-01) by Aska Electronic Co., Ltd., at an environmental temperature of 25° C., and then to constant-current/constant-voltage charge with application of a constant voltage of 2.9 V for 15 hours.

The negative electrode active material layer was then sampled under an argon atmosphere. The nonaqueous lithium power storage element was disassembled under an argon atmosphere, and the negative electrode 5 was removed. Next, the obtained negative electrode 5 was immersed in diethyl carbonate for 2 minutes or longer to remove the lithium salt. After immersion once more in diethyl carbonate under the same conditions, it was air-dried. The negative electrode active material layers on the first side and second side of the negative electrode power collector of the obtained negative electrode 5 were then sampled and weighed.

Each of the obtained negative electrode active material layers was used in solid $^7$Li-NMR measurement. Measurement was performed by the single pulse method, using an ECA700 (7Li-NMR resonance frequency: 272.1 MHz) by JEOL Resonance Inc. as the measuring apparatus, in a room temperature environment, with a magic-angle spinning rotational speed of 14.5 kHz and the irradiation pulse width set to a 450 pulse. A 1 mol/L aqueous lithium chloride solution was used as the shift reference, and the shift position measured separately as an external standard was defined as 0 ppm. During measurement of the 1 mol/L aqueous lithium chloride solution, the single pulse method was used with an irradiation pulse width set to a 450 pulse, without rotation of the sample.

The solid $^7$Li-NMR spectrum for the negative electrode active material layer, obtained by the method described above, was used for calculation of the lithium amounts $q_1$, $q_2$ and calculation of the coefficient of variation CV, by the methods described above. The results are shown in Table 6.

[Analysis of Negative Electrode Active Material Layer of Negative Electrode after Use]

The negative electrode 5 of the nonaqueous lithium power storage element obtained as described above was used to measure the BET specific surface area per unit volume of the negative electrode active material layer of the negative electrode after use.

First, the nonaqueous lithium power storage element produced as described above was subjected to constant-current charge to 2.9 V with a current of 50 mA, using a charge/discharge apparatus (ACD-01) by Aska Electronic Co., Ltd., at an environmental temperature of 25° C., and then to constant-current/constant-voltage charge with application of a constant voltage of 2.9 V for 15 hours.

The negative electrode 5 was then sampled under an argon atmosphere. The nonaqueous lithium power storage element was disassembled under an argon atmosphere, and the negative electrode 5 was removed. Next, the obtained negative electrode 5 was immersed in diethyl carbonate for 2 minutes or longer to remove the nonaqueous electrolytic solution and lithium salt, and was air-dried. The obtained negative electrode 5 was then immersed in a mixed solvent comprising methanol and isopropanol for 15 hours to inactivate the lithium ion intercalated in the negative electrode active material, and was air-dried. Next, the obtained negative electrode 5 was vacuum dried for 12 hours using a vacuum dryer under conditions with a temperature of 170° C., to obtain a measuring sample. The obtained measuring sample was then used to measure the BET specific surface area per unit volume of the negative electrode active material layer of the negative electrode after use by the method described above, using a pore distribution measuring apparatus by Yuasa-Ionics, Inc. (AUTOSORB-1 AS-1-MP), with nitrogen as the adsorbate. The results are shown in Table 6.

[Solid $^7$Li-NMR Measurement of Positive Electrode]

The positive electrode of the obtained nonaqueous lithium power storage element was used for solid $^7$Li-NMR measurement of the positive electrode active material layer.

First, the nonaqueous lithium power storage element produced as described above was subjected to constant-current charge to 2.9 V with a current of 50 mA, using a charge/discharge apparatus (ACD-01) by Aska Electronic Co., Ltd., at an environmental temperature of 25° C., and then to constant-current/constant-voltage charge with application of a constant voltage of 2.9 V for 15 hours.

The positive electrode active material layer was then sampled under an argon atmosphere. The nonaqueous lithium power storage element was disassembled under an argon atmosphere, and the positive electrode was removed. Next, the obtained positive electrode was immersed in diethyl carbonate for 2 minutes or longer to remove the nonaqueous electrolytic solution and lithium salt. After immersion once more in diethyl carbonate under the same conditions, it was air-dried.

The positive electrode active material layer was then sampled from the positive electrode.

The obtained positive electrode active material layer was used as a sample for solid $^7$Li-NMR measurement. Measurement was performed by the single pulse method, using an ECA700 ($^7$Li-NMR resonance frequency: 272.1 MHz) by JEOL Resonance Inc. as the measuring apparatus, in a room temperature environment, with a magic-angle spinning rotational speed of 14.5 kHz and the irradiation pulse width set to a 450 pulse. The observation range was −400 ppm to 400 ppm, and the number of points was 4,096. Measurement was performed with repeated latency of 10 seconds and 3,000 seconds, using the same measuring conditions other than the repeated latency, such as the same number of scans and receiver gain, and an NMR spectrum was obtained. A 1 mol/L aqueous lithium chloride solution was used as the shift reference, and the shift position measured separately as an external standard was defined as 0 ppm. During measurement of the 1 mol/L aqueous lithium chloride solution, the single pulse method was used with an irradiation pulse width set to a 450 pulse, without rotation of the sample.

The value of b/a was calculated by the method described above, from the solid $^7$Li-NMR spectrum of the positive electrode active material layer obtained by the method described above. The results are shown in Table 6.

[Measurement of Mean Particle Diameter of Lithium Compound in Positive Electrode]

The obtained nonaqueous lithium power storage element was disassembled in an argon box with a dew point temperature of −72° C., and the positive electrode coated on both sides with the positive electrode active material layer was cut out to a size of 10 cm×5 cm and immersed in 30 g of a diethyl carbonate solvent, occasionally moving the positive electrode with a pincette, and was washed for 10 minutes. The positive electrode was then removed out and air-dried for 5 minutes in an argon box, and the positive electrode was immersed in 30 g of freshly prepared diethyl carbonate solvent and washed for 10 minutes by the same method as described above. The positive electrode was removed from the argon box, and a vacuum dryer (DP33 by Yamato Scientific Co., Ltd.) was used for drying for 20 hours at a temperature of 25° C. and a pressure of 1 kPa, to obtain a positive electrode sample.

A small 1 cm×1 cm piece was cut out from the positive electrode sample, and an SM-09020CP by JEOL Ltd. was used to create a cross-section perpendicular to the in-plane direction of the positive electrode sample using argon gas, under conditions with an acceleration voltage of 4 kV and a beam diameter of 500 μm. The surface was then coated with gold by sputtering in a vacuum of 10 Pa. Next, the positive electrode surface was measured by SEM and EDX with atmospheric exposure, under the conditions described below.

(SEM-EDX Measuring Conditions)

Measuring apparatus: FE-SEM S-4700 Electrolytic emission scanning electron microscope by Hitachi High-Technologies Corp.

Acceleration voltage: 10 kV

Emission current: 10 μA

Measurement magnification: 2,000×

Electron beam incident angle: 90°

X-ray take-off angle: 30°

Dead time: 15%

Mapping elements: C, O, F

Measurement pixel count 256×256 pixels

Measuring time: 60 sec

Number of scans: 50

Adjustment of the luminance and contrast so that no pixel reached the maximum luminance value in the mapping image, and the average value of brightness fell within the range of 40% to 60% of the maximum luminance value.

(SEM-EDX Analysis)

The images obtained from SEM and EDX of the measured positive electrode cross-section were subjected to image analysis by the method described above using image analysis software (ImageJ), to calculate the mean particle diameter $X_1$ of the lithium compound. The results are shown in Table 6.

Examples 63 to 74 and Comparative Examples 53 to 56

A plurality of positive electrode precursors were produced in the same manner as Example 62, except that the positive electrode active materials, the lithium compounds and their mean particle diameters, the parts by weight of the positive electrode active materials and lithium compounds were as shown in Table 6. Nonaqueous lithium power storage elements were produced and evaluated in the same manner as Example 62, except that these positive electrode precursors were used and combined with the negative electrodes listed in Table 6. The results are shown in Table 6.

Comparative Example 57

[Production of Positive Electrode Precursor]

After mixing 87.5 parts by weight of activated carbon 2c, 3.0 parts by weight of Ketchen black, 1.5 parts by weight of PVP (polyvinylpyrrolidone), 8.0 parts by weight of PVDF (polyvinylidene fluoride) and NMP (N-methylpyrrolidone), the mixture was dispersed using a FILMIX® thin-film rotating-type high speed mixer by Primix Corp., under conditions with a peripheral velocity of 17 m/s, to obtain a coating solution. A positive electrode precursor was obtained in the same manner as Example 62, except for using the coating solution obtained above.

[Preparation and Evaluation of Nonaqueous Lithium Power Storage Element]

Assembly, filling, impregnation and sealing of a nonaqueous lithium power storage element were carried out in the same manner as Example 62, except for using the obtained positive electrode precursor, and the negative electrode listed in Table 2, comprising a metal lithium foil corresponding to 1,100 mAh/g per unit weight of the negative electrode active material, attached to the front side of the first negative electrode active material layer, and a metal lithium foil corresponding to 900 mAh/g per unit weight of the negative electrode active material attached to the front side of the second negative electrode active material layer.

Next, as the lithium doping step, the obtained nonaqueous lithium power storage element was stored for 30 hours in a thermostatic bath with an environmental temperature of 45° C., for ionization of the metal lithium and doping in the negative electrode listed in Table 2. The obtained nonaqueous lithium power storage element was then subjected to an aging step and degassing step in the same manner as Example 62, to produce a nonaqueous lithium power storage element, which was evaluated. The results are shown in Table 6.

Comparative Example 58

[Preparation and Evaluation of Nonaqueous Lithium Power Storage Element]

Assembly, filling, impregnation and sealing of a nonaqueous lithium power storage element were carried out in the same manner as Example 62, except for using the positive electrode precursor obtained in Comparative Example 57, and a negative electrode comprising a metal lithium foil corresponding to 280 mAh/g per unit weight of the negative electrode active material, attached to the front sides of the first and second negative electrode active material layers of the negative electrode listed in Table 6.

Next, as the lithium doping step, the obtained nonaqueous lithium power storage element was stored for 30 hours in a thermostatic bath with an environmental temperature of 45° C., for ionization of the metal lithium and doping in the negative electrode listed in Table 6. The obtained nonaqueous lithium power storage element was then subjected to an aging step and degassing step in the same manner as Example 62, to produce a nonaqueous lithium power storage element, which was evaluated. The results are shown in Table 6.

The results are summarized in Table 6 below.

TABLE 6

| | Positive electrode active material layer 1 of positive electrode precursor | | | | | Positive electrode active material layer 2 of positive electrode precursor | | | | |
|---|---|---|---|---|---|---|---|---|---|---|
| | Positive electrode active material | Lithium compound | Lithium compound mean particle diameter (μm) | Positive electrode active material (parts by weight) | Lithium compound (parts by weight) | Positive electrode active material | Lithium compound | Lithium compound mean particle diameter (μm) | Positive electrode active material (parts by weight) | Lithium compound (parts by weight) |
| Example 62 | Activated carbon 1e | Lithium carbonate | 2.4 | 57.5 | 30.0 | Activated carbon 1e | Lithium carbonate | 2.4 | 42.5 | 45.0 |
| Example 63 | Activated carbon 2 c | Lithium carbonate | 2.4 | 57.5 | 30.0 | Activated carbon 2 c | Lithium carbonate | 2.4 | 42.5 | 45.0 |
| Example 64 | Activated carbon 2 c | Lithium carbonate | 2.4 | 57.5 | 30.0 | Activated carbon 2 c | Lithium carbonate | 2.4 | 42.5 | 45.0 |
| Example 65 | Activated carbon 2 c | Lithium carbonate | 2.4 | 57.5 | 30.0 | Activated carbon 2 c | Lithium carbonate | 2.4 | 42.5 | 45.0 |
| Example 66 | Activated carbon 2 c | Lithium carbonate | 2.4 | 57.5 | 30.0 | Activated carbon 2 c | Lithium carbonate | 2.4 | 67.5 | 20.0 |
| Example 67 | Activated carbon 2 c | Lithium carbonate | 2.4 | 57.5 | 30.0 | Activated carbon 2 c | Lithium carbonate | 2.4 | 52.5 | 35.0 |
| Example 68 | Activated carbon 2 c | Lithium carbonate | 2.4 | 57.5 | 30.0 | Activated carbon 2 c | Lithium carbonate | 2.4 | 27.5 | 60.0 |
| Example 69 | Activated carbon 2 c | Lithium carbonate | 2.4 | 57.5 | 30.0 | Activated carbon 2 c | Lithium carbonate | 0.7 | 57.5 | 30.0 |
| Example 70 | Activated carbon 2 c | Lithium carbonate | 2.4 | 57.5 | 30.0 | Activated carbon 2 c | Lithium carbonate | 2.6 | 57.5 | 30.0 |
| Example 71 | Activated carbon 2 c | Lithium carbonate | 2.4 | 57.5 | 30.0 | Activated carbon 2 c | Lithium carbonate | 7.4 | 57.5 | 30.0 |
| Example 72 | Activated carbon 2 c | Lithium carbonate | 2.4 | 57.5 | 30.0 | Activated carbon 2 c | Lithium carbonate | 9.4 | 57.5 | 30.0 |
| Example 73 | Activated carbon 2 c | Lithium oxide | 2.5 | 57.5 | 30.0 | Activated carbon 2 c | Lithium oxide | 2.5 | 42.5 | 45.0 |
| Example 74 | Activated carbon 2 c | Lithium hydroxide | 2.7 | 57.5 | 30.0 | Activated carbon 2 | Lithium hydroxide | 2.7 | 42.5 | 45.0 |
| Comp. Example 53 | Activated carbon 2 c | Lithium carbonate | 2.4 | 57.5 | 30.0 | Activated carbon 2 c | Lithium carbonate | 2.4 | 82.5 | 5.0 |
| Comp. Example 54 | Activated carbon 2 c | Lithium carbonate | 2.4 | 57.5 | 30.0 | Activated carbon 2 c | Lithium carbonate | 2.4 | 17.5 | 70.0 |

TABLE 6-continued

| Comp. Example | Positive electrode active material layer 1 Name | Positive electrode active material layer 2 | | | Negative electrode active material layer 1 Name | Negative electrode active material layer 2 | | | |
|---|---|---|---|---|---|---|---|---|---|
| Comp. Example 55 | Activated carbon 2 c | Lithium carbonate | 2.4 | 57.5 | 30.0 | Activated carbon 2 c | Lithium carbonate | 0.2 | 57.5 | 30.0 |
| Comp. Example 56 | Activated carbon 2 c | Lithium carbonate | 2.4 | 57.5 | 30.0 | Activated carbon 2 c | Lithium carbonate | 12.5 | 57.5 | 30.0 |
| Comp. Example 57 | Activated carbon 2 c | None | — | 87.5 | 0.0 | Activated carbon 2 c | None | — | 87.5 | 0.0 |
| Comp. Example 58 | Activated carbon 2 c | None | — | 87.5 | 0.0 | Activated carbon 2 c | None | — | 87.5 | 0.0 |

| | Negative electrode | | Positive electrode active material layer 1 of positive electrode | | Positive electrode active material layer 2 of positive electrode | | |
|---|---|---|---|---|---|---|---|
| | Name | Coefficient of variation CV | BET specific surface area per unit volume of negative electrode active material layer (m2/cc) | Solid $Li^7$-NMR b/a | Lithium compound mean particle diameter (μm) | Solid $Li^7$-NMR b/a | Lithium compound mean particle diameter (μm) | Rb/Ra |
| Example 62 | Negative electrode 5 | 0.181 | 158 | 1.62 | 2.2 | 1.67 | 2.2 | 1.30 |
| Example 63 | Negative electrode 5 | 0.143 | 160 | 1.74 | 2.2 | 1.76 | 2.2 | 1.27 |
| Example 64 | Negative electrode 6 | 0.198 | 45 | 1.65 | 2.1 | 1.68 | 2.1 | 1.34 |
| Example 65 | Negative electrode 7 | 0.268 | 8 | 1.94 | 2.3 | 2.00 | 2.3 | 1.38 |
| Example 66 | Negative electrode 5 | 0.134 | 172 | 1.81 | 2.2 | 1.63 | 2.2 | 1.23 |
| Example 67 | Negative electrode 5 | 0.005 | 165 | 1.70 | 2.2 | 1.71 | 2.2 | 1.78 |
| Example 68 | Negative electrode 5 | 0.390 | 156 | 1.65 | 2.2 | 2.22 | 2.3 | 1.62 |
| Example 69 | Negative electrode 7 | 0.385 | 11 | 2.09 | 2.3 | 1.06 | 0.5 | 1.59 |
| Example 70 | Negative electrode 7 | 0.011 | 9 | 1.84 | 2.3 | 1.92 | 2.4 | 1.15 |
| Example 71 | Negative electrode 7 | 0.311 | 8 | 1.73 | 2.3 | 3.69 | 7.2 | 1.38 |
| Example 72 | Negative electrode 7 | 0.486 | 5 | 1.70 | 2.3 | 4.95 | 9.3 | 1.87 |
| Example 73 | Negative electrode 6 | 0.204 | 50 | 1.81 | 2.3 | 1.85 | 2.4 | 1.36 |
| Example 74 | Negative electrode 6 | 0.211 | 53 | 1.84 | 2.4 | 1.90 | 2.5 | 1.37 |
| Comp. Example 53 | Negative electrode 5 | 0.553 | 177 | 1.93 | 2.2 | 1.17 | 2.1 | 2.91 |
| Comp. Example 54 | Negative electrode 5 | 0.509 | 149 | 1.50 | 2.2 | 2.53 | 2.3 | 2.13 |
| Comp. Example 55 | Negative electrode 7 | 0.514 | 12 | 2.12 | 2.3 | 1.01 | 0.06 | 2.22 |
| Comp. Example 56 | Negative electrode 7 | 0.535 | 4 | 1.56 | 2.3 | 5.32 | 12.3 | 2.53 |
| Comp. Example 57 | Negative electrode 5 | 0.137 | 180 | 1.00 | — | 1.00 | — | 2.11 |
| Comp. Example 58 | Negative electrode 7 | 0.000 | 13 | 1.00 | — | 1.00 | — | 2.24 |

Based on Examples 62 to 74 and Comparative Examples 53 to 58 shown in Table 6, it is seen that, for a nonaqueous lithium power storage element, it is possible to exhibit a high load charge/discharge cycle characteristic by adding a lithium compound other than the positive electrode active material to the positive electrode, and by adjusting the coefficient of variation CV of $q_1$ and $q_2$ to be within a prescribed range, where $q_1$ is the amount of lithium per unit weight of the first negative electrode active material layer that has intercalated the lithium ions, calculated by the peak area of −20 ppm to 60 ppm in the solid $^7$Li-NMR spectrum of the first negative electrode active material layer formed on the first side of the negative electrode power collector, and $q_2$ is the amount of lithium per unit weight of the second negative electrode active material layer that has intercalated the lithium ions, calculated by the peak area of −20 ppm to 60 ppm in the solid $^7$Li-NMR spectrum of the second negative electrode active material layer formed on the second side of the negative electrode power collector, which is the back side of the first side.

An embodiment according to the fourth aspect will now be explained in detail.

Example 75

<Preparation of Positive Electrode Active Material>

Preparation Example 1f

Crushed coconut shell carbide was placed in a small carbonizing furnace and subjected to carbonization at 500° C. for 3 hours under a nitrogen atmosphere, to obtain a carbide. The obtained carbide was placed in an activating furnace, water vapor in a heated state using a preheating furnace was introduced into the activating furnace at 1 kg/h, and the temperature was increased to 900° C. over 8 hours for activation. The activated carbide was cooled under a nitrogen atmosphere to obtain activated carbon. The obtained activated carbon was flow-rinsed for 10 hours, drained, and dried for 10 hours in an electrodesiccator held at 115° C., and then it was pulverized for 1 hour with a ball mill to obtain activated carbon if.

A laser diffraction particle size distribution analyzer (SALD-2000J) by Shimadzu Corp. was used to measure the mean particle diameter of the activated carbon if, which was found to be 4.2 µm. Also, a pore distribution measuring apparatus (AUTOSORB-1 AS-1-MP) by Yuasa-Ionics, Inc. was used to measure the pore distribution of the activated carbon if. As a result, the BET specific surface area was 2360 m$^2$/g, the mesopore volume ($V_1$) was 0.52 cc/g, the micropore volume ($V_2$) was 0.88 cc/g, and $V_1/V_2$=0.59.

Preparation Example 2d

A phenol resin was placed in a furnace and subjected to carbonization at 600° C. for 2 hours under a nitrogen atmosphere, and was then pulverized with a ball mill and sorted, to obtain a carbide having a mean particle diameter of 7 µm. The obtained carbide was mixed with KOH at a weight ratio of 1:5, and the mixture was placed in a furnace and heated at 800° C. for 1 hour under a nitrogen atmosphere and activated. The activated carbide was removed out and stirred and rinsed for 1 hour in dilute hydrochloric acid adjusted to a concentration of 2 mol/L, and then boiled and rinsed with distilled water until the pH stabilized to between 5 and 6, after which it was dried to produce activated carbon 2d.

A laser diffraction particle size distribution analyzer (SALD-2000J) by Shimadzu Corp. was used to measure the mean particle diameter of the activated carbon 2d, which was found to be 7.0 µm. Also, a pore distribution measuring apparatus (AUTOSORB-1 AS-1-MP) by Yuasa-Ionics, Inc. was used to measure the pore distribution of the activated carbon 2d. As a result, the BET specific surface area was 3627 m$^2$/g, the mesopore volume ($V_1$) was 1.50 cc/g, the micropore volume ($V_2$) was 2.28 cc/g, and $V_1/V_2$=0.66.

<Production of Positive Electrode Precursor>

Activated carbon 2d was used as the positive electrode active material to produce a positive electrode precursor.

After mixing 55.5 parts by weight of activated carbon 2d, 32.0 parts by weight of lithium carbonate, 3.0 parts by weight of Ketchen black, 1.5 parts by weight of PVP (polyvinylpyrrolidone), 8.0 parts by weight of PVDF (polyvinylidene fluoride) and NMP (N-methylpyrrolidone), the mixture was dispersed using a FILMIX® thin-film rotating-type high speed mixer by Primix Corp., under conditions with a peripheral velocity of 17 m/s, to obtain coating solution 1C. The viscosity (ηb) and TI value of the obtained coating solution 1C were measured using a TVE-35H E-type viscometer by Toki Sangyo Co., Ltd. As a result, the viscosity (ηb) was 2,370 mPa·s and the TI value was 3.3. The degree of dispersion of the obtained coating solution 1C was measured using a fineness gauge by Yoshimitsu Seiki Co. As a result, the granularity was 31 µm.

Coating solution 1C was coated onto one or both sides of an aluminum foil with a thickness of 15 µm using a double-side die coater by Toray Engineering Co., Ltd. under conditions with a coating speed of 1 m/s, and dried at a drying temperature of 120° C. to obtain positive electrode precursor 11 (one side) and positive electrode precursor 11 (both sides). During coating of the coating solution 1C onto one side of the aluminum foil, the die discharge pressure was 55 kPa, and during coating of the coating solution 1C onto both sides of the aluminum foil, the discharge pressure of the top face die was 55 kPa and the discharge pressure of the bottom face die was 60 kPa. The obtained positive electrode precursor 11 (one side) and positive electrode precursor 11 (both sides) were pressed using a roll press under conditions with a pressure of 6 kN/cm and a pressed portion surface temperature of 25° C.

The total thickness of the positive electrode precursor 11 (both sides) was measured at 10 arbitrary locations of the positive electrode precursor 11 (both sides) using a Linear Gauge Sensor GS-551. by Ono Sokki Co., Ltd. The positive electrode active material layer on one side of the positive electrode precursor 11 (both sides) was then removed, and the thickness was again measured. All of the positive electrode active material layer remaining on the positive electrode power collector was then removed, and the thickness of the aluminum foil was measured. When the film thickness of the positive electrode active material layer on the positive electrode precursor 11 (both sides) was determined from the obtained measurement results, the top face of the positive electrode active material layer was 58 µm and the bottom face of the positive electrode active material layer was 61 µm, and the top face was used as the positive electrode precursor $C_{y1}$ side while the bottom face was used as the positive electrode precursor $C_{x1}$ side.

Preparation of Negative Electrode Active Material: Preparation Example 2a$_4$

The BET specific surface area and pore distribution of commercially available artificial graphite was measured by the method described above, using a pore distribution measuring apparatus (AUTOSORB-1 AS-1-MP) by Yuasa-Ionics, Inc. As a result, the BET specific surface area was 3.1 m$^2$/g and the mean particle diameter was 4.8 µm.

A 300 g portion of the artificial graphite was placed into a stainless steel mesh basket and placed on a stainless steel vat containing 30 g of coal-based pitch (softening point: 50° C.), and both were set in an electric furnace (furnace inner usable dimension: 300 mm×300 mm×300 mm). This was increased in temperature to 1000° C. for 12 hours under a nitrogen atmosphere, and kept at the same temperature for 5 hours for thermal reaction to obtain composite porous carbon material 2a$_4$. The obtained composite porous carbon material 2a$_4$ was cooled to 60° C. by natural cooling, and then removed out of the electric furnace.

The BET specific surface area and pore distribution of the obtained composite porous carbon material 2a$_4$ were measured by the same methods as described above. As a result, the BET specific surface area was 6.1 m$^2$/g and the mean particle diameter was 4.9 µm. Also, for composite porous carbon material 2a$_4$, the weight ratio of coal-based pitch-derived carbonaceous material with respect to activated carbon was 2.0%.

<Production of Negative Electrode>

Composite porous carbon material 2a$_4$ was used as a negative electrode active material to produce a negative electrode.

After mixing 84 parts by weight of composite porous carbon material 2a$_4$, 10 parts by weight of acetylene black, 6 parts by weight of PVdF (polyvinylidene fluoride) and NMP (N-methylpyrrolidone), the mixture was dispersed using a FILMIX® thin-film rotating-type high speed mixer by Primix Corp., under conditions with a peripheral velocity of 17 m/s, to obtain coating solution 1A. The viscosity (ηb) and TI value of the obtained coating solution 1A were measured using a TVE-35H E-type viscometer by Toki Sangyo Co., Ltd. As a result, the viscosity (ηb) was 2,520 mPa·s and the TI value was 3.8.

Coating solution 1A was coated onto both sides of an electrolytic copper foil with a thickness of 10 μm using a die coater by Toray Engineering Co., Ltd. under conditions with a coating speed of 2 m/s, and dried at a drying temperature of 120° C. to obtain negative electrode 8. During coating of coating solution 1A onto both sides of the copper foil, the discharge pressure of the top face die was 50 kPa, and the discharge pressure of the bottom face die was 45 kPa. The obtained negative electrode 8 was pressed using a roll press under conditions with a pressure of 5 kN/cm and a pressed portion surface temperature of 25° C.

The total thickness of the pressed negative electrode 8 was measured at 10 arbitrary locations of negative electrode 8, using a Linear Gauge Sensor GS-551 by Ono Sokki Co., Ltd. The negative electrode active material layer on one side of the negative electrode 8 was then removed, and the thickness was again measured. All of the negative electrode active material layer remaining on the negative electrode power collector was then removed, and the thickness of the copper foil was measured. When the film thickness of the negative electrode active material layer of the negative electrode 8 was determined from the obtained measurement results, the top face of the negative electrode active material layer was 35 μm and the bottom face of the negative electrode active material layer was 32 μm, and the top face was used as the negative electrode $A_{y1}$ side and the bottom face as the negative electrode $A_{x1}$ side.

[Measurement of Capacitance Per Unit Weight of Negative Electrode]

One piece of the obtained negative electrode 8 was cut out to a size of 1.4 cm×2.0 cm (2.8 cm$^2$), and the negative electrode active material layer on the $A_{x1}$ side coated onto the copper foil was removed using a spatula, brush or bristles to obtain a working electrode. Metal lithium was used as the counter electrode and reference electrode, to fabricate an electrochemical cell in an argon box, using a nonaqueous solution of LiPF$_6$ dissolved to a concentration of 1.0 mol/L in a mixed solvent of ethylene carbonate (EC) and ethylmethyl carbonate (EMC) at a volume ratio of 1:1, as the electrolytic solution.

The initial charging capacitance of the obtained electrochemical cell was measured by the following procedure using a charge/discharge apparatus (TOSCAT-3100U) by Toyo System Co., Ltd.

The electrochemical cell was subjected to constant-current charge at a temperature of 25° C., with a current value of 0.5 mA/cm$^2$ until reaching a voltage value of 0.01 V, and then to constant-voltage charge until the current value reached 0.01 mA/cm$^2$. When the charge capacity during constant-current charge and constant-voltage charge was evaluated as the initial charge capacity, it was found to be 0.74 mAh, and the capacitance per unit weight of negative electrode 8 (lithium ion doping amount) was 545 mAh/g.

<Preparation of Electrolytic Solution>

As an organic solvent there was used a mixed solvent of ethylene carbonate (EC):ethyl methyl carbonate (EMC)=33:67 (volume ratio), and each electrolyte salt was dissolved so that the concentration ratio of LiN(SO$_2$F)$_2$ and LiPF$_6$ was 75:25 (molar ratio) with respect to the total electrolytic solution and the total concentration of LiN(SO$_2$F)$_2$ and LiPF$_6$ was 1.2 mol/L, to obtain nonaqueous electrolytic solution 4. The concentrations of LiN(SO$_2$F)$_2$ and LiPF$_6$ in nonaqueous electrolytic solution 4 were 0.9 mol/L and 0.3 mol/L, respectively.

<Fabrication of Nonaqueous Lithium Power Storage Element>

The obtained positive electrode precursor 11 was cut into two positive electrode precursors 11 (one side) and 19 positive electrode precursors 11 (both sides), with the positive electrode active material layers at sizes of 10.0 cm×10.0 cm (100 cm$^2$). Twenty negative electrodes 8 were then cut out, with the negative electrode active material layers at sizes of 10.1 cm×10.1 cm (102 cm$^2$). Also, 40 10.3 cm×10.3 cm (106 cm$^2$) polyethylene separators (by ASAHI KASEI KABUSHIKI KAISHA, thickness: 10 μm) were prepared. These were laminated in the order: positive electrode precursor 11 (one side), separator, negative electrode 8, separator, positive electrode precursor 11 (both sides), with positive electrode precursors 11 (one side) as the outermost layers, and with the positive electrode precursor $C_{x1}$ sides and negative electrode $A_{x1}$ sides facing each other across separators and the positive electrode precursor $C_{y1}$ sides and negative electrode $A_{y1}$ sides facing each other across separators, to obtain an electrode laminated body. The positive electrode terminal and negative electrode terminal were ultrasonically welded to the obtained electrode laminated body and placed in a vessel formed of an aluminum laminate package material equipped with a check-valved degassing valve, and 3 sides including the electrode terminal section were sealed by heat sealing.

Approximately 70 g of the nonaqueous electrolytic solution 4 was injected into the electrode laminated body housed in the aluminum laminate package material, in a dry air environment at atmospheric pressure, a temperature of 25° C. and a dew point of no higher than −40° C. Next, it was placed in a pressure reduction chamber and the pressure was reduced from atmospheric pressure to −87 kPa, after which it was restored to atmospheric pressure and allowed to stand for 5 minutes. The step of reducing the pressure from atmospheric pressure to −87 kPa and then restoring to atmospheric pressure was subsequently repeated 4 times, and it was then allowed to stand for 15 minutes. The pressure was again reduced from atmospheric pressure to −91 kPa, and then restored to atmospheric pressure. The step of pressure reduction and restoration to atmospheric pressure in the same manner was repeated a total of 7 times (pressure reduction from atmospheric pressure to −95, −96, −97, −81, −97, −97 and −97 kPa, respectively). The electrode laminated body was impregnated with the nonaqueous electrolytic solution 4 by this procedure.

Next, the electrode laminated body impregnated with the nonaqueous electrolytic solution 4 was placed in a pressure-reducing sealing machine, and with the pressure reduced to −95 kPa, it was sealed at 180° C. for 10 seconds at a pressure of 0.1 MPa to seal the aluminum laminate package material.

[Lithium Doping Step]

The obtained electrode laminated body was placed in an argon box at a temperature of 25° C., a dew point of −60° C. and an oxygen concentration of 1 ppm. The excess portion of the aluminum laminate package material was cut to unseal it, and it was subjected to initial charging by a method of constant-current charge using a power source by Matsusada Precision, Inc. (P4LT18-0.2), with a current value of 100 mA until reaching a voltage of 4.5 V, followed by constant-voltage charge at 4.5 V continued for 72 hours, for lithium doping of the negative electrode. Upon completion of the lithium doping, a heat sealer by Fuji Impulse Co., Ltd. (FA-300) was used to seal the aluminum laminate.

[Aging Step]

The lithium-doped electrode laminated body was removed from the argon box and subjected to constant-current discharge in an environment of 25° C. at 100 mA until reaching a voltage of 3.8 V, and then constant-current discharge at 3.8 V for 1 hour, to adjust the voltage to 3.8 V. The electrode laminated body was then stored for 48 hours in a thermostatic bath at 60° C.

[Degassing Step]

A portion of the aluminum laminate package material of the aged electrode laminated body was unsealed in a dry air environment with a temperature of 25° C. and a dew point of −40° C. Next, the electrode laminated body was placed in a pressure reduction chamber, and a step of using a diaphragm pump (N816.3KT.45.18 by KNF Co.) for pressure reduction over a period of 3 minutes from atmospheric pressure to −80 kPa, followed by restoration to atmospheric pressure over a period of 3 minutes, was repeated 3 times. Next, the electrode laminated body was placed in a pressure-reducing sealing machine, and after pressure reduction to −90 kPa, it was sealed at 200° C. for 10 seconds at a pressure of 0.1 MPa to seal the aluminum laminate package material, to fabricate a nonaqueous lithium power storage element. Three nonaqueous lithium power storage elements were fabricated by this step.

<Evaluation of Nonaqueous Lithium Power Storage Elements>

[Measurement of Electrostatic Capacitance Fa]

One of the obtained nonaqueous lithium power storage elements was subjected to constant-current charge using a charge/discharge apparatus (5 V, 360 A) by Fujitsu Telecom Networks, Fukushima Ltd. in a thermostatic bath set to 25° C., with a 2 C current value (1.6 A) until reaching 3.8 V, and then constant-voltage charge was carried out with application of a constant voltage of 3.8 V for a total of 30 minutes. Next, with the capacitance after constant-current discharge to 2.2 V at a 2 C current value (1.6 A) as Q (C), F=Q/(3.8-2.2) was calculated as the electrostatic capacitance Fa, to be 1767 F.

[Measurement of Internal Resistance Ra]

The same nonaqueous lithium power storage element was subjected to constant-current charge using a charge/discharge apparatus (5 V, 360 A) by Fujitsu Telecom Networks, Fukushima Ltd. in a thermostatic bath set to 25° C., with a 20 C current value (16 A) until reaching 3.8 V, and then constant-voltage charge was carried out with application of a constant voltage of 3.8 V for a total of 30 minutes. Next, constant-current discharge was carried out to 2.2 V with a sampling time of 0.1 second and the 20 C current value (16 A), to obtain a discharge curve (time-voltage). From the discharge curve, with a voltage of Eo at discharge time=0 seconds, obtained by extrapolating by linear approximation from the voltage values at discharge times of 2 seconds and 4 seconds, the internal resistance Ra was calculated from the voltage drop $\Delta E=3.8-Eo$ and $R=\Delta E/(20$ C current value), to be 0.56 mΩ.

[High Load Charge/Discharge Cycle Test]

The nonaqueous lithium power storage element obtained in the step described above was subjected to constant-current charge using a charge/discharge apparatus (5 V, 360 A) by Fujitsu Telecom Networks, Fukushima Ltd. in a thermostatic bath set to 25° C., with a 200 C current value (160 A) until reaching 3.8 V, followed by constant-current discharge at the 200 C current value until reaching 2.2 V, as a charge/discharge step that was repeated 60,000 times without pause. Upon completion of the cycle, the internal resistance Rb was measured to be 0.63 mΩ.

[High-Temperature Storage Test]

The same nonaqueous lithium power storage element was subjected to constant-current charge using a charge/discharge apparatus (5 V, 360 A) by Fujitsu Telecom Networks, Ltd. in a thermostatic bath set to 25° C., with a 100 C current value (80 A) until reaching 4.0 V, and then constant-voltage charge was carried out with application of a constant voltage of 4.0 V for a total of 10 minutes. The cell was then stored in a 60° C. environment, and every 2 weeks it was removed out from the 60° C. environment, the cell voltage was charged to 4.0 V by the same charging step, and the cell was again stored in a 60° C. environment. This step was repeated for a period of 2 months, and the cell volume Va before start of the storage test and the volume Vb of the cell after two months of the storage test were measured by Archimedes' method in a 25° C. environment, using FLUORINERT (registered trademark of 3M Co. Japan) FC-40 as the measuring solvent. The value of B, as the gas generation volume determined by Vb−Va normalized by the electrostatic capacitance Fa, was $1.82 \times 10^{-3}$ cc/F.

[Calculation of $C_{x1}$, $C_{y1}$, $C_{x2}$, $C_{y2}$, $A_{x1}$ and $A_{y1}$]

The remaining nonaqueous lithium power storage element that had been obtained was adjusted to a voltage of 2.9 V and disassembled in an argon box at a dew point temperature of −72° C., and $C_{x1}$, $C_{y1}$, $C_{x2}$, $C_{y2}$, $A_{x1}$ and $A_{y1}$ were calculated by formula (5), formula (6) and formula (7), by the method described above.

[Microscopic Raman Spectroscopy]

The positive electrode was cut out to a size of 10 cm×10 cm from the electrode laminated body obtained by disassembling the nonaqueous lithium power storage element. The obtained positive electrode was immersed in 30 g of a diethyl carbonate solvent, and was washed for 10 minutes while occasionally moving the positive electrode with a pincette. The positive electrode was then removed out and air-dried for 5 minutes in an argon box, and the positive electrode was immersed in 30 g of freshly prepared diethyl carbonate solvent and washed for 10 minutes by the same method as described above. The washed positive electrode was removed from the argon box, and a vacuum dryer (DP33 by Yamato Scientific Co., Ltd.) was used for drying for 20 hours at a temperature of 25° C. and a pressure of 1 kPa, to obtain positive electrode sample 3.

Two small 1 cm×1 cm pieces were cut out from the positive electrode sample 3 obtained above, while maintaining a state of non-exposure to air, and sample $S_x$ was prepared by removing the positive electrode active material layer on the $C_y$ side while sample $S_y$ was prepared by removing the positive electrode active material layer on the $C_x$ side, using a spatula, brush or bristles, as samples for microscopic Raman spectroscopy.

(Measurement)

Carbonate ion mapping was performed using an inVia Reflex Raman microscope by Renishaw Co. The excitation light laser wavelength was 532 nm, and focusing was to a power of approximately 0.7 mW at the sample position, using a long-working-distance 50× objective lens. Point scanning was performed at 1 μm intervals in a range of 90 μm in the thickness direction of the positive electrode cross-section and 30 μm in the direction perpendicular to the thickness direction, and a Raman spectrum was obtained for each measurement point. For the peaks due to carbonate ion observed at 1086 cm$^{-1}$ in the Raman spectrum, a straight baseline was drawn for 1071 cm$^{-1}$ to 1104 cm$^{-1}$, and the area appearing in the positive region from the baseline and the area appearing on the negative side of the baseline were each calculated as peak areas. The negative sign was assigned to the area appearing on the negative side of the baseline. This was traced as the space distribution for the carbonate ion peak area, and an imaging representation for carbonate ion was obtained.

(Calculation of Areas $S_x$ and $S_y$ in Carbonate Ion Mapping)

The areas $S_x$ and $S_y$ in carbonate ion mapping were calculated as follows. A straight line baseline was set at positions of 1071 and 1104 cm$^{-1}$ in the Raman spectra for 2700 points obtained at each measurement position on the front side of the sample $S_x$, setting the area at the portions higher than the baseline as positive and the areas of the lower portions as negative, to construct the mapping data area (a). Next, the region from the maximum value to the minimum value of the area (a) was divided into 100 zones to construct histogram 1, and the portion on the negative side from the area value giving the maximum frequency was fitted by the least square method using a Gaussian function, thereby approximating the noise component by a Gaussian function. The difference obtained by subtracting the fitted Gaussian function from the original histogram 1 was used as histogram 2 for the peak area of $CO_3^{2-}$. In histogram 2, the cumulative frequency greater than the area (b) giving the maximum frequency was determined to be 172, as the mapping frequency for $CO_3^{2-}$ ion. This was divided by the total frequency of 2700 to calculate the area $S_x$ of carbonate ion mapping, which was $S_x$=6.4%. Similarly, the area $S_y$ of carbonate ion mapping for the sample $S_y$ was calculated to be $S_y$=4.5%.

[Calculation of $C_{y3}$ and $A_{y3}$]

While maintaining a state of non-exposure to air in the Ar box, the remaining positive electrode sample 3 was cut to a size of 10 cm×5 cm, and a spatula, brush or bristles were used to remove the positive electrode active material layer on the $C_x$ side. The obtained positive electrode sample 3 was washed for 10 minutes with 30 g of a diethyl carbonate solvent, and was vacuum dried in a side box while maintaining a state of non-exposure to air. The dried positive electrode body was transferred from the side box to an Ar box while maintaining a state of non-exposure to air, and was immersed and extracted in heavy water to obtain a positive electrode body liquid extract. Analysis of the liquid extract was by ion chromatography (IC) and $^1$H-NMR, and the abundance $C_{y3}$ (mol/g) per unit weight of the positive electrode active material for each compound accumulated on the positive electrode body was determined by the following formula (8), from the concentration C (mol/ml) of each compound in the positive electrode body liquid extract, the volume D (ml) of heavy water used for extraction and the weight E (g) of active material of the positive electrode used for extraction.

$$C_{y3}=C \times D/E \qquad (8)$$

The active material weight in the positive electrode active material layer used for extraction was determined by the following method.

The positive electrode active material layer was peeled off from the power collector of the positive electrode body remaining after heavy water extraction, using a spatula, brush or bristles, and the peeled off positive electrode active material layer was washed and the vacuum dried. The positive electrode active material layer obtained by vacuum drying was washed with NMP. Next, the obtained positive electrode active material layer was again vacuum dried, and weighed to determine the weight of the positive electrode active material layer used for extraction.

($^1$H-NMR Measurement)

The positive electrode body liquid extract was placed in a 3 mmφ NMR tube (PN-002 by Shigemi Corp.) and inserted into a 5 mmφ NMR tube (N-5 by Nihon Seimitsu Kagaku Co., Ltd.) containing 1,2,4,5-tetrafluorobenzene-added deuterated chloroform, and 1H NMR measurement was performed by the double tube method. The 7.1 ppm (m, 2H) signal of 1,2,4,5-tetrafluorobenzene was normalized, and the integral of each observed compound was calculated.

Deuterated chloroform containing dimethyl sulfoxide at known concentration was placed in a 3 mmφ NMR tube (PN-002 by Shigemi Corp.) and inserted into a 5 mmφ NMR tube (N-5 by Nihon Seimitsu Kagaku Co., Ltd.) containing the same 1,2,4,5-tetrafluorobenzene-added deuterated chloroform as above, and 1H NMR measurement was performed by the double tube method. In the same manner as above, the 7.1 ppm (m, 2H) signal of 1,2,4,5-tetrafluorobenzene was normalized, and the integral of the 2.6 ppm (s, 6H) signal of dimethyl sulfoxide was calculated. Based on the relationship between the dimethyl sulfoxide concentration used and the integral, the concentration C of each compound in the positive electrode body liquid extract was determined.

Assignment for the 1H NMR spectrum was as follows.
(For LiOCH$_2$CH$_2$OLi)
CH$_2$ in LiOCH$_2$CH$_2$OLi: 3.7 ppm (s, 4H)
CH$_3$OLi: 3.3 ppm (s, 3H)
CH$_3$ in CH$_3$CH$_2$OLi: 1.2 ppm (t, 3H)
CH$_2$O in CH$_3$CH$_2$OLi: 3.7 ppm (q, 2H)

Since the signal for CH$_2$ in LiOCH$_2$CH$_2$OLi (3.7 ppm) thus overlaps the signal for CH$_2$O in CH$_3$CH$_2$OLi (3.7 ppm), the amount of LiOCH$_2$CH$_2$OLi was calculated without the portion corresponding to CH$_2$O in CH$_3$CH$_2$OLi, calculated from the signal for CH$_3$ in CH$_3$CH$_2$OLi (1.2 ppm).

From the concentration of each compound in the extract as determined by the analysis described above, as well as the volume of heavy water used for extraction and the active material weight of the positive electrode used for extraction, it was possible to calculate the concentration $C_{y3}$ of LiOCH$_2$CH$_2$OLi on the $C_y$ side, as 84.5×10$^{-4}$ mol/g.

Using the same method, it was possible to calculate the concentration $A_{y3}$ of LiOCH$_2$CH$_2$OLi in the negative electrode active material layer facing the $C_y$ side, as 47.0×10$^{-4}$ mol/g.

Example 76

A nonaqueous lithium power storage element was fabricated by the same method as Example 75, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Example 77

A nonaqueous lithium power storage element was fabricated by the same method as Example 75, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Example 78

A nonaqueous lithium power storage element was fabricated by the same method as Example 75, except that for initial charging of the nonaqueous lithium power storage element in the lithium doping step, constant-current charge was carried out at a current value of 100 mA until reaching a voltage of 4.6 V, and then constant-voltage charge was carried out at 4.6 V continuously for 72 hours, for lithium doping at the negative electrode.

Example 79

A nonaqueous lithium power storage element was fabricated by the same method as Example 78, except that for initial charging of the nonaqueous lithium power storage element in the lithium doping step, constant-current charge was carried out at a current value of 100 mA until reaching a voltage of 4.6 V, and then constant-voltage charge was carried out at 4.6 V continuously for 36 hours, for lithium doping at the negative electrode.

Example 80

A nonaqueous lithium power storage element was fabricated by the same method as Example 78, except that for initial charging of the nonaqueous lithium power storage element in the lithium doping step, constant-current charge was carried out at a current value of 100 mA until reaching a voltage of 4.6 V, and then constant-voltage charge was carried out at 4.6 V continuously for 12 hours, for lithium doping at the negative electrode.

Example 81

A nonaqueous lithium power storage element was fabricated by the same method as Example 75, except that for initial charging of the nonaqueous lithium power storage element in the lithium doping step, constant-current charge was carried out at a current value of 100 mA until reaching a voltage of 4.3 V, and then constant-voltage charge was carried out at 4.3 V continuously for 72 hours, for lithium doping at the negative electrode.

Example 82

A nonaqueous lithium power storage element was fabricated by the same method as Example 81, except that for initial charging of the nonaqueous lithium power storage element in the lithium doping step, constant-current charge was carried out at a current value of 100 mA until reaching a voltage of 4.3 V, and then constant-voltage charge was carried out at 4.3 V continuously for 36 hours, for lithium doping at the negative electrode.

Example 83

A nonaqueous lithium power storage element was fabricated by the same method as Example 81, except that for initial charging of the nonaqueous lithium power storage element in the lithium doping step, constant-current charge was carried out at a current value of 100 mA until reaching a voltage of 4.3 V, and then constant-voltage charge was carried out at 4.3 V continuously for 12 hours, for lithium doping at the negative electrode.

Example 84

A nonaqueous lithium power storage element was fabricated by the same method as Example 75, except that the top face die discharge pressure was 56.5 kPa during coating of the positive electrode precursor (one side) to fabricate the positive electrode precursor 12 (one side), and the top face die discharge pressure was 56.5 kPa and the bottom face die discharge pressure was 58.5 kPa during coating of the positive electrode precursor (both sides) to fabricate the positive electrode precursor 12 (both sides).

Example 85

A nonaqueous lithium power storage element was fabricated by the same method as Example 84, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Example 86

A nonaqueous lithium power storage element was fabricated by the same method as Example 84, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Example 87

A nonaqueous lithium power storage element was fabricated by the same method as Example 75, except that the top face die discharge pressure was 52.5 kPa during coating of the positive electrode precursor (one side) to fabricate the positive electrode precursor 13 (one side), and the top face die discharge pressure was 52.5 kPa and the bottom face die discharge pressure was 62.5 kPa during coating of the positive electrode precursor (both sides) to fabricate the positive electrode precursor 13 (both sides).

Example 88

A nonaqueous lithium power storage element was fabricated by the same method as Example 75, except that the top face die discharge pressure was 50 kPa during coating of the positive electrode precursor (one side) to fabricate the positive electrode precursor 14 (one side), and the top face die discharge pressure was 50 kPa and the bottom face die discharge pressure was 65 kPa during coating of the positive electrode precursor (both sides) to fabricate the positive electrode precursor 14 (both sides).

Example 89

A nonaqueous lithium power storage element was fabricated by the same method as Example 88, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Example 90

A nonaqueous lithium power storage element was fabricated by the same method as Example 88, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Example 91

A nonaqueous lithium power storage element was fabricated by the same method as Example 75, except that the negative electrode 9 was fabricated with a top face die discharge pressure of 48.5 kPa and a bottom face die discharge pressure of 46.5 kPa, during coating of the negative electrode.

Example 92

A nonaqueous lithium power storage element was fabricated by the same method as Example 91, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Example 93

A nonaqueous lithium power storage element was fabricated by the same method as Example 91, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Example 94

A nonaqueous lithium power storage element was fabricated by the same method as Example 75, except that the negative electrode 10 was fabricated with a top face die discharge pressure of 55 kPa and a bottom face die discharge pressure of 40 kPa, during coating of the negative electrode.

Example 95

A nonaqueous lithium power storage element was fabricated by the same method as Example 94, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Example 96

A nonaqueous lithium power storage element was fabricated by the same method as Example 94, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Example 97

A nonaqueous lithium power storage element was fabricated by the same method as Example 75, except for using the positive electrode precursor 12 (one side), positive electrode precursor 12 (both sides) and negative electrode 9.

Example 98

A nonaqueous lithium power storage element was fabricated by the same method as Example 75, except for using the positive electrode precursor 14 (one side), positive electrode precursor 14 (both sides) and negative electrode 10.

Example 99

A nonaqueous lithium power storage element was fabricated by the same method as Example 98, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Example 100

A nonaqueous lithium power storage element was fabricated by the same method as Example 98, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 59

A nonaqueous lithium power storage element was fabricated by the same method as Example 75, except that the top face die discharge pressure was 57.5 kPa during coating of the positive electrode precursor (one side) to fabricate the positive electrode precursor 15 (one side), and the top face die discharge pressure was 57.5 kPa and the bottom face die discharge pressure was 57.5 kPa during coating of the positive electrode precursor (both sides) to fabricate the positive electrode precursor 15 (both sides).

Comparative Example 60

A nonaqueous lithium power storage element was fabricated by the same method as Comparative Example 59, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 61

A nonaqueous lithium power storage element was fabricated by the same method as Comparative Example 59, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 62

A nonaqueous lithium power storage element was fabricated by the same method as Example 75, except that the negative electrode 11 was fabricated with a top face die discharge pressure of 47.5 kPa and a bottom face die discharge pressure of 47.5 kPa, during coating of the negative electrode.

Comparative Example 63

A nonaqueous lithium power storage element was fabricated by the same method as Comparative Example 62, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 64

A nonaqueous lithium power storage element was fabricated by the same method as Comparative Example 62, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 65

A nonaqueous lithium power storage element was fabricated by the same method as Example 75, except that the top face die discharge pressure was 45 kPa during coating of the positive electrode precursor (one side) to fabricate the positive electrode precursor 16 (one side), and the top face die discharge pressure was 45 kPa and the bottom face die discharge pressure was 70 kPa during coating of the positive electrode precursor (both sides) to fabricate the positive electrode precursor 16 (both sides).

Comparative Example 66

A nonaqueous lithium power storage element was fabricated by the same method as Comparative Example 65, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 67

A nonaqueous lithium power storage element was fabricated by the same method as Comparative Example 65, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 68

A nonaqueous lithium power storage element was fabricated by the same method as Example 75, except that the negative electrode 12 was fabricated with a top face die discharge pressure of 60 kPa and a bottom face die discharge pressure of 35 kPa, during coating of the negative electrode.

Comparative Example 69

A nonaqueous lithium power storage element was fabricated by the same method as Comparative Example 68, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 70

A nonaqueous lithium power storage element was fabricated by the same method as Comparative Example 68, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 71

A nonaqueous lithium power storage element was fabricated by the same method as Example 75, except for using the positive electrode precursor 16 (one side), positive electrode precursor 16 (both sides) and negative electrode 12.

Comparative Example 72

A nonaqueous lithium power storage element was fabricated by the same method as Comparative Example 71, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 73

A nonaqueous lithium power storage element was fabricated by the same method as Comparative Example 71, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 74

A nonaqueous lithium power storage element was fabricated by the same method as Comparative Example 71, except that for initial charging of the nonaqueous lithium power storage element in the lithium doping step, constant-current charge was carried out at a current value of 100 mA until reaching a voltage of 4.1 V, and then constant-voltage charge was carried out at 4.1 V continuously for 72 hours, for lithium doping at the negative electrode.

Comparative Example 75

A nonaqueous lithium power storage element was fabricated by the same method as Comparative Example 71, except that for initial charging of the nonaqueous lithium power storage element in the lithium doping step, constant-current charge was carried out at a current value of 100 mA until reaching a voltage of 4.1 V, and then constant-voltage charge was carried out at 4.1 V continuously for 36 hours, for lithium doping at the negative electrode.

Comparative Example 76

A nonaqueous lithium power storage element was fabricated by the same method as Comparative Example 71, except that for initial charging of the nonaqueous lithium power storage element in the lithium doping step, constant-current charge was carried out at a current value of 100 mA until reaching a voltage of 4.1 V, and then constant-voltage charge was carried out at 4.1 V continuously for 12 hours, for lithium doping at the negative electrode.

Comparative Example 77

A nonaqueous lithium power storage element was fabricated by the same method as Comparative Example 71, except that for initial charging of the nonaqueous lithium power storage element in the lithium doping step, constant-current charge was carried out at a current value of 100 mA until reaching a voltage of 5.0 V, and then constant-voltage charge was carried out at 5.0 V continuously for 72 hours, for lithium doping at the negative electrode.

Comparative Example 78

A nonaqueous lithium power storage element was fabricated by the same method as Comparative Example 71, except that for initial charging of the nonaqueous lithium power storage element in the lithium doping step, constant-current charge was carried out at a current value of 100 mA until reaching a voltage of 5.1 V, and then constant-voltage charge was carried out at 5.1 V continuously for 72 hours, for lithium doping at the negative electrode.

Comparative Example 79

A nonaqueous lithium power storage element was fabricated by the same method as Comparative Example 71, except that for initial charging of the nonaqueous lithium power storage element in the lithium doping step, constant-current charge was carried out at a current value of 100 mA until reaching a voltage of 5.2 V, and then constant-voltage charge was carried out at 5.2 V continuously for 72 hours, for lithium doping at the negative electrode.

Comparative Example 80

A nonaqueous lithium power storage element was fabricated by the same method as Example 75, except that the electrode laminated body was fabricated with the positive electrode precursor $C_{x1}$ sides and negative electrode $A_{y1}$ sides facing each other across separators, and the positive electrode precursor $C_{y1}$ sides and negative electrode $A_{x1}$ sides facing each other across separators.

Comparative Example 81

A nonaqueous lithium power storage element was fabricated by the same method as Comparative Example 80, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 82

A nonaqueous lithium power storage element was fabricated by the same method as Comparative Example 80, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 83

A nonaqueous lithium power storage element was fabricated by the same method as Comparative Example 80, except for using the positive electrode precursor 14 (one side), positive electrode precursor 14 (both sides) and negative electrode 10.

Comparative Example 84

A nonaqueous lithium power storage element was fabricated by the same method as Comparative Example 83, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 85

A nonaqueous lithium power storage element was fabricated by the same method as Comparative Example 83, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

The evaluation results for Examples 75 to 100 and Comparative Examples 59 to 85 are shown in Tables 7 and 8.

TABLE 7

| | $C_{x1}$ (g/m²) | $C_{y1}$ (g/m²) | $C_{x2}$ (g/m²) | $C_{y2}$ (g/m²) | $A_{x1}$ (g/m²) | $A_{y1}$ (g/m²) | $C_{x1}/C_{y1}$ | $A_{x1}/A_{y1}$ |
|---|---|---|---|---|---|---|---|---|
| Example 75 | 28.4 | 26.6 | 5.4 | 3.6 | 23.5 | 26.0 | 1.07 | 0.90 |
| Example 76 | 28.3 | 26.4 | 9.3 | 6.3 | 23.5 | 26.0 | 1.07 | 0.90 |
| Example 77 | 28.5 | 26.3 | 14.0 | 10.6 | 23.6 | 25.9 | 1.08 | 0.91 |
| Example 78 | 28.5 | 26.6 | 2.1 | 0.3 | 23.6 | 25.9 | 1.07 | 0.91 |
| Example 79 | 28.4 | 26.5 | 5.1 | 1.4 | 23.5 | 25.9 | 1.07 | 0.91 |
| Example 80 | 28.4 | 26.5 | 8.8 | 3.7 | 23.4 | 26.0 | 1.07 | 0.90 |
| Example 81 | 28.5 | 26.4 | 8.8 | 7.0 | 23.6 | 25.9 | 1.08 | 0.91 |
| Example 82 | 28.5 | 26.6 | 12.2 | 11.1 | 23.6 | 26.0 | 1.07 | 0.91 |
| Example 83 | 28.5 | 26.5 | 16.6 | 15.7 | 23.5 | 25.9 | 1.08 | 0.91 |
| Example 84 | 27.9 | 27.1 | 4.1 | 3.1 | 23.4 | 26.0 | 1.03 | 0.90 |
| Example 85 | 28.1 | 27.2 | 8.1 | 5.7 | 23.5 | 25.9 | 1.03 | 0.91 |
| Example 86 | 28.0 | 27.1 | 13.3 | 11.3 | 23.6 | 25.9 | 1.03 | 0.91 |
| Example 87 | 30.4 | 24.4 | 5.3 | 2.3 | 23.4 | 26.0 | 1.25 | 0.90 |
| Example 88 | 31.4 | 23.5 | 5.6 | 2.8 | 23.5 | 26.0 | 1.34 | 0.91 |
| Example 89 | 31.5 | 23.6 | 10.4 | 5.8 | 23.4 | 25.9 | 1.33 | 0.90 |
| Example 90 | 31.4 | 23.5 | 14.6 | 9.5 | 23.5 | 26.1 | 1.34 | 0.90 |
| Example 91 | 28.4 | 26.5 | 5.5 | 1.4 | 24.2 | 25.2 | 1.07 | 0.96 |
| Example 92 | 28.4 | 26.5 | 8.8 | 4.6 | 24.3 | 25.3 | 1.07 | 0.96 |
| Example 93 | 28.4 | 26.4 | 13.6 | 8.8 | 24.5 | 25.2 | 1.08 | 0.97 |
| Example 94 | 28.5 | 26.5 | 4.0 | 2.8 | 21.4 | 28.5 | 1.08 | 0.75 |
| Example 95 | 28.5 | 26.5 | 8.6 | 7.6 | 21.4 | 28.5 | 1.08 | 0.75 |
| Example 96 | 28.6 | 26.4 | 13.6 | 12.6 | 21.5 | 28.6 | 1.08 | 0.75 |
| Example 97 | 28.0 | 27.1 | 3.8 | 3.6 | 24.3 | 25.1 | 1.03 | 0.97 |
| Example 98 | 31.5 | 23.4 | 5.5 | 1.4 | 21.5 | 28.5 | 1.35 | 0.75 |
| Example 99 | 31.4 | 23.6 | 10.1 | 4.4 | 21.6 | 28.6 | 1.33 | 0.76 |
| Example 100 | 31.4 | 23.6 | 14.5 | 7.0 | 21.5 | 28.5 | 1.33 | 0.75 |
| Comp. Example 59 | 27.6 | 27.5 | 3.7 | 3.7 | 23.6 | 26.0 | 1.00 | 0.91 |
| Comp. Example 60 | 27.4 | 27.5 | 7.5 | 7.4 | 23.5 | 25.9 | 1.00 | 0.91 |
| Comp. Example 61 | 27.6 | 27.5 | 13.6 | 13.7 | 23.4 | 26.0 | 1.00 | 0.90 |
| Comp. Example 62 | 28.6 | 26.5 | 4.3 | 3.5 | 24.8 | 24.7 | 1.08 | 1.00 |
| Comp. Example 63 | 28.4 | 26.6 | 8.8 | 7.5 | 24.6 | 24.7 | 1.07 | 1.00 |
| Comp. Example 64 | 28.6 | 26.5 | 13.7 | 12.6 | 24.6 | 24.8 | 1.08 | 0.99 |
| Comp. Example 65 | 31.9 | 23.1 | 6.9 | 3.3 | 23.6 | 25.9 | 1.38 | 0.91 |
| Comp. Example 66 | 31.8 | 23.1 | 12.3 | 6.0 | 23.6 | 26.0 | 1.38 | 0.91 |
| Comp. Example 67 | 31.8 | 23.0 | 17.1 | 8.1 | 23.5 | 25.9 | 1.38 | 0.91 |
| Comp. Example 68 | 28.5 | 26.6 | 4.5 | 3.5 | 20.9 | 29.0 | 1.07 | 0.72 |
| Comp. Example 69 | 28.5 | 26.6 | 8.9 | 7.9 | 21.0 | 28.9 | 1.07 | 0.73 |
| Comp. Example 70 | 28.6 | 26.6 | 13.0 | 12.0 | 21.1 | 28.9 | 1.08 | 0.73 |
| Comp. Example 71 | 31.9 | 23.1 | 6.7 | 3.3 | 21.0 | 29.0 | 1.38 | 0.72 |
| Comp. Example 72 | 31.8 | 23.0 | 12.9 | 6.1 | 21.0 | 28.9 | 1.38 | 0.73 |
| Comp. Example 73 | 31.8 | 23.0 | 18.8 | 8.7 | 21.1 | 28.9 | 1.38 | 0.73 |
| Comp. Example 74 | 31.9 | 23.1 | 20.8 | 15.1 | 21.1 | 29.0 | 1.38 | 0.73 |
| Comp. Example 75 | 31.9 | 23.0 | 20.6 | 14.5 | 20.9 | 28.9 | 1.39 | 0.72 |
| Comp. Example 76 | 31.9 | 23.1 | 22.3 | 15.6 | 21.1 | 28.9 | 1.38 | 0.73 |
| Comp. Example 77 | 31.9 | 23.1 | 0.8 | 0.5 | 20.9 | 29.0 | 1.38 | 0.72 |
| Comp. Example 78 | 32.0 | 23.0 | 0.6 | 0.4 | 21.0 | 28.9 | 1.39 | 0.73 |
| Comp. Example 79 | 31.8 | 23.0 | 0.4 | 0.2 | 21.1 | 28.9 | 1.38 | 0.73 |
| Comp. Example 80 | 28.6 | 26.4 | 4.5 | 3.5 | 25.9 | 23.6 | 1.08 | 1.10 |
| Comp. Example 81 | 28.5 | 26.5 | 8.2 | 7.4 | 25.9 | 23.5 | 1.08 | 1.10 |
| Comp. Example 82 | 28.6 | 26.4 | 13.4 | 12.6 | 25.9 | 23.4 | 1.08 | 1.11 |
| Comp. Example 83 | 31.4 | 23.4 | 5.6 | 3.2 | 28.5 | 21.5 | 1.34 | 1.33 |

TABLE 7-continued

| | | | | | | | |
|---|---|---|---|---|---|---|---|
| Comp. Example 84 | 31.5 | 23.5 | 10.1 | 5.4 | 28.6 | 21.6 | 1.34 | 1.32 |
| Comp. Example 85 | 31.5 | 23.6 | 14.5 | 8.2 | 28.5 | 21.6 | 1.33 | 1.32 |

| | $(C_{x1}+C_{x2})A_{x1}/(C_{y1}+C_{y2})A_{y1}$ | Microscopic Raman spectroscopy | | | $C_{y3}$ ($10^{-4}$ mol/g) | $A_{y3}$ ($10^{-4}$ mol/g) | |
|---|---|---|---|---|---|---|---|
| | $C_{y2}/C_{x2}$ | | $S_x(\%)$ | $S_y(\%)$ | $S_x/S_y$ | | | $C_{y3}/A_{y3}$ |
| Example 75 | 0.67 | 1.01 | 6.4 | 4.5 | 1.42 | 84.5 | 47.0 | 1.8 |
| Example 76 | 0.68 | 1.04 | 9.6 | 8.3 | 1.16 | 43.2 | 37.9 | 1.1 |
| Example 77 | 0.76 | 1.05 | 26.8 | 26.2 | 1.02 | 25.7 | 35.1 | 0.7 |
| Example 78 | 0.14 | 1.04 | 1.6 | 1.2 | 1.33 | 278.2 | 43.6 | 6.4 |
| Example 79 | 0.27 | 1.09 | 2.1 | 1.8 | 1.17 | 190.6 | 21.6 | 8.8 |
| Example 80 | 0.42 | 1.11 | 9.7 | 9.4 | 1.03 | 154.7 | 7.9 | 19.6 |
| Example 81 | 0.80 | 1.02 | 11.4 | 9.4 | 1.21 | 37.7 | 38.5 | 1.0 |
| Example 82 | 0.91 | 0.98 | 19.9 | 17.4 | 1.14 | 9.1 | 21.2 | 0.4 |
| Example 83 | 0.95 | 0.97 | 37.1 | 34.1 | 1.09 | 2.4 | 10.8 | 0.2 |
| Example 84 | 0.76 | 0.95 | 2.1 | 2.0 | 1.05 | 96.8 | 39.5 | 2.5 |
| Example 85 | 0.70 | 1.00 | 8.4 | 7.9 | 1.06 | 41.6 | 35.0 | 1.2 |
| Example 86 | 0.85 | 0.98 | 23.5 | 20.4 | 1.15 | 19.8 | 34.6 | 0.6 |
| Example 87 | 0.43 | 1.20 | 4.7 | 2.9 | 1.62 | 85.0 | 39.0 | 2.2 |
| Example 88 | 0.50 | 1.28 | 6.0 | 3.1 | 1.94 | 74.6 | 38.9 | 1.9 |
| Example 89 | 0.56 | 1.29 | 14.0 | 7.8 | 1.79 | 40.7 | 38.9 | 1.0 |
| Example 90 | 0.65 | 1.26 | 29.5 | 16.2 | 1.82 | 16.2 | 54.5 | 0.3 |
| Example 91 | 0.25 | 1.17 | 3.4 | 2.8 | 1.21 | 85.2 | 35.4 | 2.4 |
| Example 92 | 0.52 | 1.15 | 10.9 | 9.2 | 1.18 | 45.6 | 27.9 | 1.6 |
| Example 93 | 0.65 | 1.16 | 28.0 | 27.4 | 1.02 | 13.0 | 29.6 | 0.4 |
| Example 94 | 0.70 | 0.83 | 3.0 | 2.5 | 1.20 | 78.7 | 45.9 | 1.7 |
| Example 95 | 0.88 | 0.82 | 10.8 | 9.6 | 1.13 | 44.2 | 38.7 | 1.1 |
| Example 96 | 0.93 | 0.81 | 27.8 | 26.2 | 1.06 | 12.7 | 34.5 | 0.4 |
| Example 97 | 0.95 | 1.00 | 1.7 | 1.6 | 1.06 | 85.2 | 47.8 | 1.8 |
| Example 98 | 0.25 | 1.13 | 4.7 | 2.6 | 1.81 | 77.7 | 43.7 | 1.8 |
| Example 99 | 0.44 | 1.12 | 16.8 | 8.8 | 1.91 | 34.8 | 37.0 | 0.9 |
| Example 100 | 0.48 | 1.13 | 31.5 | 16.5 | 1.91 | 12.0 | 27.3 | 0.4 |
| Comp. Example 59 | 1.00 | 0.91 | 2.5 | 2.5 | 1.00 | 81.3 | 48.0 | 1.7 |
| Comp. Example 60 | 0.99 | 0.91 | 9.0 | 8.6 | 1.05 | 41.1 | 41.0 | 1.0 |
| Comp. Example 61 | 1.01 | 0.90 | 24.8 | 26.0 | 0.95 | 28.7 | 35.1 | 0.8 |
| Comp. Example 62 | 0.81 | 1.10 | 4.3 | 3.4 | 1.26 | 83.5 | 51.3 | 1.6 |
| Comp. Example 63 | 0.85 | 1.09 | 9.7 | 8.5 | 1.14 | 46.2 | 39.1 | 1.2 |
| Comp. Example 64 | 0.92 | 1.07 | 29.5 | 28.3 | 1.04 | 22.7 | 35.6 | 0.6 |
| Comp. Example 65 | 0.48 | 1.34 | 8.5 | 4.2 | 2.02 | 92.1 | 49.3 | 1.9 |
| Comp. Example 66 | 0.49 | 1.38 | 24.8 | 11.8 | 2.10 | 41.3 | 40.4 | 1.0 |
| Comp. Example 67 | 0.47 | 1.43 | 40.5 | 18.4 | 2.20 | 18.7 | 33.9 | 0.6 |
| Comp. Example 68 | 0.78 | 0.79 | 4.3 | 3.4 | 1.26 | 102.3 | 48.3 | 2.1 |
| Comp. Example 69 | 0.89 | 0.79 | 9.2 | 7.9 | 1.16 | 44.5 | 42.5 | 1.0 |
| Comp. Example 70 | 0.92 | 0.79 | 28.1 | 25.0 | 1.12 | 17.1 | 37.7 | 0.5 |
| Comp. Example 71 | 0.49 | 1.06 | 4.5 | 2.2 | 2.05 | 93.5 | 47.9 | 2.0 |
| Comp. Example 72 | 0.47 | 1.12 | 20.5 | 9.9 | 2.07 | 47.3 | 39.7 | 1.2 |
| Comp. Example 73 | 0.46 | 1.17 | 44.7 | 21.5 | 2.08 | 23.4 | 35.0 | 0.7 |
| Comp. Example 74 | 0.73 | 1.00 | 47.3 | 35.0 | 1.35 | 1.3 | 20.6 | 0.06 |
| Comp. Example 75 | 0.70 | 1.01 | 47.9 | 33.1 | 1.45 | 0.8 | 18.2 | 0.04 |
| Comp. Example 76 | 0.70 | 1.02 | 51.2 | 36.5 | 1.40 | 0.6 | 12.8 | 0.05 |
| Comp. Example 77 | 0.63 | 1.00 | 0.5 | 0.3 | 1.67 | 305.6 | 78.8 | 3.9 |
| Comp. Example 78 | 0.67 | 1.01 | 0.5 | 0.3 | 1.67 | 331.2 | 83.3 | 4.0 |
| Comp. Example 79 | 0.50 | 1.01 | 0.4 | 0.2 | 2.00 | 393.4 | 78.8 | 5.0 |

TABLE 7-continued

| | | | | | | | | |
|---|---|---|---|---|---|---|---|---|
| Comp. Example 80 | 0.78 | 1.21 | 5.4 | 4.3 | 1.26 | 104.3 | 46.9 | 2.2 |
| Comp. Example 81 | 0.90 | 1.19 | 8.7 | 7.6 | 1.14 | 40.3 | 42.4 | 1.0 |
| Comp. Example 82 | 0.94 | 1.19 | 22.1 | 20.3 | 1.09 | 20.4 | 37.0 | 0.6 |
| Comp. Example 83 | 0.57 | 1.84 | 4.1 | 2.3 | 1.78 | 96.4 | 49.8 | 1.9 |
| Comp. Example 84 | 0.53 | 1.91 | 13.2 | 7.1 | 1.86 | 44.5 | 38.3 | 1.2 |
| Comp. Example 85 | 0.57 | 1.91 | 25.9 | 14.5 | 1.79 | 23.5 | 34.1 | 0.7 |

TABLE 8

| | Initial properties | | High load charge/ discharge cycling | | High-temperature storage test |
|---|---|---|---|---|---|
| | Fa (F.) | Ra (mΩ) | Rb (mΩ) | Rb/Ra | B ($10^{-3}$ cc/F.) |
| Example 75 | 1767 | 0.56 | 0.63 | 1.13 | 1.82 |
| Example 76 | 1736 | 0.57 | 0.65 | 1.14 | 2.19 |
| Example 77 | 1812 | 0.56 | 0.64 | 1.14 | 2.16 |
| Example 78 | 1783 | 0.54 | 0.60 | 1.11 | 1.56 |
| Example 79 | 1719 | 0.56 | 0.61 | 1.09 | 1.93 |
| Example 80 | 1814 | 0.57 | 0.65 | 1.14 | 2.21 |
| Example 81 | 1874 | 0.57 | 0.65 | 1.14 | 1.78 |
| Example 82 | 1653 | 0.55 | 0.61 | 1.11 | 2.44 |
| Example 83 | 1713 | 0.54 | 0.62 | 1.15 | 2.53 |
| Example 84 | 1873 | 0.55 | 0.63 | 1.15 | 2.47 |
| Example 85 | 1768 | 0.57 | 0.62 | 1.09 | 2.36 |
| Example 86 | 1851 | 0.57 | 0.63 | 1.11 | 2.63 |
| Example 87 | 1615 | 0.57 | 0.64 | 1.12 | 1.73 |
| Example 88 | 1526 | 0.57 | 0.64 | 1.12 | 2.12 |
| Example 89 | 1526 | 0.56 | 0.61 | 1.09 | 2.41 |
| Example 90 | 1565 | 0.54 | 0.60 | 1.11 | 2.41 |
| Example 91 | 1773 | 0.58 | 0.68 | 1.17 | 1.90 |
| Example 92 | 1856 | 0.56 | 0.63 | 1.13 | 2.36 |
| Example 93 | 1820 | 0.55 | 0.63 | 1.15 | 2.59 |
| Example 94 | 1703 | 0.57 | 0.62 | 1.09 | 2.02 |
| Example 95 | 1825 | 0.57 | 0.62 | 1.09 | 2.38 |
| Example 96 | 1773 | 0.57 | 0.64 | 1.12 | 2.71 |
| Example 97 | 1878 | 0.56 | 0.64 | 1.14 | 1.65 |
| Example 98 | 1556 | 0.54 | 0.61 | 1.13 | 1.88 |
| Example 99 | 1466 | 0.54 | 0.61 | 1.13 | 2.55 |
| Example 100 | 1422 | 0.57 | 0.65 | 1.14 | 2.79 |
| Comp. Example 59 | 1767 | 0.55 | 0.68 | 1.24 | 3.75 |
| Comp. Example 60 | 1737 | 0.54 | 0.67 | 1.24 | 3.53 |
| Comp. Example 61 | 1862 | 0.56 | 0.69 | 1.23 | 4.08 |
| Comp. Example 62 | 1797 | 0.56 | 0.69 | 1.23 | 2.02 |
| Comp. Example 63 | 1766 | 0.57 | 0.70 | 1.23 | 2.43 |
| Comp. Example 64 | 1742 | 0.58 | 0.72 | 1.24 | 2.72 |
| Comp. Example 65 | 1293 | 0.56 | 0.81 | 1.45 | 1.70 |
| Comp. Example 66 | 1100 | 0.56 | 0.82 | 1.46 | 2.52 |
| Comp. Example 67 | 1064 | 0.56 | 0.84 | 1.50 | 3.04 |
| Comp. Example 68 | 1667 | 0.56 | 0.81 | 1.45 | 2.00 |
| Comp. Example 69 | 1653 | 0.54 | 0.82 | 1.52 | 2.63 |
| Comp. Example 70 | 1425 | 0.55 | 0.81 | 1.47 | 3.16 |
| Comp. Example 71 | 1145 | 0.63 | 0.86 | 1.37 | 2.38 |
| Comp. Example 72 | 1142 | 0.64 | 0.87 | 1.36 | 2.71 |
| Comp. Example 73 | 1153 | 0.69 | 0.91 | 1.32 | 2.78 |
| Comp. Example 74 | 1016 | 0.81 | 1.32 | 1.63 | 6.54 |
| Comp. Example 75 | 840 | 0.92 | 1.56 | 1.70 | 8.39 |
| Comp. Example 76 | 768 | 0.97 | 1.82 | 1.88 | 9.26 |
| Comp. Example 77 | 1154 | 0.95 | 1.87 | 1.97 | 4.75 |
| Comp. Example 78 | 1122 | 1.03 | 2.01 | 1.95 | 6.30 |
| Comp. Example 79 | 1147 | 1.06 | 2.16 | 2.04 | 7.52 |
| Comp. Example 80 | 1778 | 0.57 | 0.87 | 1.53 | 2.08 |
| Comp. Example 81 | 1634 | 0.55 | 0.85 | 1.55 | 2.63 |
| Comp. Example 82 | 1713 | 0.54 | 0.88 | 1.63 | 2.58 |
| Comp. Example 83 | 1333 | 0.55 | 0.96 | 1.75 | 1.98 |
| Comp. Example 84 | 1237 | 0.57 | 0.95 | 1.67 | 2.63 |
| Comp. Example 85 | 1136 | 0.57 | 0.98 | 1.72 | 2.85 |

Example 101

<Production of Positive Electrode Precursor>

Positive electrode precursor 17 (one side) and positive electrode precursor 17 (both sides) were fabricated by the same method as Example 75, except for using activated carbon if. The film thickness of the top face of the positive electrode active material layer was 55 μm, the film thickness of the bottom face of the positive electrode active material layer was 58 μm, the top face was used as the positive electrode precursor $C_{y2}$ side and the bottom face was used as the positive electrode precursor $C_{x2}$ side.

Preparation of Negative Electrode Active Material: Preparation Example $1a_4$

The BET specific surface area and pore distribution of commercially available coconut shell activated carbon was measured by the method described above, using a pore distribution measuring apparatus (AUTOSORB-1 AS-1-MP) by Yuasa-Ionics, Inc. As a result, the BET specific surface area was 1,790 m²/g, the mesopore volume ($V_1$) was 0.199 cc/g, the micropore volume ($V_2$) was 0.698 cc/g, $V_1/V_2=0.29$, and the mean pore size was 20.1 Å.

A 300 g portion of the coconut shell activated carbon was placed into a stainless steel mesh basket and placed on a stainless steel vat containing 540 g of coal-based pitch (softening point: 50° C.), and both were set in an electric furnace (furnace inner usable dimension: 300 mm×300 mm×300 mm). This was increased in temperature to 600° C. for 8 hours under a nitrogen atmosphere, and kept at the same temperature for 4 hours for thermal reaction to obtain composite porous carbon material $1a_4$. The obtained composite porous carbon material $1a_4$ was cooled to 60° C. by natural cooling, and then removed out of the electric furnace.

The BET specific surface area and pore distribution of the obtained composite porous carbon material $1a_4$ were measured by the same methods as described above. As a result, the BET specific surface area was 262 m²/g, the mesopore volume ($V_{m1}$) was 0.186 cc/g, the micropore volume ($V_{m2}$) was 0.082 cc/g and $V_{m1}/V_{m2}=2.27$. Also, for composite porous carbon material $1a_4$, the weight ratio of coal-based pitch-derived carbonaceous material with respect to activated carbon was 78%.

<Production of Negative Electrode>

Negative electrode 13 was fabricated by the same method as Example 75, except for using composite porous carbon material $1a_4$. The film thickness of the top face of the negative electrode active material layer was 33 μm, that of the bottom face of the negative electrode active material layer was 30 μm, the top face was used as the negative electrode $A_{y2}$ side and the bottom face was used as the negative electrode $A_{x2}$ side.

[Measurement of Capacitance Per Unit Weight of Negative Electrode]

One piece of the obtained negative electrode 13 was cut out to a size of 1.4 cm×2.0 cm (2.8 cm$^2$), and the negative electrode active material layer on the $A_{y2}$ side coated onto the copper foil was removed using a spatula, brush or bristles to obtain a working electrode. Metal lithium was used as the counter electrode and reference electrode, to fabricate an electrochemical cell in an argon box, using a nonaqueous solution of $LiPF_6$ dissolved to a concentration of 1.0 mol/L in a mixed solvent of ethylene carbonate (EC) and ethylmethyl carbonate (EMC) at a volume ratio of 1:1, as the electrolytic solution.

The initial charging capacitance of the obtained electrochemical cell was measured by the following procedure using a charge/discharge apparatus (TOSCAT-3100U) by Toyo System Co., Ltd.

The electrochemical cell was subjected to constant-current charge at a temperature of 25° C., with a current value of 0.5 mA/cm$^2$ until reaching a voltage value of 0.01 V, and then to constant-voltage charge until the current value reached 0.01 mA/cm$^2$. When the charge capacity during constant-current charge and constant-voltage charge was evaluated as the initial charge capacity, it was found to be 1.6 mAh, and the capacitance per unit weight of negative electrode 13 (lithium ion doping amount) was 1460 mAh/g.

<Fabrication and Evaluation of Nonaqueous Lithium Power Storage Element>

A nonaqueous lithium power storage element was fabricated and evaluated by the same method as Example 75, except that the electrode laminated body was fabricated using positive electrode precursor 17 (one side), positive electrode precursor 17 (both sides) and negative electrode 13, laminating them in the order: positive electrode precursor 17 (one side), separator, negative electrode 13, separator, positive electrode precursor 17 (both sides), with the positive electrode precursor $C_{x2}$ sides and negative electrode $A_{x2}$ sides facing each other across separators and the positive electrode precursor $C_{y2}$ sides and negative electrode $A_{y2}$ sides facing each other across separators.

Example 102

A nonaqueous lithium power storage element was fabricated by the same method as Example 101, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Example 103

A nonaqueous lithium power storage element was fabricated by the same method as Example 101, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Example 104

A nonaqueous lithium power storage element was fabricated by the same method as Example 101, except for using lithium oxide instead of lithium carbonate.

Example 105

A nonaqueous lithium power storage element was fabricated by the same method as Example 101, except for using lithium hydroxide instead of lithium carbonate.

Comparative Example 86

A nonaqueous lithium power storage element was fabricated by the same method as Example 101, except that the electrode laminated body was fabricated with the positive electrode precursor $C_{x2}$ sides and negative electrode $A_{y2}$ sides facing each other across separators, and the positive electrode precursor $C_{y1}$ sides and negative electrode $A_{x1}$ sides facing each other across separators.

Comparative Example 87

A nonaqueous lithium power storage element was fabricated by the same method as Comparative Example 86, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 36 hours, for lithium doping at the negative electrode.

Comparative Example 88

A nonaqueous lithium power storage element was fabricated by the same method as Comparative Example 86, except that for initial charging of the nonaqueous lithium power storage element in the lithium doping step, constant-current charge was carried out at a current value of 100 mA until reaching a voltage of 4.5 V, and then constant-voltage charge was carried out at 4.5 V continuously for 12 hours, for lithium doping at the negative electrode.

Comparative Example 89

A nonaqueous lithium power storage element was fabricated by the same method as Comparative Example 86, except for using lithium oxide instead of lithium carbonate.

Comparative Example 90

A nonaqueous lithium power storage element was fabricated by the same method as Comparative Example 86, except for using lithium hydroxide instead of lithium carbonate.

Example 106

The positive electrode precursor 11 (both sides) was cut to a size of 12.0 cm×210.0 cm (a positive electrode active material layer size of 10.0 cm×210.0 cm, and a size of 2.0 cm×210.0 cm for the non-coated portion of the positive electrode, where the positive electrode active material layer was not coated on the positive electrode power collector), the negative electrode 8 was cut to a size of 12.1×220.0 cm (a negative electrode active material layer size of 10.1 cm×220.0 cm, and a size of 2.0 cm×220.0 cm for the non-coated portion of the negative electrode, where the negative electrode active material layer was not coated on the negative electrode power collector), and the cut out positive electrode precursor and negative electrode were wound while sandwiching a polyethylene separator (product of ASAHI KASEI KABUSHIKI KAISHA, thickness: 10 µm), to fabricate an electrode laminated body. The winding was in an ellipsoid fashion, with the positive electrode precursor $C_{x1}$ side and negative electrode $A_{x1}$ side facing each other across a separator, and the positive electrode precursor $C_{y1}$ side and negative electrode $A_{y1}$ side facing each other across a separator. The positive electrode terminal and negative electrode terminal were ultrasonically welded to the obtained electrode laminated body and placed in a vessel formed of an aluminum laminate package material, and 3 sides including the electrode terminal section were sealed by heat sealing. A nonaqueous lithium power storage element was then fabricated and evaluated by the same method as Example 75.

Example 107

The positive electrode precursor 17 (both sides) was cut to a size of 12.0 cm×210.0 cm (a positive electrode active material layer size of 10.0 cm×210.0 cm, and a size of 2.0 cm×210.0 cm for the non-coated portion of the positive electrode, where the positive electrode active material layer was not coated on the positive electrode power collector), the negative electrode 13 was cut to a size of 12.1×220.0 cm (a negative electrode active material layer size of 10.1 cm×220.0 cm, and a size of 2.0 cm×220.0 cm for the non-coated portion of the negative electrode, where the negative electrode active material layer was not coated on the negative electrode power collector), and the cut out positive electrode precursor and negative electrode were wound while sandwiching a polyethylene separator (product of ASAHI KASEI KABUSHIKI KAISHA, thickness: 10 µm), to fabricate an electrode laminated body. The winding was in an ellipsoid fashion, with the positive electrode precursor $C_{x2}$ side and negative electrode $A_{x2}$ side facing each other across a separator, and the positive electrode precursor $C_{y2}$ side and negative electrode $A_{y2}$ side facing each other across a separator. The positive electrode terminal and negative electrode terminal were ultrasonically welded to the obtained electrode laminated body and placed in a vessel formed of an aluminum laminate package material, and 3 sides including the electrode terminal section were sealed by heat sealing. A nonaqueous lithium power storage element was then fabricated and evaluated by the same method as Example 75.

Comparative Example 91

A nonaqueous lithium power storage element was fabricated by the same method as Example 106, except that winding was in an ellipsoid fashion with the positive electrode precursor $C_{x1}$ side and negative electrode $A_{y1}$ side facing each other across a separator, and the positive electrode precursor $C_{y1}$ side and negative electrode $A_{x1}$ side facing each other across a separator.

Comparative Example 92

A nonaqueous lithium power storage element was fabricated by the same method as Example 107, except that winding was in an ellipsoid fashion with the positive electrode precursor $C_{x2}$ side and negative electrode $A_{y2}$ side facing each other across a separator, and the positive electrode precursor $C_{y2}$ side and negative electrode $A_{x2}$ side facing each other across a separator.

The evaluation results for Examples 101 to 107 and Comparative Examples 86 to 92 are shown in Tables 9 and 10.

TABLE 9

| | Lithium compound | $C_{x1}$ (g/m²) | $C_{y1}$ (g/m²) | $C_{x2}$ (g/m²) | $C_{y2}$ (g/m²) | $A_{x1}$ (g/m²) | $A_{y1}$ (g/m²) | $C_{x1}/C_{y1}$ | $A_{x1}/A_{y1}$ |
|---|---|---|---|---|---|---|---|---|---|
| Example 101 | Li$_2$CO$_3$ | 30.5 | 28.6 | 5.2 | 3.3 | 25.5 | 28.0 | 1.07 | 0.91 |
| Example 102 | Li$_2$CO$_3$ | 30.5 | 28.6 | 9.6 | 7.7 | 25.5 | 27.9 | 1.07 | 0.91 |
| Example 103 | Li$_2$CO$_3$ | 30.4 | 28.7 | 14.0 | 12.7 | 25.4 | 28.0 | 1.06 | 0.91 |
| Example 104 | Li$_2$O | 30.5 | 28.7 | 5.5 | 3.5 | 25.6 | 28.0 | 1.06 | 0.91 |
| Example 105 | LiOH | 30.6 | 28.6 | 5.6 | 3.8 | 25.5 | 27.9 | 1.07 | 0.91 |
| Comp. Example 86 | Li$_2$CO$_3$ | 30.4 | 28.5 | 5.3 | 4.0 | 27.9 | 25.4 | 1.07 | 1.10 |
| Comp. Example 87 | Li$_2$CO$_3$ | 30.5 | 28.5 | 9.6 | 7.6 | 27.9 | 25.5 | 1.07 | 1.09 |
| Comp. Example 88 | Li$_2$CO$_3$ | 30.6 | 28.5 | 14.1 | 12.7 | 28.0 | 25.4 | 1.07 | 1.10 |
| Comp. Example 89 | Li$_2$O | 30.5 | 28.6 | 5.6 | 3.6 | 28.0 | 25.4 | 1.07 | 1.10 |
| Comp. Example 90 | LiOH | 30.5 | 28.5 | 5.4 | 3.5 | 27.9 | 25.5 | 1.07 | 1.09 |
| Example 106 | Li$_2$CO$_3$ | 30.4 | 28.5 | 4.6 | 3.2 | 23.5 | 26.0 | 1.07 | 0.90 |
| Example 107 | Li$_2$CO$_3$ | 30.5 | 28.7 | 5.2 | 4.1 | 25.5 | 27.9 | 1.06 | 0.91 |
| Comp. Example 91 | Li$_2$CO$_3$ | 30.5 | 28.6 | 4.6 | 3.6 | 26.0 | 23.4 | 1.07 | 1.11 |
| Comp. Example 92 | Li$_2$CO$_3$ | 30.6 | 28.5 | 5.2 | 4.2 | 28.0 | 25.5 | 1.07 | 1.10 |

| | $C_{y2}/C_{x2}$ | $(C_{x1}+C_{x2})A_{x1}/$ $(C_{y1}+C_{y2})A_{y1}$ | Microscopic Raman spectroscopy $S_x$(%) | $S_y$(%) | $S_x/S_y$ | $C_{y3}$ (10⁻⁴ mol/g) | $A_{y3}$ (10⁻⁴ mol/g) | $C_{y3}/A_{y3}$ |
|---|---|---|---|---|---|---|---|---|
| Example 101 | 0.63 | 1.02 | 7.1 | 6.4 | 1.11 | 73.4 | 108.2 | 0.68 |
| Example 102 | 0.80 | 1.01 | 15.6 | 9.6 | 1.63 | 47.9 | 98.0 | 0.49 |

TABLE 9-continued

| | | | | | | | | |
|---|---|---|---|---|---|---|---|---|
| Example 103 | 0.91 | 0.97 | 32.5 | 23.3 | 1.39 | 27.2 | 91.8 | 0.30 |
| Example 104 | 0.64 | 1.02 | 7.5 | 4.4 | 1.70 | 86.1 | 104.1 | 0.83 |
| Example 105 | 0.68 | 1.02 | 7.4 | 5.3 | 1.40 | 83.2 | 115.4 | 0.72 |
| Comp. Example 86 | 0.75 | 1.21 | 7.7 | 4.6 | 1.67 | 82.8 | 100.9 | 0.82 |
| Comp. Example 87 | 0.79 | 1.22 | 16.0 | 10.7 | 1.50 | 46.8 | 95.2 | 0.49 |
| Comp. Example 88 | 0.90 | 1.20 | 29.3 | 23.5 | 1.25 | 21.6 | 102.5 | 0.21 |
| Comp. Example 89 | 0.64 | 1.24 | 7.6 | 5.5 | 1.38 | 75.7 | 113.4 | 0.67 |
| Comp. Example 90 | 0.65 | 1.23 | 7.8 | 5.5 | 1.42 | 78.9 | 114.0 | 0.69 |
| Example 106 | 0.70 | 1.00 | 6.8 | 4.6 | 1.48 | 87.6 | 78.0 | 1.12 |
| Example 107 | 0.79 | 0.99 | 8.2 | 5.9 | 1.39 | 88.5 | 103.7 | 0.85 |
| Comp. Example 91 | 0.78 | 1.21 | 6.7 | 5.1 | 1.31 | 92.1 | 80.9 | 1.14 |
| Comp. Example 92 | 0.81 | 1.20 | 7.5 | 5.5 | 1.36 | 82.6 | 101.9 | 0.81 |

TABLE 10

| | Initial properties | | High load charge/ discharge cycling | | High-temperature storage test |
|---|---|---|---|---|---|
| | Fa (F.) | Ra (mΩ) | Rb (mΩ) | Rb/Ra | B ($10^{-3}$ cc/F.) |
| Example 101 | 1381 | 0.55 | 0.63 | 1.15 | 2.25 |
| Example 102 | 1281 | 0.54 | 0.62 | 1.15 | 2.60 |
| Example 103 | 1440 | 0.59 | 0.66 | 1.12 | 2.87 |
| Example 104 | 1392 | 0.59 | 0.67 | 1.14 | 2.33 |
| Example 105 | 1275 | 0.55 | 0.65 | 1.18 | 2.35 |
| Comp. Example 86 | 1196 | 0.57 | 0.89 | 1.56 | 3.02 |
| Comp. Example 87 | 1262 | 0.59 | 0.87 | 1.47 | 3.12 |
| Comp. Example 88 | 1090 | 0.54 | 0.88 | 1.63 | 3.23 |
| Comp. Example 89 | 1146 | 0.54 | 0.86 | 1.59 | 3.45 |
| Comp. Example 90 | 1201 | 0.58 | 0.88 | 1.52 | 3.40 |
| Example 106 | 1732 | 0.55 | 0.63 | 1.15 | 1.89 |
| Example 107 | 1337 | 0.54 | 0.63 | 1.17 | 2.30 |
| Comp. Example 91 | 1595 | 0.56 | 0.89 | 1.59 | 2.89 |
| Comp. Example 92 | 1080 | 0.60 | 0.85 | 1.42 | 3.30 |

The evaluation results shown in Tables 7 to 10 suggest that when $C_{x1}/C_{y1}$ was 1.02 to 1.35, as the range of the constituent feature of the invention, and $A_{x1}/A_{y1}$ was 0.74 to 0.98, it was possible to suppress uneven distribution of ions in the nonaqueous electrolytic solution during high load charge/discharge cycling, and decomposition of lithium compound on the $C_y$ side having large potential variation could be suppressed, thereby allowing increase in resistance to be suppressed.

Furthermore, they suggest that when a compound represented by formulas (1) to (3) was present in the positive electrode surface, it was possible suppress reaction between the lithium compound in the positive electrode and the nonaqueous electrolytic solution, and to suppress gas generation in the high-temperature storage test.

INDUSTRIAL APPLICABILITY

With the nonaqueous lithium power storage element of the invention, a plurality of nonaqueous lithium power storage elements may be connected in series or in parallel to create a power storage module. The nonaqueous lithium power storage element and power storage module of the invention may be suitably utilized in a power regenerating system of an automobile hybrid drive system, a power load-leveling system for natural power generation such as solar power generation or wind power generation, or in a microgrid, an uninterruptible power source system for factory production equipment or the like, a non-contact power supply system designed for leveling of voltage fluctuation in microwave power transmission or electrolytic resonance, or energy storage, or an energy harvesting system designed for utilization of electric power generated by vibration or the like, which are purposes that require a high load charge/discharge cycle characteristic.

The nonaqueous lithium power storage element of the invention is preferably applied in a lithium ion capacitor or lithium ion secondary battery, where the effect of the invention will be maximally exhibited.

EXPLANATION OF SYMBOLS

1 Negative electrode
2 Negative electrode power collector
3 First side of negative electrode power collector
4 Second side of negative electrode power collector
5 First negative electrode active material layer
6 Second negative electrode active material layer
7 Positive electrode active material layer $C_x$ side
8 Positive electrode active material layer $C_y$ side
9 Nonporous positive electrode power collector
10 Negative electrode active material layer $A_x$ side
11 Negative electrode active material layer $A_y$ side
12 Nonporous negative electrode power collector
13 Separator
14 Electrode laminated body
15 Casing

What is claimed is:

1. A method of preparing a nonaqueous lithium power storage element, comprising:
  providing a nonaqueous lithium power storage element comprising a positive electrode precursor containing a lithium compound other than an active material, a negative electrode, a separator, a nonaqueous electrolytic solution containing lithium ions, and a casing; and
  applying a voltage of 4.2V or more to the nonaqueous lithium power storage element with a portion of the casing in an open state, to decompose the lithium compound in the positive electrode precursor and pre-dope the negative electrode with the lithium ions, while releasing a gas generated from decomposition of the lithium compound out of an opening of the casing.

2. The method according to claim 1, wherein an environmental temperature of the nonaqueous lithium power storage element is 25° C. or more and 45° C. or less.

3. The method according to claim 1, wherein the positive electrode precursor has a positive electrode power collector, and a positive electrode active material layer containing a positive electrode active material, formed on one side or both sides of the positive electrode power collector, and
wherein the negative electrode has a negative electrode power collector, and a negative electrode active material layer containing a negative electrode active material, formed on one side or both sides of the negative electrode power collector.

4. The method according to claim 3, wherein a positive electrode is formed after pre-doping the negative electrode with the lithium ions, and in the positive electrode, the lithium compound is other than the positive electrode active material.

5. The method according to claim 4, wherein a nonaqueous lithium power storage element obtained by the method comprises the positive electrode, the negative electrode, the separator, the nonaqueous electrolytic solution, and the casing, and
wherein the expression 0.1 µm≤$X_1$≤10.0 µm is satisfied, where $X_1$ is the mean particle diameter of the lithium compound, the expressions 2.0 µm≤$Y_1$≤20.0 µm and $X_1$<$Y_1$ are satisfied, where $Y_1$ is the mean particle diameter of the positive electrode active material, and an amount of the lithium compound in the positive electrode is 1 weight % to 50 weight %.

6. The method according to claim 5, wherein $X_1$ is 0.5 µm to 5.0 µm.

7. The method according to claim 5, wherein the amount of the lithium compound in the positive electrode is 2 weight % to 20 weight %.

8. The method according to claim 4, wherein the positive electrode active material is an activated carbon satisfying 0.3<$V_1$≤0.8 and 0.5≤$V_2$≤1.0, where $V_1$ (cc/g) is the mesopore volume due to pores with diameters of 20 Å to 500 Å as calculated by the BJH method, and $V_2$ (cc/g) is the micropore volume due to pores with diameters of smaller than 20 Å as calculated by the MP method, and having a specific surface area of 1,500 m²/g to 3,000 m²/g, as measured by the BET method.

9. The method according to claim 4, wherein the positive electrode active material is an activated carbon satisfying 0.8<$V_1$≤2.5 and 0.8<$V_2$≤3.0, where $V_1$ (cc/g) is the mesopore volume due to pores with diameters of 20 Å to 500 Å as calculated by the BJH method, and $V_2$ (cc/g) is the micropore volume due to pores with diameters of smaller than 20 Å as calculated by the MP method, and having a specific surface area of 2,300 m²/g to 4,000 m²/g, as measured by the BET method.

10. The method according to claim 1, wherein the lithium compound is lithium carbonate, lithium oxide or lithium hydroxide.

11. A method of preparing a nonaqueous lithium power storage element, comprising:
providing a nonaqueous lithium power storage element comprising a positive electrode precursor containing a lithium compound other than an active material, a negative electrode, a separator, a nonaqueous electrolytic solution containing lithium ions, and a casing equipped with a degassing valve or gas permeable film; and
applying a voltage of 4.2V or more to the nonaqueous lithium power storage element, to decompose the lithium compound in the positive electrode precursor and pre-dope the negative electrode with the lithium ions, while releasing a gas generated from decomposition of the lithium compound through the degassing valve or gas permeable film.

12. The method according to claim 11, wherein the degassing valve is a check-valved degassing valve.

13. The method according to claim 11, wherein an environmental temperature of the nonaqueous lithium power storage element is 25° C. or more and 45° C. or less.

14. The method according to claim 11, wherein the positive electrode precursor has a positive electrode power collector, and a positive electrode active material layer containing a positive electrode active material, formed on one side or both sides of the positive electrode power collector, and
wherein the negative electrode has a negative electrode power collector, and a negative electrode active material layer containing a negative electrode active material, formed on one side or both sides of the negative electrode power collector.

15. The method according to claim 14, wherein a positive electrode is formed after pre-doping the negative electrode with the lithium ions, and in the positive electrode, the lithium compound is other than the positive electrode active material.

16. The method according to claim 15, wherein a nonaqueous lithium power storage element obtained by the method comprises the positive electrode, the negative electrode, the separator, the nonaqueous electrolytic solution, and the casing, and
wherein the expression 0.1 µm≤$X_1$≤10.0 µm is satisfied, where $X_1$ is the mean particle diameter of the lithium compound, the expressions 2.0 µm≤$Y_1$≤20.0 µm and $X_1$<$Y_1$ are satisfied, where $Y_1$ is the mean particle diameter of the positive electrode active material, and an amount of the lithium compound in the positive electrode is 1 weight % to 50 weight %.

17. The method according to claim 16, wherein $X_1$ is 0.5 µm to 5.0 µm.

18. The method according to claim 16, wherein the amount of the lithium compound in the positive electrode is 2 weight % to 20 weight %.

19. The method according to claim 15, wherein the positive electrode active material is an activated carbon satisfying 0.3<$V_1$≤0.8 and 0.5≤$V_2$≤1.0, where $V_1$ (cc/g) is the mesopore volume due to pores with diameters of 20 Å to 500 Å as calculated by the BJH method, and $V_2$ (cc/g) is the micropore volume due to pores with diameters of smaller than 20 Å as calculated by the MP method, and having a specific surface area of 1,500 m²/g to 3,000 m²/g, as measured by the BET method.

20. The method according to claim 15, wherein the positive electrode active material is an activated carbon satisfying 0.8<$V_1$≤2.5 and 0.8<$V_2$≤3.0, where $V_1$ (cc/g) is the mesopore volume due to pores with diameters of 20 Å to 500 Å as calculated by the BJH method, and $V_2$ (cc/g) is the micropore volume due to pores with diameters of smaller than 20 Å as calculated by the MP method, and having a specific surface area of 2,300 m²/g to 4,000 m²/g, as measured by the BET method.

21. The method according to claim 11, wherein the lithium compound is lithium carbonate, lithium oxide or lithium hydroxide.

* * * * *